US005420811A

United States Patent [19]

Ohki

[11] Patent Number: 5,420,811

[45] Date of Patent: May 30, 1995

[54] SIMPLE QUICK IMAGE PROCESSING APPARATUS FOR PERFORMING A DISCRETE COSINE TRANSFORMATION OR AN INVERSE DISCRETE COSINE TRANSFORMATION

[75] Inventor: Mitsuharu Ohki, Tokyo, Japan

[73] Assignee: Sony Corporation, Japan

[21] Appl. No.: 111,381

[22] Filed: Aug. 24, 1993

[30] Foreign Application Priority Data

Aug. 26, 1992 [JP] Japan .................................. 4-250807

[51] Int. Cl.[6] .............................................. G06F 15/332

[52] U.S. Cl. .................................. 364/725; 382/276

[58] Field of Search ........................... 364/725; 382/56

[56] References Cited

U.S. PATENT DOCUMENTS

| | | | |
|---|---|---|---|
| 4,134,134 | 1/1979 | Lux | 358/280 |
| 4,293,920 | 10/1981 | Merola | 364/725 |
| 4,481,605 | 11/1984 | Chase | 364/719 |
| 4,621,337 | 11/1986 | Cates et al. | 364/727 |
| 4,791,598 | 12/1988 | Liou et al. | 364/725 |
| 4,829,465 | 5/1989 | Knauer et al. | 364/725 |
| 4,839,844 | 6/1989 | Watari | 364/727 |
| 4,841,464 | 6/1989 | Guichard et al. | 364/725 |
| 4,866,653 | 9/1989 | Kulisch et al. | 364/748 |
| 4,914,615 | 4/1990 | Karmarkar et al. | 364/754 |
| 5,001,663 | 3/1991 | Parulski et al. | 364/760 |
| 5,007,100 | 4/1991 | D'Aoust et al. | 382/49 |
| 5,008,848 | 4/1991 | Akiwumi-Assani | 364/725 |
| 5,054,103 | 10/1991 | Yasuda et al. | 382/56 |
| 5,126,962 | 6/1992 | Chiang | 364/725 |
| 5,197,021 | 3/1993 | Cucchi et al. | 364/725 |
| 5,227,994 | 7/1993 | Mitsuharu | 364/750.5 |
| 5,249,146 | 9/1993 | Uramoto et al. | 364/725 |
| 5,257,213 | 10/1993 | Kim et al. | 364/725 |

FOREIGN PATENT DOCUMENTS

| | | |
|---|---|---|
| 0416311 | 3/1991 | European Pat. Off. . |
| 0468165 | 1/1992 | European Pat. Off. . |
| 0506111 | 9/1992 | European Pat. Off. . |
| 0557204 | 8/1993 | European Pat. Off. . |
| 03075868 | 3/1991 | Japan . |
| 03102567 | 4/1991 | Japan . |
| 03186969 | 8/1991 | Japan . |
| 2205710A | 12/1988 | United Kingdom . |

OTHER PUBLICATIONS

8084 *IEEE Transactions on Signal Processing* 40 (1992) Sep., No. 9 Feig et al "Fast Algorithm for the Discrete Cosine Transform" pp. 2174–2193.

Uramoto et al., "A 100-MHz 2-D Discrete Cosine Transform Core Processor", *IEEE Journal of Solid-State Circuits*, vol. 27, No. 4, Apr. 1992, pp. 492 to 498.

*Primary Examiner*—David H. Malzahn

*Attorney, Agent, or Firm*—Ronald P. Kananen

[57] ABSTRACT

A discrete cosine transformation (DCT) system and an inverse discrete cosine transformation (IDCT) system each having a simple circuit construction and high speed operation. A two-dimensional 4×4 DCT system, for example, performs a computation: $[Y]=\frac{1}{8}\cdot[W]\cdot[V]\cdot[T]\cdot[R]\cdot[L]\cdot[Q]\cdot[X]$. A first rearrangement circuit rearranges input data [X] in accordance with factors "1" in matrix [Q]. A first inner product computation circuit multiplies the result by a constant matrix [L] having "+1" and "1" factors. A second rearrangement circuit rearranges the results in accordance with factors "1" in matrix [R]. A second inner product computation circuit multiplies the results by matrix [T] constituted by factors "0", "1", and "−1". A third inner product computation circuit multiplies the results by a matrix [V] having coefficients of irrational numbers in a DCT. Finally, a third rearrangement circuit rearranges the results in accordance with factors "1" in matrix [W].

88 Claims, 36 Drawing Sheets

TWO-DIMENSIONAL 4×8 DCT

TWO-DIMENSIONAL 4×8 DCT

TWO-DIMENSIONAL 4×8 DCT

TWO-DIMENSIONAL 4×4 DCT

TWO-DIMENSIONAL 4×4 IDCT

TWO-DIMENSIONAL 4×8 DCT

TWO-DIMENSIONAL 4×8 IDCT

TWO-DIMENSIONAL 4×4 DCT

TWO-DIMENSIONAL 4×4 IDCT

TWO-DIMENSIONAL 4×4 DCT

TWO-DIMENSIONAL 4×4 IDCT

TWO-DIMENSIONAL 4×4 DCT

TWO-DIMENSIONAL 4×4 IDCT

SIMPLE QUICK IMAGE PROCESSING APPARATUS FOR PERFORMING A DISCRETE COSINE TRANSFORMATION OR AN INVERSE DISCRETE COSINE TRANSFORMATION

BACKGROUND OF THE INVENTION

1. Field of the Invention

The present invention relates to a discrete cosine transformation (DCT) system and a discrete cosine inverse transformation (IDCT) system performing an inverse discrete cosine transformation, more particularly relates to a discrete cosine transformation system and a discrete cosine inverse transformation system having a simple circuit structure and preferably able to perform a higher speed operation.

As the discrete cosine transformation system and discrete cosine inverse transformation system in the present invention, the present invention relates to (1) a two-dimensional 4 row×8 column discrete cosine transformation (4×8 DCT) system, and an inverse transformation (4×8 IDCT) system thereof; (2) a two-dimensional 4 row×4 column discrete cosine transformation (4×4 DCT) system, and an inverse transformation (4×4 IDCT) system thereof; and (3) a discrete cosine transformation system which carries out both of the two-dimensional 8 row×8 column discrete cosine transformation and two-dimensional 4 row×8 column discrete cosine transformation, and an inverse transformation system for them.

2. Description of the Related Art

The discrete cosine transformation system which performs transformation from a real domain (space) to a frequency domain (space) and discrete cosine inverse transformation system which is an inverse transformation thereof are known as one type of orthogonal transformations and are used in for example image processing.

For example, as one example of the discrete cosine transformation system apparatus and discrete cosine inverse transformation system, examples will be shown for the two-dimensional 4 row×8 column discrete cosine transformation (4×8 DCT) and two-dimensional 4 row×8 column discrete cosine inverse transformation (or two-dimensional 4 row×8 column inverse discrete cosine transformation: 4×8 IDCT).

The two-dimensional 4×8 DCT and two-dimensional 4×8 IDCT are defined in the following equation 1 and equation 2, respectively.

$$\text{DCT: } [C]=(\tfrac{1}{4})\,[P][X]\,{}^t[N] \quad (1)$$

$$\text{IDCT: } [X]=(\tfrac{1}{2})\,{}^t[P][C][N] \quad (2)$$

Here, the matrix [C] contains matrix data arranged in a 4 row×8 column frequency domain, and the matrix [X] contains original (input) matrix data in a 4 rows×8 columns real domain. The matrix [P] denotes a 4 rows×4 columns constant matrix data for the transformation, and the matrix [N] denotes constant matrix data consisting of rows×8 columns for transformation. The suffices t on the left top indicate an transposition matrix. Namely, ${}^t$[N] represents a transposition matrix of the matrix [N], and, ${}^t$[P] represents a transposition matrix of the matrix [P].

The matrix [N] is defined by the following equation 3.

$$[N]=\begin{bmatrix} i & i & i & i & i & i & i & i \\ a & b & c & d & h & g & f & e \\ k & l & n & m & m & n & l & k \\ b & h & e & g & c & a & d & f \\ i & j & j & i & i & j & j & i \\ c & e & d & b & f & h & a & g \\ l & m & k & n & n & k & m & l \\ d & g & b & e & a & f & c & h \end{bmatrix} \quad (3)$$

The coefficients (factors) in equation 3 are defined as shown in Table 1.

Table 1

$a=-e=\cos(\pi/16)$
$b=-f=\cos(3\pi/16)$
$c=-g=\cos(5\pi/16)$
$d=-h=\cos(7\pi/16)$
$i=-j=\cos(4\pi/16)$
$k=-m=\cos(2\pi/16)$
$l=-n=\cos(6\pi/16)$ Also, the matrix [P] is defined by the following equation 4.

$$[P]=\begin{bmatrix} i & i & i & i \\ k & l & n & m \\ i & j & j & i \\ l & m & k & n \end{bmatrix} \quad (4)$$

FIG. 1 is a circuit diagram of a conventional two-dimensional 4×8 DCT apparatus performing the computation of a conventional two-dimensional 4×8 DCT, defined by the equation 1. In this 4×8 DCT apparatus, the inner product computation between the matrix [X] and the matrix [P] is carried out in a fourth-order inner product computation circuit 901, the resultant data are rearranged between a column direction and a row direction for the next computation in a rearrangement circuit 902, and the inner production computation between the rearranged data and a transposition matrix ${}^t$[N] of the matrix [N] is carried out in an eighth-order inner product computation circuit 903. As clear from the above-mentioned equations, four multipliers are needed in the fourth-order inner product computation circuit, eight multipliers are needed in the eighth order inner product computation circuit, and thus 12 multiplier circuits in total become necessary.

FIG. 2 is a circuit diagram of a conventional two-dimensional 4×8 IDCT apparatus performing the two-dimensional 4×8 IDCT defined by the equation 2. In this 4×8 IDCT apparatus, the inner product computation between the matrix [C] and the matrix [N] is carried out in an eighth-order inner product computation circuit 911, the resultant data are rearranged between the row direction and the column direction for the next computation in a rearrangement circuit 912, and the inner product computation between the rearranged data and a transposition matrix ${}^t$[P] of the matrix [P] is carried out in a fourth-order inner product computation circuit 913. Also in this apparatus, as clear from the above-mentioned equations, eight multipliers are needed in the eighth-order inner product computation circuit, and four multipliers are needed in the fourth-order inner product computation circuit, and thus 12 multiplier circuits in total become necessary.

When the two-dimensional 4×8 DCT and the two-dimensional 4×8 IDCT based on the above-mentioned equations can be constituted by hardware circuits, 12 multipliers are needed in each. Since the circuit structure of a multiplier circuit is very complex compared with an adder circuit etc., it suffers from the disadvantage in that the structure of the two-dimensional 4×8 DCT and the two-dimensional 4×8 IDCT apparatus, each having as many as 12 multipliers, becomes very complex.

Also, with the above-mentioned circuit structure, an improvement of the computation speed cannot be achieved, and therefore it also suffers from the disadvantage in that it cannot be suitably utilized for high speed image processing etc.

The above mentioned disadvantages of the two-dimensional 4×8 DCT system and two-dimensional 4×8 IDCT system were exemplified, but the above-mentioned disadvantages are not restricted to these systems. Other discrete cosine transformation systems and discrete cosine inverse transformation systems, for example, a two-dimensional 4×4 DCT system and a two-dimensional IDCT system, a two-dimensional 8×8 DCT system and a two-dimensional 8×8 IDCT system, etc. also suffer from disadvantages the same as those described above.

Further, an attempt to make common use both as a two-dimensional 4×8 DCT system and two-dimensional 8×8 DCT system or common use both as a two-dimensional 4×8 IDCT system and a two-dimensional 8×8 IDCT system would be very effective in terms of the structure of the entire image processing system in many cases, but a system which can be used as both while overcoming the above-mentioned disadvantages has not yet been supplied.

SUMMARY OF THE INVENTION

An object of the present invention is to provide a discrete cosine transformation system and/or a discrete cosine inverse transformation system, having a simple circuit structure by reducing the number of the multiplier circuits.

Another object of the present invention is to provide a discrete cosine transformation system and/or a discrete cosine inverse transformation system, which can perform a high speed operation.

As these discrete cosine transformation system and discrete cosine inverse transformation system, for example, there may be a two-dimensional 4×8 DCT system and a two-dimensional 4×8 IDCT system, a two-dimensional 4×4 DCT system and a two-dimensional 4×4 IDCT system thereof, etc.

Still another object of the present invention is to provide a circuit which can be used for a two-dimensional 4×8 DCT system and/or a two-dimensional 8×8 DCT system, having a simple circuit structure, and, another circuit which can be used for a two-dimensional 4×8 IDCT system and/or two-dimensional 8×8 IDCT system, having a simple circuit structure.

As a means of the present invention overcoming the above-described disadvantages and achieving the above mentioned objects, a concrete description will be made by taking as an example the above-mentioned two-dimensional 4×8 DCT system and two-dimensional 4×8 IDCT system.

A description will be made taking as an example the above-mentioned two-dimensional 4 row×8 column discrete cosine transformation system and two-dimensional 4 row×8 column discrete cosine inverse transformation system.

In the present invention, equation 1 which is a prototype equation of a two-dimensional 4 row×8 column discrete cosine transformation, and equation 2 which is a prototype equation of a two-dimensional 4 row×8 column discrete cosine inverse transformation, are factorized to constant matrices as simple as possible to an extent where the results of the computation are not changed, to modify the original computation equations of the two-dimensional 4×8 DCT and the two-dimensional 4×8 IDCT, to realize a circuit structure having as small a number of multiplier circuits (multipliers) as possible, based on the modified computation equations.

Below, a detailed description thereof will be given.

First, a description will be made of a two-dimensional 4×8 DCT and two-dimensional 4×8 IDCT of the present invention.

It is seen from the above-described equations that the relationship of linear primary transformation indicated in the following equation 5 and equation 6 is established between the elements Cij (i=0, 1, 2, 3: j=0, 1, . . . , 7) of the matrix [C ] and elements Xij (i=0, 1, 2, 3: j=0, 1, . . . , 7) of the matrix [X].

$$\vec{C}=[32\times 32 \text{ constant matrix}]\,\vec{X} \tag{5}$$

$$\vec{X}=[32\times 32 \text{ constant matrix}]\,\vec{C} \tag{6}$$

The matrix [C] and matrix [X] in equation 5 and equation 6 are expressed by the following equation 7 and equation 8, respectively.

$$\vec{C}=\begin{bmatrix} C00 \\ C01 \\ C02 \\ \cdot \\ \cdot \\ \cdot \\ C07 \\ C10 \\ C11 \\ C12 \\ \cdot \\ \cdot \\ \cdot \\ C30 \\ \cdot \\ \cdot \\ \cdot \\ C36 \\ C37 \end{bmatrix} \tag{7}$$

-continued $$\vec{X} = \begin{bmatrix} X00 \\ X01 \\ X02 \\ \cdot \\ \cdot \\ \cdot \\ X07 \\ X10 \\ X11 \\ X12 \\ \cdot \\ \cdot \\ \cdot \\ X30 \\ \cdot \\ \cdot \\ \cdot \\ X36 \\ X37 \end{bmatrix} \tag{8}$$

The [32×32 constant matrix] in equation 5 and equation 6 can be subjected to matrix decomposition, and the 4×8 DCT and 4×8 IDCT can be rewritten to the following equation 9 and equation 10, respectively.

$$\text{DCT: } \vec{C} = (\tfrac{1}{4})[W][V][T][R][L][Q]\vec{X} \tag{9}$$

$$\text{IDCT: } \vec{X} = [\tfrac{1}{4}]\,{}^t[Q][L]\,{}^t[R]\,{}^t[T]\,{}^t[V]\,{}^t[W]\vec{C} \tag{10}$$

The matrices [W], [V], [T], [R], [L], and [Q] in equation 9 and equation 10 are 32×32 constant matrices, respectively. Also, ${}^t[Q]$, ${}^t[R]$, ${}^t[T]$, ${}^t[V]$, and ${}^t[W]$ are transposition matrices of matrices [Q], [R], [T], [V], and [W], respectively.

These constant matrices [Q], [L], [R], [T], [V], and [W] are indicated in the following equation 11 to equation 16, respectively.

$$[Q] = \begin{bmatrix}
\begin{matrix}10000000\\00000001\\01000000\\00000010\\00100000\\00000100\\00010000\\00001000\end{matrix} & & & \\
& \begin{matrix}10000000\\00000001\\01000000\\00000010\\00100000\\00000100\\00010000\\00001000\end{matrix} & & 0 \\
& & \begin{matrix}10000000\\00000001\\01000000\\00000010\\00100000\\00000100\\00010000\\00001000\end{matrix} & \\
& 0 & & \begin{matrix}10000000\\00000001\\01000000\\00000010\\00100000\\00000100\\00010000\\00001000\end{matrix}
\end{bmatrix} \tag{11}$$

Note, a blank portion indicates "0" (same for the following).

$$[L] = \begin{bmatrix}
\begin{matrix}++\\+-\end{matrix} & & & & & & & & & & & \\
& \begin{matrix}++\\+-\end{matrix} & & & & & & & & & & \\
& & \begin{matrix}++\\+-\end{matrix} & & & & & & & & & \\
& & & \begin{matrix}++\\+-\end{matrix} & & & & & & & & \\
& & & & \begin{matrix}++\\+-\end{matrix} & & & & & 0 & & \\
& & & & & \begin{matrix}++\\+-\end{matrix} & & & & & & \\
& & & & & & \begin{matrix}++\\+-\end{matrix} & & & & & \\
& & & & & & & \begin{matrix}++\\+-\end{matrix} & & & & \\
& & & & & & & & \begin{matrix}++\\+-\end{matrix} & & & \\
& & & & & & & & & \begin{matrix}++\\+-\end{matrix} & & \\
& & & & & & & & & & \begin{matrix}++\\+-\end{matrix} & \\
& & 0 & & & & & & & & & \begin{matrix}++\\+-\end{matrix}
\end{bmatrix} \tag{12}$$

-continued

```
++
+−
  ++
  +−
    ++
    +−
      ++
      +−
```

Note, the symbol "+" indicates "+1" and the symbol "−" indicates "−1" (same also for the following).

(13)

```
      | 10000000 00000000 00000000 00000000 |
      | 00000000 00000000 00000000 00000010 |
      | 00000000 10000000 00000000 00000000 |
      | 00000000 00000000 00000010 00000000 |
      | 00000000 00000000 10000000 00000000 |
      | 00000000 00000010 00000000 00000000 |
      | 00000000 00000000 00000000 10000000 |
      | 00000010 00000000 00000000 00000000 |

      | 00100000 00000000 00000000 00000000 |
      | 00000000 00000000 00000000 00001000 |
      | 00000000 00100000 00000000 00000000 |
      | 00000000 00000000 00001000 00000000 |
      | 00000000 00000000 00100000 00000000 |
      | 00000000 00001000 00000000 00000000 |
      | 00000000 00000000 00000000 00100000 |
[R] = | 00001000 00000000 00000000 00000000 |

      | 00000001 00000000 00000000 00000000 |
      | 00000000 00000000 00000000 01000000 |
      | 00000000 00000001 00000000 00000000 |
      | 00000000 00000000 01000000 00000000 |
      | 00000000 00000000 00000001 00000000 |
      | 00000000 01000000 00000000 00000000 |
      | 00000000 00000000 00000000 00000001 |
      | 01000000 00000000 00000000 00000000 |

      | 00000100 00000000 00000000 00000000 |
      | 00000000 00000000 00000000 00010000 |
      | 00000000 00000100 00000000 00000000 |
      | 00000000 00000000 00010000 00000000 |
      | 00000000 00000000 00000100 00000000 |
      | 00000000 00010000 00000000 00000000 |
      | 00000000 00000000 00000000 00000100 |
      | 00010000 00000000 00000000 00000000 |
```

(14)

```
      | 1 1 1 1 1 1 1 1   0 0 0 0 0 0 0 0                                       |
      | 0 0 0 0 0 0 0 0   1 1 1 1 1 1 1 1                                       |
      | 1 1 − − − − 1 1   0 0 0 0 0 0 0 0                                       |
      | 0 0 0 0 0 0 0 0   1 1 − − − − 1 1                                       |
      | 1 1 0 0 0 0 − −   0 0 1 1 − − 0 0                                       |
      | 0 0 − − 1 1 0 0   1 1 0 0 0 0 − −                                       |
      | 1 1 0 0 0 0 − −   0 0 − − 1 1 0 0                                       |
      | 0 0 1 1 − − 0 0   1 1 0 0 0 0 − −                                       |

      | 1 −1 −0 0 0 0     1 −1 −0 0 0 0                  O                      |
      | 0 0 0 0 1 −1 −    0 0 0 0 1 −1 −                                        |
      | 1 −0 0 1 −0 0     0 0 −1 0 0 −1                                         |
      | 0 0 1 −0 0 1 −    −1 0 0 −1 0 0                                         |
      | 1 −0 0 −1 0 0     −1 0 0 1 −0 0                                         |
      | 0 0 1 −0 0 −1     0 0 −1 0 0 1 −                                        |
      | 1 − −1 0 0 0 0    0 0 0 0 −1 1 −                                        |
[T] = | 0 0 0 0 1 − −1    −1 1 −0 0 0 0                                         |

      |                                 0 0 0 0 0 0 0 0     1 1 1 1 1 1 1 1     |
      |                                 −1 −1 −1 −1         0 0 0 0 0 0 0 0     |
      |                                 1 1 1 1 1 1 1 1     0 0 0 0 0 0 0 0     |
      |                                 0 0 0 0 0 0 0 0     1 −1 −1 −1 −        |
      |                                 −0 0 −0 1 1 0       0 1 0 0 1 0 − −     |
      |                                 −1 0 −0 0 1 0       0 −1 0 −0 0 1       |
      |                                 − −0 1 0 0 1 1      0 0 0 −0 1 −0       |
      |                                 −0 0 1 0 −1 0       0 1 1 0 −0 0 −      |
```

-continued $$
\begin{vmatrix}
 & \begin{matrix}
1 & 0 & 0 & - & 0 & 1 & - & 0 & 0 & 1 & 1 & 0 & - & 0 & 0 & - \\
- & - & 0 & 1 & 0 & 0 & 1 & - & 0 & 0 & 0 & 1 & 0 & - & 1 & 0 \\
1 & 0 & 0 & 1 & 0 & - & - & 0 & 1 & 0 & 0 & 1 & 0 & - & - & 0 \\
- & 1 & 0 & - & 0 & 0 & 1 & 0 & 0 & 1 & - & 0 & 1 & 0 & 0 & - \\
0 & 0 & 0 & 0 & 0 & 0 & 0 & 0 & 1 & 1 & - & - & - & - & 1 & 1 \\
- & 1 & 1 & - & 1 & - & - & 1 & 0 & 0 & 0 & 0 & 0 & 0 & 0 & 0 \\
1 & 1 & - & - & - & - & 1 & 1 & 0 & 0 & 0 & 0 & 0 & 0 & 0 & 0 \\
0 & 0 & 0 & 0 & 0 & 0 & 0 & 0 & 1 & - & - & 1 & - & 1 & 1 & -
\end{matrix} \\
O &
\end{vmatrix}
$$

$$
= \begin{vmatrix} T0 & O \\ O & T1 \end{vmatrix}
$$

Note, the symbol "−" indicates "−1" and numeral "1" denotes +1.

-continued $$
[V] = \begin{vmatrix}
\begin{matrix} + & + & 0 & 0 \\ + & - & 0 & 0 \\ 0 & 0 & + & + \\ 0 & 0 & + & - \end{matrix} & & & & & & & \\
 & \begin{matrix} + & 0 & i & i \\ + & 0 & j & j \\ 0 & -i & j & \\ 0 & +i & j & \end{matrix} & & & & & & \\
 & & \begin{matrix} k & k & l & l \\ n & n & k & k \\ k & m & l & n \\ n & l & k & m \end{matrix} & & & O & & \\
 & & & \begin{matrix} k & k & l & l \\ n & n & k & k \\ l & n & k & m \\ k & m & n & l \end{matrix} & & & & \\
 & & & & \begin{matrix} a & c & b & h \\ f & a & d & g \\ g & h & a & b \\ d & b & g & a \end{matrix} & & & \\
 & & & & & \begin{matrix} a & h & c & b \\ f & g & a & d \\ g & b & h & a \\ d & a & b & g \end{matrix} & & \\
 & O & & & & & \begin{matrix} a & d & c & b \\ f & c & a & d \\ g & f & h & a \\ h & a & f & c \end{matrix} & \\
 & & & & & & & \begin{matrix} a & c & b & h \\ f & a & d & g \\ g & h & a & b \\ d & b & g & a \end{matrix}
\end{vmatrix} \quad (15)
$$

$$
= \begin{vmatrix} V0 & O \\ O & V1 \end{vmatrix}
$$

The coefficients a to n are the same as those defined in Table 1.

$$
[W] = \quad (16)
$$

$$
\begin{vmatrix}
10000000 & 00000000 & 00000000 & 00000000 \\
00000000 & 00000000 & 10000000 & 00000000 \\
00000000 & 10000000 & 00000000 & 00000000 \\
00000000 & 00000000 & 01000000 & 00000000 \\
01000000 & 00000000 & 00000000 & 00000000 \\
00000000 & 00000000 & 00100000 & 00000000 \\
00000000 & 01000000 & 00000000 & 00000000 \\
00000000 & 00000000 & 00010000 & 00000000
\end{vmatrix}
$$

$$
\begin{vmatrix}
00000000 & 00100000 & 00000000 & 00000000 \\
00000000 & 00000000 & 00000001 & 00000000 \\
00001000 & 00000000 & 00000000 & 00000000 \\
00000000 & 00000000 & 00000000 & 00010000 \\
00000000 & 00001000 & 00000000 & 00000000 \\
00000000 & 00000000 & 00000000 & 10000000 \\
00000010 & 00000000 & 00000000 & 00000000 \\
00000000 & 00000000 & 00001000 & 00000000
\end{vmatrix}
$$

$$
\begin{vmatrix}
00100000 & 00000000 & 00000000 & 00000000 \\
00000000 & 00000000 & 00000000 & 00001000 \\
00000000 & 00000010 & 00000000 & 00000000 \\
00000000 & 00000000 & 00000000 & 00000100 \\
00010000 & 00000000 & 00000000 & 00000000 \\
00000000 & 00000000 & 00000000 & 00000010 \\
00000000 & 00000001 & 00000000 & 00000000 \\
00000000 & 00000000 & 00000000 & 00000001
\end{vmatrix}
$$

-continued $$
\left|\begin{array}{cccc}
00000000 & 00010000 & 00000000 & 00000000 \\
00000000 & 00000000 & 00000000 & 01000000 \\
00000001 & 00000000 & 00000000 & 00000000 \\
00000000 & 00000000 & 00000010 & 00000000 \\
00000000 & 00000100 & 00000000 & 00000000 \\
00000000 & 00000000 & 00000100 & 00000000 \\
00000100 & 00000000 & 00000000 & 00000000 \\
00000000 & 00000000 & 00000000 & 00100000
\end{array}\right|
$$

Also, the transposition matrices ${}^t[Q]$, ${}^t[R]$, ${}^t[T]$, ${}^t[V]$, and ${}^t[W]$ are indicated in the following equations 11a to 15a, respectively.

$$
{}^t[Q] = \left|\begin{array}{cccc}
10000000 & & & \\
00100000 & & & \\
00001000 & & & \\
00000010 & & & \\
00000001 & & & \\
00000100 & & O & \\
00010000 & & & \\
01000000 & & & \\
 & 10000000 & & \\
 & 00100000 & & \\
 & 00001000 & & \\
 & 00000010 & & \\
 & 00000001 & & \\
 & 00000100 & & \\
 & 00010000 & & \\
 & 01000000 & & \\
 & & 10000000 & \\
 & & 00100000 & \\
 & & 00001000 & \\
 & & 00000010 & \\
 & & 00000001 & \\
 & & 00000100 & \\
 & & 00010000 & \\
 & & 01000000 & \\
 & O & & 10000000 \\
 & & & 00100000 \\
 & & & 00001000 \\
 & & & 00000010 \\
 & & & 00000001 \\
 & & & 00000100 \\
 & & & 00010000 \\
 & & & 01000000
\end{array}\right| \tag{11a}
$$

$$
{}^t[R] = \left|\begin{array}{cccc}
10000000 & 00000000 & 00000000 & 00000000 \\
00000000 & 00000000 & 00000001 & 00000000 \\
00000000 & 10000000 & 00000000 & 00000000 \\
00000000 & 00000000 & 00000000 & 00000001 \\
00000000 & 00000001 & 00000000 & 00000000 \\
00000000 & 00000000 & 00000000 & 10000000 \\
00000001 & 00000000 & 00000000 & 00000000 \\
00000000 & 00000000 & 10000000 & 00000000 \\
00100000 & 00000000 & 00000000 & 00000000 \\
00000000 & 00000000 & 00000100 & 00000000 \\
00000000 & 00100000 & 00000000 & 00000000 \\
00000000 & 00000000 & 00000000 & 00000100 \\
00000000 & 00000100 & 00000000 & 00000000 \\
00000000 & 00000000 & 00000000 & 00100000 \\
00000100 & 00000000 & 00000000 & 00000000 \\
00000000 & 00000000 & 00100000 & 00000000 \\
00001000 & 00000000 & 00000000 & 00000000 \\
00000000 & 00000000 & 00010000 & 00000000 \\
00000000 & 00001000 & 00000000 & 00000000 \\
00000000 & 00000000 & 00000000 & 00010000 \\
00000000 & 00010000 & 00000000 & 00000000 \\
00000000 & 00000000 & 00000000 & 00001000 \\
00010000 & 00000000 & 00000000 & 00000000 \\
00000000 & 00000000 & 00001000 & 00000000 \\
00000010 & 00000000 & 00000000 & 00000000 \\
00000000 & 00000000 & 01000000 & 00000000 \\
00000000 & 00000010 & 00000000 & 00000000 \\
00000000 & 00000000 & 00000000 & 01000000 \\
00000000 & 01000000 & 00000000 & 00000000 \\
00000000 & 00000000 & 00000000 & 00000010 \\
01000000 & 00000000 & 00000000 & 00000000 \\
00000000 & 00000000 & 00000010 & 00000000
\end{array}\right| \tag{12a}
$$

-continued $$
{}^t[T] = \left|\begin{array}{llll}
\text{1 0 1 0 1 0 1 0} & \text{1 0 1 0 1 0 1 0} & & \\
\text{1 0 1 0 1 0 1 0} & \text{−0 −0 −0 −0} & & \\
\text{1 0 −0 0 −0 1} & \text{1 0 0 1 0 1 −0} & & \\
\text{1 0 −0 0 −0 1} & \text{−0 0 −0 −1 0} & & \\
\text{1 0 −0 0 1 0 −} & \text{0 1 1 0 −0 0 1} & & \\
\text{1 0 −0 0 1 0 −} & \text{0 −−0 1 0 0 −} & & \\
\text{1 0 1 0 −0 −0} & \text{0 1 0 1 0 −0 −} & & \\
\text{1 0 1 0 −0 −0} & \text{0 −0 −0 1 0 1} & & \\
\text{0 1 0 1 0 1 0 1} & \text{1 0 0 −−0 0 −} & \text{O} & \\
\text{0 1 0 1 0 1 0 1} & \text{−0 0 1 1 0 0 1} & & \\
\text{0 1 0 −1 0 −0} & \text{1 0 −0 0 −0 1} & & \\
\text{0 1 0 −1 0 −0} & \text{−0 1 0 0 1 0 −} & & \\
\text{0 1 0 −−0 1 0} & \text{0 1 0 −1 0 −0} & & \\
\text{0 1 0 −−0 1 0} & \text{0 −0 1 −0 1 0} & & \\
\text{0 1 0 1 0 −0 −} & \text{0 1 −0 0 1 1 0} & & \\
\text{0 1 0 1 0 −0 −} & \text{0 −1 0 0 −−0} & & \\
 & & \text{0 −1 0 −−−−} & \text{1 −1 −0 −1 0} \\
 & & \text{0 1 1 0 0 1 −0} & \text{0 −0 1 0 1 1 0} \\
 & & \text{0 −1 0 0 0 0 0} & \text{0 0 0 0 0 1 −0} \\
 & & \text{0 1 1 0 −−1 1} & \text{−1 1 −0 −−0} \\
 & & \text{0 −1 0 0 0 0 0} & \text{0 0 0 0 0 1 −0} \\
 & & \text{0 1 1 0 1 0 0 −} & \text{1 0 −0 0 −−0} \\
 & & \text{0 −1 0 1 1 1 1} & \text{−1 −1 0 −1 0} \\
 & & \text{0 1 1 0 0 0 1 0} & \text{0 −0 0 0 1 1 0} \\
 & & \text{1 0 0 1 0 0 0 0} & \text{0 0 1 0 1 0 0 1} \\
 & & \text{1 0 0 −1 −0 1} & \text{1 0 0 1 1 0 0 −} \\
 & & \text{1 0 0 1 0 1 0 1} & \text{1 0 0 −−0 0 −} \\
 & \text{O} & \text{1 0 0 −0 0 −0} & \text{0 1 1 0 −0 0 1} \\
 & & \text{1 0 0 1 1 −0 −} & \text{−0 0 1 −0 0 −} \\
 & & \text{1 0 0 −0 0 1 0} & \text{0 −−0 −0 0 1} \\
 & & \text{1 0 0 1 −0 −0} & \text{0 1 −0 1 0 0 1} \\
 & & \text{1 0 0 −−1 0 −} & \text{−0 0 −1 0 0 −}
\end{array}\right| \quad (13a)
$$

$$
= \left|\begin{array}{cc} {}^tT0 & O \\ O & {}^tT1 \end{array}\right|
$$

$$
{}^t[V] = \left|\begin{array}{cccccccc}
\begin{smallmatrix} + & + & 0 & 0 \\ + & - & 0 & 0 \\ 0 & 0 & + & + \\ 0 & 0 & + & - \end{smallmatrix} & & & & & & & \\
 & \begin{smallmatrix} + & + & 0 & 0 \\ 0 & 0 & - & + \\ i & j & i & i \\ i & j & j & j \end{smallmatrix} & & & & & & \\
 & & \begin{smallmatrix} k & n & k & n \\ k & n & m & l \\ l & k & l & k \\ l & k & n & m \end{smallmatrix} & & & & & \\
 & & & \begin{smallmatrix} k & n & l & k \\ k & n & n & m \\ l & k & k & n \\ l & k & m & l \end{smallmatrix} & & & & \\
 & & & & \begin{smallmatrix} a & f & g & d \\ c & a & h & b \\ b & d & a & g \\ h & g & b & a \end{smallmatrix} & & & \\
 & & & & & \begin{smallmatrix} a & f & g & d \\ h & g & b & a \\ c & a & h & b \\ b & d & a & g \end{smallmatrix} & & \\
 & O & & & & & \begin{smallmatrix} a & f & g & h \\ d & c & f & a \\ c & a & h & f \\ b & d & a & c \end{smallmatrix} & \\
 & & & & & & & \begin{smallmatrix} a & f & g & d \\ c & a & h & b \\ b & d & a & g \\ h & g & b & a \end{smallmatrix}
\end{array}\right| \quad (14a)
$$

$$
= \left|\begin{array}{cc} {}^tV0 & O \\ O & {}^tV1 \end{array}\right|
$$

-continued (15a)

$$
{}^t[W] = \left|\begin{matrix}
10000000 & 00000000 & 00000000 & 00000000 \\
00001000 & 00000000 & 00000000 & 00000000 \\
00000000 & 00000000 & 10000000 & 00000000 \\
00000000 & 00000000 & 00001000 & 00000000 \\
00000000 & 01000000 & 00000000 & 00000000 \\
00000000 & 00000000 & 00000000 & 00000010 \\
00000000 & 00000010 & 00000000 & 00000000 \\
00000000 & 00000000 & 00000000 & 00100000 \\
00100000 & 00000000 & 00000000 & 00000000 \\
00000010 & 00000000 & 00000000 & 00000000 \\
00000000 & 10000000 & 00000000 & 00000000 \\
00000000 & 00000000 & 00000000 & 10000000 \\
00000000 & 00001000 & 00000000 & 00000000 \\
00000000 & 00000000 & 00000000 & 00001000 \\
00000000 & 00000000 & 00100000 & 00000000 \\
00000000 & 00000000 & 00000010 & 00000000 \\
01000000 & 00000000 & 00000000 & 00000000 \\
00010000 & 00000000 & 00000000 & 00000000 \\
00000100 & 00000000 & 00000000 & 00000000 \\
00000001 & 00000000 & 00000000 & 00000000 \\
00000000 & 00000001 & 00000000 & 00000000 \\
00000000 & 00000000 & 00000000 & 00000100 \\
00000000 & 00000000 & 00000000 & 00010000 \\
00000000 & 01000000 & 00000000 & 00000000 \\
00000000 & 00000100 & 00000000 & 00000000 \\
00000000 & 00000000 & 00000000 & 01000000 \\
00000000 & 00000000 & 00000000 & 00000001 \\
00000000 & 00010000 & 00000000 & 00000000 \\
00000000 & 00000000 & 01000000 & 00000000 \\
00000000 & 00000000 & 00010000 & 00000000 \\
00000000 & 00000000 & 00000100 & 00000000 \\
00000000 & 00000000 & 00000001 & 00000000
\end{matrix}\right|
$$

Points that should be specifically noted in this matrix decomposition will be mentioned below.

(1) All other matrices except the matrix [V] and the transposition matrix ${}^t$[V] thereof, indicated in equation 15, are matrices comprising "0" "+1" and "−1" as the matrix elements.

(2) In each row and each column of the matrices [W], [R], and [Q] and transposition matrices ${}^t$[W], ${}^t$[R], and ${}^t$[Q] of them, only one portion is "1". The others are all "0".

(3) All elements other than 16 2×2 sub-matrices, two 16×16 sub-matrices, two 16×16 sub-matrices, eight 4×4 sub-matrices, and eight 4×4 sub-matrices on the diagonal lines in the matrix [L], the matrix [T] and the transposition matrix ${}^t$[T] thereof, and the matrix [V] and the transposition matrix ${}^t$[V] thereof are all "0".

(4) The matrix [T] and the transposition matrix ${}^t$[T] thereof can be constituted by a 16th order inner product computation circuit with coefficients of only "0", "+1", and "−1", but as will be understood looking at the matrix [T] shown in equation 14, at least one of an even odd number row or odd number row in each column of each 16×16 sub-matrix, for example, at least one of the 2k-th row and (2k+1)-th row (note, k=0 to 7) is "0", and therefore it is substantially equivalent to an inner product computation circuit of the eighth-order at the highest.

Similarly, at least one of an even number column or odd number column in each row of each 16×16 sub-matrix of the transposition matrix ${}^t$[T], for example, at least one of the 2k-th column and (2k+1)-th column (note, k=0 to 7) is "0", and therefore it is substantially equivalent to an inner product computation circuit of the eighth-order at the highest.

Accordingly, for computing 4×8 DCT, when the matrix calculations indicated in equation 9:

[Q][L][R][T][V][W]

are constituted by hardware, it is sufficient if (a) a data column rearrangement circuit performing the processing of the matrix [Q];

(b) a second-order inner product computation circuit with coefficients of only "+1" and "−1" performing the processing of the matrix [L];

(c) a data column rearrangement circuit performing the processing of the matrix [R];

(d) an eighth-order inner product computation circuit with coefficients of only "+1" and "−1" performing the processing of the matrix [T];

(e) a fourth-order inner product computation circuit performing the processing of the matrix [V]; and (f) a data column rearrangement circuit performing the processing of the matrix [W] are sequentially connected in series.

It is sufficient if the coefficient indicated in equation 9: $\frac{1}{8}$ is just shifted by 3 bits in a binary computation, namely, no multiplication or division has to be carried out. Accordingly, this computation unit can be omitted in the structure.

Similarly, for computing 4×8 IDCT, when the matrix calculations indicated in equation 10:

${}^t$[Q][L]${}^t$[R]${}^t$[T]${}^t$[V]${}^t$[W]

are constituted by hardware, it is sufficient if (a) a data column rearrangement circuit performing the processing of the transposition matrix $^t[W]$;

(b) a fourth-order inner product computation circuit with the coefficients of irrational numbers performing the processing of the transposition matrix $^t[V]$;

(c) an eighth-order inner product computation circuit with coefficients of only "+1" and "−1" performing the processing of the transposition matrix $^t[T]$;

(d) a rearrangement circuit performing the processing of the transposition matrix $^t[R]$;

(e) a second-order inner product computation circuit with coefficients of only "+1" and "−1" performing the processing of the matrix [L]; and (f) a data column rearrangement circuit performing the processing of the transposition matrix $^t[Q]$ are sequentially connected in series.

It is sufficient if the coefficient indicated in equation 10: $\frac{1}{4}$ is just shifted by 2 bits in a binary computation, and therefore no multiplication or division has to be carried out. Accordingly, this computation unit can also be omitted in the structure.

By performing the matrix decomposition in this way, multiplication becomes necessary only in the matrix [V] and transposition matrix $^t[V]$ performing the computation of the irrational numbers, and only four multipliers are needed.

Accordingly, according to the present invention, there is provided a DCT system including:

a first rearrangement circuit which rearranges input data of a matrix form in place of multiplication of the above-described input data by a first constant matrix [Q] having a factor "1" at one portion in each row and each column;

a first inner product computation circuit which multiplies the results of the rearrangement by a second constant matrix [L] having a plurality of sub-matrices along a diagonal line, the factors of the sub-matrices being constituted by a combination of "+1" and "−1";

a second rearrangement circuit which rearranges the results of the first inner product computation in place of multiplication of the results of the first inner product computation by a third constant matrix [R] having "1" at one portion in each row and each column;

a second inner product computation circuit which multiplies the results of the second rearrangement by a fourth constant matrix [T] having a plurality of sub-matrices along the diagonal line, the factors of these sub-matrices being constituted by a combination of "0", "+1", and "−1"; a third inner product computation circuit which multiplies the results of the second inner product computation by a matrix [V] having a plurality of sub-matrices along the diagonal line and the factors of these sub-matrices having coefficients of irrational numbers in a discrete cosine transformation; and a third rearrangement circuit which rearranges the results of the third inner product computation in place of multiplication of the results of the inner product computation by a fifth constant matrix [W] having "1" at one portion in each row and each column.

Preferably, a plurality of the above described second inner product computation circuits and the above-described third inner product computation circuits are constituted in parallel.

Also, preferably, the first inner product computation circuit and the second rearrangement circuit are integrally formed and constituted by an adder circuit.

The above first inner product computation circuit may includes a plurality of series of unit circuits each having a circuit for calculating a complement of "2" of an applied binary data and a switch circuit which allows the applied binary data to pass therethrough or selectively outputs the data passed through the above-described "2"-complement calculation circuit and also a circuit for adding the results of computation of the above-described plurality of series.

Alternatively, the above first inner product computation circuit can be constituted by providing a plurality of unit computation circuits each having a first computation circuit including a circuit calculating the complement of "2" of an applied binary data and a switch circuit which allows the applied binary data to pass therethrough or selectively outputs the data passed through the above-described "2"-complement calculation circuit and also a second computation circuit having an adder circuit connected to the switch circuit and a data holding register connected to the adder circuit.

The first inner product computation circuit may be constituted by providing a plurality of unit computation circuits each having a first computation circuit comprising a circuit calculating the complement of "2" of the applied binary data and a selectively controlled switch circuit which allows the applied binary data to pass therethrough or outputs the data passed through the above-described "2"-complement calculation circuit or outputs the data "0" and also a second computation circuit having an adder circuit connected to the switch circuit and a data holding register connected to the adder circuit.

Preferably, the characteristic feature is that adjacent the above mentioned unit computation circuits are integrally constituted so that when the data "0" is output at the above mentioned switch circuit in one series of computations, the computation operation in the second computation circuit is made substantially invalid, and the computation of the other series is carried out in the second computation circuit.

Preferably, the first rearrangement circuit, the second rearrangement circuit, and the third rearrangement circuit can be integrally constituted in a rewritable memory, and the writing order of the input data and the read out order can be made different to perform the rearrangement of the data.

Also, according to the present invention, there is provided an IDCT system performing an inverse transformation of the DCT system characterized in that it includes:

a first rearrangement circuit which rearranges the input data of the matrix form in place of multiplication of the above-described input data by a first constant transposition matrix $^t[W]$ having the coefficient "1" at one portion in each row and each column;

a first inner product computation circuit which multiplies the results of the rearrangement by an transposition matrix $^t[V]$ having a plurality of sub-matrices along the diagonal line, the factors of these sub-matrices having the coefficients of the irrational numbers in the discrete cosine transformation;

a second inner product computation circuit which multiplies the results of the first inner product computation by a second constant transposition matrix $^t[T]$ having a plurality of sub-matrices along the diagonal line, the factors of these sub-matrices being constituted by a combination of "0", "+1", and "−1";

a second rearrangement circuit which rearranges the results of the second inner product computation in place of multiplication of the results of the second inner product computation by a third constant transposition matrix $^t[R]$ having "1" at one portion in each row and each column;

a third inner product computation circuit which multiplies the results of the second rearrangement by a fourth constant matrix [L] having a plurality of sub-matrices along the diagonal line, the factors of these sub-matrices being constituted by a combination of "+1" and "−1; and a third rearrangement circuit which rearranges the results of the third inner product computation in place of multiplication of the results of the third inner product computation by a fifth transposition matrix $^t[Q]$ having "1" at one portion in each row and each column;

Preferably, a plurality of the first inner product computation circuits and the second inner product computation circuits after division are constituted in parallel.

Also, preferably, the second rearrangement circuit and the third inner product computation circuit can be integrally formed and constituted by an adder circuit.

The third inner product computation circuit has a plurality of series of unit circuits each having a circuit for calculating the complement of "2" of an applied binary data and a switch circuit which allows the applied binary data to pass therethrough or selectively outputs the data passed through the "2"-complement calculation circuit and also a circuit for adding the results of computation of the plurality of series.

Alternatively, the third inner product computation circuit can be constituted by providing a plurality of unit computation circuits each having a first computation circuit including a circuit calculating the complement of "2" of an applied binary data and a switch circuit which allows the applied binary data to pass therethrough or selectively outputs the data passed through the "2"-complement calculation circuit and also a second computation circuit having an adder circuit connected to the switch circuit and a data holding register connected to the adder circuit.

The second inner product computation circuit has a plurality of series of unit computation circuits each having a circuit calculating the complement of "2" of the applied binary data and a selectively controlled switch circuit which allows the applied binary data to pass therethrough or outputs the data passed through the "2"-complement calculation circuit or outputs the data "0" and also a circuit for adding the results of computation of the plurality of series.

Preferably, the constitution is made so that adjacent the unit computation circuits can be integrally constituted so that when the data "0" is output at the switch circuit in one series of computations, the computation operation in the adding circuit is made substantially invalid, to reduce the number of the unit circuits.

The constitution is made so that the first rearrangement circuit, the second rearrangement circuit, and the third rearrangement circuit can be integrally constituted in a rewritable memory, and the writing order of the input data and the read-out order are made different to perform the rearrangement of the data.

According to the present invention, various DCT systems based on the above-mentioned structure, for example, a two-dimensional 4 row×8 column DCT system, a two-dimensional 4 row×4 column DCT system, a two-dimensional 8 row×8 column DCT system system, etc., can be provided.

Also, according to the present invention, various IDCT systems based on the above-mentioned structure, for example, a two-dimensional 4 row×8 column IDCT system, a two-dimensional 4 row×4 column IDCT system, a two-dimensional 8 row×8 column IDCT system, etc. may be provided.

Further, according to the present invention, a transformation system which can be used for both of the two-dimensional 4 row×8 column DCT and the two-dimensional 8 row×8 column DCT system can be provided.

Similarly, according to the present invention, a transformation system which can be used for both of the two-dimensional 4 row×8 column IDCT and two-dimensional 8 row×8 column IDCT can be provided.

As mentioned above, in the present invention, there is adopted a circuit structure in which the DCT is constituted by an inner product computation circuit and a rearrangement circuit having a circuit structure as simple as possible by applying computation equations using constant matrices, and a multiplier circuit is used only for the computation part of the irrational numbers derived from the discrete cosine transformation coefficients. The computation of the portions, where the inner product computation circuits are connected in series, are divided into a plurality of series. These computations are performed in parallel to achieve an improvement of the operation speed.

The above-mentioned points are the same in the IDCT system.

BRIEF DESCRIPTION OF THE DRAWINGS

The above objects and features and other objects and features of the present invention will be described more in detail with reference to the accompanying drawings, in which.

DESCRIPTION OF THE PREFERRED EMBODIMENTS

A description will be made of a circuit structure of a first aspect of a two-dimensional 4 row×8 column discrete cosine transformation (two-dimensional 4×8 DCT) as a first embodiment of the discrete cosine transformation system of the present invention and a circuit structure of a first aspect of the two-dimensional 4 row×8 column discrete cosine inverse transformation (two-dimensional 4×8 IDCT) as a first embodiment of the discrete cosine inverse transformation system of the present invention.

Figure 5:
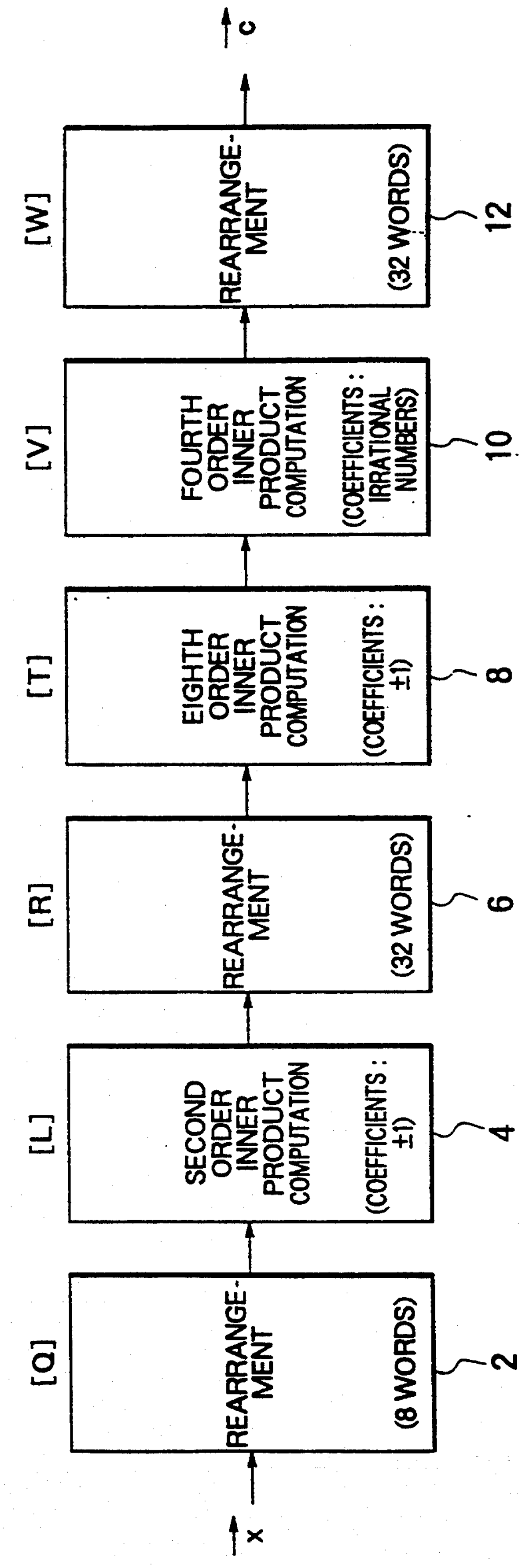
FIG. 5 is a structural view of a two-dimensional 4 row×8 column DCT system as a first embodiment of a DCT system in accordance with the present invention.

FIG. 5 shows the structure of the two-dimensional 4×8 DCT system of the present invention. This two-dimensional 4×8 DCT system performs the computation substantially defined in equation 9. The matrices [Q], [L], [R], [T], [V], and [W] in equation 9 are defined in the above equations 11 to 16, respectively.

The circuit indicated in FIG. 5 is a circuit for performing the computation from right toward the left of equation 9.

The two-dimensional 4×8 DCT system includes a first rearrangement circuit 2 of 8 words performing the processing of the matrix [Q], a second inner product computation circuit 4 with coefficients of "+1" or "−1" performing the processing of the matrix [L], a second rearrangement circuit 6 of 32 words performing the processing of the matrix [R], an eighth-order inner product computation circuit 8 with the coefficients of "+1" or "−1" performing the processing of the matrix [T], a fourth-order inner product computation circuit 10 with the coefficients of irrational numbers performing the processing of the matrix [V], and a third rearrangement circuit 12 of 32 words performing the processing of the matrix [W].

Figure 6:
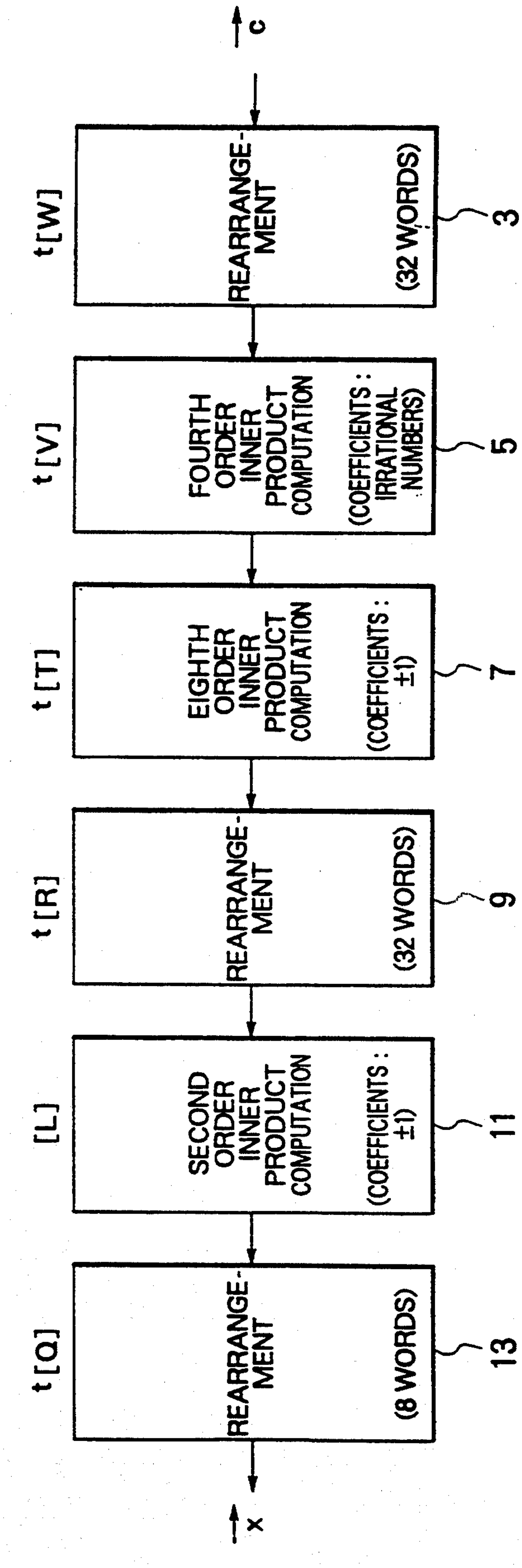
FIG. 6 is a structural view of a two-dimensional 4 row×8 column discrete cosine inverse transformation system as the first embodiment of a discrete cosine inverse transformation system of the present invention.

FIG. 6 shows the structure of the two-dimensional 4×8 IDCT system of the present invention. This two-dimensional 4×8 IDCT system performs the computation substantially defined in equation 10. The transposition matrices in equation 10, $^t$[Q], $^t$[R], $^t$[T], $^t$[V], and $^t$[W] are transposition matrices of the matrices defined in equations 11a to 15a, respectively. Also, the matrix [L] is defined in equation 12.

The circuit illustrated in FIG. 6 is a circuit for performing the computation from the right to left in equation 10.

The two-dimensional 4×8 IDCT system includes a first rearrangement circuit 3 of 32 words performing processing of the transposition matrix $^t$[W], a fourth-order inner product computation circuit 5 with coefficients of irrational numbers performing the processing of the transposition matrix $^t$[V], an eighth-order inner product computation circuit 7 with the coefficients of "+1" or "−1" performing the processing of the transposition matrix $^t$[T], a second rearrangement circuit 9 of 32 words performing the processing of the transposition matrix $^t$[R], a second order inner product computation circuit 11 with the coefficients of "+1" or "−1" performing the processing of the transposition matrix $^t$[L], and a third rearrangement circuit 13 of 8 words performing the processing of the transposition matrix $^t$[Q].

A detailed description of the two-dimensional 4×8 DCT system shown in FIG. 5 will be given.

The multiplication of the input matrix [X] by the matrix [Q] can be realized substantially by the rearrangement of 8 words since the matrix [Q] is the matrix in which only one portion in each row and each column of 8×8 sub-matrix is "1" on a diagonal line as shown in equation 11. Accordingly, the multiplication of the input matrix [X] by the matrix [Q] can be realized by the first rearrangement circuit 2. As the rearrangement circuit, a system which can perform the writing and reading out of data, for example, a random access memory (RAM) of 8 word size, is used, one series of input data is written in the RAM, and when the data is read out from the RAM, a read out operation is carried out in an address order different from that at the writing.

With respect to the result of the first rearrangement circuit 2, a calculation for the matrix [L], that is, the second-order inner product computation, is carried out in the second-order inner product computation circuit 4. As shown in equation 12, the matrix [L] is the matrix with coefficients comprising only "+1" and "−1", and therefore the circuit structure of the second-order inner product computation circuit 4 becomes for example the circuit structure shown in FIG. 7 or FIG. 8.

Figure 7:
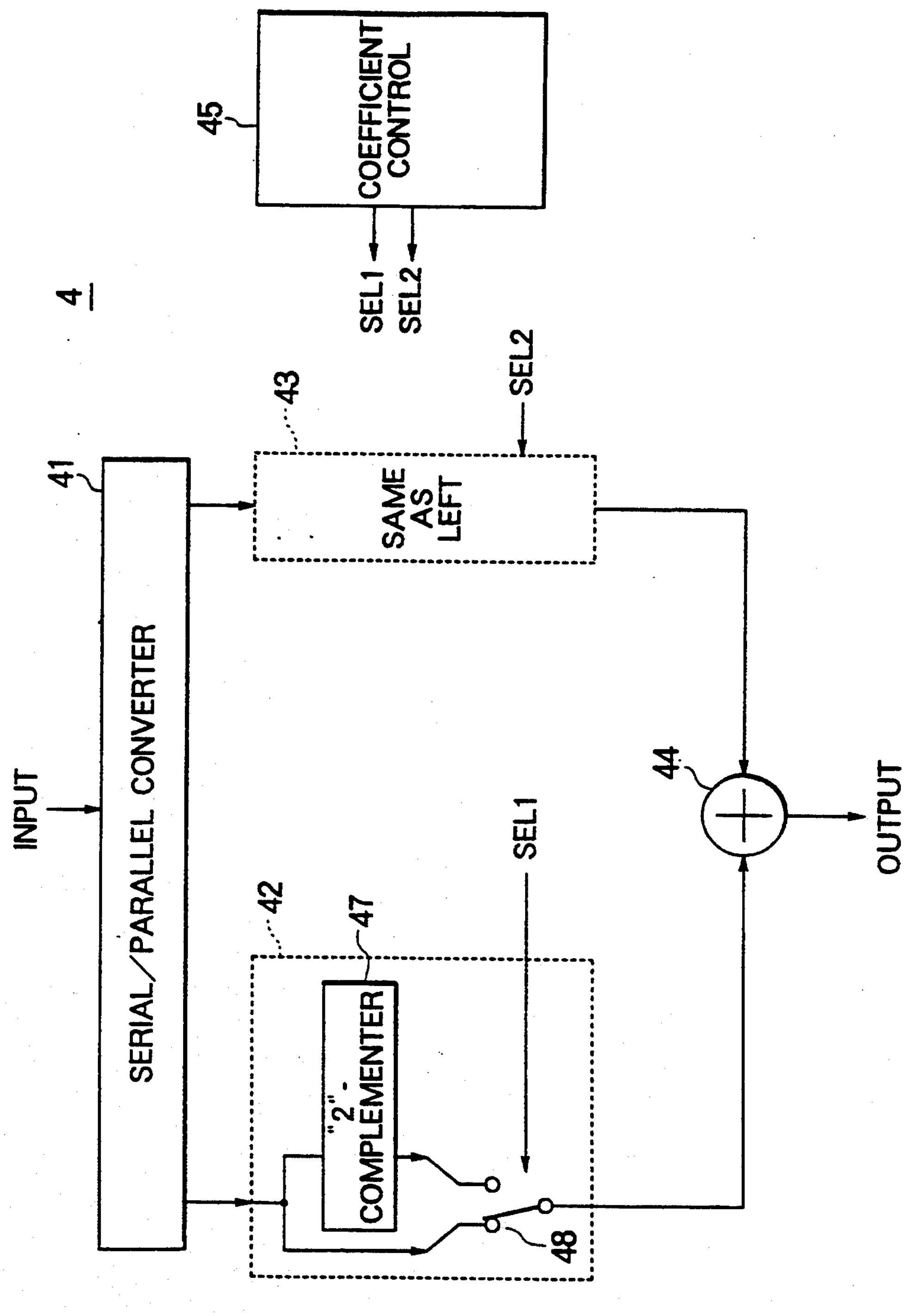
FIG. 7 is a structural view of the circuit of a second-order inner product computation circuit performing the second-order inner product computation for a matrix having coefficients comprising only "+1" and "−1" in the matrices used in the transformation system in FIG. 5 and FIG. 6.

The second-order inner product computation circuit 4 shown in FIG. 7 has a serial to parallel converter 41 converting the input data from a serial to parallel format, two computation circuits 42 and 43 which perform two parallel processings, an adder circuit 44, and a coefficient control circuit 45. Each of the computation circuits 42 and 43 is constituted by, for example, as exemplified in the computation circuit 42, a complementer 47 of "2" and a switch circuit 48. The switch position of the switch circuit 48 is controlled by the coefficient control circuit 45.

The parallel output data from the serial to parallel converter 41 is 2 bit-binary data, and therefore obtaining a complement of "2" in the complementer 47 of "2"

equals multiplication of "−1". Also, passing of the data through the switch circuit 48 not passing through the complementer 47 of "2" equals multiplication of "+1". The coefficient control circuit 45 controls the switch position of the switch circuit 48 in the computation circuits 42 and 43 in accordance with the positive/negative state of the matrix [L] indicated in equation 12.

Figure 8:
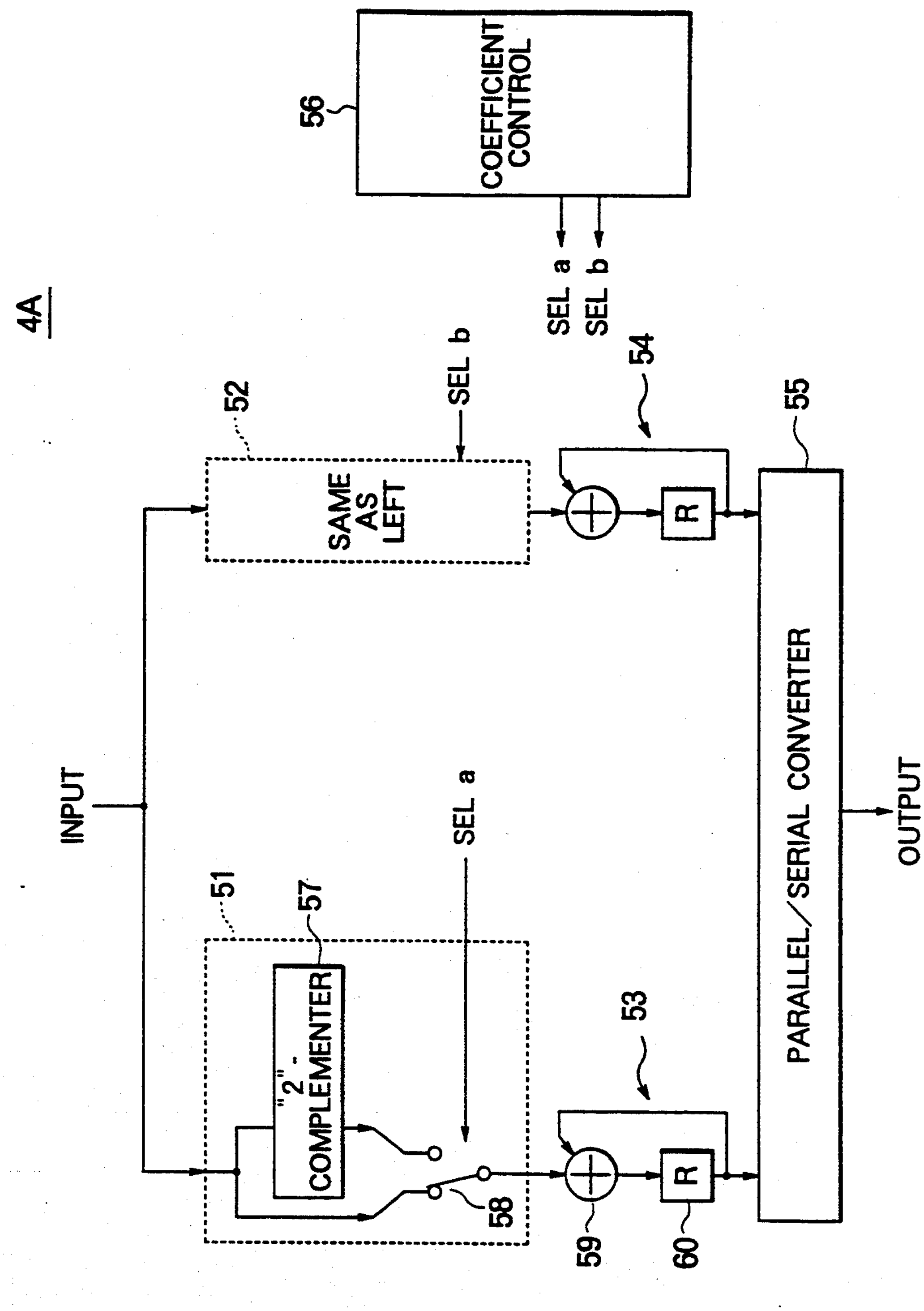
FIG. 8 is a modified circuit view of the second order inner product computation circuit shown in FIG. 7.

The second-order inner product computation circuit 4A shown in FIG. 8 has two computation circuits 51 and 52, two accumulator circuits 53 and 54, a parallel to serial converter 55, and a coefficient control circuit 56. Each of the computation circuits 51 and 52 has the complementer 57 of "2" and the switch circuit 58 as exemplified in the computation circuit 51. Also, the accumulator circuits 53 and 54 have an adder 59 and a data register 60 which functions as the unit time delay element and the data holding circuit as exemplified in the accumulator circuit 53.

The control from the coefficient control circuit 56 to the switch circuit 58 of the computation circuits 51 and 52 is the same as that explained referring to FIG. 7. Data multiplied by "+1" or "−1" in the computation circuits 51 and 52 are added at the data register 60 in which the preceding time of data is held and at the adder 59 and held again in the data register 60. The results of the accumulator circuits 53 and 54 are converted from the parallel to serial format in the parallel to serial converter 55.

The rearrangement of the data corresponding to the processing of multiplying the matrix JR] is carried out in the second rearrangement circuit 6 with respect to the result of the inner product computation in the second order inner product computation circuit 4.

The matrix [R] is, as shown in equation 13, the matrix in which "1" exists at only one portion in each row and each column, resembling the matrix [Q] indicated in equation 11, and therefore, similar to the matrix [Q], it can be replaced by the rearrangement operation of data using a RAM etc. in place of multiplication. Note, as clear from equation 11, this rearrangement becomes the rearrangement of 32 words. Namely, the capacity of the above-described RAM is for example 32 words.

The result of the second rearrangement circuit 6 is multiplied by the matrix [T] in the eighth order inner product computation circuit 8.

Figure 9:
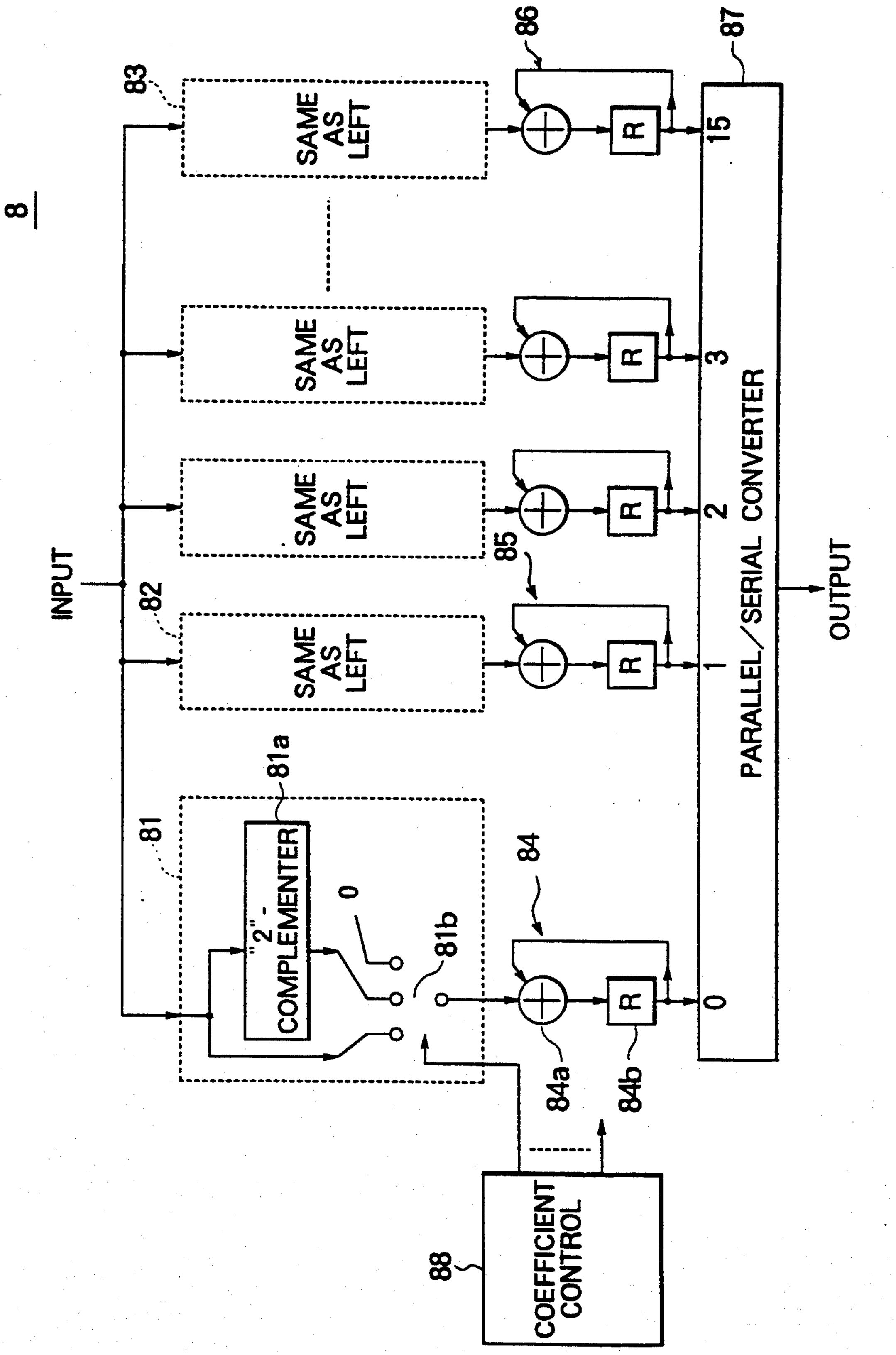
FIG. 9 is a structural view of the circuit of an eighth-order inner product computation circuit performing the eighth-order inner product computation for the matrix having the coefficients comprising "+1", "−1", and "0" on the diagonal line in the matrices used in the transformation system in FIG. 5.

FIG. 9 is a view of a circuit of the eighth order inner product computation circuit 8. The eighth order inner product computation circuit 8 has 16 computation circuits 81 and 82 to 83, 16 accumulator circuits 84 and 85 to 86, a parallel to serial converter 87, and a coefficient control circuit 88, which are provided in parallel. Each of the computation circuits 81 and 82 to 83 is constituted by the three-position switch circuit 81*b* and "2" complementer 81*a* as exemplified in the computation circuit 81. The 16 accumulator circuits 84 and 85 to 86 are each constituted by an adder circuit 84*a* and a data register 84*b* as exemplified in the accumulator circuit 84.

As shown in equation 14, in the matrix IT], two 16×16 sub-matrices exist on the diagonal line, the coefficients of them are "+1" and "−1", and the coefficients on the periphery of the sub-matrix are all "0". The coefficient control circuit 88 controls the three-position switch 81*b* so that either of the result obtained by the multiplication of the input data by "0" at the third position of the switch circuit 81*b*, the result by the multiplication of the input data by "−1" in the "2" complementer 81*a*, or the result obtained by substantially multiplying the input data by "+1" which passes through only the three-position switch circuits 81*b* other than them is selected and output. The accumulator circuit 84 adds the result of the present result from the computation circuit 81 to the result of the preceding time held in the data register 84*b* and holds the same again in the data register 84*b*. The data register 84*b* functions as the unit time delay circuit and data holding circuit. The results computed in parallel in the computation circuits 81, 82, and 83 and accumulator circuits 84, 85, and 86 are converted to a serial format in the parallel to serial converter 87 and output.

Figure 10:
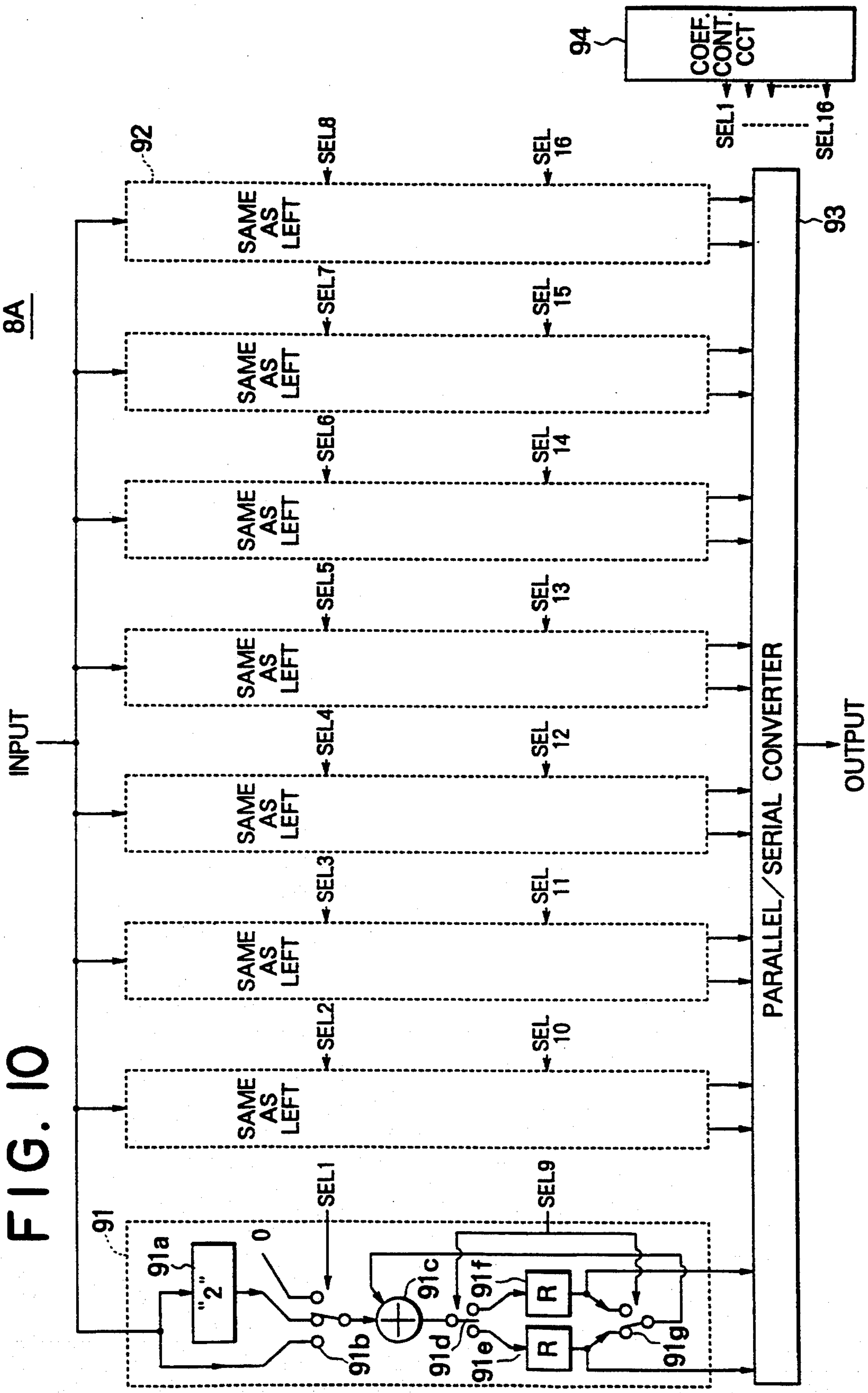
FIG. 10 is a modified circuit view of the eighth-order inner product computation circuit shown in FIG. 9.

FIG. 10 shows the structure of the modified circuit of the eighth order inner product computation circuit 8 indicated in FIG. 9.

When analyzing the 16×16 sub-matrices of the matrix [T] shown in equation 14, either of the 0-th row or first row in each column is always "0". Also, either of the second row or the third row in each column is always "0". That is, generally speaking, either one of the 2k-th row and (2k+1)-th row in each column is always "0". Note, k=0, 1, . . ., 7. Accordingly, in the circuit shown in FIG. 9, either of the adjacent computation circuits 81 and 82 always outputs "0". There is no meaning in an addition of "0" in the accumulator circuits 84 and 85.

The circuit shown in FIG. 10 commonly uses the adjacent computation circuits, for example, 81 and 82, and the accumulator circuits, for example, 84 and 85, based on the above-mentioned consideration and avoids meaningless addition, thereby simplifying the 16 parallel circuits in FIG. 9 to a half eight circuits in structure.

The eighth order inner product computation circuit 8A shown in FIG. 10 comprises eight partial inner product computation circuits 91 to 92, a parallel to serial converter 93, and a coefficient control circuit 94. Each of the partial inner product computation circuits 91 to 92, for example, the partial inner product computation circuit 91, is constituted by a "2" complementer 91*a*, a three-position switch circuit 91*b*, an adder circuit 91*c*, a first switch circuit 91*d*, a first data register 91*e*, and a second data register 91*f* functioning as a unit time delay element and data holding circuit, respectively, and a second switch circuit 91*d*.

The coefficient control circuit 94 outputs select signals 1 to 8 and select signals 9 to 16 in accordance with the coefficient in each 16×16 sub-matrix indicated in equation 15. Control is performed so that the select signals 1 to 8 select and output from the three-position switch circuit 91*b* either of the result obtained by the multiplication of the input data by "0", the result obtained by the multiplication of the input data by "−1" in the "2"-complementer 91*a*, or the result obtained by substantially the multiplication of the input data by "+1" which passes through only the three-position switch 91*b* other than them. The select signals 9 to 16 select to which result held in the first data register **91*e* or the second data register 91*f* the result to be added other than "0" from the three-position switch 91*b* is to be added at the adder circuit 91*c*. One of the held data in the first data register 91*e* and the second data register 91*f* is applied to the parallel to serial converter 93 as the value of the preceding time indicating the same as that "0" is added, and the other is applied to the parallel to serial converter 93 as the result by the addition in the above-described adder circuit 91*c*** and output as the serial data.

In the fourth order inner product computation circuit 10, the result of computation of the eighth order inner product computation circuit 8 is multiplied by a matrix [V] indicated in equation 15.

Figure 11:
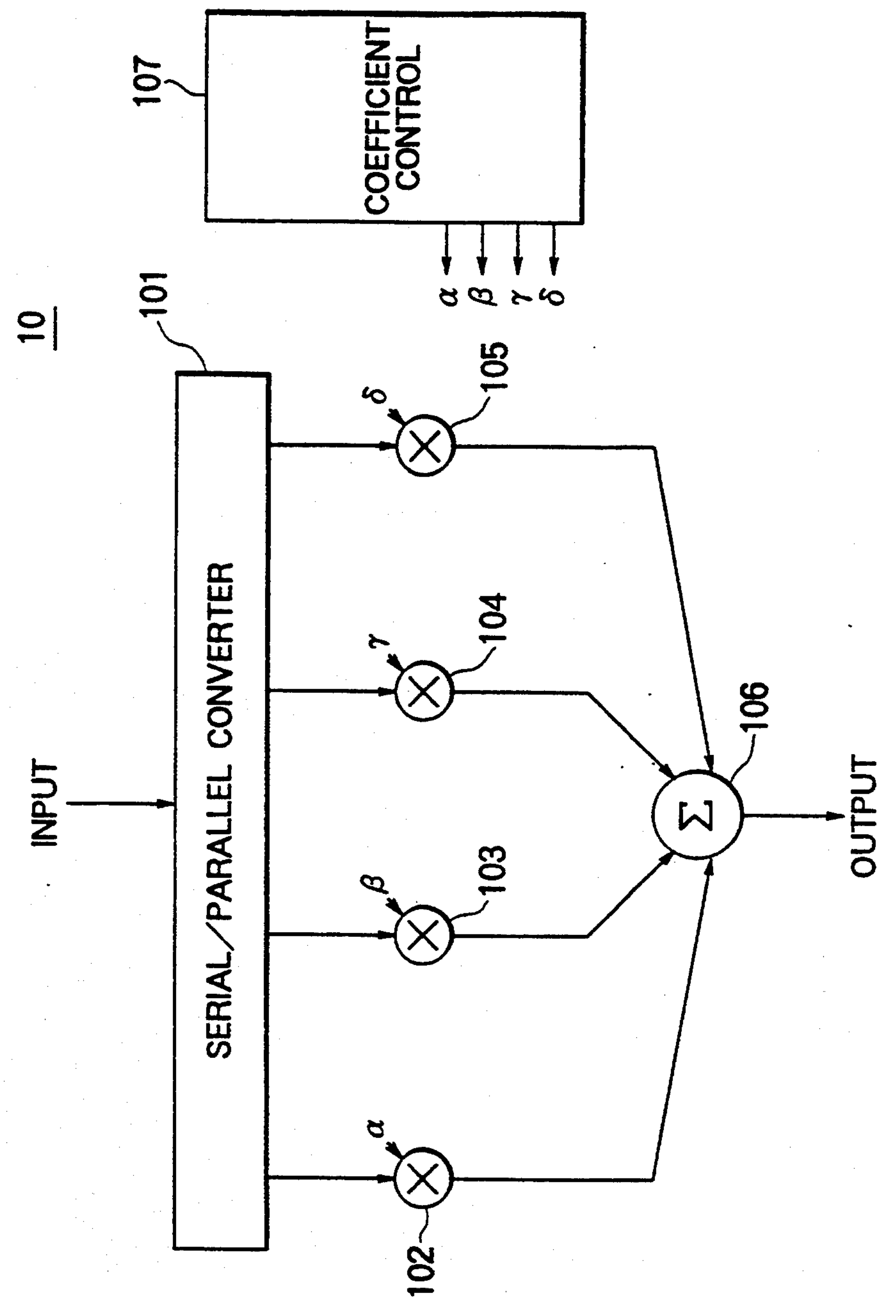
FIG. 11 is a structural view of the circuit of a fourth-order inner product computation circuit performing the fourth-order inner product computation including the irrational numbers used in the transformation system in FIG. 5 and FIG. 6.

FIG. 11 is a the circuit diagram of the fourth order inner product computation circuit 10. The matrix [V] is a matrix including irrational numbers in the coefficient of the 4×4 sub-matrix on the diagonal line, and therefore constituted by a serial to parallel converter 101, four coefficient multiplier circuits 102 to 105 provided in parallel, an adder circuit 106, and a coefficient control circuit 107.

The coefficient control circuit 107 changes the coefficients applied to the coefficient multiplier circuits 102 to 105 according to equation 16 and applies the same. These coefficients have the values of the elements of the 4×4 sub-matrix on the diagonal line of the matrix [V].

The coefficient multiplier circuits 102 to 105 multiply the coefficient set up from the coefficient control circuit 107 by the output data from the serial to parallel converter 101. The results of these multiplications are added at the adder circuit 106, and the fourth order inner product computation result is output.

Figure 12:
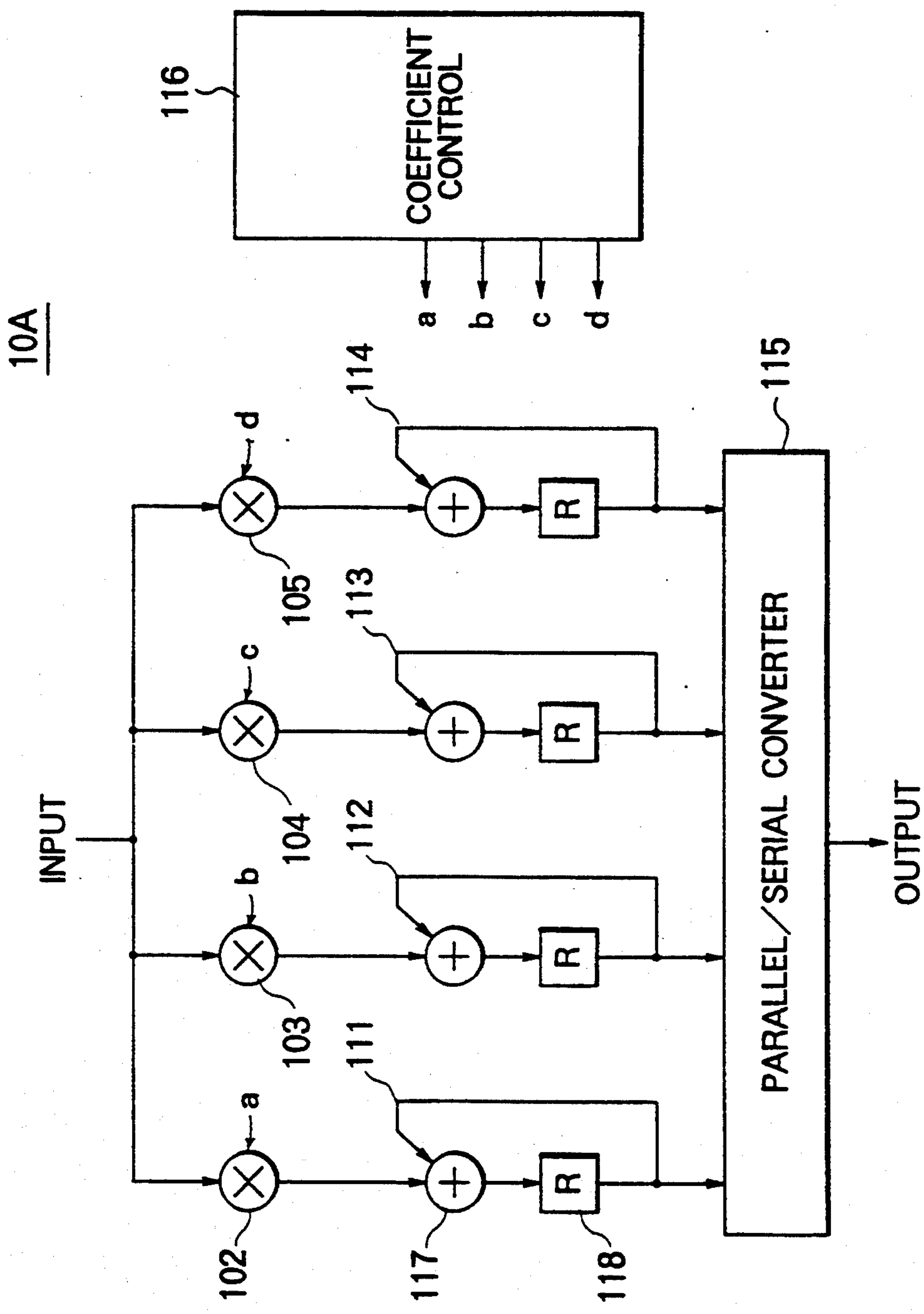
FIG. 12 is a modified circuit view of the fourth-order inner product computation circuit shown in FIG. 11.

FIG. 12 shows the circuit structure of the fourth order inner product computation circuit 10A as a modification of the fourth order inner product computation circuit 10 shown in FIG. 11. The fourth order inner product computation circuit 10A has the coefficient multiplier circuits 102 to 105, the accumulator circuits 111 to 114, the parallel-serial converter 115, and the coefficient control circuit 116 the same as those indicated in FIG. 11. Each of the accumulator circuits 111 to 114 has, for example, as exemplified in the accumulator circuit 111, an adder circuit 117, and a data register 118 functioning as the unit time delay circuit and the data holding circuit.

In the third rearrangement circuit 12, the rearrangement processing of the data equivalent to the multiplication of the result of the fourth order inner product computation circuit 10 by the matrix [W] is performed.

The matrix [W] is a matrix in which "1" exists only at one portion in each row and each column as shown in equation 16, and therefore is similar to the multiplication processing of the matrix [Q] and matrix [R]. The multiplication can be replaced by the rearrangement action of the data by using the RAM etc. As clear from equation 16, the rearrangement of data becomes the rearrangement of 32 words.

When a three-bit shift is carried out with respect to the processing result of the third rearrangement circuit 12, which means a $\frac{1}{8}$ calculation the two-dimensional 4×8 DCT indicated in equation 9 is carried out.

In the above-mentioned two-dimensional 4×8 DCT system, just four coefficient multiplier circuits 102 to 105 are provided only in the fourth order inner product computation circuit 10 performing the computation of the matrix [V] including the irrational numbers in the coefficients.

In the conventional two-dimensional 4×8 DCT system, 12 multiplier circuits were needed, and therefore this means that the number of the multiplier circuits can be reduced by eight.

Note that, the first rearrangement circuit 2, the second rearrangement circuit 6, and the third rearrangement circuit 12 can be constituted by one RAM.

A description will be made of the two-dimensional 4×8 IDCT system shown in FIG. 6.

The first rearrangement circuit 3 rearranges 32 words of the input matrix [C] using a RAM etc. similar to the third rearrangement circuit 12 in FIG. 5 mentioned above, in place of the multiplication of the transposition matrix $^t$[W] of the matrix [W] with the input matrix [C].

The fourth order inner product computation circuit 5 is constituted by a circuit similar to the one illustrated in FIG. 11 or FIG. 12 and multiplies the transposition matrix $^t$[V] with the data output from the first rearrangement circuit 3.

The eighth order inner product computation circuit 7 multiplies the transposition matrix $^t$[T] with the processing result of the fourth order inner product computation circuit 5. The transposition matrix $^t$[T] of the matrix [T] is all "0" except the 16×16 sub-matrix on the diagonal line, and therefore can be computed by the inner product computation circuit shown in FIG. 13.

Figure 13:
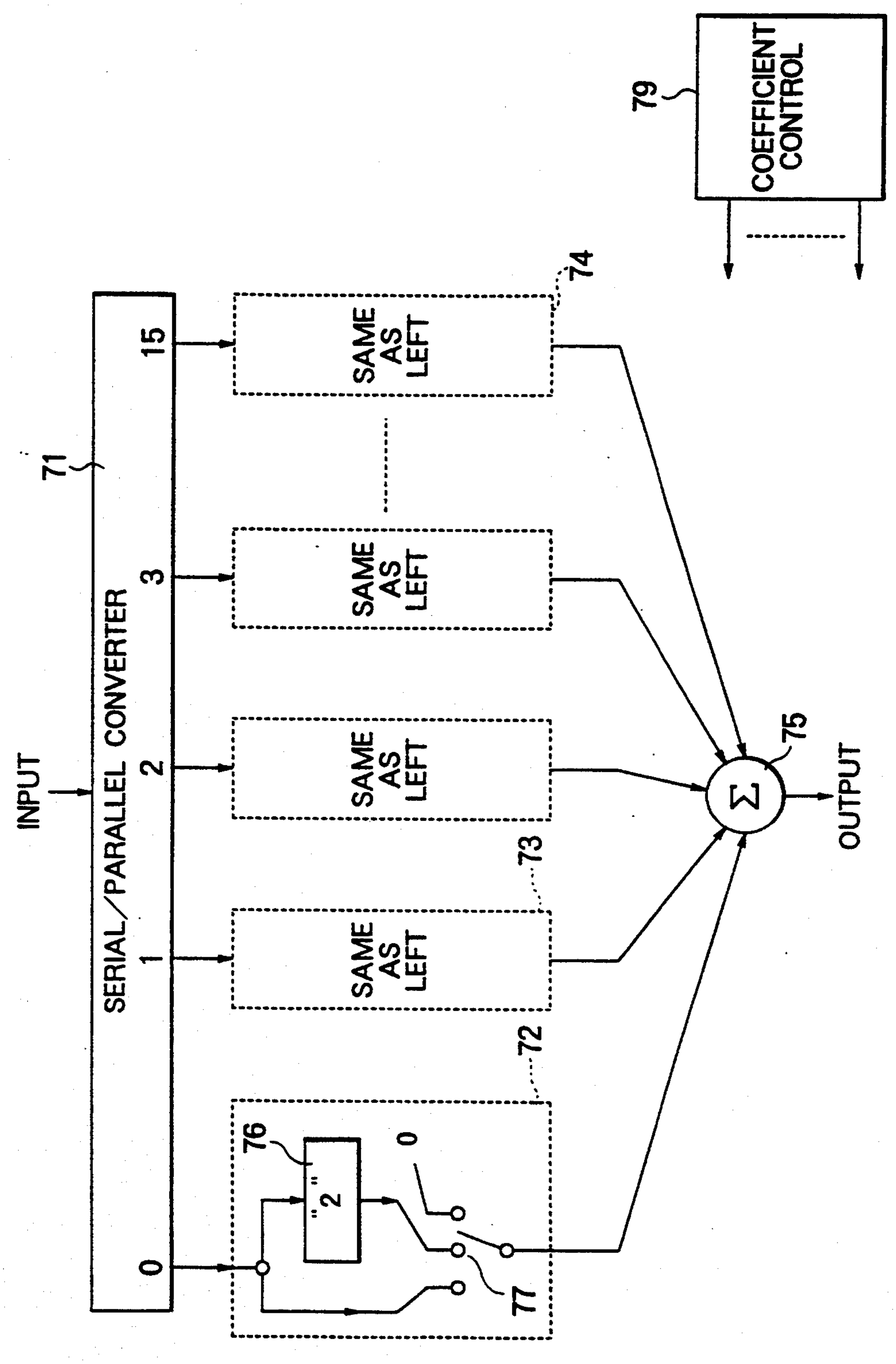
FIG. 13 is a structural view of the circuit of the eighth-order inner product computation circuit performing the eighth-order inner product computation for the matrix having the coefficients comprising "+1", "−1", and "0" on the diagonal line in the matrices used in the transformation system in FIG. 6.

The eighth order inner product computation circuit 7 shown in FIG. 13 as a serial to parallel converter 71, 16 partial inner product computation circuits 72, 73, and 74, an adder circuit 75, and a coefficient control circuit 79. Each of the partial inner product computation circuits 72, 73, and 74 is constituted by a "2"-complementer 76 and three-position switch circuit 77 as indicated in for example the partial inner product computation circuit 72. The coefficient control circuit 79 controls the three-position switch circuit 77 in accordance with the coefficient in the transposition matrix $^t$[T], to multiply the "+1", "−1", or "0" with the data output from the serial to parallel converter 71.

The multiplication of "0" at the third position in the three-position switch circuit 77 means that a meaningless operation is carried out similar to the one mentioned referring to FIG. 9. That is, generally speaking, either one of the 2k-th column or the (2k+1)-th column in each row is always "0". Note, k=0, 1, . . . , 7. That is, in the circuit shown in FIG. 13, either of the adjacent partial inner product computation circuits 72 and 73 always outputs "0". Accordingly, also for the eighth order inner product computation circuit 7 shown in FIG. 13, the circuit structure can be simplified by commonly using the adjacent computation circuits.

Figure 14:
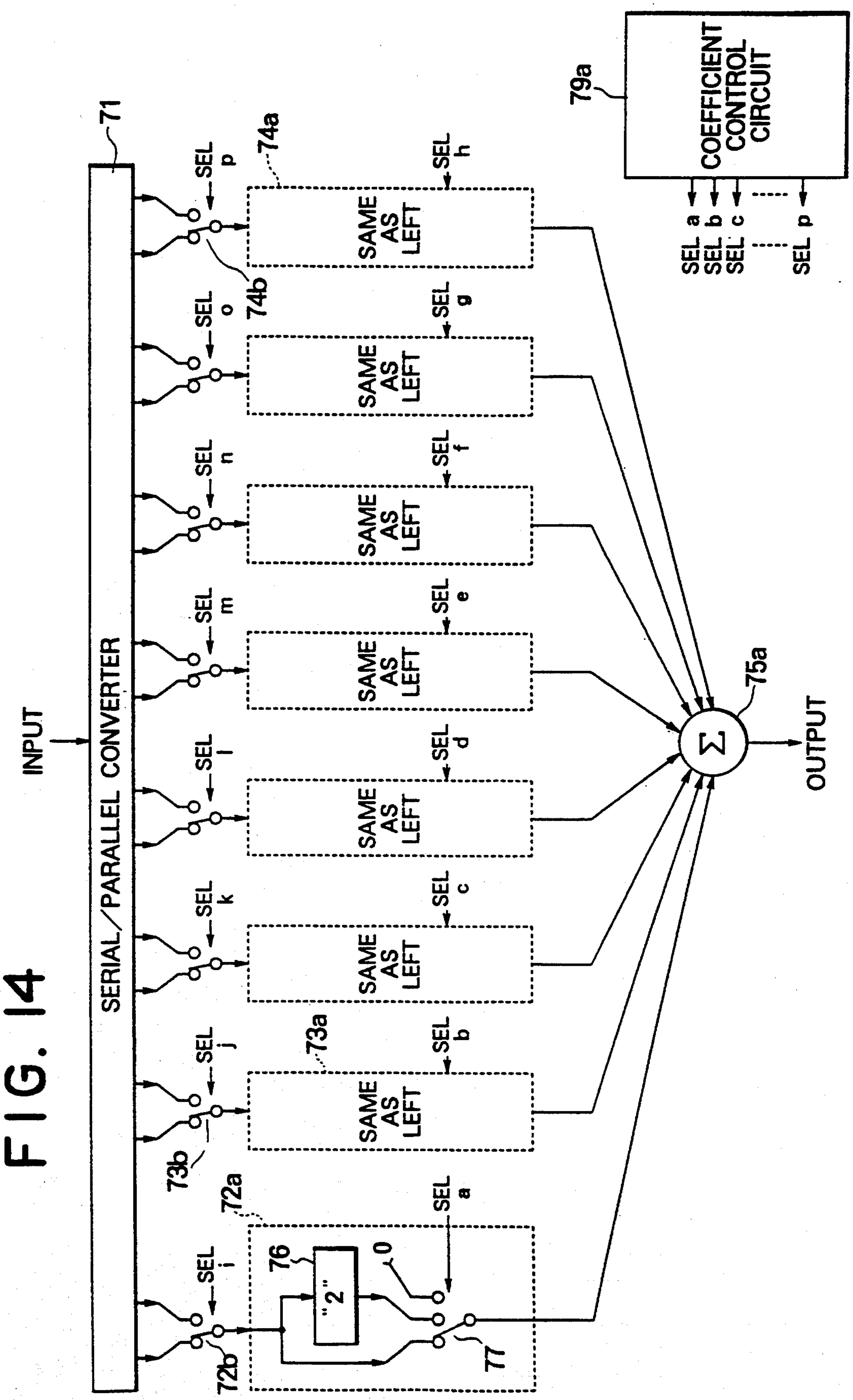
FIG. 14 is a modified circuit view of the eighth-order inner product computation circuit shown in FIG. 13.

FIG. 14 shows the eighth order inner product computation circuit 7A corresponding to the almost halved circuit structure of the eighth order inner product computation circuit 7 shown in FIG. 13, based on such a consideration. In the eighth order inner product computation circuit 7A, eight series circuits each comprising the switch circuit 72*b* and the partial inner product computation circuit 72*a* are provided in parallel, and the outputs of these parallel circuits are added at the adder circuit 75*a*. A series circuit comprising one switch circuit 72*b* and partial inner product computation circuit 72*a* performs the computation of the 0-th column and the first column which are adjacent. By this, the number of the 16 partial inner product computation circuits 72, 73, and 74 shown in FIG. 13 is reduced to eight. The coefficient control circuit 79*a* outputs the signal controlling the switch circuit 7*a* and the three-position switch circuit 77 in the partial inner product computation circuit 72*a*.

With respect to the computation result of the eighth order inner product computation circuit 7, a rearrangement is carried out in the second rearrangement circuit 9 considering the characteristics (only one portion in each row and each column is "1") of the coefficient of the transposition matrix $^t$[R], and a result by substantially multiplying the transposition matrix $^t$[R] is obtained. The second rearrangement circuit 9 can be constituted by, for example, using a RAM similar to the above-mentioned rearrangement circuit.

A computation of multiplying the computation result of the second rearrangement circuit 9 by the matrix [L] in the second order inner product computation circuit 11 is carried out. This second order inner product computation circuit 11 is constituted as a circuit equivalent to the second order inner product computation circuit 4 in FIG. 5, for example, a circuit equivalent to the circuit shown in FIG. 7 or FIG. 8.

A rearrangement of the data similar to the first rearrangement circuit shown in FIG. 5 in the third rearrangement circuit 13, for example, a rearrangement of the data considering the coefficient of the transposition matrix $^t$[Q] using the RAM is carried out with respect to the computation result of the second order inner product computation circuit 11.

By the above, as the inverse transformation system of the two-dimensional 4×8 DCT system shown in FIG. 5, the two-dimensional 4×8 IDCT can be computed in the two-dimensional 4×8 IDCT system shown in FIG. 6.

Also in the two-dimensional 4×8 IDCT system in FIG. 6, there are only four multiplier circuits in the fourth order inner product computation circuit 5. The number is smaller by eight than the 12 multiplier circuits in the conventional two-dimensional 4×8 IDCT system, and therefore the circuit structure can be simplified considerably.

Also in this two-dimensional 4×8 IDCT system, the first rearrangement circuit 3, the second rearrangement circuit 9, and the third rearrangement circuit 13 can be realized by one common RAM.

A description will be made of the circuit structure for increasing the speed of action of the two-dimensional 4 row×8 column discrete cosine transformation system and the two-dimensional 4 row×8 column discrete cosine inverse transformation system shown in FIG. 5 and FIG. 6 mentioned above.

As mentioned above, the two-dimensional 4×8 DCT was defined in equation 9 in the present invention.

To increase the speed, the multiplication of the matrix [T] expressed by equation 14 with the matrix [V] expressed by equation 15 will be considered. On the diagonal line, the matrix [T] can be broken down to the first sub-matrix [T0] on the left top and the second sub-matrix [T1] on the right bottom. Similarly, the matrix [V] can be broken down to a group of the four 4×4 sub-matrices from the left top to the right bottom along the diagonal line: that is, the first sub-matrix [V0] and the remaining four 4×4 sub-matrix group: second sub-matrix [V1]. Accordingly, the multiplication of the first sub-matrix [T0] with the first sub-matrix [V0] and the multiplication of the second sub-matrix [T1] with the second sub-matrix [V1] can be independently carried out in parallel. In this way, when the parallel action is carried out, the operation time is shortened to approximately a half.

The second rearrangement circuit 6, meaning multiplication of the computation result of the second order inner product computation circuit 4 shown in FIG. 5 by the matrix [R], performs rearrangement such that, for example, the even number data is output in the first 16 cycles and the odd number data is output in subsequent 16 cycles even if the RAM is used. Accordingly, when it is assumed that the even number outputs among the outputs of the matrix [L] are fed directly to the eighth order inner product computation circuit for calculating the first sub-matrix [T0], and the odd number outputs among the outputs of the matrix [L] are fed to the eighth order inner product computation circuit for calculating the second sub-matrix [T1], the second rearrangement circuit 6 shown in FIG. 5 becomes unnecessary. By omitting the second rearrangement circuit 6, the processing time is shortened.

Figure 15:
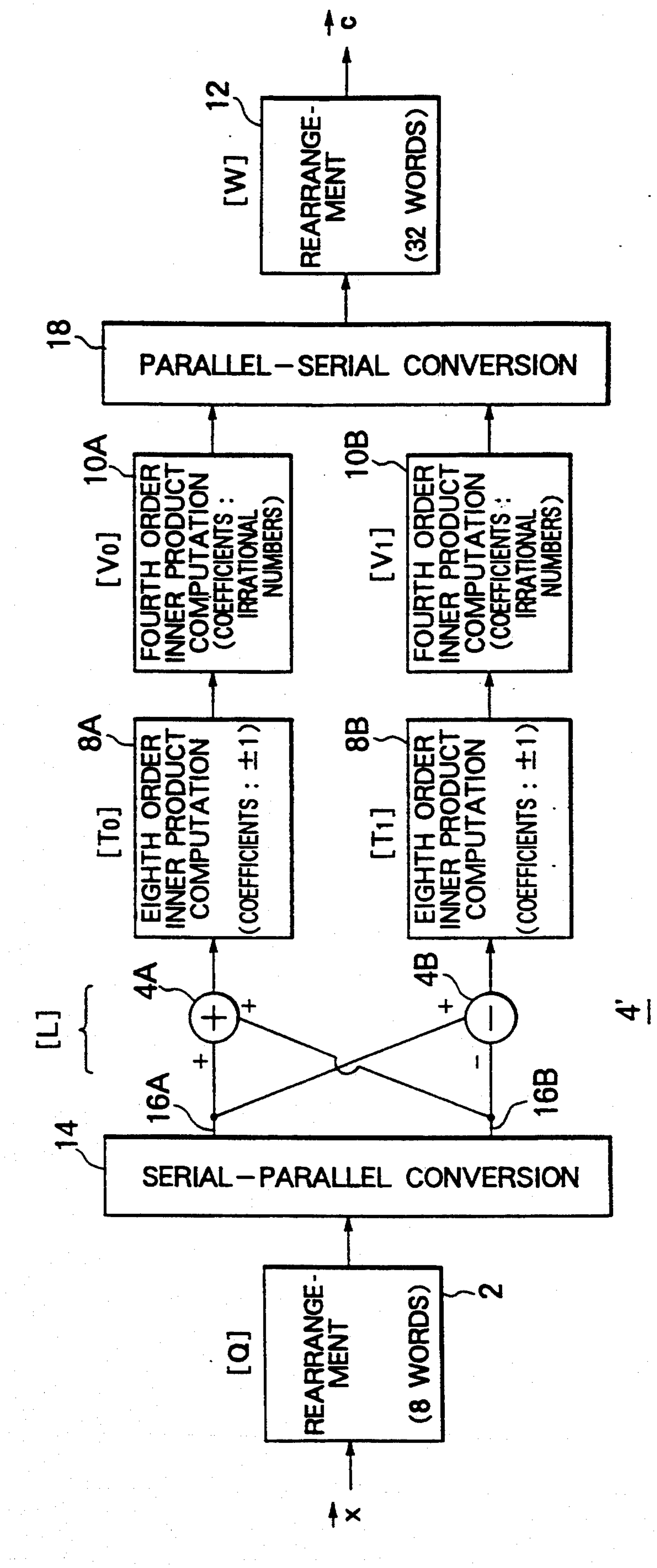
FIG. 15 is a structural view of the circuit achieving an increase of speed of the two-dimensional 4 row×8 column discrete cosine transformation system shown in FIG. 5.

FIG. 15 shows the structure of the high speed operation type two-dimensional 4×8 DCT system based on the consideration mentioned above.

The high speed operation type two-dimensional 4×8 DCT system has a first rearrangement circuit 2 performing the multiplication of the input matrix [X] with the matrix [Q]; a serial to parallel conversion circuit 14 for multiplying the matrix [L] with respect to the computation result of the first rearrangement circuit 2; an adder and subtracter circuit 4' comprising an adder circuit 4A and a subtracter circuit 4B; two eighth order inner product computation circuits 8A and 8B multiplying this computation result by the matrix [T], two fourth order inner product computation circuits 10A and 10B multiplying the results of these computations by the matrix [V]; a parallel to serial converter 18; and a third rearrangement circuit 12. A circuit corresponding to the second rearrangement circuit 6 shown in FIG. 5 is not provided in FIG. 15. Also, it is sufficient if the $\frac{1}{8}$ computation circuit performs the shift by 3 bits in the binary data, and therefore the illustration is omitted.

The first rearrangement circuit 2 is constituted by for example a RAM and rearranges the input matrix [X] in 8 words in accordance with the coefficient of the matrix [Q] in place of the multiplication of the input matrix [X] by the matrix [Q] similar to the first rearrangement circuit 2 in FIG. 5.

The serial to parallel conversion circuit 14 outputs the result of the rearrangement of the first rearrangement circuit 2 to the two lines 16A and 16B.

The matrix [L] has the coefficient of "+1" or "−1" as indicated in equation 12, and the multiplier circuit 4' of the matrix [L] can be realized equivalently by the adder circuit 4A and the subtracter circuit 4B.

The first sub-matrix [T0] and the second sub-matrix [T1] are multiplied in parallel with the results by the multiplication by the matrix [L] in the eighth order inner product computation circuits 8A and 8B, respectively. The eighth order inner product computation circuits 8A and 8B adopt the circuit structures shown in FIG. 9 and FIG. 10, respectively.

In the eighth order inner product computation circuits 8A and 8B, the results of multiplication of the first sub-matrix [T0] and the second sub-matrix [T1] are multiplied by the first sub-matrix [V0] and the second sub-matrix [V1] in parallel in the fourth order inner product computation circuits 10A and 10B, respectively. The first sub-matrix [V0] and the second sub-matrix [V1] are the matrices including irrational numbers, and therefore the circuit structure of these eighth order inner product computation circuits 8A and 8B become the circuits having the multiplier circuit as shown in FIG. 11 and FIG. 12.

The results of multiplication of the eighth order inner product computation circuits 8A and 8B are converted to the serial data in the parallel to serial converter 18, for which the rearrangement considering the characteristics of the coefficient of the matrix [W] is carried out in place of the multiplication by the matrix [W], in the third rearrangement circuit 12.

A 3-bit shift is carried out with respect to the above computation result in place of the multiplication by $\frac{1}{8}$.

By the above, according to the two-dimensional 4×8 DCT system shown in FIG. 15, the operation speed in the two-dimensional 4×8 DCT system shown in FIG. 5 can be improved almost two-fold. Note, since the two fourth order inner product computation circuits 10A and 10B are provided, even if the number of the multiplier circuits doubles, i.e., becomes eight, the number of the multiplier circuits is still small compared with conventional 12.

Figure 16:
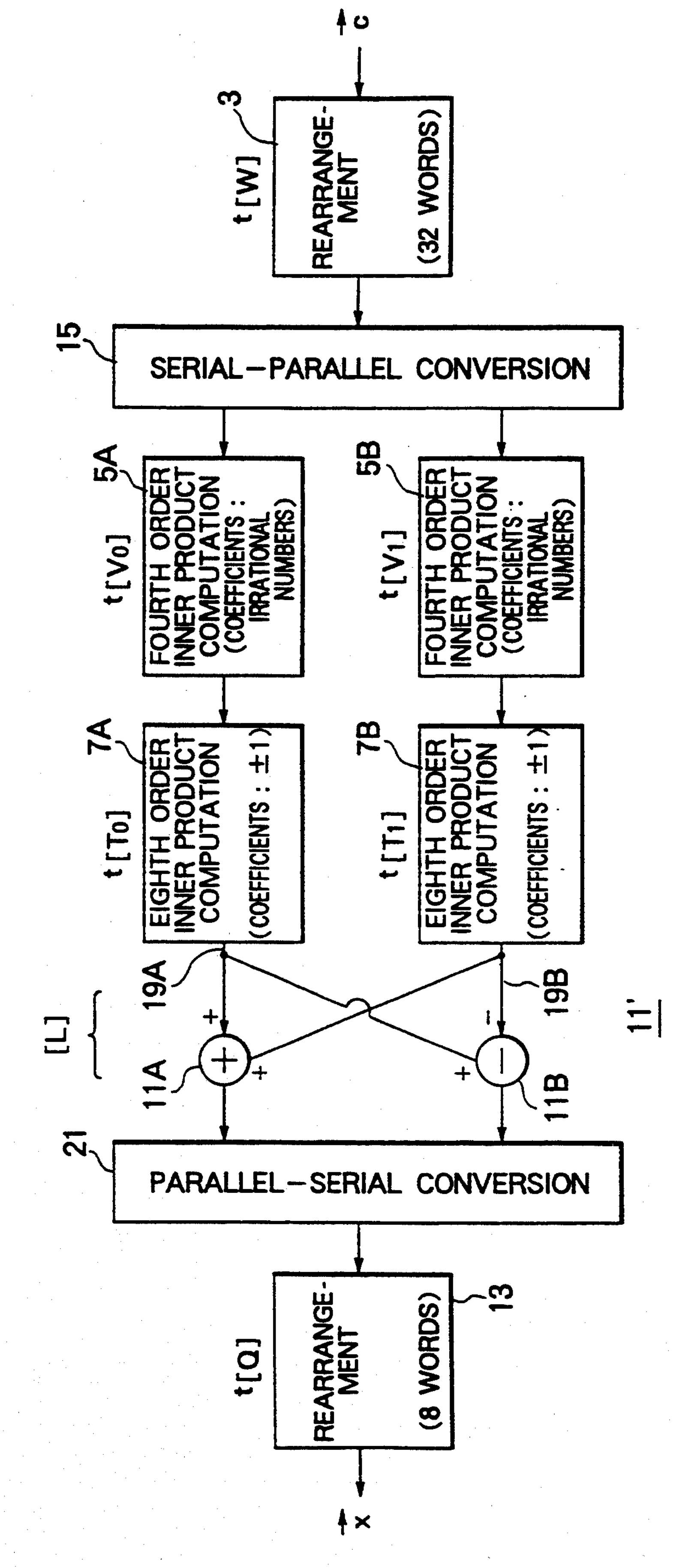
FIG. 16 is a structural view of the circuit achieving an increase of speed of the two-dimensional 4 row×8 column discrete cosine inverse transformation system shown in FIG. 6.

FIG. 16 shows the structure of the two-dimensional 4×8 IDCT system as the inverse operation circuit shown in FIG. 15.

The two-dimensional 4×8 IDCT system has a first rearrangement circuit 3 of 32 words which equivalently performs the multiplication of the input matrix [C] by the transposition matrix $^t$[W]; a serial to parallel conversion circuit 15; fourth order inner product computation circuits 5A and 5B which multiply the data output from the serial to parallel conversion circuit 15 by the first transposition matrix $^t$[V0] and the first transposition matrix $^t$[V0] which are in parallel; eighth order inner product computation circuits 7A and 7B multiplying the results of these multiplications by the first transposition matrix $^t$[T0] and second transposition matrix $^t$[T1]; an adder and subtracter circuit 11' having an adder circuit 11A performing the addition corresponding to the coefficients "+1" and "−1" of the matrix [L] in place of the multiplication of the computation results in these eighth order inner product computation circuits 7A and 7B by the matrix [L], and a subtracter circuit 11B performing the subtraction; a parallel to serial converter 21; and a third rearrangement circuit 13 performing the rearrangement of 8 words in place of the multiplication by the transposition matrix $^t$[Q].

Also in the two-dimensional 4×8 IDCT system shown in FIG. 16, the second rearrangement circuit 9 multiplying the transposition matrix $^t$[R] shown in FIG. 6 is not required.

In the two-dimensional 4×8 IDCT system shown in FIG. 16, an almost two-fold improvement of the computation processing speed compared with the two-dimensional 4×8 IDCT system shown in FIG. 6 is seen. Note, since four multiplier circuits in the fourth order inner product computation circuits 5A and 5B, respectively, i.e., eight in total multiplier circuits become necessary, the circuit structure becomes complex compared with FIG. 6.

A description will now be made of a second embodiment of the two-dimensional 4×8 DCT system and the two-dimensional 4×8 IDCT system performing the inverse transformation thereof of the present invention.

As indicated in equation 9 and equation 10, the two-dimensional 4×8 DCT and the two-dimensional 4×8 IDCT can define the method of the matrix decomposition in equation 17 and equation 18, respectively, by adopting a procedure different from that in the above-described first embodiment.

$$\text{DCT;}\ \vec{C}=(\tfrac{1}{8})[U][T][S][R][L][Q]\vec{X} \tag{17}$$

$$\text{IDCT:}\ \vec{X}=(\tfrac{1}{4})\,{}^t[Q][L]\,{}^t[R]\,{}^t[S]\,{}^t[T]\,{}^t[U]\vec{C} \tag{18}$$

The matrices [U], [T], [S], [R], [L], and [Q] in equation 17 and equation 18 are defined in the following equation 19 to equation 24, respectively.

$$\begin{vmatrix}
10000000 & 00000000 & 00000000 & 00000000 \\
00000000 & 00000000 & 10000000 & 00000000 \\
00001000 & 00000000 & 00000000 & 00000000 \\
00000000 & 00000000 & 01000000 & 00000000 \\
00100000 & 00000000 & 00000000 & 00000000 \\
00000000 & 00000000 & 00100000 & 00000000 \\
00000010 & 00000000 & 00000000 & 00000000 \\
00000000 & 00000000 & 00010000 & 00000000
\end{vmatrix} \tag{19}$$

-continued $$
[U] = \begin{vmatrix}
00000000 & 10000000 & 00000000 & 00000000 \\
00000000 & 00000000 & 00000000 & 10000000 \\
00000000 & 00001000 & 00000000 & 00000000 \\
00000000 & 00000000 & 00000000 & 00001000 \\
00000000 & 00100000 & 00000000 & 00000000 \\
00000000 & 00000000 & 00000000 & 00000010 \\
00000000 & 00000010 & 00000000 & 00000000 \\
00000000 & 00000000 & 00000000 & 00100000 \\
\\
01000000 & 00000000 & 00000000 & 00000000 \\
00000000 & 00000000 & 00001000 & 00000000 \\
00000100 & 00000000 & 00000000 & 00000000 \\
00000000 & 00000000 & 00000100 & 00000000 \\
00010000 & 00000000 & 00000000 & 00000000 \\
00000000 & 00000000 & 00000010 & 00000000 \\
00000001 & 00000000 & 00000000 & 00000000 \\
00000000 & 00000000 & 00000001 & 00000000 \\
\\
00000000 & 01000000 & 00000000 & 00000000 \\
00000000 & 00000000 & 00000000 & 00000100 \\
00000000 & 00000100 & 00000000 & 00000000 \\
00000000 & 00000000 & 00000000 & 01000000 \\
00000000 & 00010000 & 00000000 & 00000000 \\
00000000 & 00000000 & 00000000 & 00010000 \\
00000000 & 00000001 & 00000000 & 00000000 \\
00000000 & 00000000 & 00000000 & 00000001
\end{vmatrix}
$$

$$
[T] = \begin{vmatrix}
\begin{matrix} + & + & 0 & 0 \\ + & - & 0 & 0 \\ 0 & 0 & + & + \\ 0 & 0 & + & - \end{matrix} & & & & \\
& \begin{matrix} k & k & l & l \\ k & m & l & n \\ n & n & k & k \\ n & l & k & m \end{matrix} & & & \\
& & \begin{matrix} k & k & n & n \\ n & n & m & m \\ n & l & k & m \\ m & k & n & l \end{matrix} & & O \\
& & & \begin{matrix} i & j & 0 & + \\ j & j & - & 0 \\ j & j & + & 0 \\ \mathrm{j} & \mathrm{i} & 0 & + \end{matrix} &
\end{vmatrix} \tag{20}
$$

$$
\begin{vmatrix}
& \begin{matrix} b & a & g & h \\ d & f & e & g \\ a & g & d & b \\ g & d & f & a \end{matrix} & & & \\
& & \begin{matrix} b & a & g & h \\ d & f & e & g \\ a & g & d & b \\ g & d & f & a \end{matrix} & & \\
O & & & \begin{matrix} a & h & f & g \\ b & c & d & a \\ h & e & g & b \\ g & b & e & d \end{matrix} & \\
& & & & \begin{matrix} e & h & c & b \\ g & f & d & e \\ h & a & b & g \\ b & g & a & d \end{matrix}
\end{vmatrix}
$$

$$
= \begin{vmatrix}
T1 & & & O \\
& T2 & & \\
& & T3 & \\
O & & & T4
\end{vmatrix}
$$

-continued $$[S] = \begin{vmatrix}
\begin{matrix} 1&1&1&1&0&0&0&0 \\ 0&0&0&0&1&1&1&1 \\ 1&-&-&1&0&0&0&0 \\ 0&0&0&0&1&-&-&1 \\ 1&1&-&-&0&0&0&0 \\ 0&0&0&0&1&1&-&- \\ 1&-&1&-&0&0&0&0 \\ 0&0&0&0&1&-&1&- \end{matrix} & & & \\
& \begin{matrix} 1&0&0&1&0&1&1&0 \\ 0&1&1&0&1&0&0&1 \\ 1&0&0&1&0&-&-&0 \\ 0&1&1&0&-&0&0&- \\ 1&0&0&-&0&1&-&0 \\ 0&1&-&0&-&0&0&1 \\ 1&0&0&-&0&-&1&0 \\ 0&1&-&0&1&0&0&- \end{matrix} & & \text{O} \\
& & \begin{matrix} 1&0&0&1&1&0&0&1 \\ 0&1&1&0&0&1&1&0 \\ 1&0&0&-&1&0&0&- \\ 0&1&-&0&0&1&-&0 \\ 1&0&0&1&-&0&0&- \\ 0&1&1&0&0&-&-&0 \\ 1&0&0&-&-&0&0&1 \\ 0&1&-&0&0&-&1&0 \end{matrix} & \\
\text{O} & & & \begin{matrix} 1&1&0&0&0&0&1&1 \\ 0&0&1&-&1&-&0&0 \\ 1&0&-&0&0&-&0&- \\ 0&1&0&-&-&0&-&0 \\ 1&0&1&0&0&1&0&- \\ 0&1&0&1&1&0&-&0 \\ 1&-&0&0&0&0&-&1 \\ 0&0&1&1&-&-&0&0 \end{matrix}
\end{vmatrix} \tag{21}$$

$$= \begin{vmatrix} S1 & & & \text{O} \\ & S2 & & \\ & & S3 & \\ \text{O} & & & S4 \end{vmatrix}$$

$$[R] = \begin{matrix}
\begin{vmatrix}
10000000 & 00000000 & 00000000 & 00000000 \\
00010000 & 00000000 & 00000000 & 00000000 \\
00000000 & 10000000 & 00000000 & 00000000 \\
00000000 & 00001000 & 00000000 & 00000000 \\
00000000 & 00000000 & 10000000 & 00000000 \\
00000000 & 00000000 & 00001000 & 00000000 \\
00000000 & 00000000 & 00000000 & 10000000 \\
00000000 & 00000000 & 00000000 & 00001000
\end{vmatrix} \\
\begin{vmatrix}
00000000 & 00000000 & 00100000 & 00000000 \\
00000000 & 00000000 & 00000010 & 00000000 \\
00000000 & 00000000 & 00000000 & 00100000 \\
00000000 & 00000000 & 00000000 & 00000010 \\
00100000 & 00000000 & 00000000 & 00000000 \\
00000010 & 00000000 & 00000000 & 00000000 \\
00000000 & 00100000 & 00000000 & 00000000 \\
00000000 & 00000010 & 00000000 & 00000000
\end{vmatrix} \\
\begin{vmatrix}
00000000 & 00000100 & 00000000 & 00000000 \\
00000000 & 01000000 & 00000000 & 00000000 \\
00000100 & 00000000 & 00000000 & 00000000 \\
01000000 & 00000000 & 00000000 & 00000000 \\
00000000 & 00000000 & 00000000 & 00000100 \\
00000000 & 00000000 & 00000000 & 01000000 \\
00000000 & 00000000 & 00000100 & 00000000 \\
00000000 & 00000000 & 01000000 & 00000000
\end{vmatrix} \\
\begin{vmatrix}
00000000 & 00000000 & 00000000 & 00000001 \\
00000000 & 00000000 & 00000000 & 00010000 \\
00000000 & 00000000 & 00000001 & 00000000 \\
00000000 & 00000000 & 00010000 & 00000000 \\
00000000 & 00000001 & 00000000 & 00000000 \\
00000000 & 00010000 & 00000000 & 00000000 \\
00000001 & 00000000 & 00000000 & 00000000 \\
00010000 & 00000000 & 00000000 & 00000000
\end{vmatrix}
\end{matrix} \tag{22}$$

-continued $$
[L] = \left|\begin{array}{cccccccc}
\begin{smallmatrix}+&+&+&+\\+&-&+&-\\+&+&-&-\\+&-&-&+\end{smallmatrix} & & & & & & & \\
& \begin{smallmatrix}+&+&+&+\\+&-&+&-\\+&+&-&-\\+&-&-&+\end{smallmatrix} & & & & & O & \\
& & \begin{smallmatrix}+&+&+&+\\+&-&+&-\\+&+&-&-\\+&-&-&+\end{smallmatrix} & & & & & \\
& & & \begin{smallmatrix}+&+&+&+\\+&-&+&-\\+&+&-&-\\+&-&-&+\end{smallmatrix} & & & & \\
& & & & \begin{smallmatrix}+&+&+&+\\+&-&+&-\\+&+&-&-\\+&-&-&+\end{smallmatrix} & & & \\
& & & & & \begin{smallmatrix}+&+&+&+\\+&-&+&-\\+&+&-&-\\+&-&-&+\end{smallmatrix} & & \\
& O & & & & & \begin{smallmatrix}+&+&+&+\\+&-&+&-\\+&+&-&-\\+&-&-&+\end{smallmatrix} & \\
& & & & & & & \begin{smallmatrix}+&+&+&+\\+&-&+&-\\+&+&-&-\\+&-&-&+\end{smallmatrix}
\end{array}\right| \tag{23}
$$

$$
[Q] = \left|\begin{array}{cccc}
10000000 & 00000000 & 00000000 & 00000000 \\
00000001 & 00000000 & 00000000 & 00000000 \\
00000000 & 00000000 & 00000000 & 10000000 \\
00000000 & 00000000 & 00000000 & 00000001 \\
01000000 & 00000000 & 00000000 & 00000000 \\
00000010 & 00000000 & 00000000 & 00000000 \\
00000000 & 00000000 & 00000000 & 01000000 \\
00000000 & 00000000 & 00000000 & 00000010 \\
00100000 & 00000000 & 00000000 & 00000000 \\
00000100 & 00000000 & 00000000 & 00000000 \\
00000000 & 00000000 & 00000000 & 00100000 \\
00000000 & 00000000 & 00000000 & 00000100 \\
00010000 & 00000000 & 00000000 & 00000000 \\
00001000 & 00000000 & 00000000 & 00000000 \\
00000000 & 00000000 & 00000000 & 00010000 \\
00000000 & 00000000 & 00000000 & 00001000 \\
00000000 & 10000000 & 00000000 & 00000000 \\
00000000 & 00000001 & 00000000 & 00000000 \\
00000000 & 00000000 & 10000000 & 00000000 \\
00000000 & 00000000 & 00000001 & 00000000 \\
00000000 & 01000000 & 00000000 & 00000000 \\
00000000 & 00000010 & 00000000 & 00000000 \\
00000000 & 00000000 & 01000000 & 00000000 \\
00000000 & 00000000 & 00000010 & 00000000 \\
00000000 & 00100000 & 00000000 & 00000000 \\
00000000 & 00000100 & 00000000 & 00000000 \\
00000000 & 00000000 & 00100000 & 00000000 \\
00000000 & 00000000 & 00000100 & 00000000 \\
00000000 & 00010000 & 00000000 & 00000000 \\
00000000 & 00001000 & 00000000 & 00000000 \\
00000000 & 00000000 & 00010000 & 00000000 \\
00000000 & 00000000 & 00001000 & 00000000
\end{array}\right| \tag{24}
$$

The transposition matrices ${}^t[U']$, ${}^t[T']$, ${}^t[S']$, ${}^t[R]$ and ${}^t[Q]$ are also defined in the following equations 19a to 23a, respectively.

(19a)

$$
{}^t[U] = \left|\begin{array}{cccc}
10000000 & 00000000 & 00000000 & 00000000 \\
00000000 & 00000000 & 10000000 & 00000000 \\
00001000 & 00000000 & 00000000 & 00000000 \\
00000000 & 00000000 & 00001000 & 00000000 \\
00100000 & 00000000 & 00000000 & 00000000 \\
00000000 & 00000000 & 00100000 & 00000000 \\
00000010 & 00000000 & 00000000 & 00000000 \\
00000000 & 00000000 & 00000010 & 00000000 \\
\\
00000000 & 10000000 & 00000000 & 00000000 \\
00000000 & 00000000 & 00000000 & 10000000 \\
00000000 & 00001000 & 00000000 & 00000000 \\
00000000 & 00000000 & 00000000 & 00001000 \\
00000000 & 00100000 & 00000000 & 00000000 \\
00000000 & 00000000 & 00000000 & 00100000 \\
00000000 & 00000010 & 00000000 & 00000000 \\
00000000 & 00000000 & 00000000 & 00000010 \\
\\
01000000 & 00000000 & 00000000 & 00000000 \\
00010000 & 00000000 & 00000000 & 00000000 \\
00000100 & 00000000 & 00000000 & 00000000 \\
00000001 & 00000000 & 00000000 & 00000000 \\
00000000 & 00000000 & 01000000 & 00000000 \\
00000000 & 00000000 & 00010000 & 00000000 \\
00000000 & 00000000 & 00000100 & 00000000 \\
00000000 & 00000000 & 00000001 & 00000000 \\
\\
00000000 & 01000000 & 00000000 & 00000000 \\
00000000 & 00000000 & 00000000 & 00010000 \\
00000000 & 00000001 & 00000000 & 00000000 \\
00000000 & 00000000 & 00000000 & 00000100 \\
00000000 & 00010000 & 00000000 & 00000000 \\
00000000 & 00000000 & 00000000 & 01000000 \\
00000000 & 00000100 & 00000000 & 00000000 \\
00000000 & 00000000 & 00000000 & 00000001
\end{array}\right|
$$

(20a)

$$
{}^t[T] = \left|\begin{array}{cccccccc}
\begin{array}{cccc} + & + & 0 & 0 \\ + & - & 0 & 0 \\ 0 & 0 & + & + \\ 0 & 0 & + & - \end{array} & & & & & & & \\
& \begin{array}{cccc} k & k & n & n \\ k & m & n & l \\ l & l & k & k \\ l & n & k & m \end{array} & & & & & O & \\
& & \begin{array}{cccc} k & n & n & n \\ k & n & l & k \\ n & m & k & n \\ n & m & m & l \end{array} & & & & & \\
& & & \begin{array}{cccc} i & j & j & j \\ j & j & j & i \\ 0 & - & + & 0 \\ + & 0 & 0 & + \end{array} & & & & \\
& & & & \begin{array}{cccc} b & d & a & g \\ a & f & g & d \\ g & e & d & f \\ h & g & b & a \end{array} & & & \\
& & & & & \begin{array}{cccc} b & d & a & g \\ a & f & g & d \\ g & e & d & f \\ h & g & b & a \end{array} & & \\
& & O & & & & \begin{array}{cccc} a & b & h & g \\ h & c & e & b \\ f & d & g & e \\ g & a & b & d \end{array} & \\
& & & & & & & \begin{array}{cccc} e & g & h & b \\ h & f & a & g \\ c & d & b & a \\ b & e & g & d \end{array}
\end{array}\right|
$$

$$
= \left|\begin{array}{cccc}
{}^tT1 & & O & \\
& {}^tT2 & & \\
& & {}^tT3 & \\
O & & & {}^tT4
\end{array}\right|
$$

-continued $$
{}^t[S] = \left|\begin{array}{cccc}
\begin{matrix}\text{1 0 1 0 1 0 1 0}\\ \text{1 0 −0 1 0 −0}\\ \text{1 0 −0 −0 1 0}\\ \text{1 0 1 0 −0 −0}\\ \text{0 1 0 1 0 1 0 1}\\ \text{0 1 0 −0 1 0 −}\\ \text{0 1 0 −0 −0 1}\\ \text{0 1 0 1 0 −0 −}\end{matrix} & & & \\
 & \begin{matrix}\text{1 0 1 0 1 0 1 0}\\ \text{0 1 0 1 0 1 0 1}\\ \text{0 1 0 1 0 −0 −}\\ \text{1 0 1 0 −0 −0}\\ \text{0 1 0 −0 −0 1}\\ \text{1 0 −0 1 0 −0}\\ \text{1 0 −0 −0 1 0}\\ \text{0 1 0 −0 1 0 −}\end{matrix} & & O \\
 & & \begin{matrix}\text{1 0 1 0 1 0 1 0}\\ \text{0 1 0 1 0 1 0 1}\\ \text{0 1 0 −0 1 0 −}\\ \text{1 0 −0 1 0 −0}\\ \text{1 0 1 0 −0 −0}\\ \text{0 1 0 1 0 −0 −}\\ \text{0 1 0 −0 −0 1}\\ \text{1 0 −0 −0 1 0}\end{matrix} & \\
 & O & & \begin{matrix}\text{1 0 1 0 1 0 1 0}\\ \text{1 0 0 1 0 1 −0}\\ \text{0 1 −0 1 0 0 1}\\ \text{0 −0 −0 1 0 1}\\ \text{0 1 0 −0 1 0 −}\\ \text{0 −−0 1 0 0 −}\\ \text{1 0 0 −0 −−0}\\ \text{1 0 −0 −0 1 0}\end{matrix}
\end{array}\right| \tag{21a}
$$

$$
= \left|\begin{array}{cccc}
{}^tS\,1 & & & \\
 & {}^tS\,2 & & O \\
 & & {}^tS\,3 & \\
O & & & {}^tS\,4
\end{array}\right|
$$

$$
{}^t[R] = \left|\begin{array}{cccc}
10000000 & 00000000 & 00000000 & 00000000\\
00000000 & 00000000 & 00010000 & 00000000\\
00000000 & 00001000 & 00000000 & 00000000\\
00000000 & 00000000 & 00000000 & 00000001\\
01000000 & 00000000 & 00000000 & 00000000\\
00000000 & 00000000 & 00100000 & 00000000\\
00000000 & 00000100 & 00000000 & 00000000\\
00000000 & 00000000 & 00000000 & 00000010\\
\\
00100000 & 00000000 & 00000000 & 00000000\\
00000000 & 00000000 & 01000000 & 00000000\\
00000000 & 00000010 & 00000000 & 00000000\\
00000000 & 00000000 & 00000000 & 00000100\\
00010000 & 00000000 & 00000000 & 00000000\\
00000000 & 00000000 & 10000000 & 00000000\\
00000000 & 00000001 & 00000000 & 00000000\\
00000000 & 00000000 & 00000000 & 00001000\\
\\
00001000 & 00000000 & 00000000 & 00000000\\
00000000 & 00000000 & 00000001 & 00000000\\
00000000 & 10000000 & 00000000 & 00000000\\
00000000 & 00000000 & 00000000 & 00010000\\
00000100 & 00000000 & 00000000 & 00000000\\
00000000 & 00000000 & 00000010 & 00000000\\
00000000 & 01000000 & 00000000 & 00000000\\
00000000 & 00000000 & 00000000 & 00100000\\
\\
00000010 & 00000000 & 00000000 & 00000000\\
00000000 & 00000000 & 00000100 & 00000000\\
00000000 & 00100000 & 00000000 & 00000000\\
00000000 & 00000000 & 00000000 & 01000000\\
00000001 & 00000000 & 00000000 & 00000000\\
00000000 & 00000000 & 00001000 & 00000000\\
00000000 & 00000000 & 00000000 & 00000000\\
00000000 & 00000000 & 00000000 & 10000000
\end{array}\right| \tag{22a}
$$

-continued $$
{}^t[Q] = \begin{vmatrix}
10000000 & 00000000 & 00000000 & 00000000 \\
00001000 & 00000000 & 00000000 & 00000000 \\
00000000 & 10000000 & 00000000 & 00000000 \\
00000000 & 00001000 & 00000000 & 00000000 \\
00000000 & 00000100 & 00000000 & 00000000 \\
00000000 & 01000000 & 00000000 & 00000000 \\
00000100 & 00000000 & 00000000 & 00000000 \\
01000000 & 00000000 & 00000000 & 00000000 \\
00000000 & 00000000 & 10000000 & 00000000 \\
00000000 & 00000000 & 00001000 & 00000000 \\
00000000 & 00000000 & 00000000 & 10000000 \\
00000000 & 00000000 & 00000000 & 00001000 \\
00000000 & 00000000 & 00000000 & 00000100 \\
00000000 & 00000000 & 00000000 & 01000000 \\
00000000 & 00000000 & 00000100 & 00000000 \\
00000000 & 00000000 & 01000000 & 00000000 \\
00000000 & 00000000 & 00100000 & 00000000 \\
00000000 & 00000000 & 00000010 & 00000000 \\
00000000 & 00000000 & 00000000 & 00100000 \\
00000000 & 00000000 & 00000000 & 00000010 \\
00000000 & 00000000 & 00000000 & 00000001 \\
00000000 & 00000000 & 00000000 & 00010000 \\
00000000 & 00000000 & 00000001 & 00000000 \\
00000000 & 00000000 & 00010000 & 00000000 \\
00100000 & 00000000 & 00000000 & 00000000 \\
00000010 & 00000000 & 00000000 & 00000000 \\
00000000 & 00100000 & 00000000 & 00000000 \\
00000000 & 00000010 & 00000000 & 00000000 \\
00000000 & 00000001 & 00000000 & 00000000 \\
00000000 & 00010000 & 00000000 & 00000000 \\
00000001 & 00000000 & 00000000 & 00000000 \\
00010000 & 00000000 & 00000000 & 00000000
\end{vmatrix} \qquad (23a)
$$

Similar to the above-mentioned first embodiment, when considering the above-described matrices, the characteristics described below are seen.

(1) The other matrices except the matrix [T] including the irrational numbers and the transposition matrix ${}^t$[T] thereof are all matrices comprising "0", "+1", and "−1" as the elements.

(2) In the matrix [U] and the transposition matrix ${}^t$[U] thereof, the matrix [R] and the transposition matrix ${}^t$[R] thereof, and the matrix [Q] and the transposition matrix ${}^t$[Q] thereof, only one portion is "1" in each row and each column, and the others are all "0".

(3) Elements other than eight 4×4 sub-matrices, four 8×8 sub-matrices, four 8×8 sub-matrices, eight 4×4 sub-matrices, and eight 8×8 sub-matrices on the respective diagonal lines of the matrix [L], the matrix [S] and the transposition matrix ${}^t$[S] thereof, and the matrix [T] and the transposition matrix ${}^t$[T] thereof are all "0".

(4) The matrix [S] can be constituted by the eighth order inner product computation circuit with coefficients comprising only "0", "+1", and "−1", but as will be self-evident when looking at the contents of the matrix [S] indicated in equation 21, each column in each 8×8 sub-matrix, one of the even number row: 2k-th row and the odd number row (2k+1)-th row (note, k=0, 1, 2, . . . , 3) which are adjacent is "0", and therefore it can be realized by substantially the fourth order inner product computation circuit. Similarly, also the transposition matrix ${}^t$[S] can be constituted by the fourth order inner product computation circuit.

Figure 17:
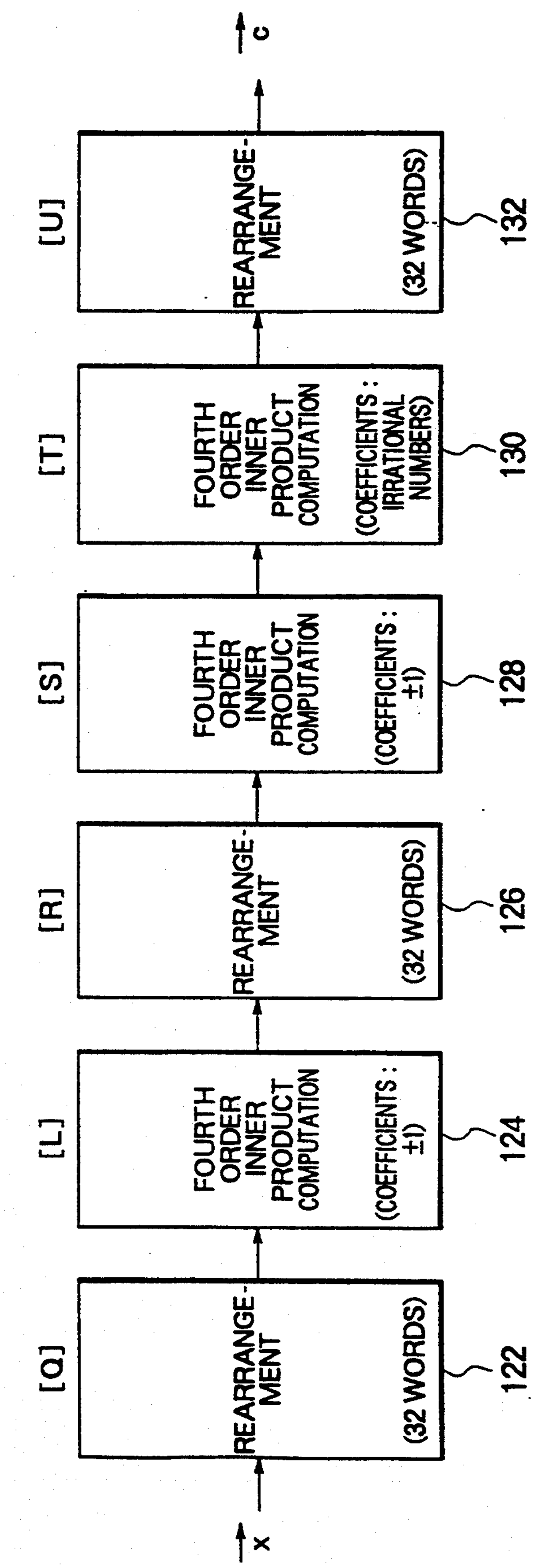
FIG. 17 is a structural view of the two-dimensional 4 row×8 column discrete cosine transformation system as a second embodiment of the discrete cosine transformation system of the present invention.

FIG. 17 shows the structure of the two-dimensional 4×8 DCT system constituted based on the above-mentioned consideration.

This two-dimensional 4×8 DCT system is resembled to the structure of the two-dimensional 4×8 DCT system shown in FIG. 5 and has a first rearrangement circuit 122 of 32 words, which rearranges the input matrix [X] in accordance with the position of "1" existing in each row and each column in the matrix [Q]; a first fourth-order inner product computation circuit 124 multiplying the matrix [L] having the coefficient of "+1" or "−1" with the output of this first rearrangement circuit 122; a second rearrangement circuit 126 which performs the rearrangement for the result of this operation in accordance with the position at which "1" exists in the matrix [R]; a second fourth-order inner product computation circuit 128 multiplying the output of the second rearrangement circuit 126 by the matrix [S] with the coefficient of "+1" or "−1"; and further a third fourth-order inner product computation circuit 130 multiplying the matrix [T] having the coefficients of irrational numbers; and a third rearrangement circuit 132 of 32 words, which rearranges the result of this computation in accordance with the position at which the "1" exists in the matrix [U].

In place of the multiplication by ⅛ indicated in equation 17, the output of the third rearrangement circuit 132 is shifted by 3 bits.

The first fourth-order inner product computation circuit 124 comes to have the same structure as the circuit structure shown in FIG. 7 or FIG. 8. Namely, FIG. 7 and FIG. 8 show circuits for performing the calculation of the second order inner product computation, where there are provided two sets of circuits in parallel (circuits 42 and 43 in FIG. 7, circuits 51 and 53 and circuits 52 and 54 in FIG. 8), but 124 shown in FIG.

17 is for the fourth order inner product and can perform the calculation by providing four sets of circuits in parallel.

The second fourth-order inner product computation circuit 128 comes to have the same structure as the circuit structure shown in FIG. 9 or FIG. 10. FIG. 9 and FIG. 10 show circuits for performing substantially the calculation of the eighth order inner product computation, in which 16 sets (circuits 81 and 84 in FIG. 9, circuits 82, 83 to circuit 85, 86 in FIG. 9) or eight sets (circuits 91 to 92 in FIG. 10) of circuits are provided in parallel, but the circuit 128 shown in FIG. 17 is for substantially the fourth order inner product computation and can perform the calculation by providing 8 sets or 4 sets of circuits in parallel.

The third fourth-order inner product computation circuit 130 has the circuit structure shown in FIG. 11 and FIG. 12. The first rearrangement circuit 122, the second rearrangement circuit 126, and the third rearrangement circuit 132 can be constituted by one or a plurality of RAM's.

The first fourth-order inner product computation circuit 124 and the second fourth-order inner product computation circuit 128 are circuits not including a multiplier circuit. The third fourth-order inner product computation circuit 130 multiplying the matrix [T] including as elements the irrational numbers includes four multiplier circuits.

Figure 18:
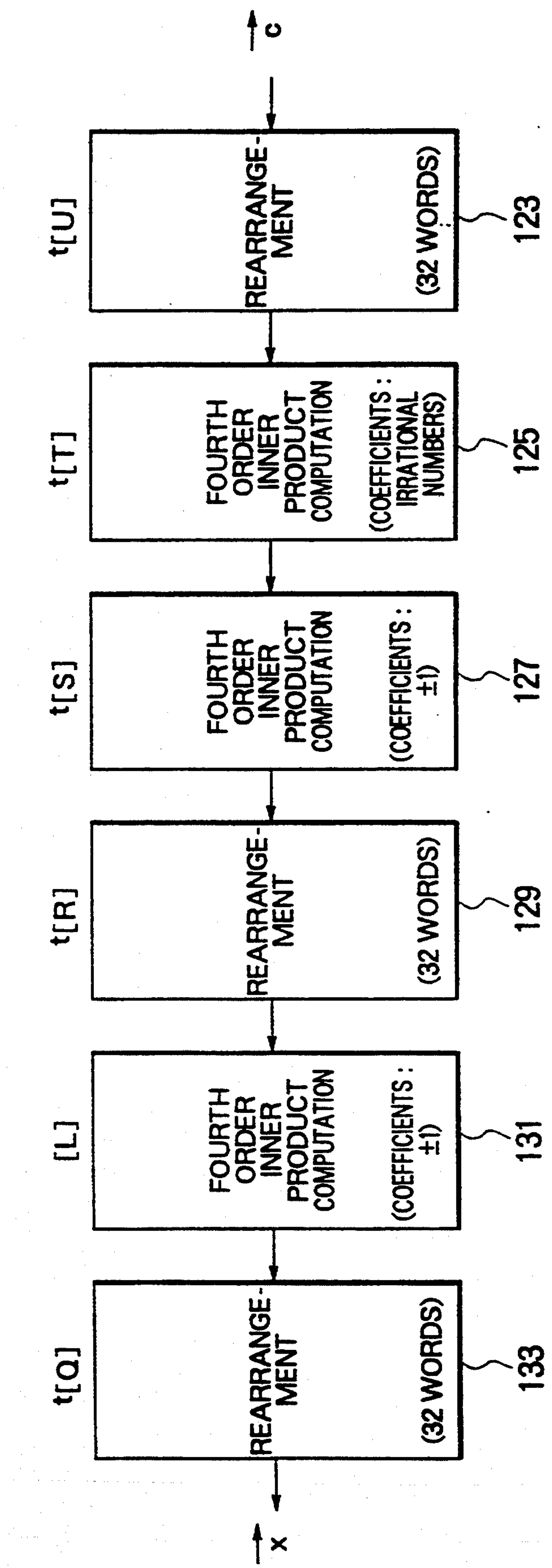
FIG. 18 is a structural view of the two-dimensional 4 row×8 column discrete cosine inverse transformation system as a second embodiment of the discrete cosine inverse transformation system of the present invention.

FIG. 18 shows the circuit structure of a two-dimensional 4×8 IDCT system constituted based on the above-mentioned consideration.

This two-dimensional 4×8 IDCT system is the inverse operation system to the two-dimensional 4×8 DCT system shown in FIG. 17 and basically resembles the structure of the two-dimensional 4×8 IDCT system shown in FIG. 6.

This two-dimensional 4×8 IDCT system has a first rearrangement circuit 123 of 32 words which rearranges the input matrix [C] in accordance with the position of "1" existing in each row and each column in the transposition matrix ${}^t[U]$; a first fourth-order inner product computation circuit 125 which multiplies the output of this first rearrangement circuit 123 by the transposition matrix ${}^t[T]$ comprising as the elements irrational numbers; further a second inner product computation circuit 127 multiplying the transposition matrix ${}^t[S]$; a second rearrangement circuit 129 of 32 words which rearranges the result of this operation in accordance with the transposition matrix ${}^t[R]$; a third fourth-order inner product computation circuit 131 further multiplying the matrix [L]; and a third rearrangement circuit 133 which rearranges the result of computation of the third fourth-order inner product computation circuit 131 according to the transposition matrix ${}^t[Q]$.

In place of the multiplication by $\frac{1}{4}$ indicated in equation 18, a 2-bit shift is carried out.

The first fourth-order inner product computation circuit 125 multiplying the transposition matrix ${}^t[T]$ including irrational numbers as elements has the structure shown in FIG. 11 or FIG. 12 and includes four multiplier circuits.

The second fourth-order inner product computation circuit 127 has a similar structure to the circuit structure shown in FIG. 13 or FIG. 14. Namely, FIG. 13 and FIG. 14 include a circuit for performing substantially the calculation of the eighth order inner product computation, in which are provided 16 sets (72, 73 to 74 in FIG. 13) or 8 sets (circuits 72*a* and 72*b* and circuits 73*a*, 73*b* to circuits 74*a*, 74*b* in FIG. 14) of circuits in parallel, but the circuit 127 shown in FIG. 18 is for substantially the fourth order inner product computation and can perform the calculation by providing 8 sets or 4 sets of circuits in parallel.

The third fourth-order inner product computation circuit 131 has the same structure as that of the circuit 124 of FIG. 17. Neither of the second inner product computation circuit 127 and the third fourth-order inner product computation circuit 131 includes a multiplier circuit.

The first rearrangement circuit 123, the second rearrangement circuit 129 and the third rearrangement circuit 133 can be constituted by for example one or a plurality of RAM's.

Accordingly, according to the present invention, there is provided a two-dimensional 4×8 discrete cosine transformation system, which two-dimensional 4×8 discrete cosine transformation system is characterized in that:

(1) provision is made of a first fourth-order inner product computation circuit having coefficients comprising "+1" and "1", (2) a second fourth-order inner product computation circuit having coefficients comprising "+1" and "−1", and (3) a third fourth-order inner product computation circuit including a memory in which the data components of the constant matrices are stored;

(4) the 4 row×8 column input data is fed via the first rearrangement circuit to the above-described first inner product computation circuit;

(5) the output of the related first inner product computation circuit is fed via the second rearrangement circuit to the above-described second inner product computation circuit; and (6) the output of the related second inner product computation circuit is fed directly to the above-described third inner product computation circuit and, at the same time, (7) the output of the related third inner product computation circuit is guided out via the third rearrangement circuit.

Also, according to the present invention, there is provided a two-dimensional 4×8 discrete cosine inverse transformation system, which two-dimensional 4×8 inverse discrete cosine transformation system is characterized in that:

(1) provision is made of a first fourth-order inner product computation circuit including a memory in which the data components of the constant matrices are stored, (2) a second fourth-order inner product computation circuit having coefficients comprising "+1" and "−1", and (3) a third fourth-order inner product computation circuit having coefficients comprising "+1" and "−1";

(4) the 4 row×8 column input data is fed via the first rearrangement circuit to the above-described first inner product computation circuit;

(5) the output of the related first inner product computation circuit is fed directly to the above-described second inner product computation circuit and, at the same time, (6) the output of the related second inner product computation circuit is fed via the second rearrangement circuit to the above-described third inner product computation circuit; and (7) the output of the related third inner product computation circuit is guided out via the third rearrangement circuit.

A description will be made of the circuit structure achieving an improvement of speed in the two-dimensional 4 row×8 column discrete cosine transformation system of the present invention shown in FIG. 17 referring to FIG. 19, and a circuit structure achieving an improvement of speed in the two-dimensional 4 row×8 column discrete cosine inverse transformation system shown in FIG. 18 referring to FIG. 20.

The two-dimensional 4×8 DCT of the second embodiment of the present invention was defined in equation 17.

As indicated in equation 20, the matrix [T] comprises four sub-matrices [T1], [T2], [T3], and [T4]. The elements other than these sub-matrices are all "0".

Also, as indicated in equation 21, the matrix [S] comprises four sub-matrices [S1], [S2], [S3], and [S4], and the elements other than these sub-matrices are all "0".

Accordingly, the computations of the second fourth-order inner product computation circuit 128 and the third fourth-order inner product computation circuit 130 can be independently carried out in parallel between four sub-matrices [S1], [S2], [S3], and [S4] and four sub-matrices [T1], [T2], [T3], and [T4].

Also, the computation of the matrix [R] in the second rearrangement circuit 126 shown in FIG. 17 is a rearrangement such that:

(1) a 0-th order, fourth order, eighth order, . . . , 28-th order are output in the first 8 cycles (unit times);

(2) a second order, sixth order, 10-th order, . . . , 30-th order are output in the next 8 cycles;

(3) a first order, fifth order, ninth order, . . . , 29-th order are output in the further next 8 cycles; and (4) a third order, seventh order, 11-th order, . . . , 31-th order are output in the final 8 cycles.

Accordingly, (a) the 4i (i=0, 1, . . . , 7)-th order output among the outputs of the matrix [L] is directly applied to the fourth order inner product computation circuit computing the sub-matrix [S1];

(b) the (4i +1)-th order output among the outputs of the matrix [L] is directly applied to the fourth order inner product computation circuit computing the sub-matrix [S3];

(c) the (4i+2)-th order output among the outputs of the matrix [L] is directly applied to the fourth order inner product computation circuit computing the sub-matrix [S2]; and (d) the (4i+3)-th order output among the outputs of the matrix [L] is directly applied to the fourth order inner product computation circuit computing the sub-matrix [S4], whereby the second rearrangement circuit 126 shown in FIG. 17 can be deleted.

Also, in the matrix [L], as indicated in equation 24, elements of the eight 4×4 sub-matrices on the diagonal line are the same. That is, the first row is (+1, +1, +1, +1);
the second row is (+1, −1, +1, −1);
the third row is ( +1, +1, −1, −1); and
the fourth row is (+1, −1, −1, +1);

Accordingly, the fourth order inner product computation circuit performing these computation can be constituted as a four-input adder circuit performing the addition in a case of merely "+1" described above while performing the subtraction in a case of "−1".

Figure 19:
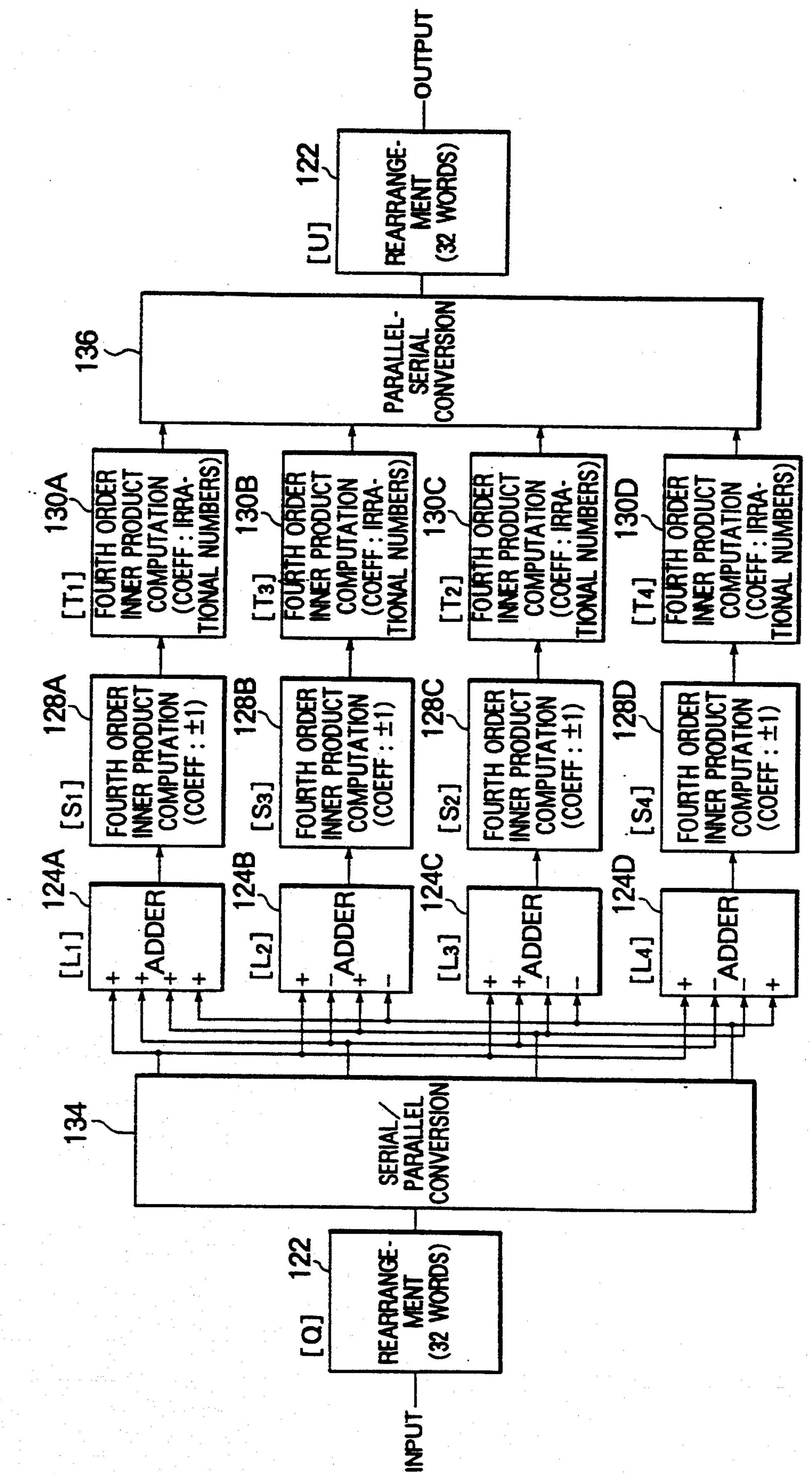
FIG. 19 is a structural view of the circuit achieving an increase of speed of the two-dimensional 4 row×8 column discrete cosine transformation system shown in FIG. 17.

The structure of the system improving the speed of operation in the two-dimensional 4×8 DCT system shown in FIG. 13 based on the above-mentioned consideration will be shown in FIG. 19.

The two-dimensional 4×8 DCT system shown in FIG. 19 has a first rearrangement circuit 122; a serial to parallel converter 134 for producing the parallel data for performing the following parallel operations; four 4-input adder circuits 124A, 124B, 124C, and 124D performing the computations of the 4i-th row, (4i+1)-th row, (4i+2)-th row and (4i+3)-th row of the matrix [L]; four second fourth-order inner product computation circuits 128A, 128B, 128C and 128D performing the computation of four sub-matrices [S1], [S3], [S2], and [S4]; four third fourth order inner product computation circuit circuits 130A, 130B, 130C, and 130D performing the computation of four sub-matrices [T1], [T3], [T2], and [T4]; a parallel to serial converter 136 returning the results of these computations to the serial data; and a third rearrangement circuit 132 performing the computation of the matrix [U].

The second fourth-order inner product computation circuits 128A to 128D have circuit structures similar to that of the circuit 128 of FIG. 17.

The third fourth-order inner product computation circuit circuits 130A to 130D have circuit structures similar to that of the circuit 130 of FIG. 17.

The first rearrangement circuit 122 and the third rearrangement circuit 132 are constituted by a RAM.

This two-dimensional 4×8 DCT system performs the computations of four systems in parallel, and therefore the speed becomes almost four times higher compared with the operation speed of the two-dimensional 4×8 DCT system shown in FIG. 17.

Figure 20:
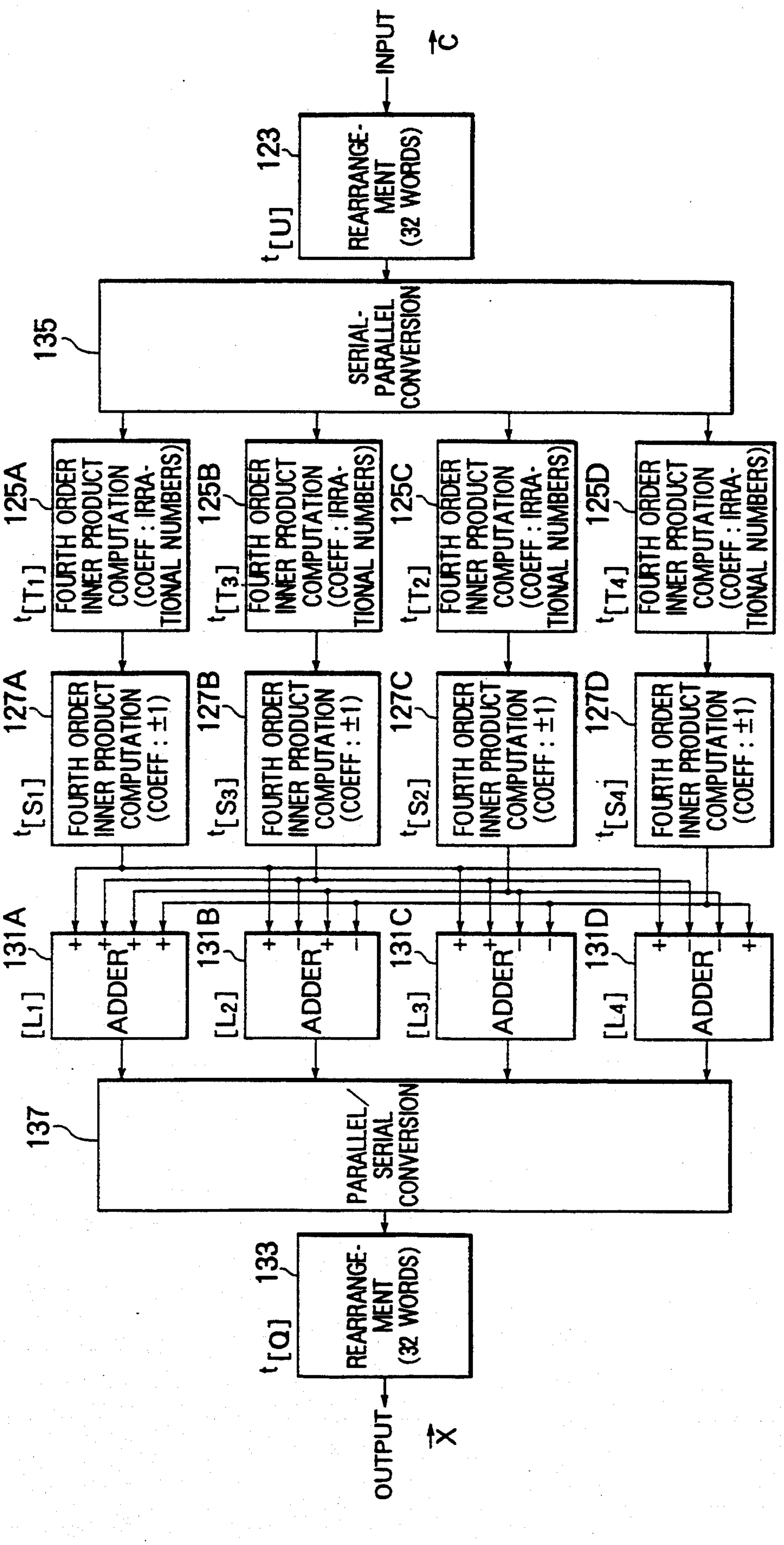
FIG. 20 is a structural view of the circuit achieving an increase of speed of the two-dimensional 4 row×8 column discrete cosine inverse transformation system shown in FIG. 18.

FIG. 20 shows a high speed processing type two-dimensional 4×8 IDCT system performing an inverse operation to that of the two-dimensional 4×8 DCT system shown in FIG. 19. Also this two-dimensional 4×8 IDCT system is an system with an operating speed which is raised almost four times higher than the operating speed of the two-dimensional 4×8 IDCT system shown in FIG. 18 based on the similar consideration to that for the two-dimensional 4×8 DCT system shown in FIG. 19.

This two-dimensional 4×8 IDCT system has a first rearrangement circuit 123 of 32 words; a serial to parallel conversion circuit 136; four first fourth-order inner product computation circuits 125A to 125D; four second inner product computation circuits 127A to 127D; four third fourth-order inner product computation circuits 131A to 131D; a parallel to serial converter 138; and a third rearrangement circuit 133 of 32 words.

Figure 21:
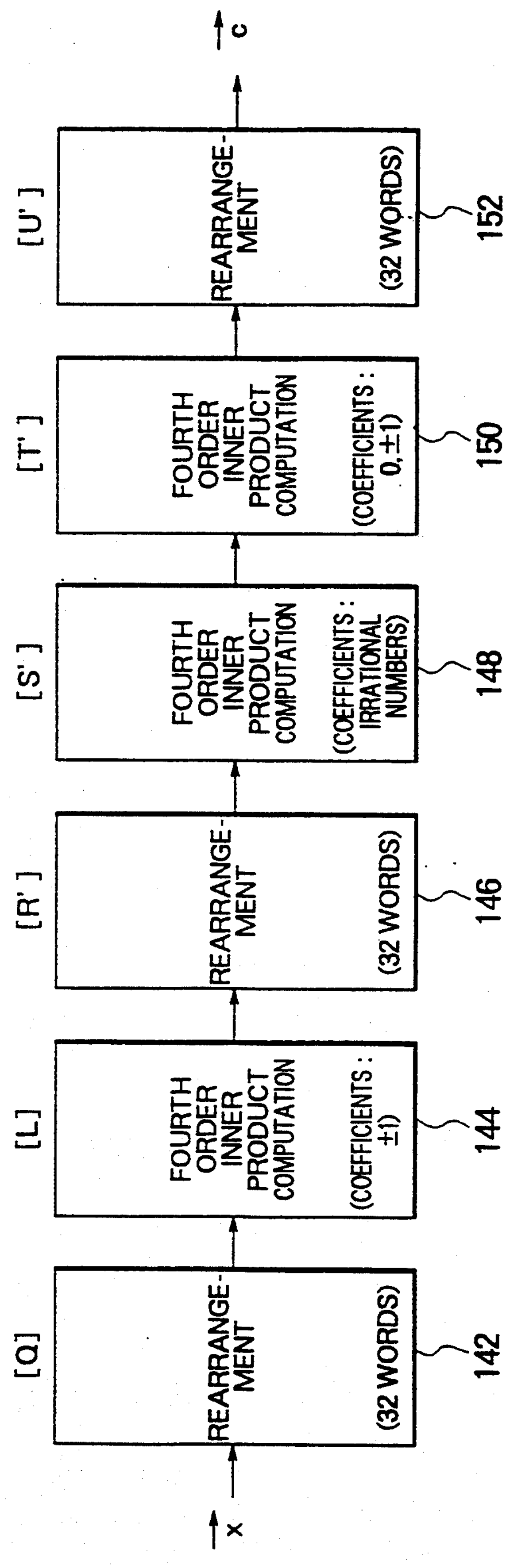
FIG. 21 is a structural view of the two-dimensional 4 row×8 column discrete cosine transformation system as a third embodiment of the discrete cosine transformation system of the present invention.
Figure 22:
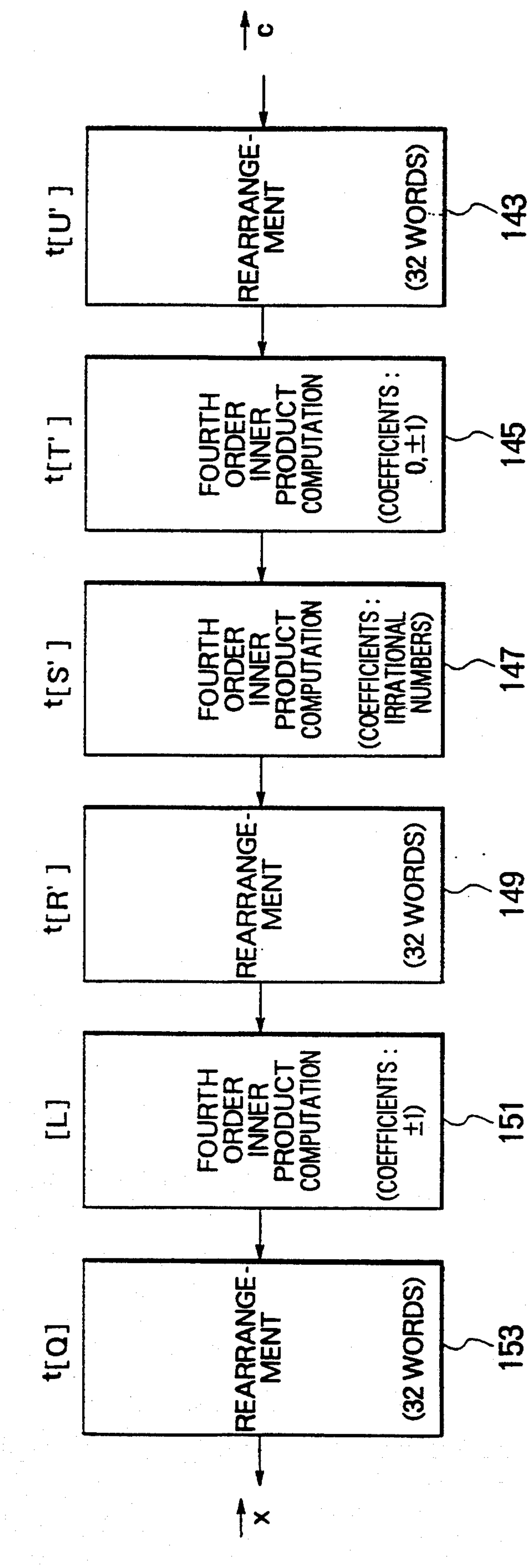
FIG. 22 is a structural view of the two-dimensional 4 row×8 column discrete cosine inverse transformation system as a third embodiment of the discrete cosine inverse transformation system of the present invention.

A third embodiment of the two-dimensional 4 row×8 column discrete cosine transformation system of the present invention and a third embodiment of the two-dimensional 4 row×8 column discrete cosine inverse transformation system of the present invention will be mentioned referring to FIG. 21 and FIG. 22.

The two-dimensional 4 row×8 column discrete cosine transformation can be defined by equation 9, but may be defined also by equation 25 by performing the decomposition of the matrix.

$$\mathrm{DCT};\vec{C}=(\tfrac{1}{4})\,[U'][T'][S'][R'][L][Q]\vec{X} \tag{25}$$

Similarly, the two-dimensional 4 row×8 column discrete cosine inverse transformation can be defined by equation 10, but may be defined also by equation 26 by performing the decomposition of the matrix.

$$\mathrm{IDCT}=\vec{X}=(\tfrac{1}{4})^{t}[Q]^{t}[L]^{t}[R']^{t}[S']^{t}[T']^{t}[U']\vec{C} \tag{26}$$

The matrices [Q], [L], [R'], [S'], [T'], and [U'] in equation 25 and equation 26 are defined in the following equation 27 to equation 32, respectively.

$$[Q]=\begin{vmatrix}
10000000 & 00000000 & 00000000 & 00000000\\
00000001 & 00000000 & 00000000 & 00000000\\
00000000 & 00000000 & 00000000 & 10000000\\
00000000 & 00000000 & 00000000 & 00000001\\
01000000 & 00000000 & 00000000 & 00000000\\
00000010 & 00000000 & 00000000 & 00000000\\
00000000 & 00000000 & 00000000 & 01000000\\
00000000 & 00000000 & 00000000 & 00000010\\
00100000 & 00000000 & 00000000 & 00000000\\
00000100 & 00000000 & 00000000 & 00000000\\
00000000 & 00000000 & 00000000 & 00100000\\
00000000 & 00000000 & 00000000 & 00000100\\
00010000 & 00000000 & 00000000 & 00000000\\
00001000 & 00000000 & 00000000 & 00000000\\
00000000 & 00000000 & 00000000 & 00010000\\
00000000 & 00000000 & 00000000 & 00001000\\
00000000 & 10000000 & 00000000 & 00000000\\
00000000 & 00000001 & 00000000 & 00000000\\
00000000 & 00000000 & 10000000 & 00000000\\
00000000 & 00000000 & 00000001 & 00000000\\
00000000 & 01000000 & 00000000 & 00000000\\
00000000 & 00000010 & 00000000 & 00000000\\
00000000 & 00000000 & 01000000 & 00000000\\
00000000 & 00000000 & 00000010 & 00000000\\
00000000 & 00100000 & 00000000 & 00000000\\
00000000 & 00000100 & 00000000 & 00000000\\
00000000 & 00000000 & 00100000 & 00000000\\
00000000 & 00000000 & 00000100 & 00000000\\
00000000 & 00010000 & 00000000 & 00000000\\
00000000 & 00001000 & 00000000 & 00000000\\
00000000 & 00000000 & 00010000 & 00000000\\
00000000 & 00000000 & 00001000 & 00000000
\end{vmatrix} \tag{27}$$

$$[L]=\begin{vmatrix}
++++ & & & & \\
+-+- & & & & \\
++-- & & & & \\
+--+ & & & & \\
 & ++++ & & & \\
 & +-+- & & & \\
 & ++-- & & & \\
 & +--+ & & & \\
 & & ++++ & & O\\
 & & +-+- & & \\
 & & ++-- & & \\
 & & +--+ & & \\
 & & & ++++ & \\
 & & & +-+- & \\
 & & & ++-- & \\
 & & & +--+ &
\end{vmatrix} \tag{28}$$

-continued $$
\begin{vmatrix}
 & +\,+\,+\,+ & & & \\
 & +\,-\,+\,- & & & \\
 & +\,+\,-\,- & & & \\
 & +\,-\,-\,+ & & & \\
 & & +\,+\,+\,+ & & \\
 & & +\,-\,+\,- & & \\
 & & +\,+\,-\,- & & \\
 & & +\,-\,-\,+ & & \\
O & & & +\,+\,+\,+ & \\
 & & & +\,-\,+\,- & \\
 & & & +\,+\,-\,- & \\
 & & & +\,-\,-\,+ & \\
 & & & & +\,+\,+\,+ \\
 & & & & +\,-\,+\,- \\
 & & & & +\,+\,-\,- \\
 & & & & +\,-\,-\,+
\end{vmatrix}
$$

$$
[R'] =
\begin{array}{c}
\begin{vmatrix}
10000000 & 00000000 & 00000000 & 00000000 \\
00001000 & 00000000 & 00000000 & 00000000 \\
00000000 & 10000000 & 00000000 & 00000000 \\
00000000 & 00001000 & 00000000 & 00000000 \\
00000000 & 00000000 & 10000000 & 00000000 \\
00000000 & 00000000 & 00001000 & 00000000 \\
00000000 & 00000000 & 00000000 & 10000000 \\
00000000 & 00000000 & 00000000 & 00001000
\end{vmatrix} \\
\begin{vmatrix}
00000000 & 00000000 & 00100000 & 00000000 \\
00000000 & 00000000 & 00000000 & 00000010 \\
00100000 & 00000000 & 00000000 & 00000000 \\
00000000 & 00000010 & 00000000 & 00000000 \\
00000000 & 00000000 & 00000010 & 00000000 \\
00000000 & 00000000 & 00000000 & 00100000 \\
00000010 & 00000000 & 00000000 & 00000000 \\
00000000 & 00100000 & 00000000 & 00000000
\end{vmatrix} \\
\begin{vmatrix}
00000000 & 00000100 & 00000000 & 00000000 \\
00000000 & 01000000 & 00000000 & 00000000 \\
00000100 & 00000000 & 00000000 & 00000000 \\
01000000 & 00000000 & 00000000 & 00000000 \\
00000000 & 00000000 & 00000000 & 00000100 \\
00000000 & 00000000 & 00000000 & 01000000 \\
00000000 & 00000000 & 00000100 & 00000000 \\
00000000 & 00000000 & 01000000 & 00000000
\end{vmatrix} \\
\begin{vmatrix}
00000000 & 00000000 & 00000000 & 00000001 \\
00000000 & 00000000 & 00010000 & 00000000 \\
00000000 & 00010000 & 00000000 & 00000000 \\
00000001 & 00000000 & 00000000 & 00000000 \\
00000000 & 00000000 & 00000000 & 00010000 \\
00000000 & 00000000 & 00000001 & 00000000 \\
00000000 & 00000001 & 00000000 & 00000000 \\
00010000 & 00000000 & 00000000 & 00000000
\end{vmatrix}
\end{array}
\tag{29}
$$

$$
[S'] =
\begin{pmatrix}
+\ 0\ 0\ +\ 0\ 0\ 0\ 0 & & \\
0\ 0\ 0\ 0\ +\ 0\ 0\ + & & \\
0\ +\ +\ 0\ 0\ 0\ 0\ 0 & & \\
0\ 0\ 0\ 0\ 0\ +\ +\ 0 & & \\
k\ n\ l\ m\ 0\ 0\ 0\ 0 & & \\
0\ 0\ 0\ 0\ k\ n\ l\ m & & O \\
l\ k\ m\ n\ 0\ 0\ 0\ 0 & & \\
0\ 0\ 0\ 0\ l\ k\ m\ n & & \\
 & n\ n\ k\ k\ 0\ 0\ 0\ 0 & \\
 & 0\ 0\ 0\ 0\ n\ n\ k\ k & \\
 & k\ k\ l\ l\ 0\ 0\ 0\ 0 & \\
 & 0\ 0\ 0\ 0\ k\ k\ l\ l & \\
 & +\ -\ 0\ 0\ 0\ 0\ -\ + & \\
 & 0\ 0\ +\ -\ +\ -\ 0\ 0 & \\
 & j\ i\ 0\ 0\ 0\ 0\ j\ i & \\
 & 0\ 0\ i\ j\ j\ i\ 0\ 0 &
\end{pmatrix}
\tag{30}
$$

-continued $$
\left(\begin{array}{lll}
 & g\,a\,d\,b\,0\,0\,0\,0 & \\
 & 0\,0\,0\,0\,g\,a\,d\,b & \\
 & b\,h\,a\,c\,0\,0\,0\,0 & \\
 & 0\,0\,0\,0\,b\,h\,a\,c & \\
 & d\,g\,f\,a\,0\,0\,0\,0 & \\
 & 0\,0\,0\,0\,d\,g\,f\,a & \\
 & a\,b\,g\,h\,0\,0\,0\,0 & \\
 & 0\,0\,0\,0\,a\,b\,g\,h & \\
 & & a\,d\,b\,c\,0\,0\,0\,0 \\
O & & 0\,0\,0\,0\,a\,h\,c\,b \\
 & & f\,c\,d\,a\,0\,0\,0\,0 \\
 & & 0\,0\,0\,0\,g\,b\,h\,a \\
 & & g\,f\,a\,h\,0\,0\,0\,0 \\
 & & 0\,0\,0\,0\,d\,a\,b\,g \\
 & & h\,a\,c\,f\,0\,0\,0\,0 \\
 & & 0\,0\,0\,0\,f\,g\,a\,d
\end{array}\right)
$$

$$
= \begin{pmatrix} S1' & & & O \\ & S2' & & \\ & & S3' & \\ O & & & S4' \end{pmatrix}
$$

(31)

$$
[T] = \left(\begin{array}{llll}
+ + + + 0\,0\,0\,0 & & & \\
0\,0\,0\,0 + + + + & & & \\
+ - + - 0\,0\,0\,0 & & & \\
0\,0\,0\,0 + - + - & & & \\
+ + - - 0\,0\,0\,0 & & & \\
0\,0\,0\,0 + + - - & & & \\
- - - + 0\,0\,0\,0 & & & \\
0\,0\,0\,0 + - - + & & & \\
 & + + + + 0\,0\,0\,0 & & \\
 & 0\,0\,0\,0\,0 + - + & & \\
 & + - + - 0\,0\,0\,0 & & \\
 & 0\,0\,0\,0 - 0 + + & & \\
 & + + - - 0\,0\,0\,0 & & \\
 & 0\,0\,0\,0 + 0 + + & & \\
 & + - - + 0\,0\,0\,0 & & \\
 & 0\,0\,0\,0\,0 + + - & & \\
 & & + + + + 0\,0\,0\,0 & \\
 & & 0\,0\,0\,0 + + + + & \\
 & & + - + - 0\,0\,0\,0 & \\
 & & 0\,0\,0\,0 + - + - & \\
 & & + + - - 0\,0\,0\,0 & \\
 & & 0\,0\,0\,0 + + - - & \\
 & & + - - + 0\,0\,0\,0 & \\
 & & 0\,0\,0\,0 + - - + & \\
 & & & + + + + 0\,0\,0\,0 \\
 & & & 0\,0\,0\,0 + - + - \\
 & & & + - - + 0\,0\,0\,0 \\
 & & & 0\,0\,0\,0 + - - + \\
 & & & 0 + - 0\,0\,0 + + \\
 & & & - 0 + - - 0\,0\,0 \\
 & & & 0 + - 0\,0\,0 - - \\
 & & & - 0\,0 + + + 0\,0
\end{array}\right)
$$

$$
= \begin{pmatrix} T1' & & & O \\ & T2' & & \\ & & T3' & \\ O & & & T4' \end{pmatrix}
$$

(32)

$$
\left(\begin{array}{ll}
10000000 & 00000000 \\
00000000 & 10000000 \\
01000000 & 00000000 \\
00000000 & 00000100 \\
00001000 & 00000000 \\
00000000 & 01000000 \\
00000100 & 00000000 \\
00000000 & 00001000
\end{array}\right.
$$

-continued $$[U] = \begin{vmatrix} 10000000 & 00000000 \\ 00000000 & 10000000 \\ 01000000 & 00000000 \\ 00000000 & 00000100 \\ 00100000 & 00000000 \\ 00000000 & 00001000 \\ 00000100 & 00000000 \\ 00000000 & 01000000 \end{vmatrix}$$

$$\begin{vmatrix} 00100000 & 00000000 \\ 00000000 & 00100000 \\ 00010000 & 00000000 \\ 00000000 & 00000001 \\ 00000010 & 00000000 \\ 00000000 & 00010000 \\ 00000001 & 00000000 \\ 00000000 & 00000010 \end{vmatrix}$$

$$\begin{vmatrix} 00001000 & 00000000 \\ 00000000 & 00010000 \\ 00010000 & 00000000 \\ 00000000 & 00000010 \\ 00000010 & 00000000 \\ 00000000 & 00000001 \\ 00000001 & 00000000 \\ 00000000 & 00100000 \end{vmatrix}$$

Also, the transposition matrices $^t[Q]$, $^t[R']$, $^t[S']$, $^t[T']$, and $^t[U']$ are defined in the following equations 27a to 31a.

(27a)

$$^t[Q] = \begin{vmatrix} 10000000 & 00000000 & 00000000 & 00000000 \\ 00000000 & 00000000 & 00000000 & 00000000 \\ 00001000 & 10000000 & 00000000 & 00000000 \\ 00000000 & 00001000 & 00000000 & 00000000 \\ 00000000 & 00000100 & 00000000 & 00000000 \\ 00000000 & 01000000 & 00000000 & 00000000 \\ 00000100 & 00000000 & 00000000 & 00000000 \\ 01000000 & 00000000 & 00000000 & 00000000 \end{vmatrix}$$

$$\begin{vmatrix} 00000000 & 00000000 & 10000000 & 00000000 \\ 00000000 & 00000000 & 00001000 & 00000000 \\ 00000000 & 00000000 & 00000000 & 10000000 \\ 00000000 & 00000000 & 00000000 & 00001000 \\ 00000000 & 00000000 & 00000000 & 00000100 \\ 00000000 & 00000000 & 00000000 & 01000000 \\ 00000000 & 00000000 & 00000100 & 00000000 \\ 00000000 & 00000000 & 01000000 & 00000000 \end{vmatrix}$$

$$\begin{vmatrix} 00000000 & 00000000 & 00100000 & 00000000 \\ 00000000 & 00000000 & 00000010 & 00000000 \\ 00000000 & 00000000 & 00000000 & 00100000 \\ 00000000 & 00000000 & 00000000 & 00000010 \\ 00000000 & 00000000 & 00000000 & 00000001 \\ 00000000 & 00000000 & 00000000 & 00010000 \\ 00000000 & 00000000 & 00000001 & 00000000 \\ 00000000 & 00000000 & 00010000 & 00000000 \end{vmatrix}$$

$$\begin{vmatrix} 00100000 & 00000000 & 00000000 & 00000000 \\ 00000010 & 00000000 & 00000000 & 00000000 \\ 00000000 & 00100000 & 00000000 & 00000000 \\ 00000000 & 00000010 & 00000000 & 00000000 \\ 00000000 & 00000001 & 00000000 & 00000000 \\ 00000000 & 00010000 & 00000000 & 00000000 \\ 00000001 & 00000000 & 00000000 & 00000000 \\ 00010000 & 00000000 & 00000000 & 00000000 \end{vmatrix}$$

(28a)

$$\begin{vmatrix} 10000000 & 00000000 & 00000000 & 00000000 \\ 00000000 & 00000000 & 00010000 & 00000000 \\ 00000000 & 00100000 & 00000000 & 00000000 \\ 00000000 & 00000000 & 00000000 & 00000001 \\ 01000000 & 00000000 & 00000000 & 00000000 \\ 00000000 & 00000000 & 00100000 & 00000000 \\ 00000000 & 00000010 & 00000000 & 00000000 \\ 00000000 & 00000000 & 00000000 & 00010000 \end{vmatrix}$$

-continued $$
{}^t[R'] = \left|\begin{array}{cccc}
00100000 & 00000000 & 00000000 & 00000000 \\
00000000 & 00000000 & 01000000 & 00000000 \\
00000000 & 00000001 & 00000000 & 00000000 \\
00000000 & 00000000 & 00000000 & 00100000 \\
00010000 & 00000000 & 00000000 & 00000000 \\
00000000 & 00000000 & 10000000 & 00000000 \\
00000000 & 00010000 & 00000000 & 00000000 \\
00000000 & 00000000 & 00000000 & 00000010
\end{array}\right|
$$

$$
\left|\begin{array}{cccc}
00001000 & 00000000 & 00000000 & 00000000 \\
00000000 & 00000000 & 00000001 & 00000000 \\
00000000 & 10000000 & 00000000 & 00000000 \\
00000000 & 00000000 & 00000000 & 01000000 \\
00000100 & 00000000 & 00000000 & 00000000 \\
00000000 & 00000000 & 00000010 & 00000000 \\
00000000 & 00001000 & 00000000 & 00000000 \\
00000000 & 00000000 & 00000000 & 00000100
\end{array}\right|
$$

$$
\left|\begin{array}{cccc}
00000010 & 00000000 & 00000000 & 00000000 \\
00000000 & 00000000 & 00000100 & 00000000 \\
00000000 & 00000100 & 00000000 & 00000000 \\
00000000 & 00000000 & 00000000 & 00001000 \\
00000001 & 00000000 & 00000000 & 00000000 \\
00000000 & 00000000 & 00001000 & 00000000 \\
00000000 & 01000000 & 00000000 & 00000000 \\
00000000 & 00000000 & 00000000 & 10000000
\end{array}\right|
$$

(29a)

$$
{}^t[S'] = \left(\begin{array}{cccc}
\begin{array}{cccccccc}
+0 & 0 & 0 & k & 0 & l & 0 \\
0 & 0 & +0 & n & 0 & k & 0 \\
0 & 0 & +0 & l & 0 & m & 0 \\
+0 & 0 & 0 & m & 0 & n & 0 \\
0 & +0 & 0 & 0 & k & 0 & l \\
0 & 0 & 0 & +0 & n & 0 & k \\
0 & 0 & 0 & +0 & l & 0 & m \\
0 & +0 & 0 & 0 & m & 0 & n
\end{array} & & & O \\
& \begin{array}{ccccccc}
n & 0 & k & 0 & +0 & j & 0 \\
n & 0 & k & 0 & -0 & i & 0 \\
k & 0 & l & 0 & 0 & +0 & i \\
k & 0 & l & 0 & 0 & -0 & j \\
0 & n & 0 & k & 0 & +0 & j \\
0 & n & 0 & k & 0 & -0 & i \\
0 & k & 0 & l & -0 & j & 0 \\
0 & k & 0 & l & +0 & i & 0
\end{array} & & \\
& & \begin{array}{cccccccc}
g & 0 & b & 0 & d & 0 & a & 0 \\
a & 0 & h & 0 & g & 0 & b & 0 \\
d & 0 & a & 0 & f & 0 & g & 0 \\
b & 0 & c & 0 & a & 0 & h & 0 \\
0 & g & 0 & b & 0 & d & 0 & a \\
0 & a & 0 & h & 0 & g & 0 & b \\
0 & d & 0 & a & 0 & f & 0 & g \\
0 & b & 0 & c & 0 & a & 0 & h
\end{array} & \\
O & & & \begin{array}{cccccccc}
a & 0 & f & 0 & g & 0 & h & 0 \\
d & 0 & c & 0 & f & 0 & a & 0 \\
b & 0 & d & 0 & a & 0 & c & 0 \\
c & 0 & a & 0 & h & 0 & f & 0 \\
0 & a & 0 & g & 0 & d & 0 & f \\
0 & h & 0 & b & 0 & a & 0 & g \\
0 & c & 0 & h & 0 & b & 0 & a \\
0 & b & 0 & a & 0 & g & 0 & d
\end{array}
\end{array}\right)
$$

$$
= \begin{pmatrix}
{}^tS1' & & & O \\
& {}^tS2' & & \\
& & {}^tS3' & \\
O & & & {}^tS4'
\end{pmatrix}
$$

-continued (30a)

$$
{}^t[T] = \left(\begin{array}{llll}
+0\ +0\ +0\ +0 & & & \\
+0\ -0\ +0\ -0 & & & \\
+0\ +0\ -0\ -0 & & & \\
+0\ -0\ -0\ +0 & & & \\
0\ +0\ +0\ +0\ + & & & \\
0\ +0\ -0\ +0\ - & & & \\
0\ +0\ +0\ -0\ - & & & \\
0\ +0\ -0\ -0\ + & & & \\
 & +0\ +0\ +0\ +0 & & \\
 & +0\ -0\ +0\ -0 & & \\
 & +0\ +0\ -0\ -0 & & \\
 & +0\ -0\ -0\ +0 & & \\
 & 0\ 0\ 0\ -0\ +0\ 0 & & \\
 & 0\ +0\ 0\ 0\ 0\ 0\ + & & \\
 & 0\ -0\ +0\ +0\ + & & \\
 & 0\ +0\ +0\ +0\ - & & \\
 & & +0\ +0\ +0\ +0 & \\
 & & +0\ -0\ +0\ -0 & \\
 & & +0\ +0\ -0\ -0 & \\
 & & +0\ -0\ -0\ +0 & \\
 & & 0\ +0\ +0\ +0\ + & \\
 & & 0\ +0\ -0\ +0\ - & \\
 & & 0\ +0\ +0\ -0\ - & \\
 & & 0\ +0\ -0\ -0\ + & \\
 & & & +0\ +0\ 0\ -0\ - \\
 & & & +0\ -0\ +0\ +0 \\
 & & & +0\ -0\ -+-0 \\
 & & & +0\ +0\ 0\ -0\ + \\
 & & & 0\ +0\ +0\ -0\ + \\
 & & & 0\ -0\ -0\ 0\ 0\ + \\
 & & & 0\ +0\ -+0\ -0 \\
 & & & 0\ -0\ ++0\ -0
\end{array}\right)
$$

$$
= \begin{pmatrix} {}^tT1' & & & O \\ & {}^tT2' & & \\ & & {}^tT3' & \\ O & & & {}^tT4' \end{pmatrix}
$$

(31a)

$$
{}^t[U] = \left(\begin{array}{llll}
10000000 & & 00000000 & \\
00100000 & & 10000000 & \\
00000000 & & 10000000 & \\
00000000 & & 00100000 & \\
00001000 & & 00000000 & \\
00000010 & & 00000000 & \\
00000000 & & 00001000 & \\
00000000 & & 00000010 & \\
 & 10000000 & & 00000000 \\
 & 00100000 & & 00000000 \\
 & 00001000 & & 00000000 \\
 & 00000000 & & 00100000 \\
 & 00000000 & & 10000000 \\
 & 00000010 & & 00000000 \\
 & 00000000 & & 00001000 \\
 & 00000000 & & 00000010 \\
01000000 & & 00000000 & \\
00000100 & & 00000000 & \\
00000000 & & 01000000 & \\
00000000 & & 00000100 & \\
00000001 & & 00000000 & \\
00010000 & & 00000000 & \\
00000000 & & 00000001 & \\
00000000 & & 00010000 & \\
 & 01000000 & & 00000000 \\
 & 00000001 & & 00000000 \\
 & 00000000 & & 00000001 \\
 & 00000000 & & 01000000 \\
 & 00000100 & & 00000000 \\
 & 00010000 & & 00000000 \\
 & 00000000 & & 00010000 \\
 & 00000000 & & 00000100
\end{array}\right)
$$

Similar to the above-mentioned first to second embodiments, the characteristics of the above-described matrices will be mentioned in the following.

(1) The matrices other than the matrix [S'] and the transposition matrix ${}^t$[S'] thereof are all matrices comprising only "0" and "±1" as the elements.

(2) In each row and each column of the matrix [U'] and the transposition matrix ${}^t$[U'], the matrix [R'] and the transposition matrix ${}^t$[R'], and the matrix [Q'] and the transposition matrix ${}^t$[Q'], only one portion is "1" and the others are all "0".

(3) All elements other than eight 4×4 sub-matrices, four 8×8 sub-matrices, four 8×8 sub-matrices, four 8×8 sub-matrices, and four 8×8 sub-matrices on the respective diagonal lines of the matrix [L], the matrix [S'] and the transposition matrix ${}^t$[S'], and the matrix [T'] and the transposition matrix ${}^t$[T'] are "0".

(4) The matrix [S'] and the transposition matrix ${}^t$[S'] can be constituted by the eighth order inner product computation circuit, but as will be understood when looking at the elements of the matrix [S'], in each column of the 8×8 sub-matrices, at least one of the even number row or odd number row (2k-th row or (2k+1)-th row (k=0, 1, . . . , 3)) is "0", and therefore it is substantially equivalent to the inner product computation circuit of the fourth order at the highest.

Similarly, also in the transposition matrix ${}^t$[S'] (illustration is omitted), in each row of each 8×8 sub-matrix, at least one of the even number column or odd number column (2k-th column or (2K+1)-th column) is "0", and therefore it is substantially equivalent to the inner product computation circuit of the fourth order at the highest.

(5) Also, the matrix [T'] and the transposition matrix ${}^t$[T'] thereof can be constituted by the eighth order inner product computation circuit having the coefficients comprising "0" and "±1" but as will be understood when looking at the elements of the matrix [T'], in each column of each 8×8 sub-matrix, at least one of the even number row or odd number row (2k-th row or (2k+1)-th row) is "0", and therefore it is substantially equivalent to the inner product computation circuit of the fourth order at the highest.

Similarly, also in the transposition matrix ${}^t$[T'] (illustration is omitted), in each row of each 8×8 sub-matrix, at least one of the even number column or odd number column (2k-th column or (2k+1)-th column) is "0", and therefore it is substantially equivalent to the inner product computation circuit of the fourth order at the highest.

FIG. 21 shows the structure of the two-dimensional 4×8 DCT system realizing the two-dimensional 4×8 DCT indicated in equation 25 considering the above-mentioned characteristics.

This two-dimensional 4×8 DOT system has a first rearrangement circuit 142 of 32 words; a first fourth-order inner product computation circuit 144; a second rearrangement circuit 146 of 32 words; a second fourth-order inner product computation circuit 148; a third fourth-order inner product computation circuit 150; and a third rearrangement circuit 152 of 32 words.

The calculation of ⅛ indicated in equation 26, in place of the multiplication or division, shifts the binary data by 3 bits.

The first rearrangement circuit 142, the second rearrangement circuit 146, and the third rearrangement circuit 152 are constituted by for example one or a plurality of RAM's.

The first fourth-order inner product computation circuit 144 with the coefficient comprising "+1" or "−1" has a circuit structure of that of for example 124 of FIG. 17.

The calculation with the matrix [S'] can be performed by the eighth order inner product computation circuit since elements other than the four 8×8 sub-matrices on the diagonal line are "0" in the matrix [S']. Namely, the structure becomes the same as that of FIG. 12. FIG. 12 shows the circuit for performing the calculation of the fourth order inner product computation, in which four sets of circuits (circuits 102 and 111, circuits 103 and 112, circuits 104 and 113, and circuits 105 and 114 in FIG. 12) are provided, but the calculation with the matrix [S'] is the eighth order inner product computation, and the calculation can be carried out by providing eight sets of circuits in parallel. Further, in each column of each 8×8 sub-matrix, at least one of the even number row or odd number row is "0", and therefore it is also possible to calculate the same by substantially the fourth order inner product computation circuit. Namely, it was mentioned before that the circuit shown in FIG. 9 could be changed to the circuit shown in FIG. 10 which was the preferable circuit, and it is the same also for this. Note, FIG. 9 and FIG. 10 are views of circuits for performing the inner product computation in which the coefficients are only "0", "+1", and "−1". Multiplication with the "0", "+1", or "−1" has been carried out by the "2"-complementer and the three-position switch circuit, but at the present time, so as to perform multiplication with irrational numbers, a multiplier is necessary in place of the "2"-complementer and three-position switch circuit in FIG. 9 and FIG. 10.

The third fourth-order inner product computation circuit comes to have a similar circuit structure as that of the circuit 128 of FIG. 17.

The two-dimensional 4×8 IDCT system performing an inverse operation to that of the two-dimensional 4×8 DCT system can be constituted based on a similar concept as that for the two-dimensional 4×8 DCT system, and the circuit structure thereof will be shown in FIG. 22.

The two-dimensional 4×8 IDCT system shown in FIG. 22 has a first rearrangement circuit 143 of 32 bits; a first fourth-order inner product computation circuit 145; a second fourth-order inner product computation circuit 147, a second rearrangement circuit 149 of 32 words; a third fourth order inner product computation circuit 151; and a third rearrangement circuit 153 of 32 words.

In the computation of ¼ indicated in equation 27, the binary data is shifted by 2 bits, and no multiplication or division is carried out.

The first rearrangement circuit 143, the second rearrangement circuit 149, and the third rearrangement circuit 153 can be constituted by one or a plurality of RAM's.

The first inner product computation circuit 145 comes to have a similar circuit structure as that of the circuit 127 of FIG. 18.

The calculation with the transposition matrix $^t[S']$ can be carried out by the eighth order inner product computation circuit since the elements of the transposition matrix $^t[S']$ other than the four 8×8 sub-matrices on the diagonal line are "0". Namely, the structure becomes the same as that shown in FIG. 11. FIG. 11 shows the circuit for performing the calculation of the fourth order inner product computation, in which four sets of circuits (102, 103, 104, and 105 of FIG. 11) are provided in parallel, but the calculation with the transposition matrix $^t[S']$ is the eighth order inner product computation, and the calculation can be made by providing eight sets of circuits in parallel. Further, in each row of each 8×8 sub-matrix, at least one of the even number column or the odd number column is "0", and therefore the calculation can be carried out by substantially the fourth order inner product computation circuit. Namely, it was mentioned before that it was also possible to change the circuit of FIG. 13 to a preferable circuit in FIG. 14, and it is true also for this. Note, FIG. 13 and FIG. 14 are circuit views performing the inner product computation in which the coefficients are only "0", "+1", and "−1". Multiplication with the "0", "+1", or "−1" has been carried out by the "2"-complementer and the three-position switch circuit, but at the present time, so as to perform the multiplication with irrational numbers, a multiplier is necessary in place of the "2"-complementer and three-position switch circuit in FIG. 13 and FIG. 14.

The third fourth-order inner product computation circuit 151 comes to have the same circuit structure as that of for example the circuit 131 of FIG. 18.

Consequently, according to the present invention, there is provided a two-dimensional 4×8 discrete cosine transformation system, which performs a two-dimensional 4×8 discrete cosine transformation, is characterized in that:

(1) provision is made of a first fourth-order inner product computation circuit having coefficients comprising "+1" and "−1", (2) a second fourth-order inner product computation circuit including a memory in which the data components of the constant matrices are stored, and (3) a third fourth-order inner product computation circuit with coefficients comprising "0", "+1", and "−1";

(4) the 4 row×8 column of input data is fed via the first rearrangement circuit to the above-described first inner product computation circuit;

(5) the output data of the related first inner product computation circuit are fed via the second rearrangement circuit to the above-described second inner product computation circuit; and (6) the output data of the related second inner product computation circuit are fed directly to the above-described third inner product computation circuit and, at the same time, (7) the output data of the related third inner product computation circuit are guided out via the third rearrangement circuit.

Also, according to the present invention, there is provided a two-dimensional 4×8 inverse discrete cosine transformation system, which performs a two-dimensional 4×8 discrete cosine inverse transformation, is characterized in that:

(1) provision is made of a first fourth-order inner product computation circuit with coefficients comprising "0", "+1", and "−1", (2) a second fourth-order inner product computation circuit including a memory in which the data components of the constant matrices are stored, and (3) a third fourth-order inner product computation circuit having coefficients comprising "+1" and "−1";

(4) the 4 row×8 column of input data is fed via the first rearrangement circuit to the above-described first inner product computation circuit;

(5) the output data of the related first inner product computation circuit are fed directly to the above described second inner product computation circuit and, at the same time, (6) the output data of the related second inner product computation circuit are fed via the second rearrangement circuit to the above-described third inner product computation circuit; and (7) the output data of the related third inner product computation circuit are guided out via the third rearrangement circuit.

The circuit structure for enabling the high speed processing in the two-dimensional 4 row×8 column discrete cosine transformation system and the circuit structure enabling a high speed processing in the two-dimensional 4 row×8 column discrete cosine inverse transformation system of the third embodiment of the present invention will be described next.

The two-dimensional 4 row×8 column discrete cosine transformation is defined in equation 25. To achieve a higher speed operation of this processing, an element analysis of the matrix in equation 25 is carried out.

Also in this embodiment, similar to the case in the high speed processing in the above-mentioned first and second embodiments, attention should be paid to the following facts.

(1) The calculation for computation between the sub-matrix [S1'] among the matrices [S'] and the sub-matrix [T1'] among the matrices [T'] is made in one "fourth order inner product computation circuit" and one "fourth order inner product computation circuit having coefficients comprising only "0" and "±1", respectively;

(2) The calculation for computation between the sub-matrix [S2'] among the matrices [S'] and the sub-matrix [T2'] among the matrices [T'] is made in one "fourth order inner product computation circuit" and one "fourth order inner product computation circuit having coefficients comprising only "0" and "±1" respectively;

(3) The calculation for computation between the sub-matrix [S3'] among the matrices [S'] and the sub-matrix [T3'] among the matrices [T'] is made in one "fourth order inner product computation circuit" and one "fourth order inner product computation circuit having coefficients comprising only "0" and "±1", respectively; and (4) The calculation for computation between the sub-matrix [S4'] among the matrices [S'] and the sub-matrix [T4'] among the matrices [T'] is made in one "fourth order inner product computation circuit" and one "fourth order inner product computation circuit having coefficients comprising only "0" and "±1", respectively.

That is, the four sub-matrices [S1'], [S2'], [S3']. and [S4'] in the matrix [S'] and the four sub-matrices [T1'], [T2'], [T3'], and [T4'] in the matrix [T'] are computed in parallel by the fourth order inner product computation circuit, respectively, to improve the operation speed to $\frac{1}{4}$.

The rearrangement computation [R'] is a rearrangement wherein:

(a) a 0-th order, fourth order, eighth order, . . . , 28-th order are first output in the first 8 cycles;

(b) a second order, sixth order, 10-th order, . . . , 30-th order are output in the next 8 cycles;

(c) a first order, fifth order, ninth order, . . . , 29-th order are output in the further next 8 cycles; and (d) a third order, seventh order, 11-th order, . . . , 31-th order are output in the final 8 cycles, and accordingly, if (i) the 4i (i=0 to 7)-th order output among the outputs of the matrix [L] is directly fed to the fourth order inner product computation circuit for calculating the sub-matrix [S1'];

(ii) the (4i+1)-th order output among the outputs of the matrix [L] is directly fed to the fourth order inner product computation circuit for calculating the sub-matrix [S3'];

(iii) the (4i+2)-th order output among the outputs of the matrix [L] is directly fed to the fourth order inner product computation circuit for calculating the sub-matrix [S2']; and (iv) the (4i+3)-th order output among the outputs of the matrix [L] is directly fed to the fourth order inner product computation circuit for calculating the sub-matrix [S4'], the rearrangement circuit for the matrix [R'] becomes unnecessary, whereby the circuit structure can be simplified and, at the same time, the rearrangement time can be shortened.

Figure 23:
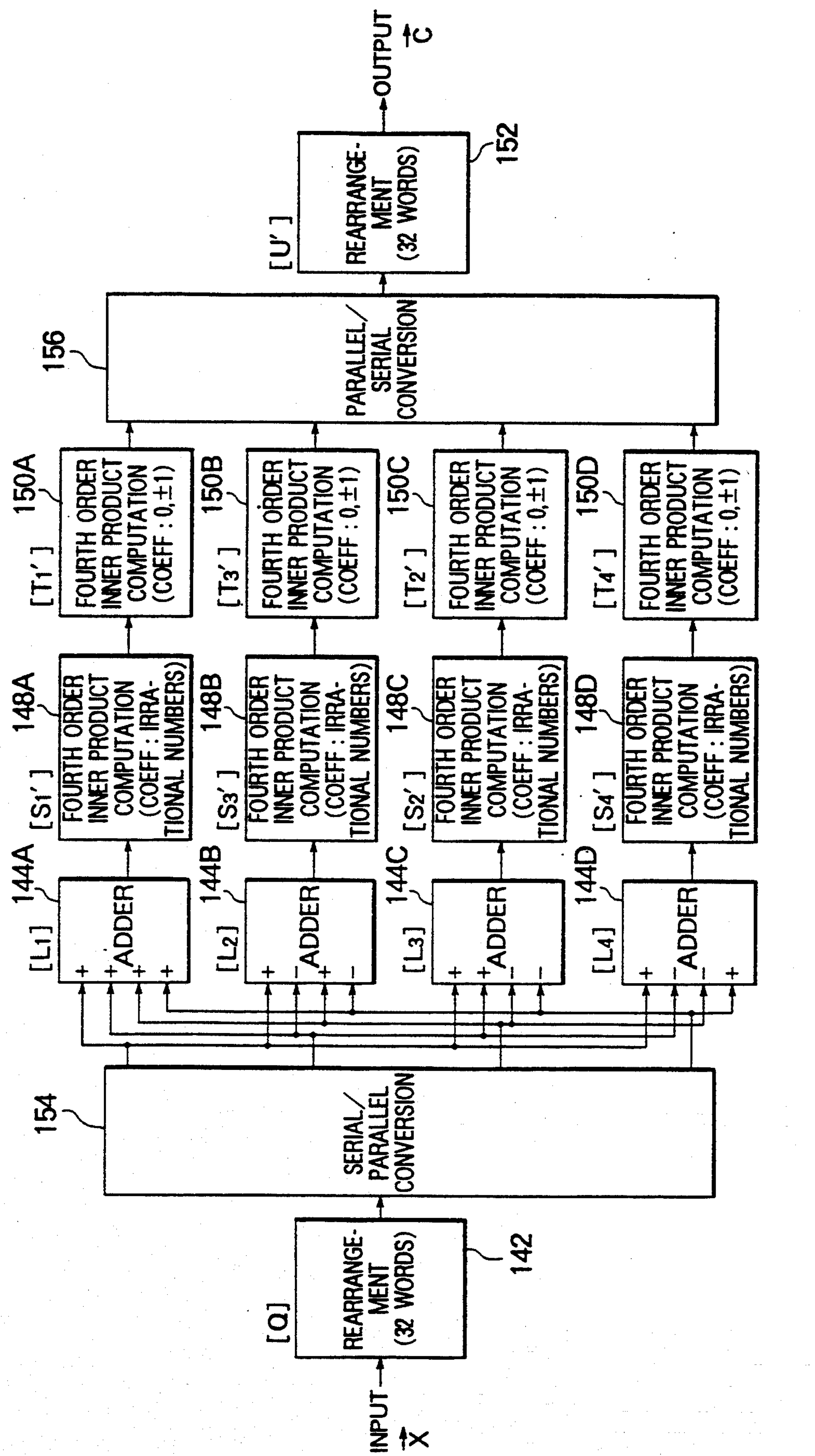
FIG. 23 is a structural view of the circuit achieving an increase of speed of the two-dimensional 4 row×8 column discrete cosine transformation system shown in FIG. 21.

FIG. 23 shows the circuit structure of the two-dimensional 4×8 DCT system based on the above-mentioned consideration.

This two-dimensional 4×8 DCT system has a first rearrangement circuit 142; a serial to parallel converter 154, four 4-input adder circuits 144A to 144D; four second fourth order inner product computation circuits 148A to 148D; four third fourth order inner product computation circuits 150A to 150D; a parallel to serial converter 156; and a third rearrangement circuit 152.

In this two-dimensional 4×8 DCT system, a higher speed processing almost four times higher compared with that in the two-dimensional 4×8 DCT system shown in FIG. 21 becomes possible. Note, four multiplier circuits are needed in each of the second fourth order inner product computation circuits 148A to 148D, and 16 in total multiplier circuits are necessary.

Figure 24:
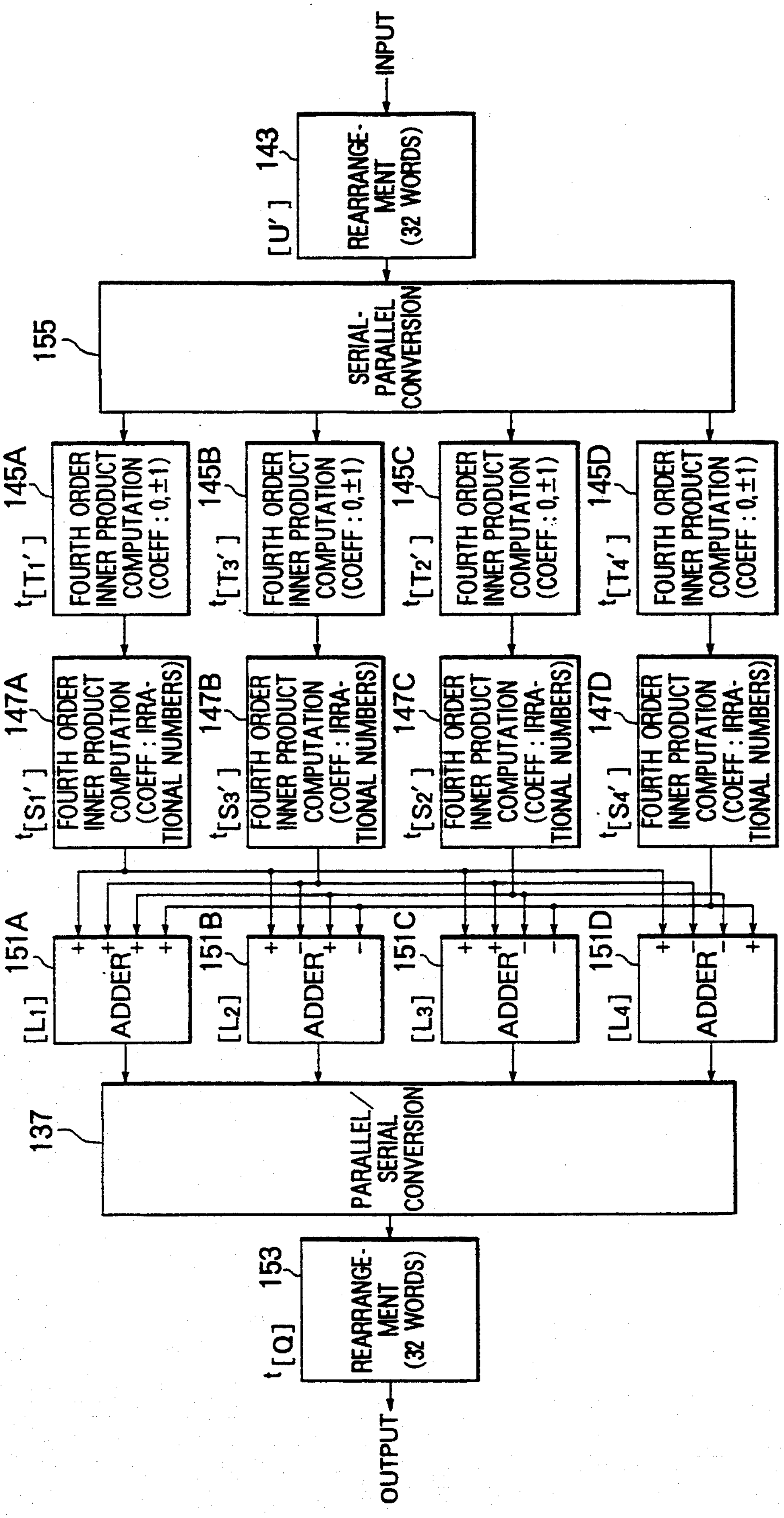
FIG. 24 is a structural view of the circuit achieving an increase of speed of the two-dimensional 4 row×8 column discrete cosine inverse transformation system shown in FIG. 22.

FIG. 24 shows the structure of a processing speed-increased two-dimensional 4×8 IDCT system as the inverse transformation system of the two-dimensional 4×8 DCT system shown in FIG. 23.

This two-dimensional 4×8 IDCT system has a first rearrangement circuit 143; a serial to parallel converter 155, four fourth order inner product computation circuits 145A to 145D; four second fourth order inner product computation circuits 147A to 147D; four 4-input adder circuits 151A to 151D; a parallel to serial converter 157; and a third rearrangement circuit 153.

Also in this two-dimensional 4×8 IDCT system, a higher speed processing almost four times higher compared with that in the two-dimensional 4×8 IDCT system shown in FIG. 22 becomes possible. Note, four multiplier circuits are needed in each of the second fourth order inner product computation circuits 147A to 147D, and 16 in total multiplier circuits are necessary.

As the fourth embodiment of the present invention, a description will be made of a two-dimensional 4 row×4 column discrete cosine transformation (two-dimensional 4×4 DCT) system and a two-dimensional 4 row×4 column discrete cosine inverse transformation (two-dimensional 4×4 IDCT) system performing the inverse transformation processing thereof.

The two-dimensional 4×4 DCT is defined in equation 33.

$$\text{DCT; } [C]=(\tfrac{1}{2})[P][X]^t[P] \quad (33)$$

Also, the two-dimensional 4×4 IDCT is defined in equation $$\text{IDCT: } [X]=(\tfrac{1}{2})^t[P][C][P] \quad (34)$$

The matrix [X] in equation 33 and equation 34 indicates the original data defined by a 4×4 matrix, and the matrix [C] is data defined by a 4×4 matrix in the frequency space.

Also, the matrix [P] in equation 33 and equation 34 is defined by the following equation.

$$[P] = \begin{bmatrix} i & i & i & i \\ k & l & n & m \\ i & j & j & i \\ l & m & k & n \end{bmatrix} \quad (35)$$

Also, the coefficients in equation 35 are defined in equation 36.

$$i=-j=\cos(2\pi/8)\ k=-m=\cos(\pi/8)\ l=-n=\cos(3\pi/8) \quad (36)$$

In the above-mentioned operation, similar to the case of performing the computation of the two-dimensional 4×8 DCT indicated in equation 1, when a hardware circuit computing equation 33 is constituted, the number of multiplier circuits for multiplying the irrational numbers is large, and therefore there are problems in that the circuit structure becomes complex and a long operation time is taken.

Figure 1:
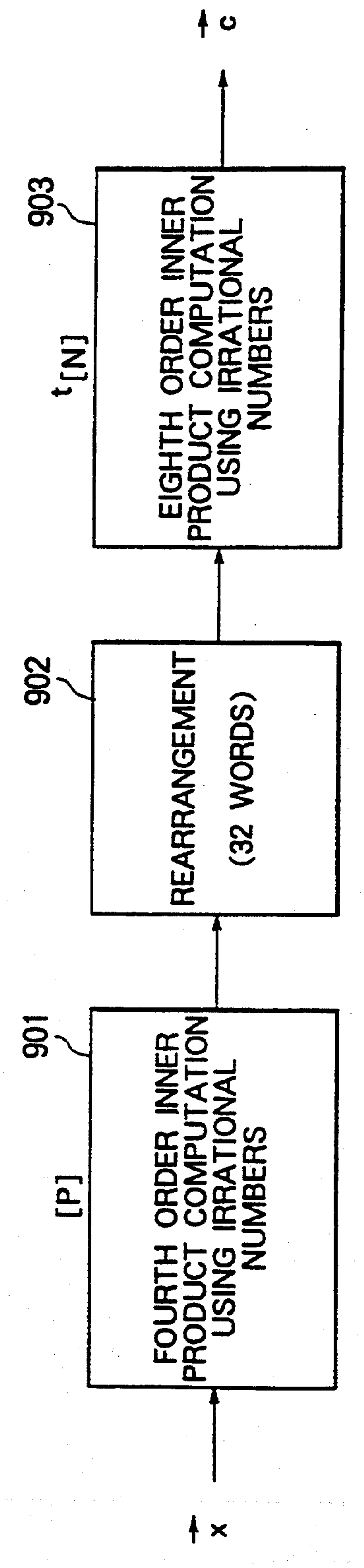
FIG. 1 is a structural view of a conventional two-dimensional 4 row×8 column discrete cosine transformation system.
Figure 2:
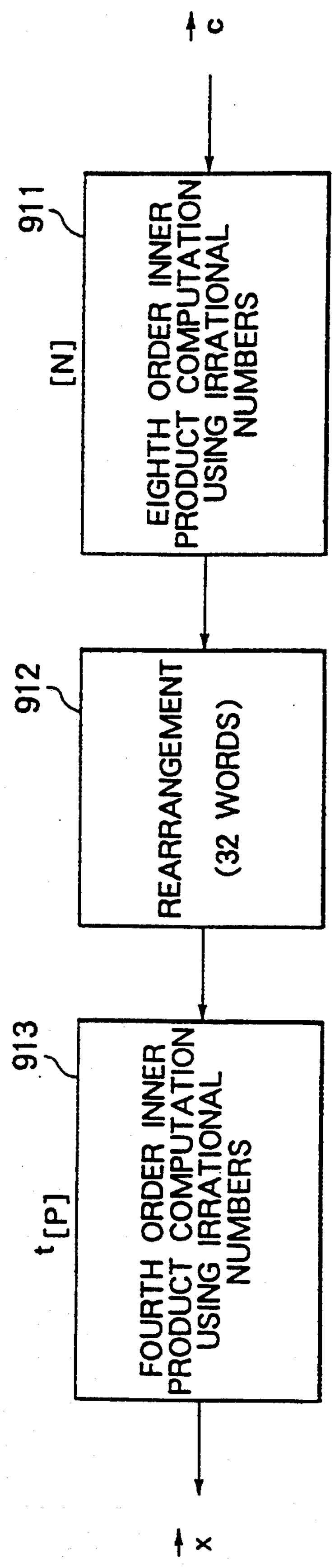
FIG. 2 is a structural view of a conventional two-dimensional 4 row×8 column discrete cosine inverse transformation system.
Figure 3:
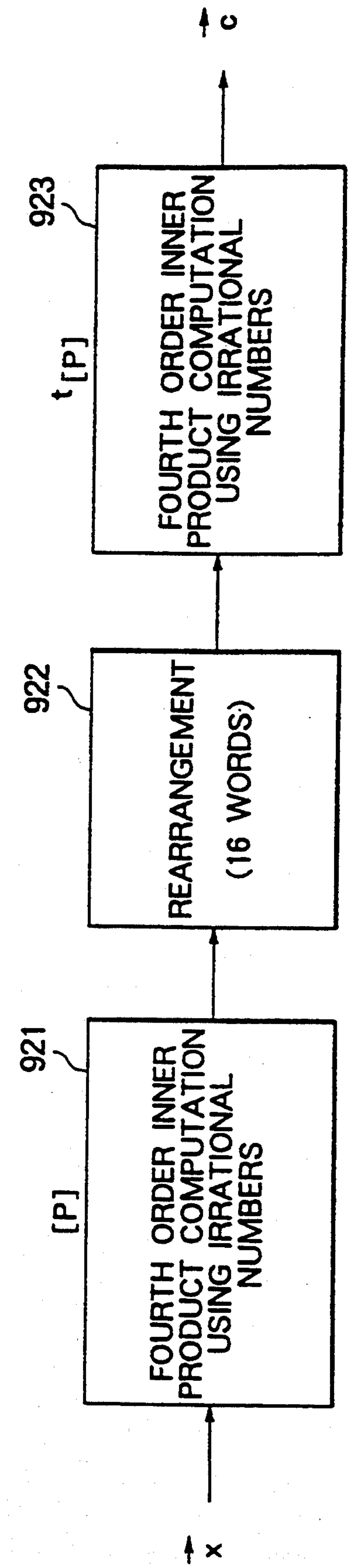
FIG. 3 is a structural view of a conventional two-dimensional 4 row×4 column discrete cosine transformation system.

FIG. 3 shows the structure of a conventional two-dimensional 4×4 DCT system. In this system, the computation of the input matrix [X] and matrix [P] is carried out by a first fourth-order inner product computation circuit 921 using four multipliers; the data rearrangement of 16 words is carried out in a rearrangement circuit 922; and the multiplication with the transposition matrix $^t$[p] is carried out in a second fourth-order inner product computation circuit 923 using four multipliers, and therefore eight multiplier circuits in total are needed.

Figure 4:
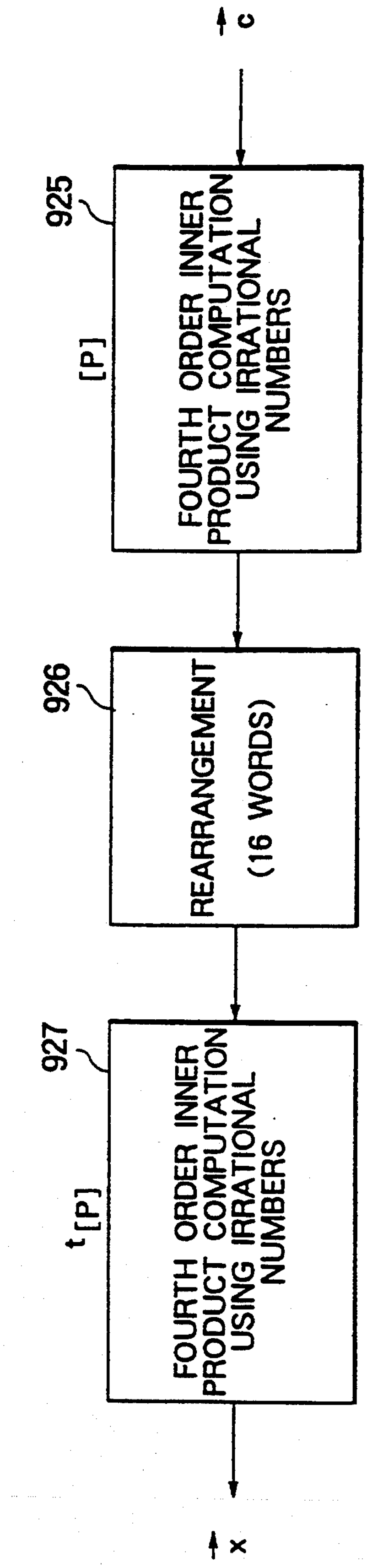
FIG. 4 is a structural view of a conventional two-dimensional 4 row×4 column discrete cosine inverse transformation system.

As shown in FIG. 4, also in the two-dimensional 4×4 IDCT system, similar to the two-dimensional 4×4 DCT system shown in FIG. 3, the computation of the input matrix [C] and matrix [P] is carried out by a first fourth order inner product computation circuit 925 using four multipliers; the rearrangement of 16 words is carried out in a rearrangement circuit 926; and multiplication with the transposition matrix $^t$[P] is carried out in a second fourth order inner product computation circuit 927 using four multipliers, and therefore eight multiplier circuits in total are still needed.

Therefore, as an embodiment of the present invention, similar to the above-mentioned two-dimensional 4×8 DCT and two-dimensional 4×8 IDCT, linear primary transformation is carried out (decomposition of matrix is carried out) to achieve simplification of the processing, and consequently achieve simplification of the structure of the system performing that processing.

It is learned that there is a relationship of linear primary transformation between the elements Cij (i=0, 1, 2, 3: j=0, 1, 2, 3) of the matrix [C] and the elements Xij (i=0, 1, 2, 3: j=0, 1, 2, 3) of the matrix [X].

$$\vec{C}=[16\times 16 \text{ constant matrix}]\vec{X} \quad (37)$$

$$\vec{X}=[16\times 16 \text{ constant matrix}]\vec{C} \quad (38)$$

$$\vec{C}=\begin{bmatrix} C00 \\ C01 \\ C02 \\ C03 \\ C10 \\ C11 \\ C12 \\ C13 \\ C20 \\ \cdot \\ \cdot \\ \cdot \\ C32 \\ C33 \end{bmatrix} \quad (39)$$

$$\vec{X}=\begin{bmatrix} X00 \\ X01 \\ X02 \\ X03 \\ X10 \\ X11 \\ X12 \\ X13 \\ X20 \\ \cdot \\ \cdot \\ \cdot \\ X32 \\ X33 \end{bmatrix} \quad (40)$$

The above-described [16×16 constant matrices] can be subjected to matrix decomposition. When matrix decomposition is carried out, the two-dimensional 4×4 DCT and two-dimensional 4×4 IDCT are expressed by equation 41 and equation 42, respectively.

$$\text{DCT}:\vec{C}=(\tfrac{1}{4})\,[U][T][S][R][L][Q]\vec{X} \quad (41)$$

$$\text{IDCT}:\vec{X}=(\tfrac{1}{4})\,{}^t[Q][L]{}^t[R]{}^t[S]{}^t[T]{}^t[U]\vec{C} \quad (42)$$

The matrices [U], [T], [S], [R], [L], and [Q] in equation 41 and equation 42 are 16×16 constant matrices, respectively. Also, the transposition matrices $^t$[Q], $^t$[R], $^t$[S], $^t$[T], and $^t$[U] are 16×16 constant matrices. The matrices [Q], [L], [R], [S], [T], and [U] are indicated in the following equations 43 to 48, respectively.

$$[Q]=\begin{pmatrix} 1000 & & 0000 \\ 0001 & & 0000 \\ 0000 & & 1000 \\ 0000 & & 0001 \\ 0100 & & 0000 \\ 0010 & & 0000 \\ 0000 & & 0100 \\ 0000 & & 0010 \end{pmatrix} \quad (43)$$

-continued $$
\begin{pmatrix}
1000 & 0000 \\
0001 & 0000 \\
0000 & 1000 \\
0000 & 0001 \\
0100 & 0000 \\
0010 & 0000 \\
0000 & 0100 \\
0000 & 0010
\end{pmatrix}
$$

$$
[L] = \begin{pmatrix}
++++ & & & \\
+-+- & & & \\
++-- & & & \\
+--+ & & & \\
 & ++++ & & \\
 & +-+- & & \\
 & ++-- & & \\
 & +--+ & & \\
 & & ++++ & \\
 & & +-+- & \\
 & & ++-- & \\
 & & +--+ & \\
 & & & ++++ \\
 & & & +-+- \\
 & & & ++-- \\
 & & & +--+
\end{pmatrix} \quad (44)
$$

$$
[R] = \begin{pmatrix}
1000 & 0000 & 0000 & 0000 \\
0000 & 1000 & 0000 & 0000 \\
0000 & 0000 & 1000 & 0000 \\
0000 & 0000 & 0000 & 1000 \\
0000 & 0100 & 0000 & 0000 \\
0000 & 0000 & 0000 & 0100 \\
0100 & 0000 & 0000 & 0000 \\
0000 & 0000 & 0100 & 0000 \\
0000 & 0000 & 0010 & 0000 \\
0000 & 0000 & 0000 & 0010 \\
0010 & 0000 & 0000 & 0000 \\
0000 & 0010 & 0000 & 0000 \\
0000 & 0000 & 0000 & 0001 \\
0000 & 0000 & 0001 & 0000 \\
0000 & 0001 & 0000 & 0000 \\
0001 & 0000 & 0000 & 0000
\end{pmatrix} \quad (45)
$$

$$
[S] = \begin{pmatrix}
+0\,+0 & & & \\
0\,+0\,+ & & & \\
+0\,-0 & & & \\
0\,+0\,- & & & \\
 & ++++ & & \\
 & ++-- & & \\
 & +-+- & & \\
 & +--+ & & \\
 & & ++++ & \\
 & & ++-- & \\
 & & +-+- & \\
 & & +--+ & \\
 & & & +0\,0\,+ \\
 & & & +--- \\
 & & & 0\,+-0 \\
 & & & +++-
\end{pmatrix} \quad (46)
$$

$$
= \begin{pmatrix}
S1 & & & O \\
 & S2 & & \\
 & & S3 & \\
O & & & S4
\end{pmatrix}
$$

-continued $$
[T] = \begin{pmatrix}
++ & & & & & & & \\
+- & & & & & & & \\
 & ++ & & & & & & \\
 & +- & & & & & & \\
 & & k\,n & & & & & \\
 & & n\,m & & & & & \\
 & & & k\,n & & & & \\
 & & & n\,m & & & & \\
 & & & & k\,n & & & \\
 & & & & n\,m & & & \\
 & & & & & k\,n & & \\
 & & & & & n\,m & & \\
 & & & & & & +j & \\
 & & & & & & +i & \\
 & & & & & & & +j \\
 & & & & & & & -j
\end{pmatrix} \quad (47)
$$

$$
= \begin{pmatrix}
T1 & & & O \\
 & T2 & & \\
 & & T3 & \\
O & & & T4
\end{pmatrix}
$$

$$
(U) = \begin{pmatrix}
1000 & 0000 & 0000 & 0000 \\
0000 & 1000 & 0000 & 0000 \\
0100 & 0000 & 0000 & 0000 \\
0000 & 0100 & 0000 & 0000 \\
0000 & 0000 & 1000 & 0000 \\
0000 & 0000 & 0000 & 1000 \\
0000 & 0000 & 0010 & 0000 \\
0000 & 0000 & 0000 & 0010 \\
0010 & 0000 & 0000 & 0000 \\
0000 & 0010 & 0000 & 0000 \\
0001 & 0000 & 0000 & 0000 \\
0000 & 0001 & 0000 & 0000 \\
0000 & 0000 & 0100 & 0000 \\
0000 & 0000 & 0000 & 0001 \\
0000 & 0000 & 0001 & 0000 \\
0000 & 0000 & 0000 & 0100
\end{pmatrix} \quad (48)
$$

Also, the transposition matrices ${}^t[Q]$, ${}^t[R]$, ${}^t[S]$, ${}^t[T]$, and ${}^t[U]$ are expressed by the following equations 43a to 47a, respectively.

$$
{}^t[Q] = \begin{pmatrix}
1000 & 0000 & & \\
0000 & 1000 & & \\
0000 & 0100 & & \\
0100 & 0000 & & \\
 & & 1000 & 0000 \\
 & & 0000 & 1000 \\
 & & 0000 & 0101 \\
 & & 0100 & 0000 \\
 & & 0010 & 0000 \\
 & & 0000 & 0010 \\
 & & 0000 & 0001 \\
 & & 0001 & 0000 \\
0010 & 0000 & & \\
0000 & 0010 & & \\
0000 & 0001 & & \\
0001 & 0000 & &
\end{pmatrix} \quad (43a)
$$

-continued $$
{}^t[R] = \begin{pmatrix}
1000 & 0000 & 0000 & 0000 \\
0000 & 0010 & 0000 & 0000 \\
0000 & 0000 & 0010 & 0000 \\
0000 & 0000 & 0000 & 0001 \\
0100 & 0000 & 0000 & 0000 \\
0000 & 1000 & 0000 & 0000 \\
0000 & 0000 & 0001 & 0000 \\
0000 & 0000 & 0000 & 0010 \\
0010 & 0000 & 0000 & 0000 \\
0000 & 0001 & 0000 & 0000 \\
0000 & 0000 & 1000 & 0000 \\
0000 & 0000 & 0000 & 0100 \\
0001 & 0000 & 0000 & 0000 \\
0000 & 0100 & 0000 & 0000 \\
0000 & 0000 & 0100 & 0000 \\
0000 & 0000 & 0000 & 1000
\end{pmatrix} \tag{44a}
$$

$$
{}^t[S] = \begin{pmatrix}
\begin{matrix} +0+0 \\ 0+0+ \\ +0-0 \\ 0+0- \end{matrix} & & & \\
& \begin{matrix} ++++ \\ ++-- \\ +-+- \\ +--+ \end{matrix} & & \\
& & \begin{matrix} ++++ \\ ++-- \\ +-+- \\ +--+ \end{matrix} & \\
& & & \begin{matrix} ++0+ \\ 0-++ \\ 0--+ \\ +-0- \end{matrix}
\end{pmatrix} \tag{45a}
$$

$$
= \begin{pmatrix}
{}^tS1 & & & O \\
& {}^tS2 & & \\
& & {}^tS3 & \\
O & & & {}^tS4
\end{pmatrix}
$$

$$
{}^t[T] = \begin{pmatrix}
\begin{matrix} ++ \\ +- \end{matrix} & & & & & & & \\
& \begin{matrix} ++ \\ +- \end{matrix} & & & & & & \\
& & \begin{matrix} k\,n \\ n\,m \end{matrix} & & & & & \\
& & & \begin{matrix} k\,n \\ n\,m \end{matrix} & & & & \\
& & & & \begin{matrix} k\,n \\ n\,m \end{matrix} & & & \\
& & & & & \begin{matrix} k\,n \\ n\,m \end{matrix} & & \\
& & & & & & \begin{matrix} ++ \\ j\,i \end{matrix} & \\
& & & & & & & \begin{matrix} +- \\ j\,j \end{matrix}
\end{pmatrix} \tag{47}
$$

$$
= \begin{pmatrix}
{}^tT1 & & & O \\
& {}^tT2 & & \\
& & {}^tT3 & \\
O & & & {}^tT4
\end{pmatrix}
$$

-continued $$
{}^t(U) = \begin{pmatrix}
1000 & 0000 & 0000 & \\
0100 & 0000 & 0000 & \\
0000 & 0000 & 1000 & \\
0000 & 0000 & 0010 & \\
0100 & & 0000 & \\
0001 & & 0000 & \\
0000 & & 0100 & \\
0000 & & 0001 & \\
& 1000 & & 0000 \\
& 0000 & & 1000 \\
& 0010 & & 0000 \\
& 0000 & & 0010 \\
& 0100 & & 0000 \\
& 0000 & & 0001 \\
& 0001 & & 0000 \\
& 0000 & & 0100
\end{pmatrix} \tag{47a}
$$

In this matrix decomposition, points which should be specifically noted are as follows.

(1) Matrices other than the matrix [T] and the transposition matrix ${}^t$[T] thereof are all matrices comprising elements of only "0" and "±1".

(2) In each row and each column of the matrix [U] and the transposition matrix ${}^t$[U], the matrix [R] and the transposition matrix ${}^t$[R], and the matrix [Q] and the transposition matrix ${}^t$[Q], only one portion is "1", and the others are all "0".

(3) Elements other than the four 4×4 sub-matrices, four 4×4 sub-matrices, four 4×4 sub-matrices, eight 2×2 sub-matrices, and eight 2×2 sub-matrices on the respective diagonal lines of the matrix [L], the matrix [S] and the transposition matrix ${}^t$[S] thereof, and the matrix [T] and the transposition matrix ${}^t$[T] thereof are all "0".

Figure 25:
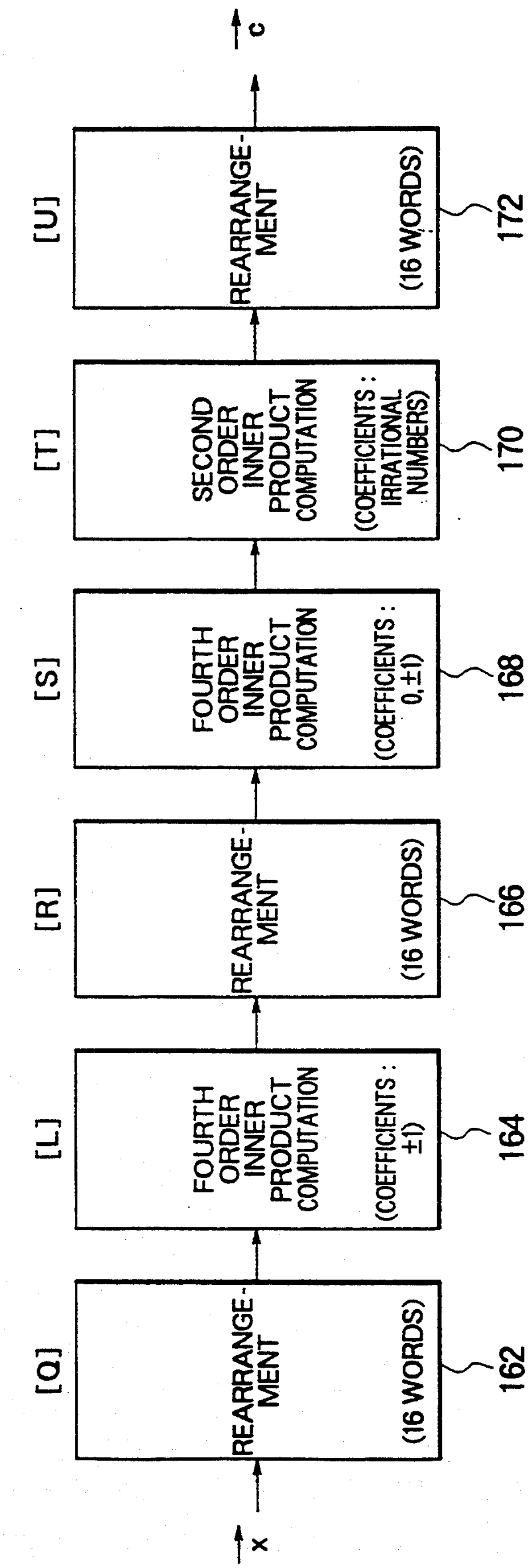
FIG. 25 is a structural view of a first aspect of a two-dimensional 4 row×4 column discrete cosine transformation system as a fourth embodiment of the discrete cosine transformation system of the present invention.

Accordingly, to constitute the matrix calculation of equation 42 defining the two-dimensional 4×4 DCT:

[Q][L][R][S][T][U]

as hardware, as shown in FIG. 25, the constitution can be made using, as shown FIG. 25, a first rearrangement circuit 162 of 16 words, a first fourth-order inner product computation circuit 164, a second rearrangement circuit 166 of 16 words, a second fourth-order inner product computation circuit 168, a second inner product computation circuit 170, and a third rearrangement circuit 172 of 16 words.

In the multiplication of $\frac{1}{4}$ indicated in equation 41, the binary data is shifted by 2 bits, and no multiplication is carried out.

The first rearrangement circuit 162 rearranges the input matrix [X] according to the elements of the matrix [Q].

The first fourth-order inner product computation circuit 164 has the same circuit structure as that of for example the circuit 124 of FIG. 17 and performs the inner product computation of the coefficient of "+1" or "−1". A multiplier circuit is not included in this circuit.

The second rearrangement circuit 166 rearranges the result of computation of the first fourth order inner product computation circuit 164 according to the elements of the matrix [R].

The second fourth-order inner product computation circuit circuit 168 has the same circuit structure as that of the circuit 124 of FIG. 17 and multiplies the coefficients "0", "+1", and "−1" in the matrix [S] to the output data of the second rearrangement circuit 166, but also this circuit structure does not include a multiplier circuit.

The second inner product computation circuit 170 has two multiplier circuits for performing the multiplication of the matrix [T] including irrational numbers.

The third rearrangement circuit 172 rearranges the result of computation from the second order inner product computation circuit 170 according to the elements of the matrix [U].

The first rearrangement circuit 162, the second rearrangement circuit 166, and the third rearrangement circuit 172 can be realized using for example one or a plurality of RAM's.

The above two-dimensional 4×4 DCT system merely has two multiplier circuits in the second order inner product computation circuit 170.

Figure 26:
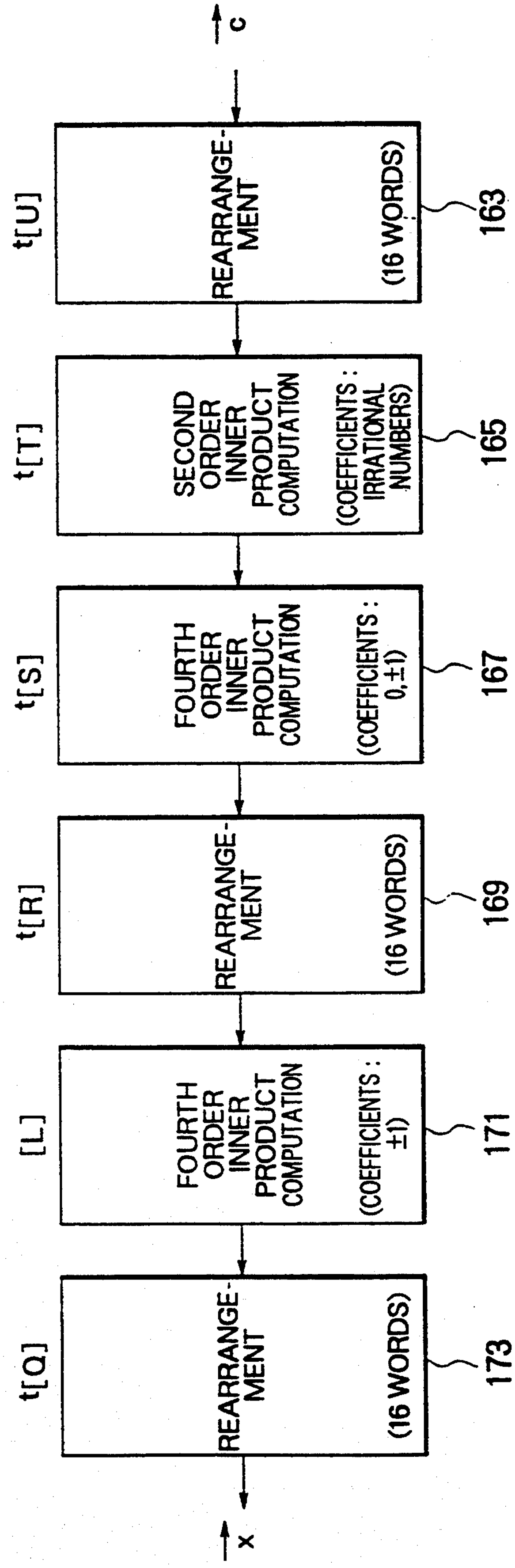
FIG. 26 is a structural view of the first aspect of a two-dimensional 4 row×4 column discrete cosine inverse transformation system as a fourth embodiment of the discrete cosine inverse transformation system of the present invention.

FIG. 26 shows the structure of the two-dimensional 4×4 IDCT system performing an inverse transformation to that of the two-dimensional 4×4 DCT system shown in FIG. 25.

This two-dimensional 4×4 IDCT system has a first rearrangement circuit 163 of 16 words; a second inner product computation circuit 165; a first fourth-order inner product computation circuit 167; a second rearrangement circuit 169 of 16 words; a second fourth-order inner product computation circuit 171; and a third rearrangement circuit 173.

The computation of the coefficient $\frac{1}{4}$ in equation 42 can be realized by shifting the binary data by 2 bits.

The first rearrangement circuit 163 rearranges the input matrix [C] according to the elements of the transposition matrix ${}^t$[U].

The second order inner product computation circuit 165 has two multiplier circuits and multiplies the irrational numbers in the transposition matrix ${}^t$[T] with the output of the first rearrangement circuit 163.

The first fourth-order inner product computation circuit 167 performs the inner product computation according to the coefficients "0", "+1", and "−1" in the transposition matrix ${}^t$S]. The first fourth-order inner product computation circuit 167 has a similar circuit structure to that of for example the circuit 131 in FIG. 18, and the multiplier circuit is not required.

The second rearrangement circuit 169 rearranges the outputs of the first fourth order inner product computation circuit 167 according to the elements in the transposition matrix ${}^t$[R].

The second fourth-order inner product computation circuit 171 has the same circuit structure as that of for example the circuit 131 of FIG. 19 and performs the inner product computation according to the coefficients of "+1" and "−1" in the matrix [L]. Also this inner product computation circuit 171 does not require a multiplier circuit.

The third rearrangement circuit 173 rearranges the outputs of the second fourth order inner product computation circuit 171 according to the transposition matrix ${}^t$[Q].

The first rearrangement circuit 163, the second rearrangement circuit 169, and the third rearrangement circuit 173 can be constituted by one or a plurality of RAM's.

In this way, by arranging equation 33 and equation 34 by matrix decomposition, the two-dimensional 4×4 DCT system and the two-dimensional 4×4 IDCT system can be constituted by using only two multiplier circuits respectively in the two-dimensional 4×4 DCT system and two-dimensional 4×4 IDCT system for performing the multiplication of the matrix [T] including the irrational numbers and the transposition matrix ${}^t$[T].

Respective second aspects of the two-dimensional 4×4 DCT system and the two-dimensional 4×4 IDCT system of the present invention will be described next.

The aforesaid [16×16 constant matrices] can be subjected to matrix decomposition as indicated in the following equation 49 and equation 50.

$$\mathrm{DCT}:\vec{C}=(\tfrac{1}{4})\,[U'][T'][S'][R'][L][Q]\vec{X} \tag{49}$$

$$\mathrm{IDCT}=\vec{X}=(\tfrac{1}{4})\,{}^t[Q][L]{}^tR']{}^t[S']{}^t[T']{}^tU']\vec{C} \tag{50}$$

The respective matrices in equation 49 and equation 50 are indicated in the following equation 51 to equation 54.

$$[R'] = \left(\begin{array}{cccc}
1000 & 0000 & 0000 & 0000 \\
0000 & 1000 & 0000 & 0000 \\
0000 & 0000 & 1000 & 0000 \\
0000 & 0000 & 0000 & 1000 \\
0000 & 0100 & 0000 & 0000 \\
0100 & 0000 & 0000 & 0000 \\
0000 & 0000 & 0000 & 0100 \\
0000 & 0000 & 0100 & 0000 \\
0000 & 0000 & 0010 & 0000 \\
0010 & 0000 & 0000 & 0000 \\
0000 & 0000 & 0000 & 0010 \\
0000 & 0010 & 0000 & 0000 \\
0000 & 0000 & 0000 & 0001 \\
0001 & 0000 & 0000 & 0000 \\
0000 & 0000 & 0001 & 0000 \\
0000 & 0001 & 0000 & 0000
\end{array}\right) \tag{51}$$

$$[S'] = \left(\begin{array}{cccccccc}
\begin{smallmatrix} + & + \\ - & + \end{smallmatrix} & & & & & & & \\
& \begin{smallmatrix} + & + \\ - & + \end{smallmatrix} & & & & & & \\
& & \begin{smallmatrix} n & k \\ k & l \end{smallmatrix} & & & O & & \\
& & & \begin{smallmatrix} n & k \\ k & l \end{smallmatrix} & & & & \\
& & & & \begin{smallmatrix} n & k \\ k & l \end{smallmatrix} & & & \\
& & & & & \begin{smallmatrix} n & k \\ k & l \end{smallmatrix} & & \\
& O & & & & & \begin{smallmatrix} + & + \\ j & i \end{smallmatrix} & \\
& & & & & & & \begin{smallmatrix} - & + \\ i & i \end{smallmatrix}
\end{array}\right) \tag{52}$$

-continued $$[T'] = \begin{pmatrix} \begin{smallmatrix}+&0&+&0\\0&-&0&-\\+&0&-&0\\0&-&0&+\end{smallmatrix} & & & \\ & \begin{smallmatrix}+&+&+&+\\+&-&+&-\\+&+&-&-\\+&-&-&+\end{smallmatrix} & & \\ & & \begin{smallmatrix}+&+&+&+\\+&-&+&-\\+&+&-&-\\+&-&-&+\end{smallmatrix} & \\ & & & \begin{smallmatrix}+&+&0&+\\0&+&-&-\\0&+&+&-\\+&-&0&-\end{smallmatrix} \end{pmatrix} \quad (53)$$

$$[U'] = \begin{pmatrix} 1000 & 0000 & & \\ 0000 & 1000 & & \\ 0100 & 0000 & & \\ 0000 & 0100 & & \\ & & 1000 & 0000 \\ & & 0000 & 1000 \\ & & 0010 & 0000 \\ & & 0000 & 0100 \\ 0010 & 0000 & & \\ 0000 & 0010 & & \\ 0001 & 0000 & & \\ 0000 & 0001 & & \\ & & 0100 & 0000 \\ & & 0000 & 0010 \\ & & 0001 & 0000 \\ & & 0000 & 0001 \end{pmatrix} \quad (54)$$

Also, the transposition matrices $^t$[U'], [T'], [S'], and $^t$[R'] are expressed by the following equations 51a to 55a.

$${}^t[R'] = \begin{pmatrix} 1000 & 0000 & 0000 & 0000 \\ 0000 & 0100 & 0000 & 0000 \\ 0000 & 0000 & 0100 & 0000 \\ 0000 & 0000 & 0000 & 0100 \\ 0100 & 0000 & 0000 & 0000 \\ 0000 & 1000 & 0000 & 0000 \\ 0000 & 0000 & 0001 & 0000 \\ 0000 & 0000 & 0000 & 0001 \\ 0010 & 0000 & 0000 & 0000 \\ 0000 & 0001 & 0000 & 0000 \\ 0000 & 0000 & 1000 & 0000 \\ 0000 & 0000 & 0000 & 0010 \\ 0001 & 0000 & 0000 & 0000 \\ 0000 & 0010 & 0000 & 0000 \\ 0000 & 0000 & 0010 & 0000 \\ 0000 & 0000 & 0000 & 1000 \end{pmatrix} \quad (51a)$$

$${}^t[S'] = \begin{pmatrix} \begin{smallmatrix}+&-\\+&+\end{smallmatrix} & & & & & & & & \\ & \begin{smallmatrix}+&-\\+&+\end{smallmatrix} & & & & & & O & \\ & & \begin{smallmatrix}n&k\\k&l\end{smallmatrix} & & & & & & \\ & & & \begin{smallmatrix}n&k\\k&l\end{smallmatrix} & & & & & \\ & & & & \begin{smallmatrix}n&k\\k&l\end{smallmatrix} & & & & \\ & & & & & \begin{smallmatrix}n&k\\k&l\end{smallmatrix} & & & \\ & O & & & & & \begin{smallmatrix}+j\\+i\end{smallmatrix} & & \\ & & & & & & & \begin{smallmatrix}-i\\+i\end{smallmatrix} & \end{pmatrix} \quad (52a)$$

$${}^t[T'] = \begin{pmatrix} \begin{smallmatrix}+&0&+&0\\0&-&0&-\\+&0&-&0\\0&-&0&+\end{smallmatrix} & & & \\ & \begin{smallmatrix}+&+&+&+\\+&-&+&-\\+&+&-&-\\+&-&-&+\end{smallmatrix} & & \\ & & \begin{smallmatrix}+&+&+&+\\+&-&+&-\\+&+&-&-\\+&-&-&+\end{smallmatrix} & \\ & & & \begin{smallmatrix}+&0&0&+\\+&+&+&-\\0&-&+&0\\+&-&-&-\end{smallmatrix} \end{pmatrix} \quad (53a)$$

$${}^t[U'] = \begin{pmatrix} 1000 & & 0000 & \\ 0010 & & 0000 & \\ 0000 & & 1000 & \\ 0000 & & 0010 & \\ 0100 & & 0000 & \\ 0001 & & 0000 & \\ 0000 & & 0100 & \\ 0000 & & 0001 & \\ & 1000 & & 0000 \\ & 0000 & & 1000 \\ & 0010 & & 0000 \\ & 0000 & & 0010 \\ & 0100 & & 0000 \\ & 0001 & & 0000 \\ & 0000 & & 0100 \\ & 0000 & & 0001 \end{pmatrix} \quad (54a)$$

Note that, the matrix [Q], the transposition matrix $^t$Q] and the matrix [L] in equation 49 and equation 50 are indicated in equation 43, the transposition matrix of equation 43, and equation 44, respectively.

In this matrix decomposition, points which should be specifically noted are as follows:

(1) Matrices other than the matrix [S'] and the transposition matrix $^t$S'] thereof are all matrices comprising elements of only "0" and "±1".

(2) In each row and each column of the matrix [U'] and the transposition matrix $^t$U'], the matrix [R'] and the transposition matrix $^t$R'], and the matrix [Q'] and the transposition matrix $^t$[Q'], only one portion is "1" and the others are all "0".

(3) Elements other than the four 4×4 sub-matrices, eight 2×2 sub-matrices, eight 2×2 sub-matrices, four 4×4 sub-matrices, and four 4×4 sub-matrices on the respective diagonal lines of the matrix [L], the matrix [S'] and the transposition matrix $^t$S'] thereof, and the matrix [T'] and the transposition matrix $^t$[T'] thereof are all "0".

Accordingly, so as to constitute the matrix calculation in equation 49 indicating the two-dimensional 4×4 DCT discrete cosine transformation as hardware, it is sufficient if a data column rearrangement circuit, a fourth order inner product computation circuit having coefficients comprising only "±1", a data column rearrangement circuit, a second order inner product computation circuit, a fourth order inner product computation circuit having coefficients comprising only "0" and "±1", and a data column rearrangement circuit are used.

Also the two-dimensional 4×4 IDCT is the same as described above.

Figure 27:
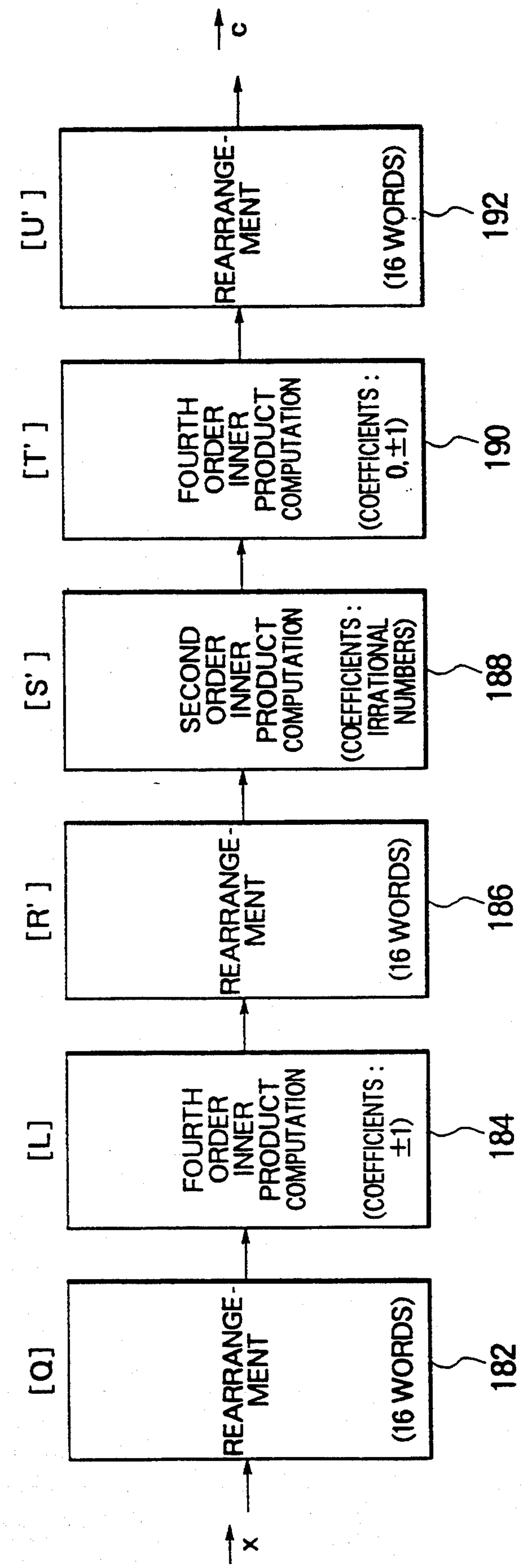
FIG. 27 is a structural view of a second aspect of the two-dimensional 4 row×4 column discrete cosine transformation system as a fifth embodiment of the discrete cosine transformation system of the present invention.

FIG. 27 shows the structure of the two-dimensional 4×4 DCT system of the second aspect.

This two-dimensional 4×4 DCT system has a first rearrangement circuit 182; a first fourth order inner product computation circuit 184; a second rearrangement circuit 186; a second fourth order inner product computation circuit 188 having two multiplier circuits performing the multiplication of irrational numbers; a second fourth order inner product computation circuit 190; and a third rearrangement circuit 192. The computation of ¼ does not perform multiplication, but shifts the binary data by 2 bits.

When comparing the two-dimensional 4×4 DCT system shown in FIG. 27 and the two-dimensional 4×4 DCT system shown in FIG. 25, in FIG. 25, it is the circuit structure in which the computation of the second order inner product computation circuit 170 having two multiplier circuits multiplying the irrational numbers is carried out after the computation of the second fourth order inner product computation circuit 168, but contrary to this, the two-dimensional 4×4 DCT system shown in FIG. 27 has the circuit structure in which, after the computation of the second order inner product computation circuit 188, the computation of the second fourth order inner product computation circuit 190 is carried out.

Figure 28:
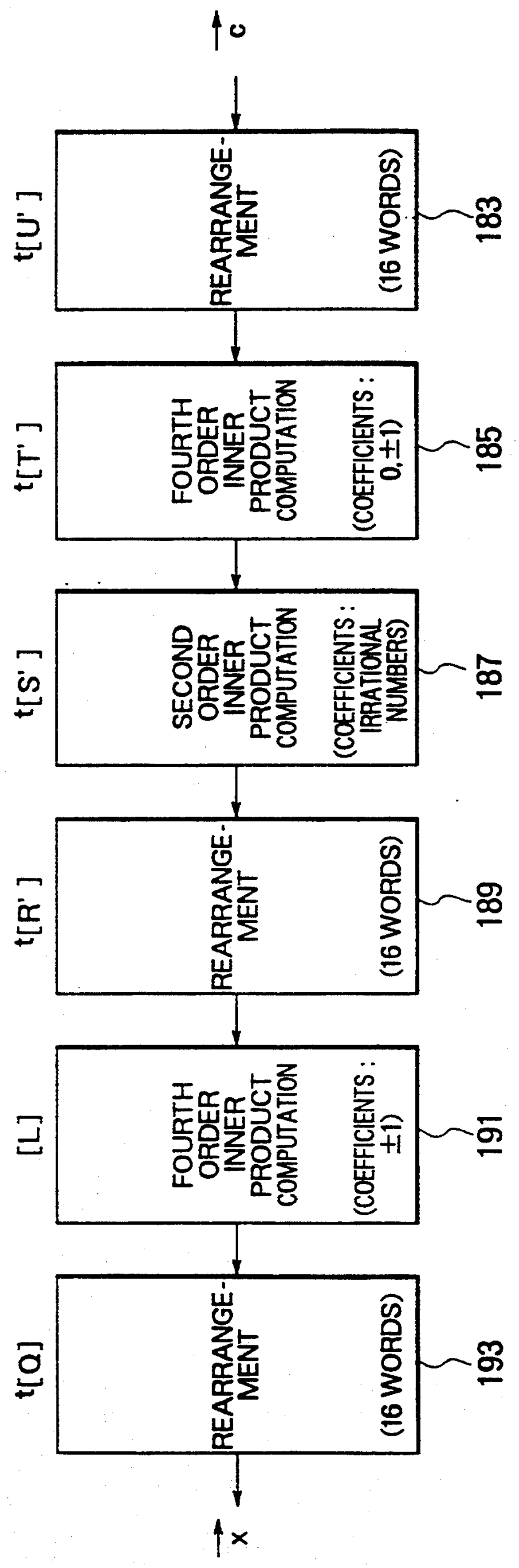
FIG. 28 is a structural view of the second aspect of the two-dimensional 4 row×4 column discrete cosine inverse transformation system as a fifth embodiment of the discrete cosine inverse transformation system of the present invention.

FIG. 28 shows the structure of the two-dimensional 4×4 IDCT system of the second aspect.

This two-dimensional 4×4 IDCT system has a first rearrangement circuit 183; a first fourth-order inner product computation circuit 185; a second order inner product computation circuit 187 having two multiplier circuits performing the multiplication of irrational numbers; a second rearrangement circuit 189; a second fourth order inner product computation circuit 191; and a third rearrangement circuit 193. The calculation of ¼ does not perform multiplication and shifts the binary data by 2 bits.

When comparing the two-dimensional 4×4 IDCT system shown in FIG. 28 and the two-dimensional 4×4 IDCT system shown in FIG. 26, in FIG. 26, it is a circuit structure in which the computation of the first fourth-order inner product computation circuit 167 is carried out after the computation of the second order inner product computation circuit 165 having two multiplier circuits multiplying irrational numbers, but contrary to this, the two-dimensional 4×4 IDCT system shown in FIG. 28 has a circuit structure in which, after the computation of the first fourth-order inner product computation circuit 185, the computation of the second order inner product computation circuit 187 multiplying the irrational numbers is carried out.

Therefore, according to the present invention, there is provided a two-dimensional 4×4 discrete cosine transformation system, which performs a two-dimensional 4×4 discrete cosine transformation, is characterized in that:

(1) provision is made of a first fourth-order inner product computation circuit having coefficients comprising "+1" and "−1", (2) a second fourth-order inner product computation circuit with coefficients comprising "0", "+1", and "−1", and (3) a third second-order inner product computation circuit including a memory in which the data components of the constant matrices are stored;

(4) the 4 row×8 column input data are fed via the first rearrangement circuit to the above-described first inner product computation circuit;

(5) the output data of the related first inner product computation circuit are fed via the second rearrangement circuit to the above-described second inner product computation circuit; and (6) the output data of the related second inner product computation circuit are fed directly to the above-described third inner product computation circuit and, at the same time, (7) the output data of the related third inner product computation circuit are guided out via the third rearrangement circuit.

Also, according to the present invention, there is provided a two-dimensional 4×4 discrete cosine inverse transformation system, which performs a two-dimensional 4×4 discrete cosine inverse transformation, is characterized in that:

(1) provision is made of a first second-order inner product computation circuit including a memory in which the data components of the constant matrices are stored, (2) a second fourth-order inner product computation circuit with coefficients comprising "0", "+1", and "−1"and (3) a third fourth-order inner product computation circuit having coefficients comprising "+1" and "−1";

(4) the 4 row×4 column input data are fed via the first rearrangement circuit to the above-described first inner product computation circuit;

(5) the output data of the related first inner product computation circuit are fed directly to the above-described second inner product computation circuit and, at the same time, (6) the output data of the related second inner product computation circuit are fed via the second rearrangement circuit to the above-described third inner product computation circuit; and (7) the output data of the related third inner product computation circuit are guided out via the third rearrangement circuit.

Further, according to the present invention, there is provided a two-dimensional 4×4 discrete cosine transformation system, which performs a two-dimensional 4×4 discrete cosine transformation, is characterized in that:

(1) provision is made of a first fourth-order inner product computation circuit having coefficients comprising "+1" and "−1", (2) a second second-order inner product computation circuit including a memory in which the data components of the constant matrices is stored, and (3) a third fourth-order inner product computation circuit with coefficients comprising "0", "+1" and "−1";

(4) the 4 row×4 column input data are fed via the first rearrangement circuit to the above-described first inner product computation circuit;

(5) the output data of the related first inner product computation circuit are fed via the second rearrangement circuit to the above-described second inner product computation circuit; and (6) the output data of the related second inner product computation circuit are fed directly to the above-described third inner product computation circuit and, at the same time, (7) the output data of the related third inner product computation circuit are guided out via the third rearrangement circuit.

According to the present invention, there is provided a two-dimensional 4×4 discrete cosine inverse transformation system, which performs a two-dimensional 4×4 discrete cosine inverse transformation, is characterized in that:

(1) provision is made of a first fourth-order inner product computation circuit with coefficients comprising "0", "+1", and "−1", (2) a second second-order inner product computation circuit including a memory in which the data components of the constant matrices are stored, and (3) a third fourth-order inner product computation circuit having coefficients comprising "+1" and "−1";

(4) the 4row×4 column input data are fed via the first rearrangement circuit to the above-described first inner product computation circuit;

(5) the output data of the related first inner product computation circuit are fed directly to the above-described second inner product computation circuit and, at the same time, (6) the output data of the related second inner product computation circuit are fed via the second rearrangement circuit to the above-described third inner product computation circuit; and (7) the output data of the related third inner product computation circuit are guided out via the third rearrangement circuit.

The circuit structure achieving a higher speed computation in the above-mentioned two-dimensional 4 rows×4 columns discrete cosine transformation (two-dimensional 4×4 DCT) system and two-dimensional 4 row×4 column discrete cosine inverse transformation (two-dimensional 4×4 IDCT) system will be described next.

The two-dimensional 4×4 DCT is defined in equation 41 and the two-dimensional 4×4 IDCT is defined in equation 42.

A description will be made first of the two-dimensional 4×4 DCT.

By analyzing the contents of the matrix [S] and the contents of the matrix [T], the following parallel processing is enabled as follows.

(1) The operations for computation with the first sub-matrix [S1] in the matrix [S] and with the first sub-matrix [T1] in the matrix [T] are made in the fourth order inner product computation circuit and one "second order inner product computation circuit" each having only one coefficient comprising "0" and "±1";

(2) The operations for computation with the second sub-matrix [S2] in the matrix [S] and with the second sub-matrix [T2] in the matrix [T] are made in the fourth order inner product computation circuit and one "second order inner product computation circuit" each having only one coefficient comprising "±1";

(3) The operations for computation with the third sub-matrix [S3] in the matrix [S] and with the third sub-matrix [T3] in the matrix [T] are made in the fourth order inner product computation circuit and one "second order inner product computation circuit" each having only one coefficient comprising "±1"; and (4) The operations for computation with the fourth sub-matrix [S4] in the matrix [S] and with the fourth sub-matrix [T4] in the matrix [T] are made in the fourth order inner product computation circuit and one "second order inner product computation circuit" each having only one coefficient comprising "0" and "±1".

The rearrangement operation [R] is a rearrangement of data wherein:

(a) a 0-th order, fourth order, eighth order, and 12-th order are first output in the first 4 cycles (unit times);

(b) a first order, fifth order, ninth order, and 13-th order are output in the next 4 cycles;

(c) a second order, sixth order, 10-th order, and 14-th order are output in the further next 4 cycles; and (d) a third order, seventh order, 11-th order, and 15-th order are output in the final 4 cycles.

Accordingly, (i) the 4i (i=0 to 3)-th order output among the outputs of the matrix [L] is directly fed to the fourth order inner product computation circuit for calculating the first sub-matrix [S1];

(ii) the (4i+1)-th order output among the outputs of the matrix [L] is directly fed to the fourth order inner product computation circuit for calculating the second sub-matrix [S3];

(iii) the (4i+2)-th order output among the outputs of the matrix [L] are directly fed to the fourth order inner product computation circuit for calculating the third sub-matrix [S2]; and (iv) the (4i+3)-th order output among the outputs of the matrix [L] are directly fed to the fourth order inner product computation circuit for calculating the fourth sub-matrix [S4], whereby the rearrangement matrix [R] becomes unnecessary.

Figure 29:
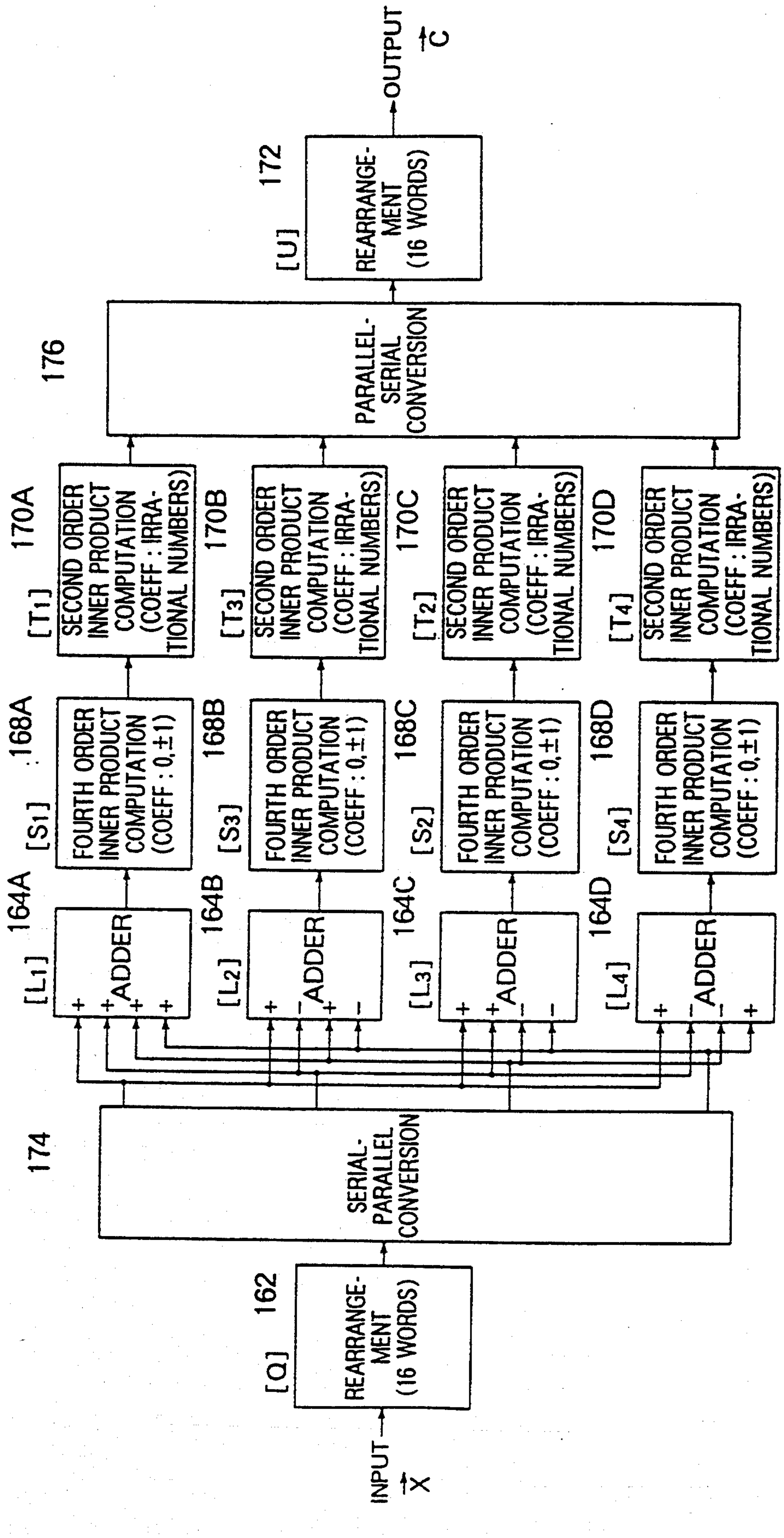
FIG. 29 is a structural view of the circuit achieving an increase of speed of the two-dimensional 4 row×4 column discrete cosine transformation system shown in FIG. 25.

FIG. 29 shows the structure of the two-dimensional 4×4 DCT system based on the above-mentioned consideration.

The two-dimensional 4×4 DCT system has a first rearrangement circuit 162; a serial to parallel converter 174; four 4-input adder circuits 164A to 164D; four second fourth order inner product computation circuit circuits 168A to 168D; four second order inner product computation circuits 170A to 170D; a parallel to serial converter 176; and a third rearrangement circuit 172.

As clear from the circuit structure in the figure, the operation is carried out in parallel in four systems between the serial to parallel Converter 174 and the parallel to serial converter 176 and, in addition, there is no rearrangement processing concerning the matrix [R], and therefore an improvement of the processing speed of almost four times compared with the two-dimensional 4×4 DCT system shown in FIG. 25 is achieved.

Figure 30:
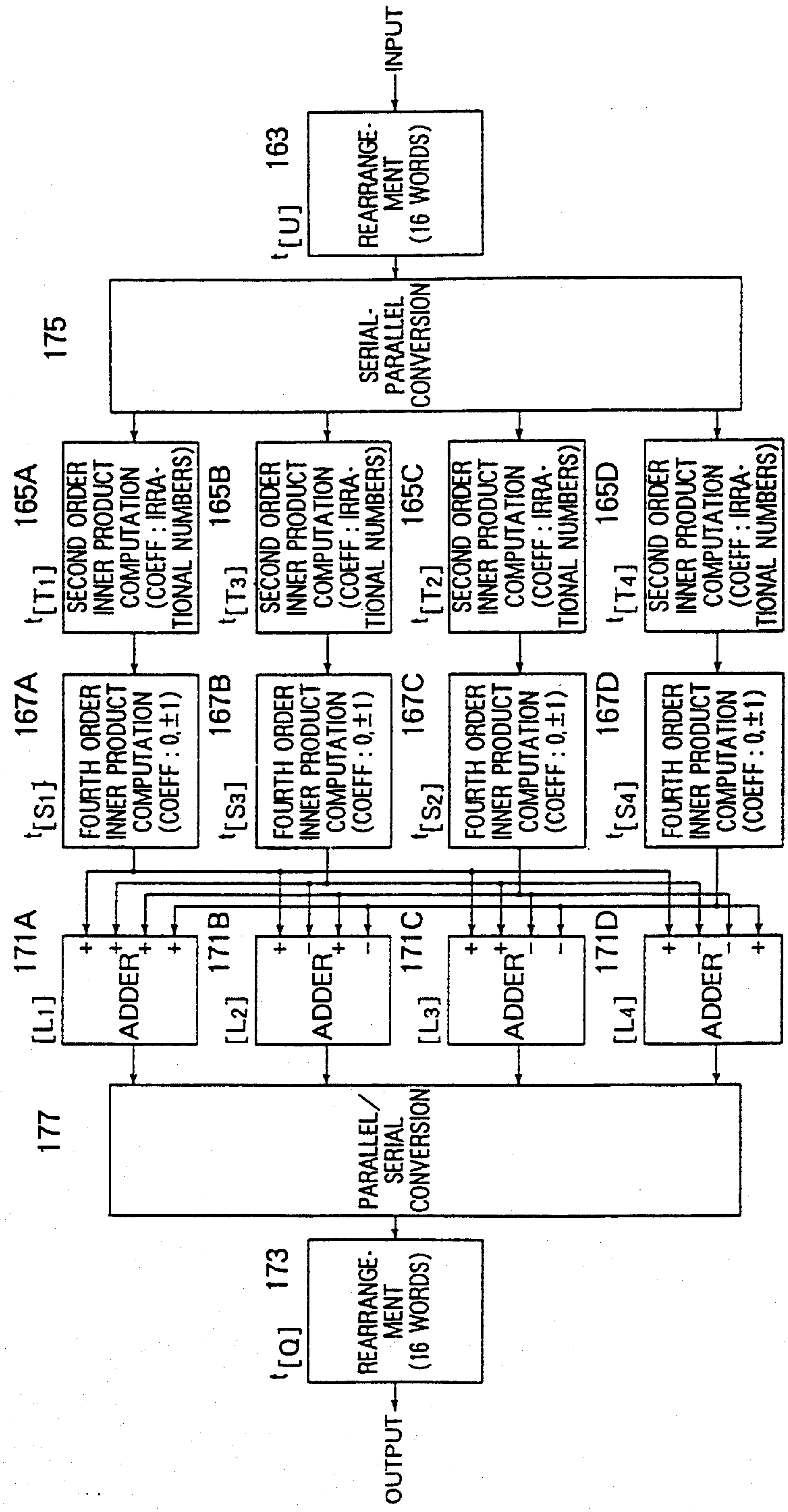
FIG. 30 is a structural view of the circuit achieving an increase of speed of the two-dimensional 4 row×4 column discrete cosine inverse transformation system shown in FIG. 26.

FIG. 30 shows the structure of the two-dimensional 4×4 IDCT system based on the above-mentioned consideration.

The two-dimensional 4×4 IDCT system has a first rearrangement circuit 163; a serial to parallel converter 175; four second order inner product computation circuits 165A to 165D; four first fourth-order inner product computation circuits 167A to 167D; four 4-input adder circuits 171A to 171D; a parallel to serial converter 177; and a third rearrangement circuit 173.

As clear from the circuit structure in the figure, the computation is carried out in parallel in four systems between the serial to parallel converter 175 and the parallel to serial converter 177, and in addition, there is no rearrangement processing concerning the transposition matrix ᵗR], and therefore an improvement of the processing speed of almost four times compared with the two-dimensional 4×4 DCT system shown in FIG. 26 is achieved.

A description will now be made of an system which can be used for both of the two-dimensional 4 row×8 column discrete cosine transformation (two-dimensional 4×8 DCT) and two-dimensional 8 row×8 column discrete cosine transformation (two-dimensional 8×8 DCT) as a fifth embodiment of the discrete cosine transformation system of the present invention.

Also, a description will be made of an system which can be used for both of the two-dimensional 4 row×8 column discrete cosine inverse transformation (two-dimensional 4×8 IDCT) and two-dimensional 8 row×8 column discrete cosine inverse transformation (two-dimensional 8×8 IDCT) as the discrete cosine inverse transformation system of the present invention.

For example, in image data compression processing, there is known a method of sequentially performing the computation processing while adaptively performing switching between the 8×8 DCT and 4×8 DCT. Accordingly, a circuit which can selectively calculate either of the 8×8 DCT or 4×8 DCT by a control signal has been demanded.

The circuit structure of the two-dimensional 4×8 DCT system was mentioned above. Particularly, as the above-mentioned circuit structure, a circuit structure in which the number of the multiplier circuits was reduced to simplify the circuit structure, and further a high speed processing was possible, was mentioned.

Also, the circuit structure of the two-dimensional 8×8 DCT system has been already proposed (refer to for example, Japanese Patent Application No. 4-35149 (filed on Feb. 21, 1992) and Japanese Patent Application No. 4-191113 (filed on Jul. 17, 1992) previously filed by the same applicant of the present case) both of which are in included in co-pending U.S. application, Ser. No. 08/020,313, filed on Feb. 19, 1993, incorporated herein by reference.

However, in these circuit structures, either of the two-dimensional 4×8 DCT or two-dimensional 8×8 DCT can be computed. A system which can compute the two has not yet been known.

Then the present invention is intended to provide a system which can compute both of the two-dimensional 4×8 DCT and two-dimensional 8×8 DCT by single system in consideration with such a circumstance.

Similarly, the present invention is also intended to provide an system which can compute both of the two-dimensional 4×8 IDCT and two-dimensional 8×8 IDCT by single system.

In a discrete cosine transformation system of the present invention, each rearrangement circuit and each inner product computation circuit in the circuit of a two-dimensional 8×8 DCT, and each rearrangement circuit and each inner product computation circuit in the circuit of a two-dimensional 4×8 DCT are commonly used. The circuit structure of two-dimensional 8×8 DCT or circuit structure of two-dimensional 4×8 DCT is adopted by a control signal from a control circuit, whereby a circuit which can selectively calculate either the two-dimensional 8×8 DCT or two-dimensional 4×8 DCT is realized.

This is true also for a system which can be used for both of the two-dimensional 4×8 IDCT and two-dimensional 8×8 IDCT.

A summary will be given of the two-dimensional 8×8 DCT system and two-dimensional 8×8 IDCT system disclosed in Japanese Patent Application No. 4-35149 and Japanese Patent Application No. 4-191113 filed by the same applicant of the present case mentioned above both of which are included in co-pending U.S. application, Ser. No. 08/020,313, filed on Feb. 19, 1993, incorporated herein by reference.

The two-dimensional 8×8 DCT is expressed as in the following equation 55, and $$[Y]=[M][X] \quad (55)$$

the 64 row×64 column constant matrix [M] can be subjected to matrix decomposition as in the following equation 56.

$$[M]=\frac{1}{8}[W][V][TS][R][L][Q] \quad (56)$$

Accordingly, equation 56 can be rewritten to the following equation 57.

$$[Y]=\frac{1}{8}[W][V][TS][R][L][Q][X] \quad (57)$$

Similarly, the two-dimensional 8×8 IDCT is expressed by the following equation 58.

$$[X]=\tfrac{1}{8}\,{}^{t}[Q]\,{}^{t}[L]\,{}^{t}[R]\,{}^{t}[TS]\,{}^{t}[V]\,{}^{t}[W][Y] \tag{58}$$

The matrix [Q] in equation 57 can be expressed by the following equation 59 to equation 61.

$$[Q]=\begin{pmatrix} Q_1 & & & & & & & Q_2 \\ & Q_1 & & & O & & Q_2 & \\ & & Q_1 & & & Q_2 & & \\ O & & & Q_1 & Q_2 & & & O \end{pmatrix} \tag{59}$$

$$Q_1=\begin{bmatrix} +&0&0&0&0&0&0&0 \\ 0&0&0&0&0&0&0&+ \\ 0&0&0&0&0&0&0&0 \\ 0&0&0&0&0&0&0&0 \\ 0&+&0&0&0&0&0&0 \\ 0&0&0&0&0&0&+&0 \\ 0&0&0&0&0&0&0&0 \\ 0&0&0&0&0&0&0&0 \\ 0&0&+&0&0&0&0&0 \\ 0&0&0&0&0&+&0&0 \\ 0&0&0&0&0&0&0&0 \\ 0&0&0&0&0&0&0&0 \\ 0&0&0&+&0&0&0&0 \\ 0&0&0&0&+&0&0&0 \\ 0&0&0&0&0&0&0&0 \\ 0&0&0&0&0&0&0&0 \end{bmatrix} \tag{60}$$

$$Q_2=\begin{bmatrix} 0&0&0&0&0&0&0&0 \\ 0&0&0&0&0&0&0&0 \\ +&0&0&0&0&0&0&0 \\ 0&0&0&0&0&0&0&+ \\ 0&0&0&0&0&0&0&0 \\ 0&0&0&0&0&0&0&0 \\ 0&+&0&0&0&0&0&0 \\ 0&0&0&0&0&0&+&0 \\ 0&0&0&0&0&0&0&0 \\ 0&0&0&0&0&0&0&0 \\ 0&0&+&0&0&0&0&0 \\ 0&0&0&0&0&+&0&0 \\ 0&0&0&0&0&0&0&0 \\ 0&0&0&0&0&0&0&0 \\ 0&0&0&+&0&0&0&0 \\ 0&0&0&0&+&0&0&0 \end{bmatrix} \tag{61}$$

-continued

The matrix [L] in equation 57 can be expressed by the following equation 62 and equation 63.

$$(L)=\begin{pmatrix} L_{11} & & & O \\ & L_{22} & & \\ & & L_{33} & \\ O & & & L_{44} \end{pmatrix} \tag{62}$$

$$\left.\begin{array}{l} L_{11} \\ L_{22} \\ L_{33} \\ L_{44} \end{array}\right\}=\begin{pmatrix} +&+&+&+ \\ +&-&+&- \\ +&+&-&- \\ +&-&-&+ \end{pmatrix} \tag{63}$$

(each of the four diagonal blocks in equation 63 is the same 4×4 pattern shown above)

The matrix [R] in equation 57 can be expressed by the following equation 64 to equation 68.

$$(R)=\begin{pmatrix} R_{11} & R_{12} \\ R_{21} & R_{22} \end{pmatrix} \tag{64}$$

$$R_{11}=\left(\begin{array}{*{32}{c}}
+&0&0&0&0&0&0&0&0&0&0&0&0&0&0&0&0&0&0&0&0&0&0&0&0&0&0&0&0&0&0&0 \\
0&0&0&0&0&0&0&0&0&0&0&0&0&0&0&0&0&0&0&0&0&0&0&0&0&0&0&0&0&0&0&0 \\
0&0&0&0&+&0&0&0&0&0&0&0&0&0&0&0&0&0&0&0&0&0&0&0&0&0&0&0&0&0&0&0 \\
0&0&0&0&0&0&0&0&0&0&0&0&0&0&0&0&0&0&0&0&0&0&0&0&0&0&0&0&0&0&0&0 \\
0&0&0&0&0&0&0&+&0&0&0&0&0&0&0&0&0&0&0&0&0&0&0&0&0&0&0&0&0&0&0&0 \\
0&0&0&0&0&0&0&0&0&0&0&0&0&0&0&0&0&0&0&0&0&0&0&0&0&0&0&0&0&0&0&0 \\
0&0&0&0&0&0&0&0&0&0&0&0&+&0&0&0&0&0&0&0&0&0&0&0&0&0&0&0&0&0&0&0 \\
0&0&0&0&0&0&0&0&0&0&0&0&0&0&0&0&0&0&0&0&0&0&0&0&0&0&0&0&0&0&0&0 \\
0&0&0&0&0&0&0&0&0&0&0&0&0&0&0&0&+&0&0&0&0&0&0&0&0&0&0&0&0&0&0&0 \\
0&0&0&0&0&0&0&0&0&0&0&0&0&0&0&0&0&0&0&0&0&0&0&0&0&0&0&0&0&0&0&0 \\
0&0&0&0&0&0&0&0&0&0&0&0&0&0&0&0&0&0&0&0&+&0&0&0&0&0&0&0&0&0&0&0 \\
0&0&0&0&0&0&0&0&0&0&0&0&0&0&0&0&0&0&0&0&0&0&0&0&0&0&0&0&0&0&0&0 \\
0&0&0&0&0&0&0&0&0&0&0&0&0&0&0&0&0&0&0&0&0&0&0&0&+&0&0&0&0&0&0&0 \\
0&0&0&0&0&0&0&0&0&0&0&0&0&0&0&0&0&0&0&0&0&0&0&0&0&0&0&0&0&0&0&0 \\
0&0&0&0&0&0&0&0&0&0&0&0&0&0&0&0&0&0&0&0&0&0&0&0&0&0&0&0&+&0&0&0 \\
0&0&0&0&0&0&0&0&0&0&0&0&0&0&0&0&0&0&0&0&0&0&0&0&0&0&0&0&0&0&0&0
\end{array}\right. \tag{65}$$

-continued 0 0 0 0 0 0 0 0 0 0 0 0 0 +0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 +0 0
0 0 0 0 0 0 0 0 0 0 0 0 0 0 0 0 0 0 0 0 0 0 0 0 0 0 0 0 0 0 0 0

0 0 0 0 0 0 0 0 +0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 +0 0 0 0 0
0 0 0 0 0 0 0 0 0 0 0 0 0 0 0 0 0 0 0 0 0 0 0 0 0 0 0 0 0 0 0 0

0 0 0 0 0 +0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 +0 0 0 0 0 0 0 0 0 0
0 0 0 0 0 0 0 0 0 0 0 0 0 0 0 0 0 0 0 0 0 0 0 0 0 0 0 0 0 0 0 0

0 +0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 +0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0

(66)

$R_{12}$ =

0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 +0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 +0 0 0 0 0 0 0

0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 +0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 +0 0 0 0 0 0 0 0 0 0 0 0 0 0 0

0 0 0 0 0 0 0 0 0 0 0 0 0 0 0 0 0 0 0 0 0 0 0 0 0 0 0 0 0 0 0 0
0 0 0 0 0 0 0 0 0 0 0 0 +0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 +0 0 0 0 0 0 0 0 0 0 0 0 0 0 0 0 0 0 0 0 0 0 0

0 0 0 0 0 0 0 0 0 0 0 0 0 0 0 0 0 0 0 0 0 0 0 0 0 0 0 0 0 0 0 0
0 0 0 0 +0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
+0 0 0 0 0 0 0 0 0 0 0 0 0 0 0 0 0 0 0 0 0 0 0 0 0 0 0 0 0 0 0

0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 +0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 +0 0 0 0 0 0 0 0 0 0 0 0 0 0 0 0 0 0

0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 +0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 +0 0 0 0 0 0 0 0 0 0 0 0 0 0 0 0 0 0 0 0 0 0

0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 +0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 +0 0 0 0 0 0 0 0 0 0 0 0 0 0 0 0 0 0 0 0 0 0 0 0 0 0

0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 +0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 +0 0 0 0 0 0 0 0 0 0 0 0 0 0 0 0 0 0 0 0 0 0 0 0 0 0 0 0 0 0

(67)

0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0

0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0
0 0 0 0 0 0 0 0 0 0 0 0 0 0 0 0 0 0 0 0 0 0 0 0 0 0 0 0 0 0 0 0

0 0 0 0 0 0 0 0 0 0 0 0 0 0 0 0 0 0 +0 0 0 0 0 0 0 0 0 0 0 0 0
0 0 0 0 0 0 0 0 0 0 0 0 0 0 0 0 0 0 0 0 0 0 0 0 0 0 0 0 0 0 +0
0 0 0 0 0 0 0 0 0 0 0 0 0 0 0 0 0 0 0 0 0 0 +0 0 0 0 0 0 0 0 0
0 0 0 0 0 0 0 0 0 0 0 0 0 0 0 0 0 0 0 0 0 0 0 0 0 0 +0 0 0 0 0

-continued $$
R_{21} = \left|\begin{array}{l}
0\ 0\ +\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ +\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ +\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ +\ 0\ 0\ 0\ 0\ 0\ 0\ 0\ 0\ 0\ 0\ 0\ 0\ 0\ 0\ 0\ 0\ 0\ 0\ 0\ 0\ 0 \\[6pt]
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ +\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ +\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\[6pt]
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ +\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ +\ 0\ 0\ 0\ 0\ 0\ 0\ 0\ 0\ 0\ 0\ 0\ 0\ 0\ 0\ 0\ 0 \\[6pt]
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ +\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ +\ 0\ 0\ 0\ 0\ 0\ 0\ 0\ 0 \\[6pt]
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ 0\ 0\ +\ 0\ 0\ 0\ 0\ 0\ 0\ 0\ 0\ 0\ +\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ +
\end{array}\right)
$$

$$
R_{22} = \left(\begin{array}{l}
0\ 0\ 0\ 0\ 0\ 0\ 0\ 0\ 0\ 0\ 0\ 0\ 0\ 0\ 0\ 0\ 0\ 0\ +\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ +\ 0 \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ +\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ +\ 0\ 0\ 0\ 0\ 0 \\[6pt]
0\ 0\ +\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ +\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ +\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ +\ 0\ 0\ 0\ 0\ 0\ 0\ 0\ 0\ 0\ 0\ 0\ 0\ 0\ 0\ 0\ 0\ 0\ 0\ 0\ 0\ 0 \\[6pt]
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\[6pt]
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\[6pt]
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ + \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ +\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\[6pt]
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ +\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ +\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\[6pt]
0\ 0\ 0\ 0\ 0\ 0\ 0\ 0\ 0\ 0\ 0\ 0\ 0\ 0\ 0\ +\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ +\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\[6pt]
0\ 0\ 0\ 0\ 0\ 0\ 0\ +\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ +\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0 \\
0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0\ 0
\end{array}\right) \quad (68)
$$

The matrix [TS] in equation 57 can be expressed by the following equation 69 to equation 71.

$$
TS = \begin{pmatrix}
TS_{11} & & & \\
& TS_{22} & & \\
& & TS_{33} & \\
& & & TS_{44}
\end{pmatrix} \quad (69)
$$

-continued $$
TS_{11} = \left(\begin{array}{l}
+\ +\ +\ +\ +\ +\ +\ +\ 0\ 0\ 0\ 0\ 0\ 0\ 0\ 0 \\
0\ 0\ 0\ 0\ 0\ 0\ 0\ 0\ +\ +\ +\ +\ +\ +\ +\ + \\
+\ +\ -\ -\ -\ -\ +\ +\ 0\ 0\ 0\ 0\ 0\ 0\ 0\ 0 \\
0\ 0\ 0\ 0\ 0\ 0\ 0\ 0\ +\ +\ -\ -\ -\ -\ +\ + \\
+\ +\ 0\ 0\ 0\ 0\ -\ -\ 0\ 0\ +\ +\ -\ -\ 0\ 0 \\[6pt]
0\ 0\ -\ -\ +\ +\ 0\ 0\ +\ +\ 0\ 0\ 0\ 0\ -\ - \\
+\ +\ 0\ 0\ 0\ 0\ -\ -\ 0\ 0\ -\ -\ +\ +\ 0\ 0 \\
0\ 0\ +\ +\ -\ -\ 0\ 0\ +\ +\ 0\ 0\ 0\ 0\ -\ - \\
+\ -\ 0\ 0\ 0\ 0\ +\ -\ +\ -\ 0\ 0\ 0\ 0\ +\ - \\
0\ 0\ +\ -\ +\ -\ 0\ 0\ 0\ 0\ +\ -\ +\ -\ 0\ 0 \\
+\ -\ 0\ 0\ 0\ 0\ +\ -\ -\ +\ 0\ 0\ 0\ 0\ -\ +
\end{array}\right| \quad (70)
$$

-continued $$
\left(\begin{matrix}
0&0&+&-&+&-&0&0&0&0&-&+&-&+&0&0\\
+&-&+&-&-&+&-&+&0&0&0&0&0&0&0&0\\
0&0&0&0&0&0&0&0&+&-&+&-&-&+&-&+\\
+&-&-&+&+&-&-&+&0&0&0&0&0&0&0&0\\
0&0&0&0&0&0&0&0&+&-&-&+&+&-&-&+
\end{matrix}\right)
$$

(71)

$$
\begin{matrix} TS_{22} = \\ TS_{33} \end{matrix}
\left(\begin{matrix}
0&0&0&0&+&+&+&+&+&+&+&+&0&0&0&0\\
-&-&-&-&0&0&0&0&0&0&0&0&+&+&+&+\\
+&+&+&+&0&0&0&0&0&0&0&0&+&+&+&+\\
0&0&0&0&+&+&+&+&-&-&-&-&0&0&0&0\\
-&+&0&0&+&-&0&0&0&0&-&+&0&0&+&-\\
0&0&+&-&0&0&+&-&+&-&0&0&+&-&0&0\\
0&0&-&+&+&-&0&0&0&0&+&-&+&-&0&0\\
-&+&0&0&0&0&+&-&-&+&0&0&0&0&-&+\\
+&-&0&0&0&0&+&-&-&+&0&0&0&0&+&-\\
0&0&-&+&-&+&0&0&0&0&-&+&+&-&0&0\\
+&-&0&0&+&-&0&0&0&0&-&+&0&0&-&+\\
0&0&+&-&0&0&-&+&-&+&0&0&+&-&0&0\\
0&0&0&0&+&+&-&-&+&+&-&-&0&0&0&0\\
-&-&+&+&0&0&0&0&0&0&0&0&+&+&-&-\\
+&+&-&-&0&0&0&0&0&0&0&0&+&+&-&-\\
0&0&0&0&+&+&-&-&-&-&+&+&0&0&0&0
\end{matrix}\right)
$$

(72)

$$
TS_{44} =
\left(\begin{matrix}
+&+&0&0&0&0&0&0&0&0&+&+&0&0&0&0\\
0&0&-&+&+&+&0&0&-&+&0&0&0&0&+&+\\
-&+&+&+&0&0&0&0&+&+&0&0&+&+&0&0\\
0&0&0&0&+&-&-&-&0&0&+&-&0&0&-&+\\
0&0&-&+&0&0&0&0&0&0&0&0&0&0&-&-\\
+&+&0&0&0&0&-&+&0&0&-&-&-&+&0&0\\
-&+&0&0&-&+&0&0&0&0&0&0&-&-&-&+\\
0&0&+&+&0&0&-&-&-&-&-&+&0&0&0&0\\
0&0&0&0&+&+&0&0&+&-&0&0&0&0&0&0\\
+&+&0&0&0&0&+&-&0&0&-&-&+&-&0&0\\
0&0&+&+&0&0&+&+&-&-&+&-&0&0&0&0\\
-&+&0&0&+&-&0&0&0&0&0&0&-&-&+&-\\
0&0&0&0&0&0&-&+&0&0&0&0&+&-&0&0\\
0&0&+&-&+&+&0&0&-&+&0&0&0&0&-&-\\
0&0&0&0&-&+&-&-&0&0&+&-&0&0&+&-\\
-&+&-&-&0&0&0&0&-&-&0&0&+&+&0&0
\end{matrix}\right)
$$

The matrix [V] in equation 57 can be expressed by the following equation 73 to equation 76.

(73)

$$
V = \begin{pmatrix} V_{11} & & & \\ & V_{22} & & \\ & & V_{33} & \\ & & & V_{44} \end{pmatrix}
$$

(74)

$$
V_{11} = \begin{pmatrix}
\begin{matrix} +&+&0&0\\ +&-&0&0\\ 0&0&+&+\\ 0&0&+&- \end{matrix} & & & \\
& \begin{matrix} +&0&i&i\\ +&0&j&j\\ 0&-i&j& \\ 0&+i&j& \end{matrix} & & \\
& & \begin{matrix} k&k&l&l\\ n&n&k&k\\ k&m&l&n\\ n&l&k&m \end{matrix} & \\
& & & \begin{matrix} k&k&l&l\\ n&n&k&k\\ k&m&l&n\\ n&l&k&m \end{matrix}
\end{pmatrix}
$$

(75)

$$
\begin{matrix} V_{22} = \\ V_{33} \end{matrix} \begin{pmatrix}
\begin{matrix} a&c&b&h\\ f&a&d&g\\ g&h&a&b\\ d&b&g&a \end{matrix} & & & \\
& \begin{matrix} a&h&c&b\\ f&g&a&d\\ g&b&h&a\\ d&a&b&g \end{matrix} & & \\
& & \begin{matrix} a&d&c&b\\ f&c&a&d\\ g&f&h&a\\ h&a&f&c \end{matrix} & \\
& & & \begin{matrix} a&c&b&h\\ f&a&d&g\\ g&h&a&b\\ d&b&g&a \end{matrix}
\end{pmatrix}
$$

(76)

$$
V_{44} = \begin{pmatrix}
\begin{matrix} +i&k&n\\ +j&l&k\\ +j&n&m\\ +i&m&l \end{matrix} & & & \\
& \begin{matrix} +i&k&l\\ -i&n&k\\ -i&l&m\\ -j&k&l \end{matrix} & & \\
& & \begin{matrix} +i&k&l\\ -i&n&k\\ +j&n&k\\ +i&m&n \end{matrix} & \\
& & & \begin{matrix} +j&k&l\\ -j&n&k\\ +i&n&k\\ -i&k&l \end{matrix}
\end{pmatrix}
$$

The matrix [W] in equation 57 can be expressed by the following equation 77 to equation 81.

(77)

$$
W = \begin{pmatrix} W_{11} & W_{12} \\ W_{21} & W_{22} \end{pmatrix}
$$

(78)

$$
\left(\begin{matrix}
+&0&0&0&0&0&0&0&0&0&0&0&0&0&0&0&0&0&0&0&0&0&0&0&0&0&0&0&0&0&0&0\\
0&0&0&0&0&0&0&0&0&0&0&0&0&0&0&0&+&0&0&0&0&0&0&0&0&0&0&0&0&0&0&0\\
0&0&0&0&0&0&0&0&0&0&0&0&+&0&0&0&0&0&0&0&0&0&0&0&0&0&0&0&0&0&0&0\\
0&0&0&0&0&0&0&0&0&0&0&0&0&0&0&0&0&+&0&0&0&0&0&0&0&0&0&0&0&0&0&0
\end{matrix}\right.
$$

-continued $$
W_{11} = \begin{pmatrix}
0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 \\
0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 \\
0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 \\
0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0
\end{pmatrix}
$$

$$
W_{12} = \begin{pmatrix}
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
+ & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 \\
0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 \\
0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 \\
0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 \\
0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0
\end{pmatrix} \quad (79)
$$

-continued $$
W_{21} = \left(\begin{array}{*{32}{c}}
0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 \\
0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 \\
0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0. & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 \\
0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 \\
0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 \\
0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 \\
0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0
\end{array}\right) \quad (80)
$$

$$
W_{22} = \left(\begin{array}{*{32}{c}}
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 \\
0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 \\
0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 \\
0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 \\
0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 \\
0 & 0 & 0 & 0 & 0 & 0 & 0 & 0 & 0 & 0 & + & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & + & 0 & 0 & 0 & 0 & 0 & 0 & 0 & 0 & 0 & 0 & 0 & 0
\end{array}\right) \quad (81)
$$

As seen from equation 59 to equation 81 indicated above, a system computing the two-dimensional 8×8 DCT indicated in equation 57 is constituted by:

(1) a circuit which rearranges the input matrix data [X] in 64 words according to the matrix [Q];

(2) a circuit which performs the fourth order inner product computation (addition and subtraction) for the matrix [L] having coefficients comprising "+1" and "−1";

(3) a circuit which rearranges 64 words according to the matrix [R];

(4) a circuit which performs the eighth order inner product computation (addition and subtraction) for the matrix [TS] having coefficients comprising "0", "+1" and "−1";

(5) a circuit performing the fourth order inner product computation (including the multiplication) for the matrix [V] including the irrational numbers; and (6) a circuit which performs the rearrangement of 64 words according to the matrix [W].

($\frac{1}{8}$) in equation 58 shifts the data by 3 bits.

Similarly, a system for computing the two-dimensional 8×8 IDCT indicated in equation 58 is constituted by:

(1) a circuit which rearranges the input matrix data [Y] in 64 words according to the transposition matrix ${}^t$[W];

(2) a circuit performing the fourth order inner product computation (including the multiplication) according to the transposition matrix ${}^t$V] including the irrational numbers;

(3) a circuit which performs the eighth order inner product computation (addition and subtraction) according to the transposition matrix ${}^t$TS] having coefficients comprising "0", "+1", and "−1";

(4) a circuit which performs the rearrangement of 64 words according to the transposition matrix ${}^t$[R];

(5) a circuit which performs the computation of the fourth order inner product (addition and subtraction) according to the transposition matrix ${}^t$L] having coefficients comprising "+1" and "−1"; and (6) a circuit which performs the rearrangement of 64 words according to the transposition matrix ${}^t$Q].

($\frac{1}{8}$) in equation 57 shifts the data by 3 bits.

A system based on the above-mentioned concept will be described now in detail.

For the above-mentioned two-dimensional 4×8 DCT system, three aspects were mentioned. In the following illustration, the second aspect illustrated in FIG. 17 will be mentioned as an example.

Figure 31:
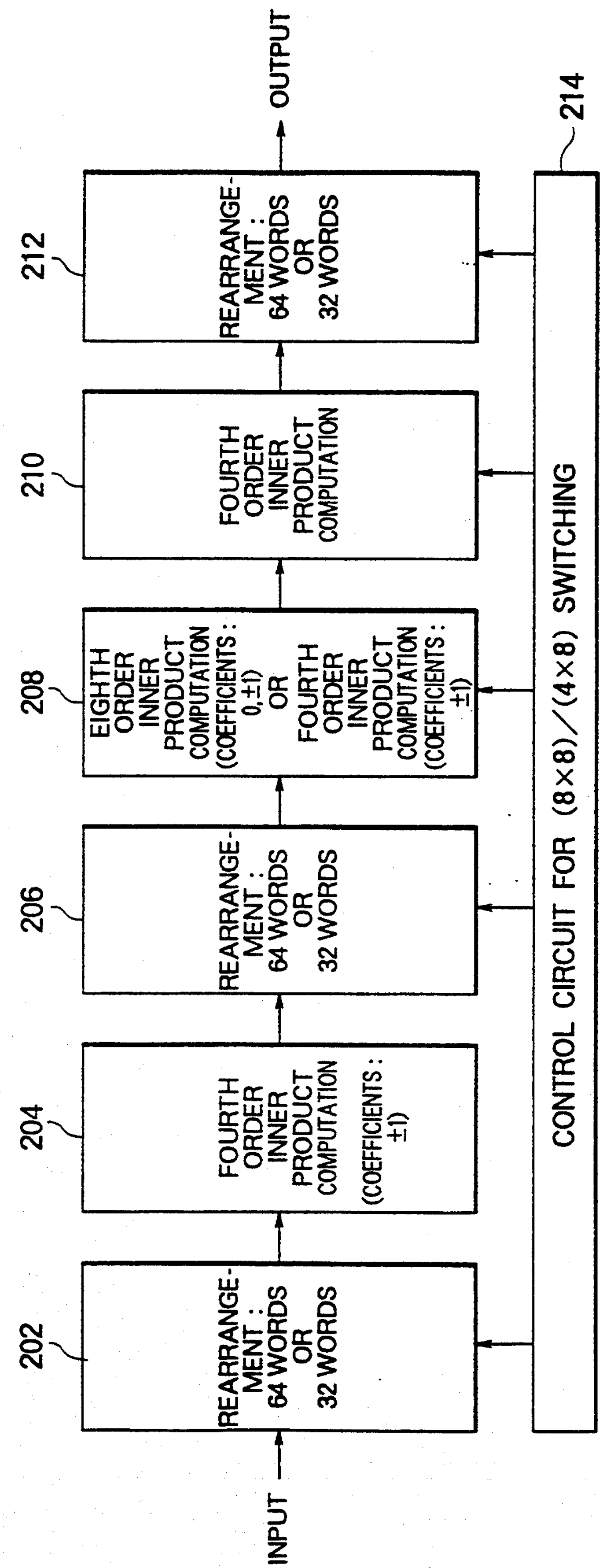
FIG. 31 is a structural view of a first aspect of an system which enables common use for both of the two-dimensional 4 row×8 column discrete cosine transformation and two-dimensional 8 row×8 column discrete cosine transformation as a sixth embodiment of the discrete cosine transformation system of the present invention.

FIG. 31 shows the structure of the common use discrete cosine transformation system.

This common-use type discrete cosine transformation system has a first rearrangement circuit 202; a first fourth-order inner product computation circuit 204; a second rearrangement circuit 206; an eighth-order/-fourth-order inner product computation circuit 208; a fourth order inner product computation circuit 210; a third rearrangement circuit 212; and a switch control circuit 214.

The first rearrangement circuit 202 is a rearrangement circuit which has a function of the rearrangement circuit of 32 words similar to the first rearrangement circuit 122 in the two-dimensional 4×8 DCT system shown in FIG. 17 and a function of the rearrangement circuit of 64 words in the two-dimensional 8×8 DCT system. The functions of the two rearrangement circuits are controlled by the switch control circuit 214.

The first fourth-order inner product computation circuit 204 is not selected by the two-dimensional 4×8 DCT and the two-dimensional 8×8 DCT, and thus it is commonly used. That is, in the computation of the matrix having coefficients comprising "+1" and "−1", in both of the two-dimensional 4×8 DCT and two-dimensional 8×8 DCT, the following 4×4 matrix is exhibited, and therefore it can be commonly used.

$$\begin{matrix} +1 & +1 & +1 & +1 \\ +1 & -1 & +1 & -1 \\ +1 & +1 & -1 & -1 \\ +1 & -1 & -1 & +1 \end{matrix}$$

The second rearrangement circuit 206 has the function of the rearrangement circuit of 32 words, the same as the second rearrangement circuit 126 shown in FIG. 17, and a function of the rearrangement circuit of 64 words of the two-dimensional 8×8 DCT, and selectively operates by a control signal from the switch control circuit 214.

The eighth-order/fourth-order inner product computation circuit 208 has a fourth order inner product computation circuit 128 for the two-dimensional 4×8 DCT shown in FIG. 17 and an eighth order inner product computation circuit for the two-dimensional 8×8 DCT. They selectively operate in accordance with a control signal from the switch control circuit 214.

The fourth order inner product computation circuit 210 has a function of the inner product computation circuit for two-dimensional 4×8 DCT, and the inner product computation circuit for two-dimensional 8×8 DCT.

The third rearrangement circuit 212 has functions of both of the third rearrangement circuit 132 shown in FIG. 17 and two-dimensional 8×8 DCT and selectively operates by a control signal from the switch control circuit 214.

A description will be now made of the computation mode in the case of use as a two-dimensional 4×8 DCT system.

When a control signal when used as the two-dimensional 4×8 DCT system from the switching control circuit 214, for example, the signal of logic "1", is output to the first rearrangement circuit 202, the second rearrangement circuit 206, the eighth-order/fourth-order inner product computation circuit 208, the fourth order inner product computation circuit 210, and the third rearrangement circuit 212, in these circuits, a circuit exhibiting the function of the above-mentioned two-dimensional 4×8 DCT is selected. The first fourth order inner product computation circuit 204 is not selected since it is used both for the two-dimensional 4×8 DCT and the two-dimensional 8×8 DCT.

The computation of the two-dimensional 4×8 DCT is conducted by the above selection.

When it is used as a two-dimensional 8×8 DCT, the normal signal of the logic "0" is output from the switching control circuit 214 to the first rearrangement circuit 202, the second rearrangement circuit 206, the eighth-order/fourth-order inner product computation circuit 208, the fourth order inner product computation circuit 210, and the third rearrangement circuit 212, and the computation of the two-dimensional 8×8 DCT is conducted in these circuits.

As mentioned above, it is possible to constitute the first rearrangement circuit 202, the second rearrangement circuit 206, and the third rearrangement circuit 212 by using for example a random access memory (RAM), and therefore the switching in the first rearrangement circuit 202 between the purpose for the two-dimensional 4×8 DCT and the purpose for the two-dimensional 8×8 DCT depends upon only the difference of the order of rearrangement, and it is merely a difference of the method of use of the RAM, that is, the difference of the address control method, and thus problems due to the common use for the two-dimensional 4×8 DCT and two-dimensional 8×8 DCT, for example, the circuit scale becoming big and the control becoming very complex, do not occur.

The eighth-order/fourth-order inner product computation circuit can perform the calculation in for example the eighth order inner product computation circuit of FIG. 10. Namely, it performs the calculation by the above-mentioned eighth order inner product computation circuit by a control signal from the switching control circuit 214 when it is made to function as the two-dimensional 8×8 DCT, that is, made to perform the eighth order inner product computation. It is clear that the calculation of the eighth order inner product computation can be performed by the eighth order inner product computation circuit. When it is made to function as a two-dimensional 4×8 DCT, that is, when made to perform the fourth order inner product computation, the calculation is made by the above-mentioned eighth order inner product computation circuit by a control signal from the switching control circuit 214. So as to perform the calculation of the fourth order inner product computation in the eighth order inner product computation circuit, the following may be carried out. When four among eight circuits (91 to 92) arranged in parallel in FIG. 10 are utilized, and the remaining four are not used, the operation of the fourth order inner product computation can be carried out by the circuit of FIG. 10. The first fourth-order inner product computation circuit 204 is common to the two-dimensional 4×8 DCT and two-dimensional 8×8 DCT. Accordingly, the circuit structure using the system both as the two-dimensional 4×8 DCT and two-dimensional 8×8 DCT becomes a very simple circuit structure compared with a case where the two-dimensional 4×8 DCT system and the two-dimensional 8×8 DCT system are arranged in parallel and are switched.

Especially, as illustrated in FIG. 17, the two-dimensional 4×8 DCT system simplifies the circuit structure by reducing the number of the multiplier circuits. Accordingly, the circuit structure of the common-use discrete cosine inverse transformation system illustrated in FIG. 31 does not become complex.

FIG. 22 shows the circuit structure of the common-use discrete cosine inverse transformation system.

Also in this common-use discrete cosine inverse transformation system, a two-dimensional 4×8 IDCT system illustrated in FIG. 18 is exemplified as the two-dimensional 4×8 IDCT system.

Figure 32:
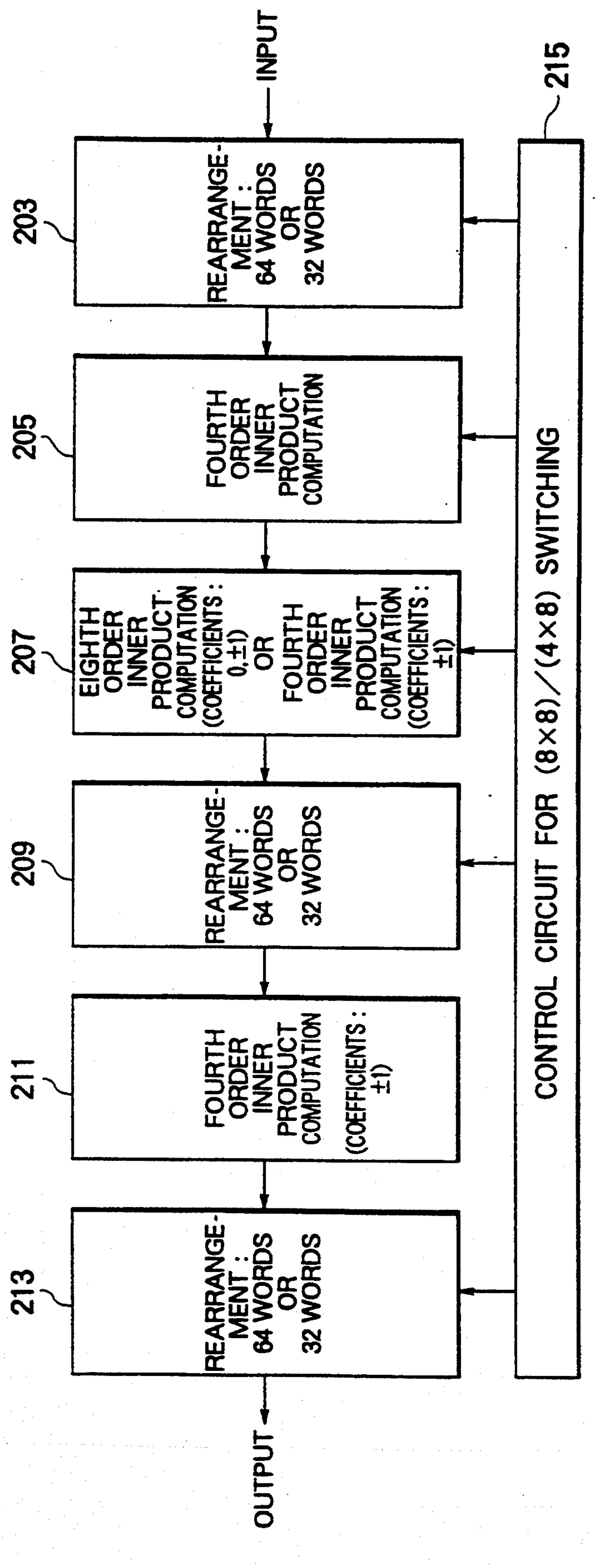
FIG. 32 is a structural view of the first aspect of an system which enables common use for both of the two-dimensional 4 row×8 column discrete cosine inverse transformation and two-dimensional 8 row×8 column discrete cosine inverse transformation as a sixth embodiment of the discrete cosine inverse transformation system of the present invention.

The common-use type discrete cosine inverse transformation system shown in FIG. 32 has a first rearrangement circuit 203 which has the function of the rearrangement circuit of 32 words for the two-dimensional 4×8 IDCT shown in FIG. 18 and the function of the rearrangement circuit for the two-dimensional 8×8 IDCT; a fourth order inner product computation circuit 205; an eighth-order/fourth-order inner product computation circuit 207; a second rearrangement circuit 209 which has the function of the rearrangement circuit 129 of 32 words for the two-dimensional 8×8 IDCT shown in FIG. 18 and the function of the rearrangement circuit for the two-dimensional 8×8 IDCT; a fourth order inner product computation circuit 211; a third rearrangement circuit 213 which has the function of the rearrangement circuit 133 of 32 words shown in FIG. 18 and the function of the rearrangement circuit for the two-dimensional 8×8 IDCT; and a switching control circuit 215.

The operation of this common-use type discrete cosine inverse transformation system is similar to that of the common-use type discrete cosine transformation system illustrated in FIG. 31, and therefore a detailed description thereof will be omitted.

Figure 33:
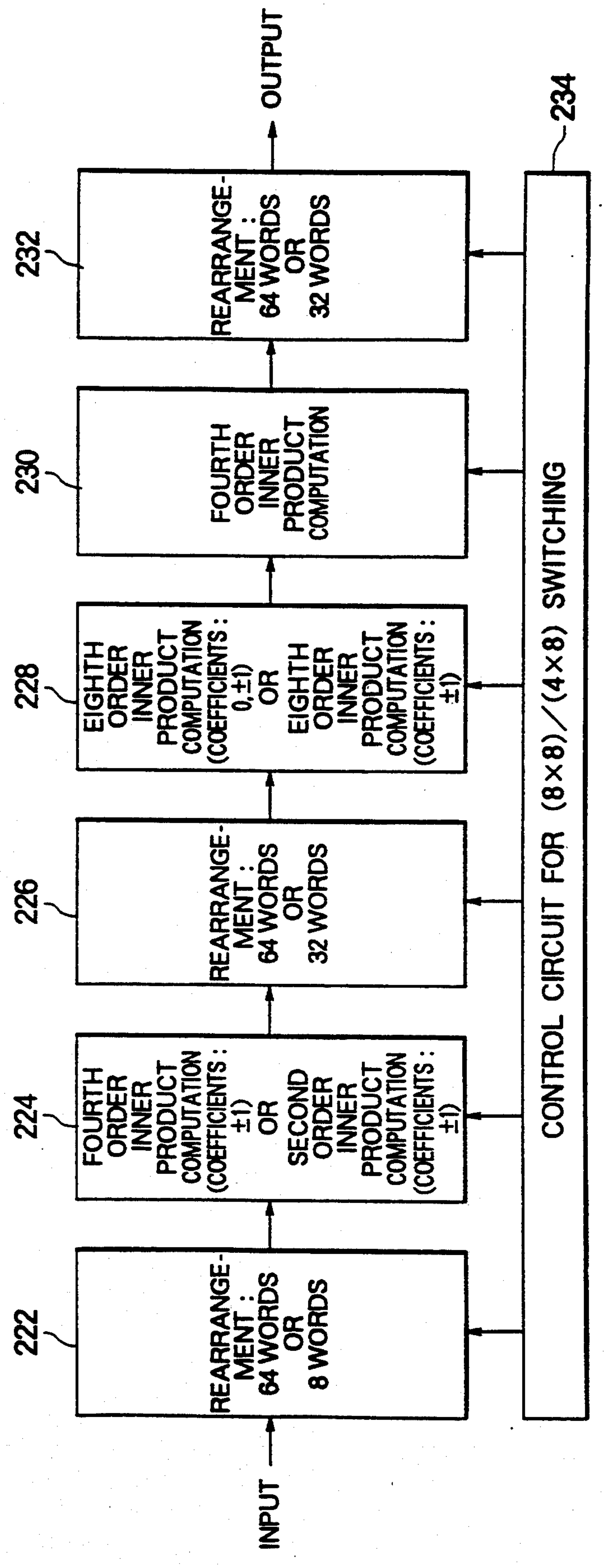
FIG. 33 is a structural view of a second aspect of an system which enables common use for both of the two-dimensional 4 row×8 column discrete cosine transformation and two-dimensional 8 row×8 column discrete cosine transformation as a seventh embodiment of the discrete cosine transformation system of the present invention.

FIG. 33 shows the structure of the second aspect of the common-use type discrete cosine transformation system.

As the two-dimensional 4×8 DCT system in this system, a system illustrated in FIG. 5 will be exemplified.

This common-use type discrete cosine transformation system system has a first rearrangement circuit 222; a fourth-order/second-order inner product computation circuit 224; a second rearrangement circuit 226; an eighth-order/eighth-order inner product computation circuit 228; a fourth order inner product computation circuit 230; a third rearrangement circuit 232; and a switching control circuit 234.

The first rearrangement circuit 222 is a rearrangement circuit which has a function of the rearrangement circuit of 8 words similar to the first rearrangement circuit 2 in the two-dimensional 4×8 DCT system shown in FIG. 5 and the function of the rearrangement circuit of 64 words in the two-dimensional 8×8 DCT system. The functions of the two rearrangement circuits are controlled by the switching control circuit 234.

The fourth-order/second-order inner product computation circuit 224 has the functions of both of the second order inner product computation circuit 4 for the two-dimensional 4×8 DCT shown in FIG. 5 and the fourth order inner product computation circuit for the two-dimensional 8×8 DCT.

The second rearrangement circuit 226 has the functions of both of the second rearrangement circuit 6 for two-dimensional 4×8 DCT shown in FIG. 5 and the rearrangement circuit for two-dimensional 8×8 DCT.

The eighth-order/eighth-order inner product computation circuit 228 has the functions of both of the eighth order inner product computation circuit 8 for two-dimensional 4×8 DCT shown in FIG. 5 and eighth order inner product computation circuit for two-dimensional 8×8 DCT.

Also the fourth order inner product computation circuit 230 has the functions of the two.

The above-mentioned commonly used circuit is selectively driven in response to the control signal from the switching control circuit 234 and performs the selected discrete cosine transformation.

Figure 34:
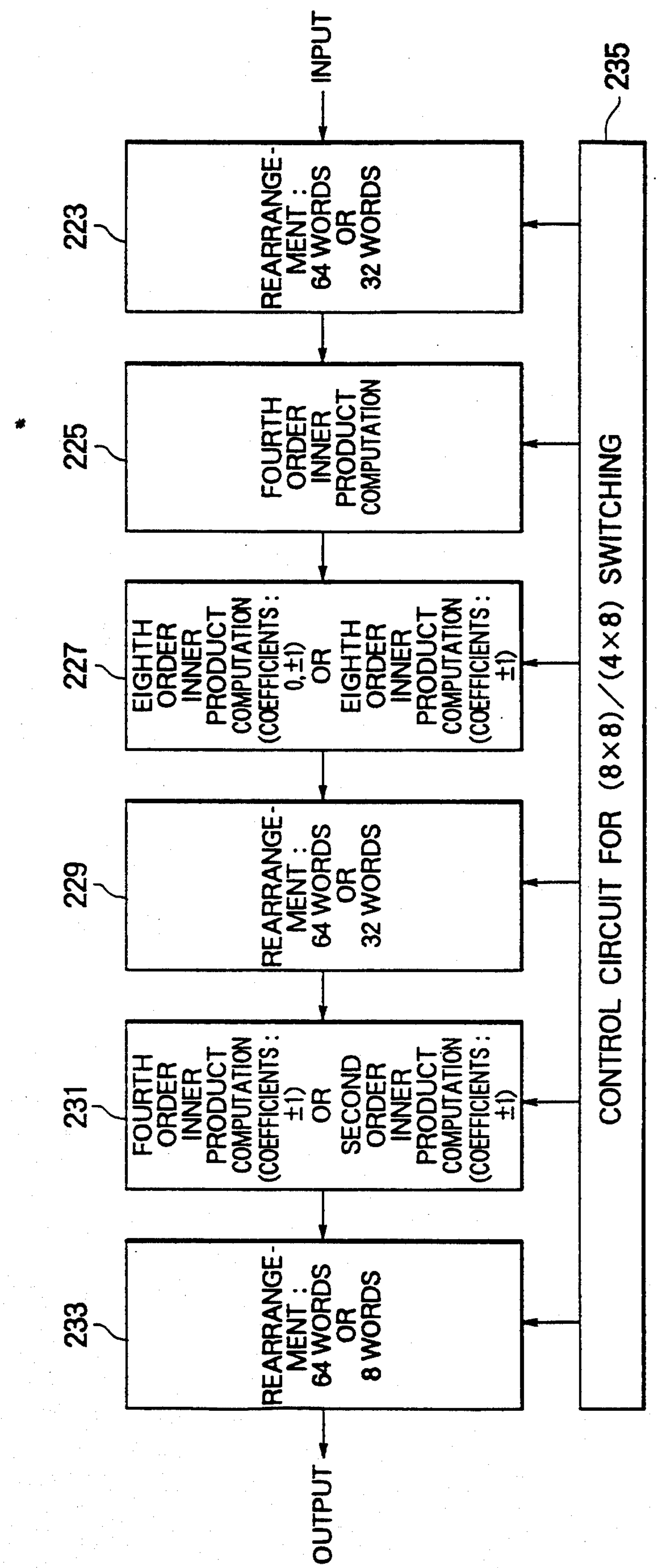
FIG. 34 is a structural view of the second aspect of an system which enables common use for both of the two-dimensional 4 row×8 column discrete cosine inverse transformation and two-dimensional 8 row×8 column discrete cosine inverse transformation as a seventh embodiment of the discrete cosine inverse transformation system of the present invention.

FIG. 34 shows the circuit structure of the common-use discrete cosine inverse transformation system.

Also in this common-use discrete cosine inverse transformation system, a two-dimensional 4×8 IDCT system illustrated in FIG. 6 is exemplified as the two-dimensional 4×8 IDCT system.

The common-use type discrete cosine inverse transformation system shown in FIG. 34 has a first rearrangement circuit 223 which has the function of the rearrangement circuit 3 of 32 words for the two-dimensional 4×8 IDCT shown in FIG. 6 and the function of the rearrangement circuit for the two-dimensional 8×8 IDCT; a fourth order inner product computation circuit 225; an eighth-order/eighth-order inner product computation circuit 227; a second rearrangement circuit 229 which has the function of the rearrangement circuit 9 of 32 words for the two-dimensional 4×8 IDCT shown in FIG. 6 and the function of the rearrangement circuit for the two-dimensional 8×8 IDCT; a fourth-order/second-order inner product computation circuit 231; a third rearrangement circuit 233 which has the function of the rearrangement circuit 13 of 8 words and the function of the rearrangement circuit for the two-dimensional 8×8 IDCT; and a switching control circuit 235.

The operation of this common-use type discrete cosine inverse transformation system is similar to that of the commonly used type discrete cosine transformation system illustrated in FIG. 33, and therefore a detailed description thereof will be omitted.

Accordingly, the system used for both of the two-dimensional 8×8 discrete cosine transformation and two-dimensional 4×8 discrete cosine transformation of the present invention provides (1) a first fourth-order inner product computation circuit having coefficients comprising "+1" and "−1", (2) a second inner product computation circuit performing the calculation of either of:

(a) an eighth order inner product computation with coefficients comprising "0", "+1" and "−1", or (b) a fourth order inner product computation with coefficients of "+1" and "−1", (3) a third fourth-order inner product computation circuit performing the inner product computation with a specific constant selected by a control signal from the switching control circuit, first rearrangement circuit performing the rearrangement of the data of 64 words at largest in the rearrangement order determined by the control signal from the switching control circuit, (5) a second rearrangement circuit performing the rearrangement of the data of 64 words at largest in the rearrangement order determined by a control signal from the switching control circuit, and (6) a third rearrangement circuit performing the rearrangement of the data of 64 words at largest in the rearrangement order determined by the control signal from the switching control circuit;

(7) the input data are fed via the above-described first rearrangement circuit to the above-described first inner product computation circuit;

(8) the output data of the related first inner product computation circuit are fed via the above-described second rearrangement circuit to the above-described second inner product computation circuit; and (9) the output data of the related second inner product computation circuit are fed directly to the above-described third inner product computation circuit and, at the same time,

(10) the output data of the related third inner product computation circuit are guided out via the above-described third rearrangement circuit, and either of the two-dimensional 8×8 discrete cosine transformation or two-dimensional 4×8 discrete cosine transformation is carried out by a signal from the switching control circuit.

Also, the two-dimensional 8×8 discrete cosine inverse transformation and two-dimensional 8×8 discrete cosine inverse transformation systems of the present invention are characterized in that provision is made of a first fourth-order inner product computation circuit performing the inner product computation with a specific constant selected by the control signal from the switching control circuit;

a second inner product computation circuit performing the calculation of either of the eighth order inner product computation with the coefficients comprising "0", "+1", and "−1" or the eighth order inner product computation with the coefficients comprising "+1" and "−1" by the control signal from the switching control circuit;

a third fourth-order inner product computation circuit with the coefficients comprising "+1" and "−1"; a first rearrangement circuit performing the rearrangement of the data of 64 words at the largest, which performs the rearrangement in the rearrangement order determined by the control signal from the control circuit;

a second rearrangement circuit performing the rearrangement of the data of 64 words at the largest, which performs the rearrangement in the rearrangement order determined by the control signal from the control circuit; and a third rearrangement circuit performing the rearrangement of the data of 64 words at the largest, which performs the rearrangement in the rearrangement order determined by the control signal from the control circuit, wherein the input data are fed via the above-described first rearrangement circuit to the above-described first inner product computation circuit;

the output data of the related first inner product computation circuit are fed directly to the above-described second inner product computation circuit and, at the same time, the output data of the related second inner product computation circuit are fed via the above-described second rearrangement circuit to the above-described third inner product computation circuit; and the output data of the related third inner product computation circuit are guided out via the above-described third rearrangement circuit, and consequently the calculation of either of the two-dimensional 8×8 inverse discrete cosine transformation or two-dimensional 4×8 inverse discrete cosine transformation is carried out according to a signal from the switching control circuit.

Further, the two-dimensional 8×8 discrete cosine transformation and two-dimensional 4×8 discrete cosine transformation systems of the present invention are characterized in that provision is made of a first inner product computation circuit which performs the calculation of either of the fourth order inner product computation with coefficients comprising "+1" and "−1" or the second order inner product computation circuit with the coefficients comprising "+1" and "−1" by a control signal from the switching control circuit;

a second inner product computation circuit which performs the calculation of either of the eighth order inner product computation with coefficients comprising "0", "+1", and "−1" or the eighth order inner product computation with the coefficients comprising "+1" and "−1" by the control signal from the switching control circuit;

a fourth order third inner product computation circuit performing the inner product computation with the specific constant selected by the control signal from the switching control circuit;

a first rearrangement circuit performing the rearrangement of the data of 64 words at the largest, which performs the rearrangement in the rearrangement order determined by the control signal from the switching control circuit;

a second rearrangement circuit performing the rearrangement of the data of 64 words at the largest, which performs the rearrangement in the rearrangement order determined by the control signal from the switching control circuit; and a third rearrangement circuit performing the rearrangement of the data of 64 words at the largest, which performs the rearrangement in the rearrangement order determined by the control signal from the switching control circuit, wherein the input data are fed via the above-described first rearrangement circuit to the above-described first inner product computation circuit;

the output data of the related first inner product computation circuit are fed via the above-described second rearrangement circuit to the above-described second inner product computation circuit;

the output data of the related second inner product computation circuit are fed directly to the above-described third inner product computation circuit and, at the same time, the output data of the related third inner product computation circuit are guided out via the above-described third rearrangement circuit, and therefore, the calculation of either of the two-dimensional 8×8 discrete cosine transformation or two-dimensional 4×8 discrete cosine transformation is carried out according to a signal from the switching control circuit.

Also, the two-dimensional 8×8 discrete cosine inverse transformation and two-dimensional 4×8 inverse discrete cosine transformation systems of the present invention are characterized in that provision is made of a fourth order first inner product computation circuit performing the inner product computation with a specific constant selected by a control signal from the switching control circuit;

a second inner product computation circuit performing the calculation of either of the eighth order inner product computation with the coefficients comprising "0", "+1", and "−1" or the eighth order inner product computation with the coefficients comprising "+1" and "−1" by the control signal from the switching control circuit;

a third inner product computation circuit which performs the calculation of either of the fourth order inner product computation with the coefficients comprising "+1" and "−1" or the second order inner product computation with the coefficients comprising "+1" and "−1" by the control signal from the switching control circuit;

a first rearrangement circuit performing the rearrangement of the data of 64 words at the largest, which performs the rearrangement in the rearrangement order determined by a control signal from the switching control circuit;

a second rearrangement circuit performing the rearrangement of the data of 64 words at the largest, which performs the rearrangement in the rearrangement order determined by a control signal from the switching control circuit; and a third rearrangement circuit performing the rearrangement of the data of 64 words at the largest, which performs the rearrangement in the rearrangement order determined by a control signal from the switching control circuit, wherein the input data are fed via the above-described first rearrangement circuit to the above-described first inner product computation circuit;

the output data of the related first inner product computation circuit are fed directly to the above-described second inner product computation circuit and, at the same time, the output data of the related second inner product computation circuit are fed via the above-described second rearrangement circuit to the above-described third inner product computation circuit; and the output data of the related third inner product computation circuit are guided out via the above-described third rearrangement circuit, and the calculation of either of the two-dimensional 8×8 inverse discrete cosine transformation or two-dimensional 4×8 inverse discrete cosine transformation is carried out according to a signal from the switching control circuit.

The circuit structure for improving the speed of operation of the common-use type discrete cosine transformation system and the circuit structure of the common-use discrete cosine inverse transformation system of the present invention mentioned above will be described.

The present invention provides a circuit which can calculate either of the two-dimensional 8×8 DCT or two-dimensional 4×8 DCT by a signal from the control circuit corresponding to the high speed data rate by providing four circuits indicated in the above-described common-use type discrete cosine transformation system in parallel.

Also, the present invention provides a circuit which can calculate either of the two-dimensional 8×8 IDCT or two-dimensional 4×8 IDCT by a signal from the control circuit corresponding to the high speed data rate by providing four circuits used for both of the two-dimensional 8×8 IDCT and two-dimensional 4×8 IDCT indicated in the above-described common-use type discrete cosine inverse transformation system in parallel.

Figure 35:
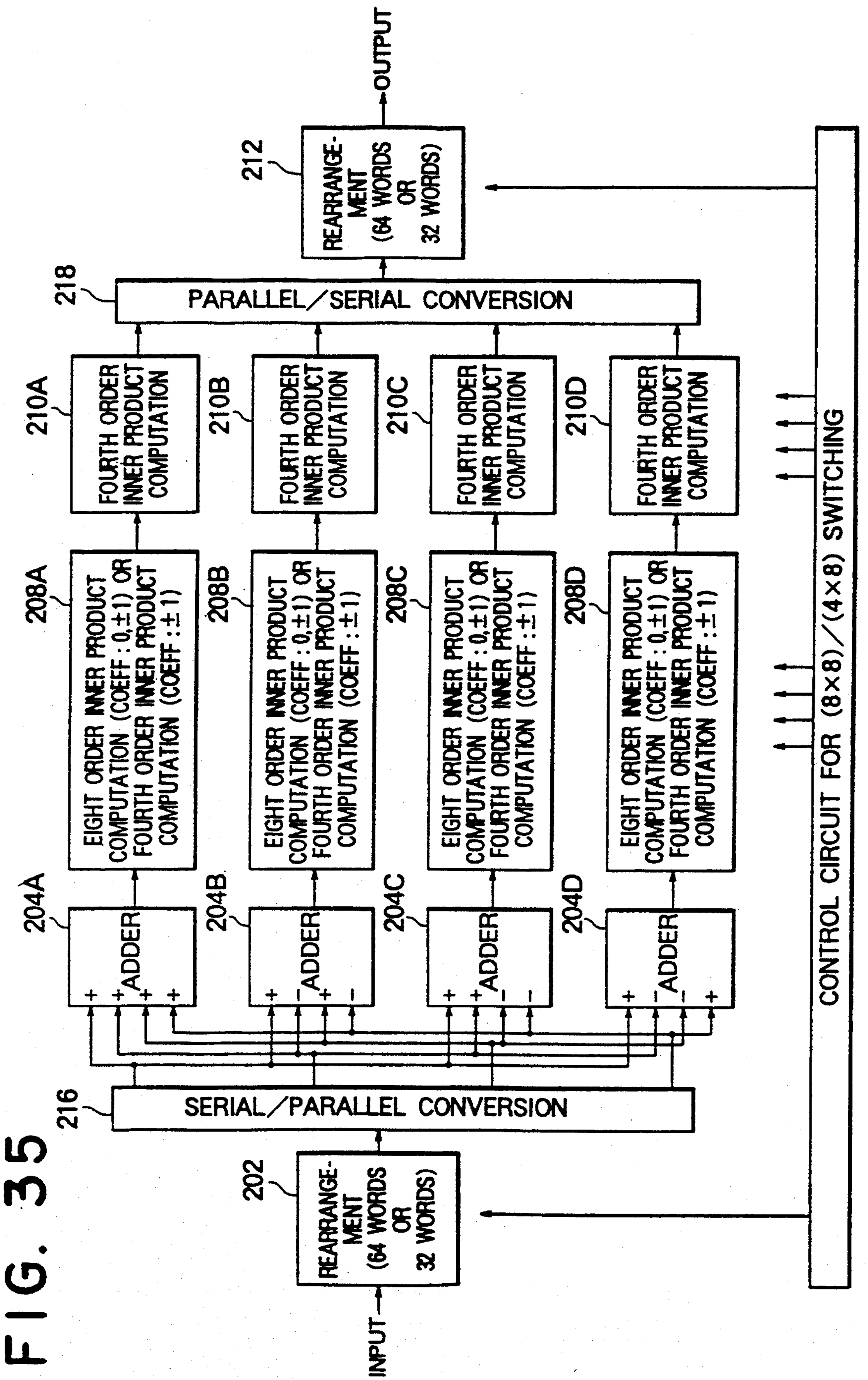
FIG. 35 is a structural view of the circuit achieving an increase of speed of the transformation system shown in FIG. 31.

FIG. 35 shows the circuit structure for improving the speed of computation of the common-use type discrete cosine transformation system shown in FIG. 31.

This speed-up common-use type discrete cosine transformation system is constituted so that circuits between the serial to parallel converter 216 and the parallel to serial converter 218, that is, the first fourth order inner product computation circuit 204, the eighth-order/fourth-order inner product computation circuit 208, and the fourth order inner product computation circuit 210 shown in FIG. 31 are divided into four systems, i.e., the 4-input adder circuits 204A to 204D, eighth-order/fourth-order inner product computation circuits 208A to 208D, and fourth order inner product computation circuits 210A to 210D, respectively, to enable parallel computation. The first rearrangement circuit 202 and the third rearrangement circuit 212 are similar to those in FIG. 31.

Also, in the second rearrangement circuit 206 and first fourth order inner product computation circuit 204 shown in FIG. 31, based on the above-mentioned speed up procedure, the first fourth-order inner product computation circuit 204 becomes the 4-input adder circuits 204A to 204D and the second rearrangement circuit 206 is eliminated.

Figure 36:
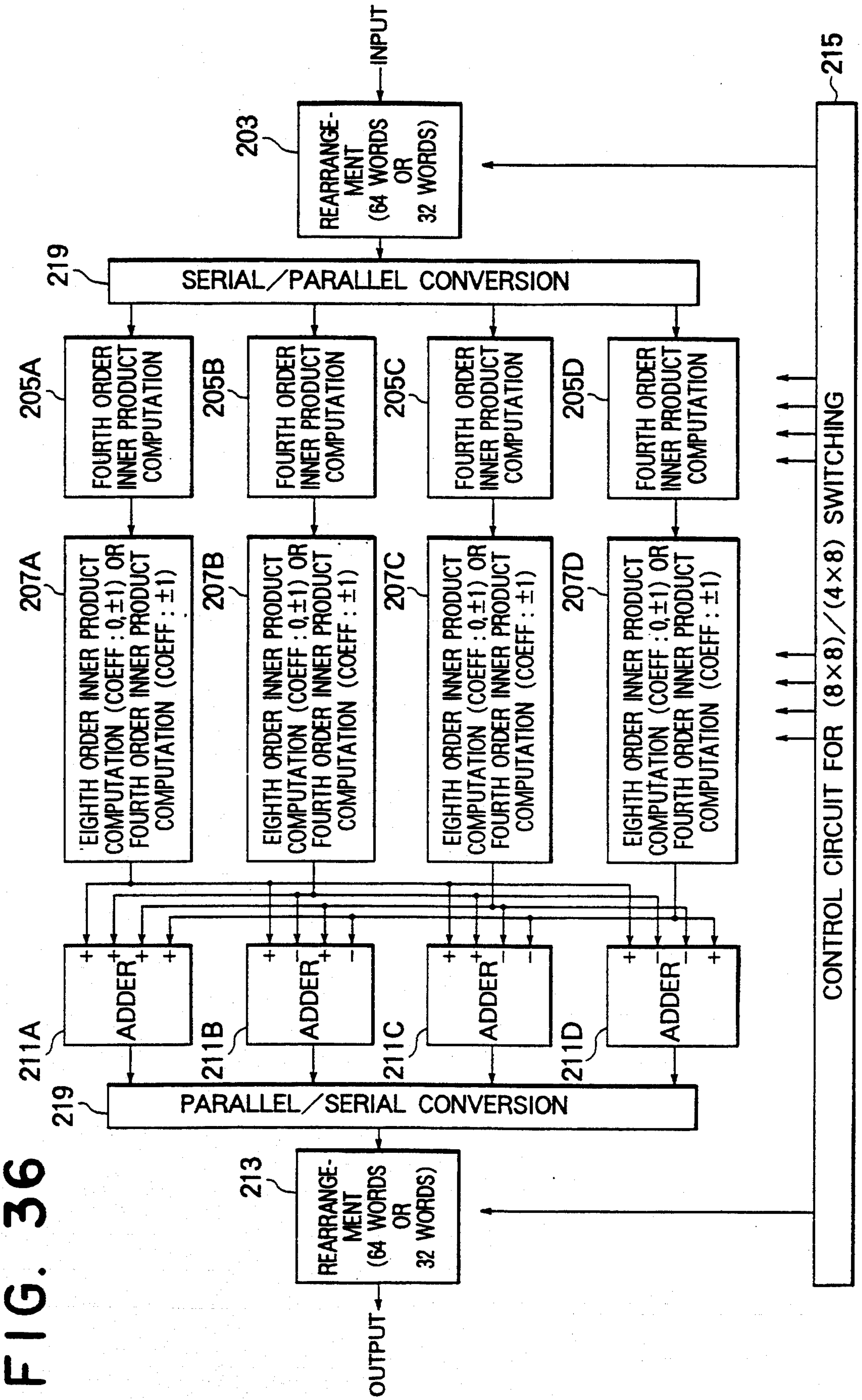
FIG. 36 is a structural view of the circuit achieving an increase of speed of the inverse transformation system shown in FIG. 32.

FIG. 36 shows a circuit structure for improving the speed of the common-use type discrete cosine inverse transformation system shown in FIG. 32.

This system has a first rearrangement circuit 203; a serial to parallel converter 217; four fourth-order inner product computation circuits 205A to 205D; four eighth-order/fourth-order inner product computation circuits 207A to 207D; four 4-input adder circuits 211A to 211D; a parallel-serial converter 219; a second rearrangement circuit 213; and a switching control circuit 215.

A procedure enabling high speed operation by replacing the fourth order inner product computation circuit 205, the eighth-order/fourth-order inner product computation circuit 207, and the fourth order inner product computation circuit 211 shown in FIG. 32 by the four 4-input fourth order inner product computation circuits 205A to 205D, four eighth-order/fourth-order inner product computation circuits 207A to 207D, and the four 4-input adder circuits 211A to 211D is similar to that of FIG. 35.

Also for the systems shown in FIG. 33 and FIG. 34, a plurality of series of circuits are provided similar to the above description to enable a high speed operation.

As mentioned above, this speed-up circuit can achieve an improvement of speed almost 4 times higher than the systems shown in FIG. 31 to FIG. 34.

A description was made above of the embodiments of the present invention, but the present invention is not restricted to the above-mentioned examples and be modified in various ways.

For example, of course not only can the second order inner product computation circuit shown in FIG. 7 and FIG. 8 be applied to the two-dimensional 4×8 DCT system and two-dimensional 4×8 IDCT system shown in FIG. 5 and FIG. 6, FIG. 15 and FIG. 16, FIG. 17 and FIG. 18, FIG. 19 and FIG. 20, FIG. 21 and FIG. 22, and FIG. 23 and FIG. 24, but they can also be applied to the two-dimensional 4×8 DCT system and two-dimensional 4×8 IDCT system shown in FIG. 25 to FIG. 30, and further can be applied to the systems shown in FIG. 31 to FIG. 36. The second order inner product computation circuit shown in FIG. 7 and FIG. 8 can be made to have a further generalized circuit structure and can be applied to various systems.

Such an application is similarly carried out also for the eighth order inner product computation circuit shown in FIG. 9 and FIG. 10, the fourth order inner product computation circuit shown in FIG. 11 and FIG. 12, and the inner product computation circuit shown in FIG. 13 and FIG. 14.

As mentioned above, according to the present invention, a two-dimensional 4 row×8 column discrete cosine transformation system having a simple circuit structure can be provided. Also, according to the present invention, this system can be made to operate at a higher speed.

Similarly, according to the present invention, a two-dimensional 4 row×8 column discrete cosine inverse transformation system having a simple circuit structure can be provided. Also, according to the present invention, this system can be made to operate at a higher speed.

According to the present invention, a two-dimensional4 row×4 column discrete cosine transformation system having a simple circuit structure can be provided. Also, according to the present invention, this system can be made to operate at a higher speed.

Similarly, according to the present invention, a two-dimensional 4row×4 column discrete cosine inverse transformation system having a simple circuit structure can be provided. Also, according to the present invention, this system can be made to operate at a higher speed.

Further, according to the present invention, an system which can be used for both of the two-dimensional 4 row×8 column discrete cosine transformation and two-dimensional 8 row×8 column discrete cosine transformation can be provided. Also, according to the present invention, this system can be made to operate at a higher speed.

Similarly, according to the present invention, an system which can be used for both of the two-dimensional 4 row×8 column discrete cosine inverse transformation and two-dimensional 8 row×8 column discrete cosine inverse transformation can be provided. Also, according to the present invention, this system can be made to operate at a higher speed.

Many widely different embodiments of the present invention may be constructed without departing from the spirit and scope of the present invention, and it should be understood that the present invention is not restricted to the specific embodiments described above.

What is claim is:

1. A discrete cosine transformation system comprising transforming means for performing a two-dimensional 4-row×8 column discrete cosine transformation of binary data in a matrix form, in accordance with the following formula:

$$DCT{:}\vec{C}(\ddagger)\ [W][V][T][R][L][Q]\vec{X}$$

where, $\vec{X}$ denotes matrix data to be subjected to the discrete cosine transformation and is defined as follows:

$\vec{X}=X_k(k=0\sim7,\ 10\sim17,\ 20\sim27,\ 30\sim37)$, or Xij $(i=0\sim3, j=0\sim7)$ $$\vec{X}=\begin{bmatrix} x00 \\ x01 \\ x02 \\ \cdot \\ \cdot \\ \cdot \\ x07 \\ x10 \\ x11 \\ x12 \\ \cdot \\ \cdot \\ x30 \\ \cdot \\ \cdot \\ \cdot \\ x36 \\ x37 \end{bmatrix}$$

C denotes matrix data obtained by the discrete cosine transformation and is defined as follows:

$\vec{C}=C_k(k=0\sim7,\ 10\sim17,\ 20\sim27,\ 30\sim37)$, or $C_{ij}$- $(i=0\sim3, j=0\sim7)$ $$\vec{C}=\begin{bmatrix} c00 \\ c01 \\ c02 \\ \cdot \\ \cdot \\ \cdot \\ c07 \\ c10 \\ c11 \\ c12 \\ \cdot \\ \cdot \\ c30 \\ \cdot \\ \cdot \\ \cdot \\ c36 \\ c37 \end{bmatrix}$$

[Q] denotes first 32×32 constant matrix data, defined as follows:

$[Q]=Q_{ij}(i=0\sim31, j=0\sim31)$ $$[Q]=\begin{bmatrix}
\begin{matrix}10000000\\00000001\\01000000\\00000010\\00100000\\00000100\\00010000\\00001000\end{matrix} & & & O \\
& \begin{matrix}10000000\\00000001\\01000000\\00000010\\00100000\\00000100\\00010000\\00001000\end{matrix} & & \\
& & \begin{matrix}10000000\\00000001\\01000000\\00000010\\00100000\\00000100\\00010000\\00001000\end{matrix} & \\
O & & & \begin{matrix}10000000\\00000001\\01000000\\00000010\\00100000\\00000100\\00010000\\00001000\end{matrix}
\end{bmatrix}$$

[L] denotes second 32×32 constant matrix data, defined as follows:

$[L]=L_{ij}(i=0\sim31, j=0\sim31)$ $[L]=$

-continued

```
++
+−
  ++
  +−
    ++
    +−
      ++
      +−
        ++
        +−                     O
          ++
          +−
            ++
            +−
              ++
              +−

                ++
                +−
                  ++
                  +−
                    ++
                    +−
                      ++
        O             +−
                        ++
                        +−
                          ++
                          +−
                            ++
                            +−
                              ++
                              +−
```

[R] denotes third 32×32 constant matrix data, defined as follows:

$[R]=R_{ij}(i=0\sim31, j=0\sim31)$

[R] =

```
10000000 00000000 00000000 00000000
00000000 00000000 00000000 00000010
00000000 10000000 00000000 00000000
00000000 00000000 00000010 00000000
00000000 00000000 10000000 00000000
00000000 00000010 00000000 00000000
00000000 00000000 00000000 10000000
00000010 00000000 00000000 00000000

00100000 00000000 00000000 00000000
00000000 00000000 00000000 00001000
00000000 00100000 00000000 00000000
00000000 00000000 00001000 00000000
00000000 00000000 00100000 00000000
00000000 00001000 00000000 00000000
00000000 00000000 00000000 00100000
00001000 00000000 00000000 00000000

00000001 00000000 00000000 00000000
00000000 00000000 00000000 01000010
00000000 00000001 00000000 00000000
00000000 00000000 01000000 00000000
00000000 00000000 00000001 00000000
00000000 01000000 00000000 00000000
00000000 00000000 00000000 00000001
01000000 00000000 00000000 00000000

00000100 00000000 00000000 00000000
00000000 00000000 00000000 00010000
00000000 00000100 00000000 00000000
00000000 00000000 00010000 00000000
00000000 00000000 00000100 00000000
00000000 00010000 00000000 00000000
00000000 00000000 00000000 00000100
00010000 00000000 00000000 00000000
```

[T] denotes fourth 32×32 constant matrix data, defined as follows:

$[T]=T_{ij}(i=0\sim31, j=0\sim31)$ (T) =

```
1 1 1 1 1 1 1 1  0 0 0 0 0 0 0 0
0 0 0 0 0 0 0 0  1 1  1 1 1 1 1
1 1 − − − − 1 1  0 0 0 0 0 0 0 0
0 0 0 0 0 0 0 0  1 1 − − − − 1 1
1 1 0 0 0 0 − −  0 0 1 1 − − 0 0
0 0 − − 1 1 0 0  1 1 0 0 0 0 − −
1 1 0 0 0 0 − −  0 0 − − 1 1 0 0
0 0 1 1 − − 0 0  1 1 0 0 0 0 − −          O

1 −1 −0 0 0 0  1 −1 −0 0 0 0
0 0 0 0 1 −1 −  0 0 0 0 1 −1 −
1 −0 0 1 −0 0  0 0 −1 0 0 −1
0 0 1 −0 0 1 −  −1 0 0 −1 0 0
1 −0 0 −1 0 0  −1 0 0 1 −0 0
0 0 1 −0 0 −1  0 0 −1 0 0 1 −
1 − −1 0 0 0 0  0 0 0 0 −1 1 −
0 0 0 0 1 − −1  −1 1 −0 0 0 0

                 0 0 0 0 0 0 0 0  1 1 1 1 1 1 1 1
                 −1 −1 −1 −1  0 0 0 0 0 0 0 0
                 1 1 1 1 1 1 1 1  0 0 0 0 0 0 0 0
                 0 0 0 0 0 0 0 0  1 −1 −1 −1 −
                 −0 0 −0 1 1 0  0 1 0 0 1 0 − −
                 −1 0 −0 0 1 0  0 −1 0 −0 0 1
                 − −0 1 0 0 1 1  0 0 0 −0 1 −0
                 −0 0 1 0 −1 0  0 1 1 0 −0 0 −

        O        1 0 0 −0 1 −0  0 1 1 0 −0 0 −
                 − −0 1 0 0 1 −  0 0 0 1 0 −1 0
                 1 0 0 1 0 − −0  1 0 0 1 0 − −0
                 −1 0 −0 0 1 0  0 1 −0 1 0 0 −
                 0 0 0 0 0 0 0 0  1 1 − − − − 1 1
                 −1 1 −1 − −1  0 0 0 0 0 0 0 0
                 1 1 − − − − 1 1  0 0 0 0 0 0 0 0
                 0 0 0 0 0 0 0 0  1 − −1 −1 1 −
```

=

```
| ᵗT1  O   |
| O    ᵗT1 |
```

[V] denotes fifth 32×32 constant matrix data including irrational numbers, defined as follows:

$[V]=V_{ij}(i=0\sim31, j=0\sim31)$

```
      | + + 0 0
      | + − 0 0
      | 0 0 + +
      | 0 0 + −
      |         +0 i i
      |         +0 j j
      |         0 −i j
      |         0 +i j
      |                k k l l
      |                n n k k                 O
      |                k m l n
      |                n l k m
      |                        k k l l
      |                        n n k k
      |                        l n k m
[V] = |                        k m n l
```

-continued $$
\left|\begin{array}{cccccccccccccccc}
a & c & b & h & & & & & & & & & & & & \\
f & a & d & g & & & & & & & & & & & & \\
g & h & a & b & & & & & & & & & & & & \\
d & b & g & a & & & & & & & & & & & & \\
 & & & & a & h & c & b & & & & & & & & \\
 & & & & f & g & a & d & & & & & & & & \\
 & & & & g & b & h & a & & & & & & & & \\
O & & & & d & a & b & g & & & & & & & & \\
 & & & & & & & & a & d & c & b & & & & \\
 & & & & & & & & f & c & a & d & & & & \\
 & & & & & & & & g & f & h & a & & & & \\
 & & & & & & & & h & a & f & c & & & & \\
 & & & & & & & & & & & & a & c & b & h \\
 & & & & & & & & & & & & f & a & d & g \\
 & & & & & & & & & & & & g & h & a & b \\
 & & & & & & & & & & & & d & b & g & a
\end{array}\right|
$$

$$
= \left|\begin{array}{cc} V0 & O \\ O & V1 \end{array}\right|
$$

wherein, a=−e=cos (π/16)
b=−f=cos (3π/16)
c=−g=cos(5π/16)
d=−h=cos(7π/16)
i=−j=cos(4π/16)
k=−m=cos(2π/16)
l=−n=cos(6π/16)

[W] denotes sixth 32×32 constant matrix data, defined as follows:

$[W]=W_{ij}(i=0\sim31, j=0\sim31)$ $$
[W] = \left|\begin{array}{cccc}
10000000 & 00000000 & 00000000 & 00000000 \\
00000000 & 00000000 & 10000000 & 00000000 \\
00000000 & 10000000 & 00000000 & 00000000 \\
00000000 & 00000000 & 01000000 & 00000000 \\
01000000 & 00000000 & 00000000 & 00000000 \\
00000000 & 01000000 & 00100000 & 00000000 \\
00000000 & 00000000 & 00000000 & 00000000 \\
00000000 & 00000000 & 00010000 & 00000000 \\
\\
00000000 & 00100000 & 00000000 & 00000000 \\
00000000 & 00000000 & 00000001 & 00000000 \\
00001000 & 00000000 & 00000000 & 00000000 \\
00000000 & 00000000 & 00000000 & 00010000 \\
00000000 & 00001000 & 00000000 & 00000000 \\
00000000 & 00000000 & 00000000 & 10000000 \\
00000010 & 00000000 & 00000000 & 00000000 \\
00000000 & 00000000 & 00001000 & 00000000 \\
\\
00100000 & 00000000 & 00000000 & 00000000 \\
00000000 & 00000000 & 00000000 & 00001000 \\
00000000 & 00000010 & 00000000 & 00000000 \\
00000000 & 00000000 & 00000000 & 00000100 \\
00010000 & 00000000 & 00000000 & 00000000 \\
00000000 & 00000000 & 00000000 & 00000010 \\
00000000 & 00000001 & 00000000 & 00000000 \\
00000000 & 00000000 & 00000000 & 00000001 \\
\\
00000000 & 00010000 & 00000000 & 00000000 \\
00000000 & 00000000 & 00000000 & 01000000 \\
00000001 & 00000100 & 00000000 & 00000000 \\
00000000 & 00000000 & 00000010 & 00000000 \\
00000000 & 00000100 & 00000100 & 00000000 \\
00000000 & 00010000 & 00000100 & 00000000 \\
00000100 & 00000000 & 00000000 & 00000000 \\
00010000 & 00000000 & 00000000 & 00100000
\end{array}\right|
$$

wherein said transforming means comprises:

a first rearrangement means (2) for rearranging said matrix data $\vec{X}$ in accordance with positions of factors "1" in said first 32×32 constant matrix data

[Q], as an inner product computation; $[Q]\cdot\vec{X}$, to provide seventh matrix data: $[MD7]=[Q]\vec{X}$;

a second order inner product computation means (4) for computing a second order inner product computation between said second 32×32 constant matrix data [L] and said seventh matrix data [MD7], to provide eighth matrix data: [MD8]=[L]·[MD7];

a second rearrangement means (6) for rearranging said eighth matrix data [MD8] in accordance with positions of factors "1" in said third 32×32 constant matrix data [R], as an inner product computation: [R]·[MD8], to provide ninth matrix data: [MD9]=[R]·[MD8];

an eighth order inner product computation means (8) for computing an eighth order inner product computation between said fourth 32×32 constant matrix data[T] and said ninth matrix data [MD9], to provide 10th matrix data: [MD10]=[T]·[MD9];

a fourth order inner product computation means (10) for computing a fourth order inner product computation between said fifth 32×32 matrix data [V] and said 10th matrix data [MD10], to provide 11th matrix data: [MD11]=[V]·[MD10 ];

a third rearrangement means (12) for rearranging said 11th matrix data [MD11] in accordance with positions of factors "1" in said sixth 32×32 constant matrix data [W], as an inner product computation: [W]·[MD11], to provide 12th matrix data [MD12]=·[W]·[MD11]; and a shift means for shifting said 12th matrix data [MD12] by three bits, to thereby provide said matrix data $\vec{C}$=[MD12 ]/8.

2. A discrete cosine transformation system according to claim 1, wherein said first rearrangement means (2) comprises a writable and readable memory means having an eight word storage capacity, said memory means including:

(a) means for receiving and storing eight element data of said matrix data $\vec{X}$ therein, (b) means for reading said stored data therefrom, in accordance with an order defined by element data of said first matrix data [Q] corresponding to said element data of said matrix data $\vec{X}$, and (c) means for continuously repeating said operations (a) and (b) four times.

3. A discrete cosine transformation system according to claim 2, wherein said second order inner product computation means comprises a first data input means for inputting a first data comprising factors positioned at an upper position of a diagonal portion of said seventh matrix data [MD7], a first switching means (48) having a first input terminal connected to said first input data means, a second input terminal and an output terminal, a first complement means (47), provided between said first data input means and said second input terminal of said first switching means, and computing a complement of a binary data "2" of said input data at said first data input means, a second data input means for inputting a second data comprising factors positioned at a lower position of the diagonal portion of said seventh matrix data [MD7], a second switching means having a first input terminal connected to said second data input means, a second input terminal and an output terminal, a second complement means, provided between said second data input means and said second input terminal of said second switching means, and computing a complement of a binary data "2" of said input data at said second data input means, a coefficient control means (45) for controlling the switching operations of said first and second switching means in accordance with element data in said second matrix data [L], when a first element data, positioned at a portion corresponding to said first input data, is +1 said control means energizes said first switching means to output said first input data from said output terminal thereof, and when the first element data is −1 said control means energizes said first switching means to output said complement data of said first input data from said output terminal, and, when a second element data, positioned at a portion corresponding to said second input data, is +1 said control means energizes said second switching means to output said first input data from said output terminal thereof, and when the second element data is −1 said control means energizes said second switching means to output said complement data of said second input data from said output terminal thereof, and an addition means (44) for adding said data from said first switching means and said data from said second switching means.

4. A discrete cosine transformation system according to claim 1, wherein said second order inner product computation means comprises a first data input means for inputting a first data comprising factors positioned at an upper position of a diagonal portion of said seventh matrix data [MD7], a first switching means (58) having a first input terminal connected to said first input data means, a second input terminal and an output terminal, a first complement circuit (57), provided between said first data input means and said second input terminal of said first switching means, and computing a complement of a binary data "2" of said input data at said first data input means, a second data input means for inputting a second data positioned at a lower position of the diagonal portion of said seventh matrix data [MD7], a second switching means having a first input terminal connected to said second data input means, a second input terminal and an output terminal, a second complement circuit, provided between said second data input means and said second input terminal of said second switching means, and computing a complement of a binary data "2" of said input data at said second data input means, a coefficient control means (56) for controlling the switching operations of said first and second switching means in accordance with element data in said second matrix data, when a first element data, positioned at a portion corresponding to said first input data, is +1 said control means energizes said first switching means to output said first input data from said output terminal thereof, and when the first element data is −1 said control means energizes said first switching means to output said complement data of said first input data from said output terminal, and, when a second element data, positioned at a portion corresponding to said second input data, is +1 said control means energizes said second switching means to output said first input data from said output terminal thereof, and when the second element data is −1 said control means energizes said second switching means to output said complement data of said second input data from said output terminal thereof, a first accumulation means (53) for accumulating said data from said first switching means, and a second accumulation means (54) for accumulating said data from said second switching means.

5. A discrete cosine transformation system according to claim 1, wherein said second rearrangement means (6) comprises a writable and readable memory means having a 32 word storage capacity, said memory means including:

(a) means for receiving and storing 32 element data of said eighth matrix data [MD8] therein, (b) means for reading said stored data therefrom, in accordance with an order defined by element data of said third matrix data [R] corresponding to said element data of said eighth matrix data, and (c) means for continuously repeating said operations (a) and (b) 32 times.

6. A discrete cosine transformation system according to claim 1, wherein said eighth order inner product computation means (8) comprises 16 computing means (81 to 83) provided in parallel, each including a data input terminal receiving a data of said ninth matrix data, a switching means having a first input terminal connected to said input terminal, a second input terminal, a third input terminal applying a data "0", and an output terminal, a complement means, provided between said data input terminal and said second input terminal of said switching means, and computing a complement of a binary data "2" of said input data at said data input terminal, and an accumulation means for accumulating data from said switching means, said eighth order inner product computation means further comprises a coefficient control means (88) for controlling the switching operations of said switching means in said respective computing means in accordance with element data in said fourth matrix data [T], said coefficient control means simultaneously controlling said respective switching means as follows:

when the element data positioned at a portion corresponding to the input data in each computing means is +1, said control means energizes the switching means to output said input data applied to said first input terminal thereof from said output terminal thereof, when the element data is −1, said control means energizes the switching means to output said complement data applied to said second input terminal thereof from said output terminal thereof, and when the element data is zero, said control means energizes the switching means to output the data of zero applied to said third input terminal thereof from said output terminal thereof.

7. A discrete cosine transformation system according to claim 1, wherein said eighth order inner product computation means (8A) comprises eight computing means (91 to 92), each including a data input terminal receiving a data of said ninth matrix data, a first switching means (91*b*) having a first input terminal connected to said data input terminal, a second input terminal, a third input terminal applying a data "0", and an output terminal, a complement computing means (91*a*) provided between said data input terminal and said second input terminal of said first switching means, and computing a complement of a binary data "2" of said input data at said data input terminal, an addition means (91*c*) having a first input terminal connected to said output terminal of said first switching means, and a second input terminal, a second switching means (91*d*) having an input terminal connected to an output of said addition means, and first and second output terminals, a first data holding means (91*e*) having art input terminal connected to said first output terminal of said second switching means, and holding the data from said addition means through said second switching means by a predetermined time, a second data holding means (91*f*) having an input terminal connected to said second output terminal of said second switching means, and holding the data from said addition means through said second switching means by the predetermined time, and a third switching means (91*g*) having a first input terminal connected to an output of said first data holding means, a second input terminal connected to an output of said second data holding means, and an output terminal connected to said second input terminal of said addition means, said inner product computation means further comprises a coefficient control means (94) for controlling switching operations of said first to third switching means in said respective computing means in accordance with element data in said fourth matrix data [T], said coefficient control means simultaneously controlling said first to third switching means in said respective computing means, as follows:

when the element data positioned at a portion corresponding to the input data in each computing means is +1, said coefficient control means energizes said first switching means to output said input data applied to said first input terminal thereof from said output terminal thereof, when the element data is −1, said coefficient control means energizes said first switching means to output said complement data applied to said second input terminal thereof from said output terminal thereof, and when the element data is 0, said coefficient control means energizes said first switching means to output said data "0" applied to said third input terminal thereof from said output terminal thereof, and said coefficient control means controlling said second and third switching means in each computing means so that said first data holding means is connected between the output and said second input terminal of said addition means when first eight data in each line of said ninth matrix data are input, and said second data holding means is connected between the output and said second input terminal of said addition means when second eight data in said each line of said ninth matrix data are input.

8. A discrete cosine transformation system according to claim 1, wherein said fourth order product computation means comprises first to fourth multiplication means (102 to 105), and addition means (106) and a coefficient control means (107) holding coefficients of said fifth matrix data [V] as element data, said coefficient control means applying four element data in each line of said fifth matrix data to said first to fourth multiplication means at each data input time, said first to fourth multiplication means multiplying the respective input data of said 10th matrix data and said applied element data, and said addition means adding data multiplied at said first to fourth multiplication means.

9. A discrete cosine transformation system according to claim 1, wherein said fourth order product computation means comprises first to fourth multiplication and accumulation means, each including a multiplication means (102, 103, 104, 105), an addition means having a first input terminal connected to an output terminal of said multiplication means, and a second input terminal, and a data holding means having an input terminal connected to an output terminal of said addition means and an output terminal connected to said second input terminal of said addition means wherein, said fourth order product computation means further comprises a coefficient control means holding coefficients of said fifth matrix data [V] as element data, said coefficient control means applying four element data in each line of said fifth matrix data to each multiplication means at each data input time, said each multiplication means multiplying the respective input data of said 10th matrix data and said applied element data, and said each addition means adding data multiplied at said each multiplication means and data held in said each data holding means.

10. A discrete cosine transformation system according to claim 1, wherein said third rearrangement means (12) comprises a writable and readable memory means having a 32 word storage capacity, said memory means including:

(a) means for receiving and storing 32 element data of said 11th matrix data [MD11] therein, (b) means for reading said stored data therefrom, in accordance with an order defined by element data of said sixth matrix data [W] corresponding to said element data of said 11th matrix data, and (c) means for continuously repeating said operations (a) and (b) 32 times.

11. A discrete cosine transformation system comprising transforming means for performing a two-dimensional 4-row×8 column discrete cosine transformation of binary data in a matrix form, in accordance with the following formula:

$$DCT:\vec{C}(\mathbf{i})\,[W][V][T][R][L][Q]\vec{X}$$

where, $\vec{X}$ denotes matrix data to be subjected to the discrete cosine transformation and is defined as follows:

$X=X_k(k=0\sim7,\ 10\sim17,\ 20\sim27,\ 30\sim37)$, or $X_{ij}$. $(i=0\sim3,\ j=0\sim7)$ $$\vec{X} = \begin{bmatrix} x00 \\ x01 \\ x02 \\ \cdot \\ \cdot \\ \cdot \\ x07 \\ x10 \\ x11 \\ x12 \\ \cdot \\ \cdot \\ \cdot \\ x30 \\ \cdot \\ \cdot \\ \cdot \\ x36 \\ x37 \end{bmatrix}$$

$\vec{C}$ denotes matrix data obtained by the discrete cosine transformation and is defined as follows:

$\vec{C}=C_k(k=0\sim7,\ 10\sim17,\ 20\sim27,\ 30\sim37)$, or $C_{ij}$ $(i=0\sim3, j=0\sim7)$ $$\vec{C} = \begin{bmatrix} c00 \\ c01 \\ c02 \\ \cdot \\ \cdot \\ \cdot \\ c07 \\ c10 \\ c11 \\ c12 \\ \cdot \\ \cdot \\ \cdot \\ c30 \\ \cdot \\ \cdot \\ \cdot \\ c36 \\ c37 \end{bmatrix}$$

[Q] denotes first 32×32 constant matrix data, defined as follows:

$[Q]=Q_{ij}(i=0\sim31, j=0\sim31)$ $$(Q) = \begin{vmatrix} \begin{matrix} 10000000 \\ 00000001 \\ 01000000 \\ 00000010 \\ 00100000 \\ 00000100 \\ 00010000 \\ 00001000 \end{matrix} & & & O \\ & \begin{matrix} 10000000 \\ 00000001 \\ 01000000 \\ 00000010 \\ 00100000 \\ 00000100 \\ 00010000 \\ 00001000 \end{matrix} & & \\ & & \begin{matrix} 10000000 \\ 00000001 \\ 01000000 \\ 00000010 \\ 00100000 \\ 00000100 \\ 00010000 \\ 00001000 \end{matrix} & \\ & O & & \begin{matrix} 10000000 \\ 00000001 \\ 01000000 \\ 00000010 \\ 00100000 \\ 00000100 \\ 00010000 \\ 00001000 \end{matrix} \end{vmatrix}$$

[L] denotes second 32×32 constant matrix data, defined as follows:

$[L]=L_{ij}(i=0\sim31, j=0\sim31)$ $$(L) = \left( \begin{matrix} ++ & & & & & & & & \\ +- & & & & & & & & \\ & ++ & & & & & & & \\ & +- & & & & & & & \\ & & ++ & & & & & & \\ & & +- & & & & & & \\ & & & ++ & & & & & \\ & & & +- & & & & & \\ & & & & ++ & & & & \\ & & & & +- & & & & O \\ & & & & & ++ & & & \\ & & & & & +- & & & \\ & & & & & & ++ & & \\ & & & & & & +- & & \\ & & & & & & & ++ & \\ & & & & & & & +- & \end{matrix} \right.$$

-continued

| | | | | | | | |
|---|---|---|---|---|---|---|---|
| ++ | | | | | | | |
| +− | | | | | | | |
| | ++ | | | | | | |
| | +− | | | | | | |
| | | ++ | | | | | |
| | | +− | | | | | |
| | | | ++ | | | | |
| O | | | +− | | | | |
| | | | | ++ | | | |
| | | | | +− | | | |
| | | | | | ++ | | |
| | | | | | +− | | |
| | | | | | | ++ | |
| | | | | | | +− | |
| | | | | | | | ++ |
| | | | | | | | +− |

[R] denotes third 32×32 constant matrix data, defined as follows:

[R]=$R_{ij}$(i=0~31, j=0~31)

R) =

| | | | |
|---|---|---|---|
| 10000000 | 00000000 | 00000000 | 00000000 |
| 00000000 | 00000000 | 00000000 | 00000010 |
| 00000000 | 10000000 | 00000000 | 00000000 |
| 00000000 | 00000000 | 00000010 | 00000000 |
| 00000000 | 00000000 | 10000000 | 00000000 |
| 00000000 | 00000010 | 00000000 | 00000000 |
| 00000000 | 00000000 | 00000000 | 10000000 |
| 00000010 | 00000000 | 00000000 | 00000000 |
| 00100000 | 00000000 | 00000000 | 00000000 |
| 00000000 | 00000000 | 00000000 | 00001000 |
| 00000000 | 00100000 | 00000000 | 00000000 |
| 00000000 | 00000000 | 00001000 | 00000000 |
| 00000000 | 00000000 | 00100000 | 00000000 |
| 00000000 | 00001000 | 00000000 | 00000000 |
| 00000000 | 00000000 | 00000000 | 00100000 |
| 00001000 | 00000000 | 00000000 | 00000000 |

-continued

| | | | |
|---|---|---|---|
| 00000001 | 00000000 | 00000000 | 00000000 |
| 00000000 | 00000000 | 00000000 | 01000000 |
| 00000000 | 00000001 | 00000000 | 00000000 |
| 00000000 | 00000000 | 01000000 | 00000000 |
| 00000000 | 00000000 | 00000001 | 00000000 |
| 00000000 | 01000000 | 00000000 | 00000000 |
| 00000000 | 00000000 | 00000000 | 00000001 |
| 01000000 | 00000000 | 00000000 | 00000000 |
| 00000100 | 00000000 | 00000000 | 00000000 |
| 00000000 | 00000000 | 00000000 | 00010000 |
| 00000000 | 10000000 | 00000000 | 00000000 |
| 00000000 | 00000000 | 00010000 | 00000000 |
| 00000000 | 00000000 | 00000100 | 00000000 |
| 00000000 | 00000100 | 00000000 | 00000000 |
| 00000000 | 00000000 | 00000000 | 00000100 |
| 00001000 | 00000000 | 00000000 | 00000000 |

[T] denotes fourth 32×32 constant matrix data, defined as follows:

[T]=$T_{ij}$(i=0~31, j=0~31)

(T) =

| | | | |
|---|---|---|---|
| 1 1 1 1 1 1 1 1 | 0 0 0 0 0 0 0 0 | | |
| 0 0 0 0 0 0 0 0 | 1 1 1 1 1 1 1 1 | | |
| 1 1 — — — — 1 1 | 0 0 0 0 0 0 0 0 | | |
| 0 0 0 0 0 0 0 0 | 1 1 — — — — 1 1 | | |
| 1 1 0 0 0 0 — — | 0 0 1 1 — — 0 0 | | |
| 0 0 — — 1 1 0 0 | 1 1 0 0 0 0 — — | | |
| 1 1 0 0 0 0 — — | 0 0 — — 1 1 0 0 | | |
| 0 0 1 1 — — 0 0 | 1 1 0 0 0 0 — — | | |
| 1 — 1 — 0 0 0 0 | 1 — 1 — 0 0 0 0 | O | |
| 0 0 0 0 1 — 1 — | 0 0 0 0 1 — 1 — | | |
| 1 — 0 0 1 — 0 0 | 0 0 — 1 0 0 — 1 | | |
| 0 0 1 — 0 0 1 — | — 1 0 0 — 1 0 0 | | |
| 1 — 0 0 — 1 0 0 | — 1 0 0 1 — 0 0 | | |
| 0 0 1 — 0 0 — 1 | 0 0 — 1 0 0 1 — | | |
| 1 — — 1 0 0 0 0 | 0 0 0 0 — 1 1 — | | |
| 0 0 0 0 1 — — 1 | — 1 1 — 0 0 0 0 | | |
| | | 0 0 0 0 0 0 0 0 | 1 1 1 1 1 1 1 1 |
| | | — 1 — 1 — 1 — 1 | 0 0 0 0 0 0 0 0 |
| | | 1 1 1 1 1 1 1 1 | 0 0 0 0 0 0 0 0 |
| | | 0 0 0 0 0 0 0 0 | 1 — 1 — 1 — 1 — |
| | | — 0 0 — 0 1 1 0 | 0 1 0 0 1 0 — — |
| | | — 1 0 — 0 0 1 0 | 0 — 1 0 — 0 0 1 |
| | | — — 0 1 0 0 1 1 | 0 0 0 — 0 1 — 0 |
| | | — 0 0 1 0 — 1 0 | 0 1 1 0 — 0 0 — |
| | | 1 0 0 — 0 1 — 0 | 0 1 1 0 — 0 0 — |
| | | — — 0 1 0 0 1 — | 0 0 0 1 0 — 1 0 |
| | | 1 0 0 1 0 — — 0 | 1 0 0 1 0 — — 0 |
| O | | — 1 0 — 0 0 1 0 | 0 1 — 0 1 0 0 — |
| | | 0 0 0 0 0 0 0 0 | 1 1 — — — — 1 1 |
| | | — 1 1 — 1 — — 1 | 0 0 0 0 0 0 0 0 |
| | | 1 1 — — — — 1 1 | 0 0 0 0 0 0 0 0 |
| | | 0 0 0 0 0 0 0 0 | 1 — — 1 — 1 1 — |

-continued $$= \begin{vmatrix} T0 & O \\ O & T1 \end{vmatrix}$$

[V] denotes fifth 32×32 constant matrix data including irrational numbers, defined as follows:

$[V]=V_{ij}(i=0\sim31, j=0\sim31)$

```
      |++0 0                                        |
      |+-0 0                                        |
      |0 0 ++                                       |
      |0 0 +-                                       |
      |       +0 i i                                |
      |       +0 j j                                |
      |       0 -i j                                |
      |       0 +i j                                |
      |            k k l l                          |
      |            n n k k           O              |
      |            l n k m                          |
      |            k m n l                          |
(V) = |                 k k l l                     |
      |                 n n k k                     |
      |                 l n k m                     |
      |                 k m n l                     |
      |                        a c b h              |
      |                        f a d g              |
      |                        g h a b              |
      |                        d b g a              |
      |                             a h c b         |
      |                             f g a d         |
      |                             g b h a         |
      |                             d a b g         |
      |        O                         a d c b    |
      |                                  f c a d    |
      |                                  g f h a    |
      |                                  h a f c    |
      |                                      a c b h|
      |                                      f a d g|
      |                                      g h a b|
      |                                      d b g a|
```

$$= \begin{vmatrix} V0 & O \\ O & V1 \end{vmatrix}$$

wherein, $a=-e=\cos(\pi/16)$ $b=-f=\cos(3\pi/16)$ $c=-g=\cos(5\pi/16)$ $d=-h=\cos(7\pi/16)$ $i=-j=\cos(4\pi/16)$ $k=-m=\cos(2\pi/16)$ $l=-n=\cos(6\pi/16)$

[W] denotes sixth 32×32 constant matrix data, defined as follows:

$[W]=W_{ij}(i=0\sim31, j=0\sim31)$ (W) =

| | | | |
|---|---|---|---|
| 10000000 | 00000000 | 00000000 | 00000000 |
| 00000000 | 00000000 | 10000000 | 00000000 |
| 00000000 | 10000000 | 00000000 | 00000000 |
| 00000000 | 00000000 | 01000000 | 00000000 |
| 01000000 | 00000000 | 00000000 | 00000000 |
| 00000000 | 00000000 | 00100000 | 00000000 |
| 00000000 | 01000000 | 00000000 | 00000000 |
| 00000000 | 00000000 | 00010000 | 00000000 |

-continued

| | | | |
|---|---|---|---|
| 00000000 | 00100000 | 00000000 | 00000000 |
| 00000000 | 00000000 | 00000001 | 00000000 |
| 00001000 | 00000000 | 00000000 | 00000000 |
| 00000000 | 00000000 | 00000000 | 00010000 |
| 00000000 | 00001000 | 00000000 | 00000000 |
| 00000000 | 00000000 | 00000000 | 10000000 |
| 00000010 | 00000000 | 00000000 | 00000000 |
| 00000000 | 00000000 | 00001000 | 00000000 |
| 00100000 | 00000000 | 00000000 | 00000000 |
| 00000000 | 00000000 | 00000000 | 00001000 |
| 00000000 | 00000010 | 00000000 | 00000000 |
| 00000000 | 00000000 | 00000000 | 00000100 |
| 00010000 | 00000000 | 00000000 | 00000000 |
| 00000000 | 00000000 | 00000000 | 00000010 |
| 00000000 | 00000001 | 00000000 | 00000000 |
| 00000000 | 00000000 | 00000000 | 00000001 |
| 00000000 | 00010000 | 00000000 | 00000000 |
| 00000000 | 00000000 | 00000000 | 01000000 |
| 00000001 | 00000000 | 00000000 | 00000000 |
| 00000000 | 00000000 | 00000010 | 00000000 |
| 00000000 | 00000100 | 00000000 | 00000000 |
| 00000000 | 00000000 | 00000100 | 00000000 |
| 00000100 | 00000000 | 00000000 | 00000000 |
| 00000000 | 00000000 | 00000000 | 00100000 |

wherein said transforming means comprises:

a first rearrangement means (2) for rearranging said matrix data $\vec{X}$ in accordance with positions of factors "1" in said first 32×32 constant matrix data [Q], as an inner product computation: $[Q]\cdot\vec{X}$, to provide seventh matrix data: $[MD7]=[Q]\vec{X}$;

an addition and subtraction means (4') for substantially computing a second order inner product computation between said second constant matrix data [L] and said seventh matrix data, including a serial to parallel conversion means (14), an addition means (4A) and a subtraction means (4B) said serial to parallel conversion means reading two consecutive serial data of said seventh matrix data and converting first and second parallel data, in odd times said addition means adding said first and second parallel data, and in even times said subtraction means subtracting said second parallel data from said first parallel data, to thereby provide eighth matrix data: $[MD8]=[L]\cdot[MD7]$;

a first eighth-order inner product computation means (8A), connected to said addition means, for computing an eighth order inner product computation between a first 16×16 sub-matrix data $[T_o]$ of said fourth matrix data [T] and a first 16×16 sub-matrix data $[MD8_1]$ of said eighth matrix data [MD8] output from said addition means, to provide ninth 16×16 matrix data $[MD9]=[T_0]\cdot[MD8_1]$;

a first fourth-order inner product computation means (10A), connected to said first eighth-order inner product computation means (8A), for computing a fourth order inner product computation between said ninth matrix data [MD9] and a first 16×16 sub-matrix data $[V_0]$ of said fifth matrix data [V], to provide 10th 16×16 matrix data $[MD10]=[V_0]\cdot[MD9]$;

a second eighth-order inner product computation means (8B), connected to said subtraction means, for computing an eighth order inner product computation between a second 16×16 sub-matrix data [$T_1$] of said fourth matrix data [T] and a second 16×16 sub-matrix data [$MD8_2$] of said eighth matrix data [MD8] output from said subtraction means, to provide 11th 16×16 matrix data [MD11]=[$T_1$]·[$MD8_2$];

a second fourth-order inner product computation means (10B), connected to said second eighth order inner product computation means (8B), for computing a fourth order inner product computation between said 11th matrix data [MD11] and a first 16×16 sub-matrix data [$V_1$] of said fifth matrix data [V], to provide 12th 16×16 matrix data [MD12]=[$V_1$]·[MD11];

a parallel to serial conversion means (18) for continuously receiving two parallel data from said first and second fourth-order inner product computation means (10A, 10B) and outputting two consecutive data, to thereby provide matrix data as 13th matrix data [MD13];

a second rearrangement means (12) for rearranging said 13th matrix data [MD13] in accordance with positions of factors "1" in said sixth 32×32 constant matrix data [W], as an inner product computation: [W]·[MD13], to provide 14th matrix data [MD14]=[W]·[MD13]; and a shift means for shifting said 14th matrix data [MD14] by three bits, to thereby provide said matrix data $\bar{C}$=[MD14]/8.

12. A discrete cosine transformation system according to claim 11, wherein said first rearrangement means (2) comprises a writable and readable memory means having an eight word storage capacity, said memory means including:

(a) means for receiving and storing eight element data of said matrix data $\bar{X}$ therein, (b) means for reading said stored data therefrom, in accordance with an order defined by element data of said first matrix data [Q] corresponding to said element data of said matrix data $\bar{X}$, (c) means for continuously repeating said operations (a) and (b) four times.

13. A discrete cosine transformation system according to claim 11, wherein said first eighth-order inner product computation means (8A) comprises 16 computing means (81 to 83) provided in parallel, each including a data input terminal receiving a data of said first sub-matrix of said eighth matrix data, a switching means having a first input terminal connected to said input terminal, a second input terminal, a third input terminal applying a data "0" and an output terminal, a complement means, provided between said data input terminal and said second input terminal of said switching means, and computing a complement of a binary data "2" of said input data at said data input terminal, and an accumulation means for accumulating data from said switching means, said inner product computation means further comprises a coefficient control means (88) for controlling the switching operations of said switching means in said respective computing means in accordance with element data in said first sub-matrix [$T_0$] of said fourth matrix data [T], said coefficient control means simultaneously controlling said respective switching means as follows:

when the element data positioned at a portion corresponding to the input data in each computing means is +1, said control means energizes the switching means to output said input data applied to said first input terminal thereof from said output terminal thereof, when the element data is −1, said control means energizes the switching means to output said complement data applied to said second input terminal thereof from said output terminal thereof, and when the element data is zero, said control means energizes the switching means to output the data of zero applied to said third input terminal thereof from said output terminal thereof.

14. A discrete cosine transformation system according to claim 11, wherein said first eighth-order inner product computation means (8A) comprises eight computing means (91 to 92), each including a data input terminal receiving a data in said second sub-matrix of said eighth matrix data, a first switching means (91b) having a first input terminal connected to said data input terminal, a second input terminal, a third input terminal applying a data "0", and an output terminal, a complement computing means (91*a*) provided between said data input terminal and said second input terminal of said first switching means, and computing a complement of a binary data "2" of said input data at said data input terminal, an addition means (91*c*) having a first input terminal connected to said output terminal of said first switching means, and a second input terminal, a second switching means (91*d*) having an input terminal connected to an output of said addition means, and first and second output terminals, first data holding means (91*e*) having an input terminal connected to said first output terminal of said second switching means, holding the data from said addition means through said second switching means by a predetermined time, a second data holding means (91*f*) having an input terminal connected to said second output terminal of said second switching means, holding the data from said addition means through said second switching means by the predetermined time, and a third switching means (91*g*) having a first input terminal connected to an output of said first data holding means, a second input terminal connected to an output of said second data holding means, and an output terminal connected to said second input terminal of said addition means, said inner product computation means further comprises a coefficient control means (94) for controlling switching operations of said first to third switching means in said respective computing means in accordance with element data in said first sub-matrix data [$T_0$] of said fourth matrix data [T], said coefficient control means simultaneously controlling said first to third switching means in said respective computing means, as follows:

when the element data positioned at a portion corresponding to the input data in each computing means is +1, said coefficient control means energizes said first switching means to output said input data applied to said first input terminal thereof from said output terminal thereof, when the element data is −1, said coefficient control means energizes said first switching means to output said complement data applied to said second input terminal thereof from said output terminal thereof, and when the element data is 0, said coefficient control means energizes said first switching means to output said data "0" applied to said third input terminal thereof from said output terminal thereof, and said coefficient control means controlling said second and third switching means so that said first data holding means is connected between the output and said second input terminal of said addition means when first eight data in each line of said eighth matrix data are input, and said second data holding means is connected between the output and said second input terminal of said addition means when second eight data in said each line of said ninth matrix data are input.

15. A discrete cosine transformation system according to claim 11, wherein said first fourth-order product computation means comprises first to fourth multiplication means (102 to 105), an addition means (106) and a coefficient control means (107) holding coefficients in said first sub-matrix $[V_0]$ of said fifth matrix data [V] as element data, said coefficient control means applying four element data in each line of said fifth matrix data to said first to fourth multiplication means at each data input time, said first to fourth multiplication means multiplying the respective input data of said 10th matrix data and said applied element data, and said addition means adding data multiplied at said first to fourth multiplication means.

16. A discrete cosine transformation system according to claim 11, wherein said first fourth-order product computation means comprises first to fourth multiplication and accumulation means, each including a multiplication means (102, 103, 104, 105), an addition means having a first input terminal connected to an output terminal of said multiplication means and a second input terminal, and a data holding means having an input terminal connected to an output terminal of said addition means and an output terminal connected to said second input terminal of said addition means, said first fourth order product computation means further comprises a coefficient control means holding coefficients said first sub-matrix $[V_0]$ of said fifth matrix data [V] as element data, said coefficient control means applying four element data in each line of said fifth matrix data to each multiplication means at each data input time, said each multiplication means multiplying the respective input data of said ninth matrix data and said applied element data, and said each addition means adding data multiplied at said each multiplication means and data held in said each data holding means.

17. A discrete cosine transformation system according to claim 11, wherein said second eighth-order inner product computation means (SB) comprises 16 computing means (81 to 83) provided in parallel, each including a data input terminal receiving a data of said second sub-matrix of said eighth matrix data, a switching means having a first input terminal connected to said input terminal, a second input terminal, a third input terminal applying a data "0" and an output terminal, a complement means, provided between said data input terminal and said second input terminal of said switching means, and computing a complement of a binary data "2" of said input data at said data input terminal, and an accumulation means for accumulating data from said switching means, said inner product computation means further comprises a coefficient control means (88) for controlling the switching operations of said switching means in said respective computing means in accordance with element data in said second sub-matrix $[T_1]$ of said fourth matrix data [T], said coefficient control means simultaneously controlling said respective switching means as follows:

when the element data positioned at a portion corresponding to the input data in each computing means is +1, said control means energizes the switching means to output said input data applied to said first input terminal thereof from said output terminal thereof, when the element data is −1, said control means energizes the switching means to output said complement data applied to said second input terminal thereof from said output terminal thereof, and when the element data is zero, said control means energizes the switching means to output the data of zero applied to said third input terminal thereof from said output terminal thereof.

18. A discrete cosine transformation system according to claim 12, wherein said second eighth-order inner product computation means (8B) comprises eight computing means (91 to 92), each including a data input terminal receiving a data in said second sub-matrix of said eighth matrix data, a first switching means (**91*b*) having a first input terminal connected to said data input terminal, a second input terminal, a third input terminal applying a data "0", and an output terminal, a complement computing means (91*a*) provided between said data input terminal and said second input terminal of said first switching means and computing a complement of a binary data "2" of said input data at said data input terminal, an addition means (91*c*) having a first input terminal connected to said output terminal of said first switching means, and a second input terminal, a second switching means (91*d*) having an input terminal connected to an output of said addition means, and first and second output terminals, a first data holding means (91*e*) having an input terminal connected to said first output terminal of said second switching means, holding the data from said addition means through said second switching means by a predetermined time, a second data holding means (91*f***) having an input terminal connected to said second output terminal of said second switching means, holding the data from said addition means through said second switching means by the predetermined time, and a third switching means (91g) having a first input terminal connected to an output of said first data holding means, a second input terminal connected to an output of said second data holding means, and an output terminal connected to said second input terminal of said addition means, said inner product computation means further comprises a coefficient control means (94) for controlling switching operations of said first to third switching means in said respective computing means in accordance with element data in said second sub-matrix data $[T_1]$ of said fourth matrix data [T], said coefficient control means simultaneously controlling said first to third switching-means in said respective computing means, as follows:

when the element data positioned at a portion corresponding to the input data in each computing means is $+1$, said coefficient control means energizes said first switching means to output said input data applied to said first input terminal thereof from said output terminal thereof, when the element data is $-1$, said coefficient control means energizes said first switching means to output said complement data applied to said second input terminal thereof from said output terminal thereof, and when the element data is 0, said coefficient control means energizes said first switching means to output said data "0" applied to said third input terminal thereof from said output terminal thereof, and said coefficient control means controlling said second and third switching means so that said first data holding means is connected between the output and said second input terminal of said addition means when first eight data in each line of said eighth matrix data are input, and said second data holding means is connected between the output and said second input terminal of said addition means when second eight data in said each line of said ninth matrix data are input.

19. A discrete cosine transformation system according to claim 11, wherein said second fourth-order product computation means comprises first to fourth multiplication means (102 to 105), an addition means (106) and a coefficient control means (107) holding coefficients in said second sub-matrix $[V_1]$ of said fifth matrix data [V] as element data, said coefficient control means applying four element data in each line of said fifth matrix data to said first to fourth multiplication means at each data input time, said first to fourth multiplication means multiplying the respective input data of said 10th matrix data and said applied element data, and said addition means adding data multiplied at said first to fourth multiplication means.

20. A discrete cosine transformation system according to claim 11, wherein said second fourth-order product computation means comprises first to fourth multiplication and accumulation means, each including a multiplication means (102, 103, 104, 105), an addition means having a first input terminal connected to an output terminal of said multiplication means, and a second input terminal, and a data holding means having an input terminal connected to an output terminal of said addition means and an output terminal connected to said second input terminal of said addition means, said product computation means further comprises a coefficient control means holding coefficients in said second sub-matrix $[V_1]$ of said fifth matrix data [V] as element data, said coefficient control means applying four element data in each line of said fifth matrix data to each multiplication means at each data input time, said each multiplication means multiplying the respective input data of said ninth matrix data and said applied element data, and said each addition means adding data multiplied at said each multiplication means and data held in said each data holding means.

21. A discrete cosine transformation system according to claim 12, wherein said third rearrangement means (12) comprises a writable and readable memory means having a 32 word storage capacity, said memory means including:

(a) means for receiving and storing 32 element data of said 13th matrix data [MD13] therein, (b) means for reading said stored data therefrom, in accordance with an order defined by element data of said sixth matrix data [W] corresponding to said element data of said 13th matrix data, and (c) means for continuously repeating said operations (a) and (b) 32 times.

22. A discrete cosine inverse transformation system comprising transforming means for performing a two-dimensional 4-row×8 column discrete cosine inverse transformation of binary data in a matrix form, in accordance with the following formula:

$$IDCT: \vec{X} = (\tfrac{1}{4})\,{}^t[Q][L]\,{}^t[R]\,{}^t[T]\,{}^t[V]\,{}^t[W]\vec{C}$$

where, $\vec{C}$ denotes matrix data to be subjected to the discrete cosine inverse transformation and is defined as follows:

$\vec{C} = C_k$ (k=0~7, 10~17, 20~27, 30~37), or $C_{ij}$. (i=0~3, j=0~7)

$$\vec{C} = \begin{bmatrix} c00 \\ c01 \\ c02 \\ \cdot \\ \cdot \\ \cdot \\ c07 \\ c10 \\ c11 \\ c12 \\ \vdots \\ c30 \\ \cdot \\ \cdot \\ \cdot \\ c36 \\ c37 \end{bmatrix}$$

$\vec{X}$ denotes matrix data obtained by the discrete cosine inverse transformation and is defined as follows:

$\vec{X} = X_k$ (k=0~7, 10~17, 20~27, 30~37), or $X_{ij}$. (i=0~3, j=0~7)

```
      ┌     ┐
      │ x00 │
      │ x01 │
      │ x02 │
      │  .  │
      │  .  │
      │  .  │
      │ x07 │
      │ x10 │
      │ x11 │
 X⃗ =  │ x12 │
      │  :  │
      │  .  │
      │ x30 │
      │  .  │
      │  .  │
      │  .  │
      │ x36 │
      │ x37 │
      └     ┘
```

${}^{t}$[W] denotes first 32×32 constant transposition matrix data, defined as follows:

${}^{t}[W]=W_{ij}(i=0\sim31,\ j=0\sim31)$ ${}^{t}(w)=$

```
|10000000 00000000 00000000 00000000|
|00001000 00000000 00000000 00000000|
|00000000 00000000 10000000 00000000|
|00000000 00000000 00001000 00000000|
|00000000 00100000 00000000 00000000|
|00000000 00000000 00000000 00000010|
|00000000 00000010 00000000 00000000|
|00000000 00000000 00000000 00100000|

|00100000 00000000 00000000 00000000|
|00000010 00000000 00000000 00000000|
|00000000 10000000 00000000 00000000|
|00000000 00000000 00000000 10000000|
|00000000 00001000 00000000 00000000|
|00000000 00000000 00000000 00001000|
|00000000 00000000 00100000 00000000|
|00000000 00000000 00000010 00000000|

|01000000 00000000 00000000 00000000|
|00010000 00000000 00000000 00000000|
|00000100 00000000 00000000 00000000|
|00000001 00000000 00000000 00000000|
|00000000 00000001 00000000 00000000|
|00000000 00000000 00000000 00000100|
|00000000 00000000 00000000 00010000|
|00000000 01000000 00000000 00000000|

|00000000 00000100 00000000 00000000|
|00000000 00000000 00000000 01000000|
|00000000 00000000 00000000 00000001|
|00000000 00010000 00000000 00000000|
|00000000 00000000 01000000 00000000|
|00000000 00000000 00010000 00000000|
|00000000 00000000 00000100 00000000|
|00000000 00000000 00000001 00000000|
```

${}^{t}$[V] denotes second 32×32 transposition matrix data, defined as follows:

${}^{t}[V]={}^{t}V_{ij}(i=0\sim31,\ j0\sim31)$

```
        |++0 0                                                  |
        |+-0 0                                                  |
        |0 0 ++                                                 |
        |0 0 +-                                                 |
        |      ++0 0                                            |
        |      0 0 -+                                           |
        |      i j i i                                          |
        |      i j j j                                          |
        |                                                       |
        |          k n k n                                      |
        |          k n m l                                      |
        |          l k l k                                      |
        |          l k n m                                      |
        |                  k n l k                              |
t(V) =  |                  k n n m                              |
        |                  l k k n                              |
        |                  l k m l                              |
        |                                                       |
        |                          a f g d                      |
        |                          c a h b                      |
        |                          b d a g                      |
        |                          h g b a                      |
        |                                 a f g d               |
        |      O                          h g b a               |
        |                                 c a h b               |
        |                                 b d a g               |
        |                                                       |
        |                                        a f g h        |
        |                                        d c f a        |
        |                                        c a h f        |
        |                                        b d a c        |
        |                                              a f g d  |
        |                                              c a h b  |
        |                                              b d a g  |
        |                                              h g b a  |

     = |tVO  O  |
       |O    tV1|
```

wherein, a=−e=cos (π/16)

b=−f=cos (3π/16)

c=−g=cos (5π/16)

d=−h=cos (7π/16)

i=−j=cos (4π/16)

k=−m=cos (2π/16)

l=−n=cos (6π/16)

${}^{t}$[T] denotes third 32×32 constant transposition matrix data, defined as follows:

${}^{t}[T]={}^{t}T_{ij}(i=0\sim31,\ j=0\sim31)$

```
|1 0 1 0 1 0 1 0  1 0 1 0 1 0 1 0                         |
|1 0 1 0 1 0 1 0  —0 —0 —0 —0                             |
|1 0 ——0 0 —1  1 0 0 1 0 1 —0                             |
|1 0 —0 0 —0 1  —0 0 —0 —1 0                              |
|1 0 —0 0 1 0 —  0 1 1 0 —0 0 1                           |
|1 0 —0 0 1 0 —  0 ——0 1 0 0 —                            |
|1 0 1 0 —0 —0  0 1 0 1 0 —0 —                            |
|1 0 1 0 —0 —0  0 —0 —0 1 0 1                             |
```

-continued

```
       | 0 1 0 1 0 1 0 1  1 0 0 — — 0 0 —            O                     |
       | 0 1 0 1 0 1 0 1  — 0 0 1 1 0 0 1                                  |
       | 0 1 0 — 1 0 — 0  1 0 — 0 0 — 0 1                                  |
       | 0 1 0 — 1 0 — 0  — 0 1 0 0 1 0 —                                  |
       | 0 1 0 — — 0 1 0  0 1 0 — 1 0 — 0                                  |
       | 0 1 0 — — 0 1 0  0 — 0 1 — 0 1 0                                  |
       | 0 1 0 1 0 — 0 —  0 1 — 0 0 1 1 0                                  |
t(T) = | 0 1 0 1 0 — 0 —  0 — 1 0 0 — — 0                                  |

       |                                   0 — 1 0 — — — —  1 — 1 — 0 — 1 0 |
       |                                   0 1 1 0 0 1 — 0  0 — 0 1 0 1 1 0 |
       |                                   0 — 1 0 0 0 0 0  0 0 0 0 0 1 — 0 |
       |                                   0 1 1 0 — — 1 1  — 1 1 — 0 — — 0 |
       |                                   0 — 1 0 0 0 0 0  0 0 0 0 0 1 — 0 |
       |                                   0 1 1 0 1 0 0 —  1 0 — 0 0 — — 0 |
       |                                   0 — 1 0 1 1 1 1  — 1 — 1 0 — 1 0 |
       |                                   0 1 1 0 0 0 1 0  0 — 0 0 0 1 1 0 |

       |                                   1 0 0 1 0 0 0 0  0 0 1 0 1 0 0 1 |
       |                                   1 0 0 — 1 — 0 1  1 0 0 1 1 0 0 — |
       |                                   1 0 0 1 0 1 0 1  1 0 0 — — 0 0 — |
       |          O                        1 0 0 — 0 0 — 0  0 1 1 0 — 0 0 1 |
       |                                   1 0 0 1 1 — 0 —  — 0 0 1 — 0 0 — |
       |                                   1 0 0 — 0 0 1 0  0 — — 0 — 0 0 1 |
       |                                   1 0 0 1 — 0 — 0  0 1 — 0 1 0 0 1 |
       |                                   1 0 0 — — 1 0 —  — 0 0 — 1 0 0 — |
```

$$= \begin{vmatrix} {}^tT0 & O \\ O & {}^tT1 \end{vmatrix}$$

${}^t$[R] denotes fourth 32×32 constant transposition matrix data, defined as follows:

${}^t$[R]$= {}^tR_{ij}$(i=0~31, j=0~31)

t(R) =

```
| 10000000 00000000 00000000 00000000 |
| 00000000 00000000 00000001 00000000 |
| 00000000 10000000 00000000 00000000 |
| 00000000 00000000 00000000 00000001 |
| 00000000 00000001 00000000 00000000 |
| 00000000 00000000 00000000 10000000 |
| 00000001 00000000 00000000 00000000 |
| 00000000 00000000 10000000 00000000 |

| 00100000 00000000 00000000 00000000 |
| 00000000 00000000 00000100 00000000 |
| 00000000 00100000 00000000 00000000 |
| 00000000 00000000 00000000 00000100 |
| 00000000 00000100 00000000 00000000 |
| 00000000 00000000 00000000 00100000 |
| 00000100 00000000 00000000 00000000 |
| 00000000 00000000 00100000 00000000 |
```

-continued

```
| 00001000 00000000 00000000 00000000 |
| 00000000 00000000 00010000 00000000 |
| 00000000 00001000 00000000 00000000 |
| 00000000 00000000 00000000 00010000 |
| 00000000 0001000  00000000 00000000 |
| 00000000 00000000 00000000 00001000 |
| 00010000 00000000 00000000 00000000 |
| 00000000 00000000 00001000 00000000 |

| 00000010 00000000 00000000 00000000 |
| 00000000 00000000 01000000 00000000 |
| 00000000 00000010 00000000 00000000 |
| 00000000 00000000 00000000 01000000 |
| 00000000 01000000 00000000 00000000 |
| 00000000 00000000 00000000 00000010 |
| 01000000 00000000 00000000 00000000 |
| 00000000 00000000 00000010 00000000 |
```

[L] denotes fifth 32×32 constant matrix data, defined as follows:

[L]$=L_{ij}$(i=0~31, j=0~31)

```
       / ++                                   \
       | +-                                   |
       |    ++                                |
       |    +-                                |
       |       ++                             |
       |       +-                             |
       |          ++                          |
       |          +-                          |
       |             ++                       |
       |             +-             O         |
       |                ++                    |
       |                +-                    |
(L) =  |                   ++                 |
       |                   +-                 |
       |                      ++              |
       |                      +-              |
```

-continued $$\left(\begin{array}{cccccccccccccccc}
++ & & & & & & & \\
+- & & & & & & & \\
 & ++ & & & & & & \\
 & +- & & & & & & \\
 & & ++ & & & & & \\
 & & +- & & & & & \\
 & & & ++ & & & & \\
O & & & +- & & & & \\
 & & & & ++ & & & \\
 & & & & +- & & & \\
 & & & & & ++ & & \\
 & & & & & +- & & \\
 & & & & & & ++ & \\
 & & & & & & +- & \\
 & & & & & & & ++ \\
 & & & & & & & +-
\end{array}\right)$$

${}^t[Q]$ denotes sixth 32×32 constant transposition matrix data, defined as follows:

${}^t[Q]=Q_{ij}(i=0\sim31, j=0\sim31)$ $${}^t[Q] = \left|\begin{array}{cccc}
\begin{matrix}10000000\\00100000\\00001000\\00000010\\00000001\\00000100\\00010000\\01000000\end{matrix} & & O & \\
 & \begin{matrix}10000000\\00100000\\00001000\\00000010\\00000001\\00000100\\00010000\\01000000\end{matrix} & & \\
 & & \begin{matrix}10000000\\00100000\\00001000\\00000010\\00000001\\00000100\\00010000\\01000000\end{matrix} & \\
O & & & \begin{matrix}10000000\\00100000\\00001000\\00000010\\00000001\\00000100\\00010000\\01000000\end{matrix}
\end{array}\right|$$

wherein said transforming means comprises:

a first rearrangement means (3) for rearranging said matrix data $\vec{C}$ in accordance with positions of factors "1" in said first 32×32 constant transposition matrix data ${}^t[W]$, as an inner product computation: ${}^t[W]\cdot\vec{C}$, to provide seventh matrix data: $[MD7]={}^t[W]\vec{C}$;

a fourth order inner product computation means (5) for computing a fourth order inner product computation between said second 32×32 transposition matrix data ${}^t[V]$ and said seventh matrix data [MD7], to provide eighth matrix data: $[MD8]={}^t[V]\cdot[MD7]$;

an eighth order inner product computation means (7) for computing an eighth order inner product computation between said third 32×32 constant transposition matrix data ${}^t[T]$ and said eighth matrix data [MD8], to provide ninth matrix data: $[MD9]={}^t[T]\cdot[MD8]$;

a second rearrangement means (9) for rearranging said ninth matrix data [MD9] in accordance with positions of factors "1" in said fourth 32×32 constant transposition matrix data ${}^t[R]$, as an inner product computation: ${}^t[R]\cdot[MD9]$, to provide 10th matrix data: $[MD10]={}^t[R]\cdot[MD9]$;

a second order inner product computation means (11) for computing a second order product computation between said fifth 32×32 constant matrix data [L] and said 10th matrix data [MD10], to provide 11th matrix data: $[MD11]=[L]\cdot[MD10]$;

a third rearrangement means (13) for rearranging said 11th matrix data [MD11] in accordance with positions of factors "1" in said sixth 32×32 constant transposition matrix data ${}^t[Q]$, as an inner product computation: ${}^t[Q]\cdot[MD11]$, to provide 12th matrix data $[MD12]={}^t[Q]\cdot[MD11]$; and a shift means for shifting said 12th matrix: data [MD12] by two bits, to thereby provide said matrix data $\vec{X}=[MD12]/4$.

23. A discrete cosine inverse transformation system according to claim 22, wherein said first rearrangement means (3) comprises a writable and readable memory means having a 32 word storage capacity, said memory means including:

(a) means for receiving and storing eight element data of said matrix data $\vec{C}$ therein, (b) means for reading said stored data therefrom, in accordance with an order defined by element data of said first transposition matrix data ${}^t[W]$ corresponding to said element data of said matrix data $\vec{C}$, and (c) means for continuously repeating said operations (a) and (b) four times.

24. A discrete cosine inverse transformation system according to claim 22, wherein said fourth order product computation means comprises first to fourth multiplication means (102 to 105), and addition means (106) and a coefficient control means (107) holding coefficients of said second transposition matrix data ${}^t[V]$ as element data, said coefficient control means applying four element data in each line of said second transposition matrix data to said first to fourth multiplication means at each data input time, said first to fourth multiplication means multiplying the respective input data of said seventh matrix data [MD7] and said applied element data, and said addition means adding data multiplied at said first to fourth multiplication means.

25. A discrete cosine inverse transformation system according to claim 22, wherein said fourth order product computation means comprises first to fourth multiplication and accumulation means, each including a multiplication means (102, 103, 104, 105), an addition means having a first input terminal connected to an output terminal of said multiplication, and a second input terminal, and a data holding means having an input terminal connected to an output terminal of said addition means and an output terminal connected to said second input terminal of said addition means, said product computation means further comprises a coefficient control means holding coefficients of said second transposition matrix data ${}^{t}$[V] as element data, said coefficient control means applying four element data in each line of said second transposition matrix data to each multiplication means at each data input time, said each multiplication means multiplying the respective input data of said seventh matrix data [MD7] and said applied element data, and said each addition means adding data multiplied at said each multiplication means and data held in said each data holding means.

26. A discrete cosine inverse transformation system according to claim 22, wherein said eighth order inner product computation means (8) comprises 16 computing means (81 to 83) provided in parallel, each including a data input terminal receiving a data of said eighth matrix data, a switching means having a first input terminal connected to said input terminal, a second input terminal, a third input terminal applying a data "0" and an output terminal, a complement means, provided between said data input terminal and said second input terminal of said switching means, and computing a complement of a binary data "2" of said input data at said data input terminal, and an accumulation means for accumulating data from said switching means, said inner product computation means further comprises a coefficient control means (88) for controlling the switching operations of said switching means in said respective computing means in accordance with element data in said third transposition matrix data ${}^{t}$[T], said coefficient control means simultaneously controlling said respective switching means as follows:

when the element data positioned at a portion corresponding to the input data in each computing means is +1, said control means energizes the switching means to output said input data applied to said first input terminal thereof from said output terminal thereof, when the element data is −1, said control means energizes the switching means to output said complement data applied to said second input terminal thereof from said output terminal thereof, and when the element data is zero, said control means energizes the switching means to output the data of zero applying to said third input terminal thereof from said output terminal thereof.

27. A discrete cosine inverse transformation system according to claim 22, wherein said eighth order inner product computation means (8A) comprises eight computing means (91 to 92), each including a data input terminal receiving a data of said ninth matrix data, a first switching means (91*b*) having a first input terminal connected to said data input terminal, a second input terminal, a third input terminal applied a data "0", and an output terminal, a complement computing means (91*a*) provided between said data input terminal and said second input terminal of said first switching means, and computing a complement of a binary data "2" of said input data at said data input terminal, an addition means (91*c*) having a first input terminal connected to said output terminal of said first switching means, and a second input terminal, a second switching means (91*d*) having an input terminal connected to an output of said addition means, and first and second output terminals, a first data holding means (91*e*) having an input terminal connected to said first output terminal of said second switching means, and holding the data from said addition means through said second switching means by a predetermined time, a second data holding means (91*f*) having an input terminal connected to said second output terminal of said second switching means, and holding the data from said addition means through said second switching means by the predetermined time, and a third switching means (91*g*) having a first input terminal connected to an output of said first data holding means, a second input terminal connected to an output of said second data holding means, and an output terminal connected to said second input terminal of said addition means, said inner product computation means further comprises a coefficient control means (94) for controlling switching operations of said first to third switching means in said respective computing means in accordance with element data in said third transposition matrix data ${}^{t}$[T], said coefficient control means simultaneously controlling said first to third switching means in said respective computing means, as follows:

when the element data positioned at a portion corresponding to the input data in each computing means is +1, said coefficient control means energizes said first switching means to output said input data applied to said first input terminal thereof from said output terminal thereof, when the element data is −1, said coefficient control means energizes said first switching means to output said complement data applied to said second input terminal thereof from said output terminal thereof, and when the element data is 0, said coefficient control means energizes said first switching means to output said data "0" applied to said third input terminal thereof from said output terminal thereof, and said coefficient control means controlling said second and third switching means so that said first data holding means is connected between the output and said second input terminal of said addition means when first eight data in each line of said eighth matrix data are input, and said second data holding means is connected between the output and said second input terminal of said addition means when second eight data in said each line of said eighth matrix data are input.

28. A discrete cosine inverse transformation system according to claim 22, wherein said second rearrangement means (9) comprises a writable and readable memory means having a 32 word storage capacity, said memory means including:

(a) means for receiving and storing 32 element data of said ninth matrix data [MD9] therein, (b) means for reading said stored data therefrom, in accordance with an order defined by element data of said fourth transposition matrix data ${}^{t}$[R] corresponding to said element data of said ninth matrix data, and (c) means for continuously repeating said operations (a) and (b) 32 times.

29. A discrete cosine inverse transformation system according to claim 24, wherein said second order inner product computation means comprises a first data input means for inputting a first data comprising factors positioned at an upper position of a diagonal portion of said 10th matrix data [MD10], a first switching means (48) having a first input terminal connected to said first input data means, a second input terminal and an output terminal, a first complement means (47), provided between said first data input means and said second input terminal of said first switching means, and computing a complement of a binary data "2" of said input data at said first data input means, a second data input means for inputting a second data comprising factors positioned at a lower position of the diagonal portion of said 10th matrix data [MD10], a second switching means having a first input terminal connected to said second data input means, a second input terminal and an output terminal, a second complement circuit, provided between said second data input means and said second input terminal of said second switching means, and computing a complement of a binary data "2" of said input data at said second data input means, a coefficient control means (45) for controlling the switching operations of said first and second switching means in accordance with element data in said fifth matrix data [L], when a first element data, positioned at a portion corresponding to said first input data, is +1 said control means energizes said first switching means to output said first input data from said output terminal thereof, and when the first element data is −1 said control means energizes said first switching means to output said complement data comprising factors of said first input data from said output terminal, and, when a second element data, positioned at a portion corresponding to said second input data, is +1 said control means energizes said second switching means to output said first input data from said output terminal thereof, and when the second element data is −1 said control means energizes said second switching means to output said complement data of said second input data from said output terminal thereof, and an addition means (44) for adding said data from said first switching means and said data from said second switching means.

30. A discrete cosine inverse transformation system according to claim 22, wherein said second order inner product computation means comprises a first data input means for inputting a first data comprising factors positioned at an upper position of a diagonal portion of said 10th matrix data [MD10], a first switching means (58) having a first input terminal connected to said first input data means, a second input terminal and an output terminal, a first complement circuit (57), provided between said first data input means and said second input terminal of said first switching means, and computing a complement of a binary data "2" of said input data at said first data input means, a second data input means for inputting a second data comprising factors positioned at a lower position of the diagonal portion of said 10th matrix data [MD10], a second switching means having a first input terminal connected to said second data input means, a second input terminal and an output terminal, a second complement circuit, provided between said second data input means and said second input terminal of said second switching means, and computing a complement of a binary data "2" of said input data at said second data input means, a coefficient control means (56) for controlling the switching operations of said first and second switching means in accordance with element data in said fifth matrix data [L], when a first element data, positioned at a portion corresponding to said first input data, is +1 said control means energizes said first switching means to output said first input data from said output terminal thereof, and when the first element data is −1 said control means energizes said first switching means to output said complement data of said first input data from said output terminal, and, when a second element data, positioned at a portion corresponding to said second input data, is +1 said control means energizes said second switching means to output said first input data from said output terminal thereof, and when the second element data is −1 said control means energizes said second switching means to output said complement data of said second input data from said output terminal thereof, a first accumulation means (53) for accumulating said data from said first switching means, and a second accumulation means (54) for accumulating said data from said second switching means.

31. A discrete cosine inverse transformation system according to claim 22, wherein said third rearrangement means (13) comprises a writable and readable memory means having an eight word storage capacity, said memory means including:

(a) means for receiving and storing eight element data of said 11th matrix data [MD11] therein, (b) means for reading said stored data therefrom, in accordance with an order defined by element data of said sixth constant transposition matrix data ${}^{t}$[Q] corresponding to said element data of said 11th matrix data, and (c) means for continuously repeating said operations (a) and (b) 32 times.

32. A discrete cosine inverse transformation system comprising transforming means for performing a two-dimensional 4-row×8 column discrete cosine inverse transformation of binary data in a matrix form, in accordance with the following formula:

$$IDCT: \vec{X} = (\tfrac{1}{4})\,{}^t[Q][L]\,{}^t[R]\,{}^t[T]\,{}^t[V]\,{}^t[W]\vec{C}$$

where, $\vec{C}$ denotes matrix data to be subjected to the discrete cosine inverse transformation and is defined as follows:

$\vec{C} = C_k$(k=0~7, 10~17, 20~27, 30~37), or $C_{ij}$-(i=0~3, j=0~7)

$$\vec{C} = \begin{bmatrix} c00 \\ c01 \\ c02 \\ \cdot \\ \cdot \\ \cdot \\ c07 \\ c10 \\ c11 \\ c12 \\ \cdot \\ \cdot \\ \cdot \\ c30 \\ \cdot \\ \cdot \\ \cdot \\ c36 \\ c37 \end{bmatrix}$$

$\vec{X}$ denotes matrix data obtained by the discrete cosine inverse transformation and is defined as follows:

$\vec{X} = X_k$(k=0~7, 10~17, 20~27, 30~37), or $X_{ij}$-(i=0~3, j=0~7)

$$\vec{X} = \begin{bmatrix} x00 \\ x01 \\ x02 \\ \cdot \\ \cdot \\ \cdot \\ x07 \\ x10 \\ x11 \\ x12 \\ \cdot \\ \cdot \\ \cdot \\ x30 \\ \cdot \\ \cdot \\ \cdot \\ x36 \\ x37 \end{bmatrix}$$

$^t[W]$ denotes first 32×32 constant transposition matrix data, defined as follows:

$^t[W] = W_{ij}$(i=0~31, j=0~31)

$^t(W) =$ $$\begin{vmatrix}
10000000 & 00000000 & 00000000 & 00000000 \\
00001000 & 00000000 & 00000000 & 00000000 \\
00000000 & 00000000 & 10000000 & 00000000 \\
00000000 & 00000000 & 00001000 & 00000000 \\
00000000 & 00100000 & 00000000 & 00000000 \\
00000000 & 00000000 & 00000000 & 00000010 \\
00000000 & 00000010 & 00000000 & 00000000 \\
00000000 & 00000000 & 00000000 & 00100000
\end{vmatrix}$$

$$\begin{vmatrix}
00100000 & 00000000 & 00000000 & 00000000 \\
00000010 & 00000000 & 00000000 & 00000000 \\
00000000 & 10000000 & 00000000 & 00000000 \\
00000000 & 00000000 & 00000000 & 10000000 \\
00000000 & 00001000 & 00000000 & 00000000 \\
00000000 & 00000000 & 00000000 & 00001000 \\
00000000 & 00000000 & 00100000 & 00000000 \\
00000000 & 00000000 & 00000010 & 00000000
\end{vmatrix}$$

$$\begin{vmatrix}
01000000 & 00000000 & 00000000 & 00000000 \\
00010000 & 00000000 & 00000000 & 00000000 \\
00000100 & 00000000 & 00000000 & 00000000 \\
00000001 & 00000000 & 00000000 & 00000000 \\
00000000 & 00000001 & 00000000 & 00000000 \\
00000000 & 00000000 & 00000000 & 00000100 \\
00000000 & 00000000 & 00000000 & 00010000 \\
00000000 & 01000000 & 00000000 & 00000000
\end{vmatrix}$$

$$\begin{vmatrix}
00000000 & 00000100 & 00000000 & 00000000 \\
00000000 & 00000000 & 00000000 & 01000000 \\
00000000 & 00000000 & 00000000 & 00000001 \\
00000000 & 00010000 & 00000000 & 00000000 \\
00000000 & 00000000 & 01000000 & 00000000 \\
00000000 & 00000000 & 00010000 & 00000000 \\
00000000 & 00000000 & 00000100 & 00000000 \\
00000000 & 00000000 & 00000001 & 00000000
\end{vmatrix}$$

$^t[V]$ denotes second 32×32 transposition matrix data, defined as follows:

$^t[V] = {}^tV_{ij}$(i=0~31, j=0~31)

```
        | ++0 0                                               |
        | +−0 0                                               |
        | 0 0 ++                                              |
        | 0 0 +−                                              |
        |        ++0 0                                        |
        |        0 0 −+                                       |
        |        i j i i                                      |
        |        i j j j                                      |
        |               k n k n                               |
        |               k n m l                               |
        |               l k l k                               |
        |               l k n m                               |
        |                       k n l k                       |
        |                       k n n m                       |
        |                       l k k n                       |
 t(V) = |                       l k m l                       |
        |                                 a f g d             |
        |                                 c a h b             |
        |                                 b d a g             |
        |                                 h g b a             |
        |                                        a f g d      |
        |                                        h g b a      |
        |                                        c a h b      |
        |     O                                  b d a g      |
        |                                               a f g h        |
        |                                               d c f a        |
        |                                               c a h f        |
        |                                               b d a c        |
        |                                                      a f g d |
        |                                                      c a h b |
        |                                                      b d a g |
        |                                                      h g b a |

      = | tV1  O   |
        | O    tV1 |
```

wherein, $a=-e=\cos(\pi/16)$ $b=-f=\cos(3\pi/16)$ $c=-g=\cos(5\pi/16)$ $d=-h=\cos(7\pi/16)$ $i=-j=\cos(4\pi/16)$ $k=-m=\cos(2\pi/16)$ $l=-n=\cos(6\pi/16)$ $^t[T]$ denotes third 32×32 constant transposition matrix data, defined as follows:

$^t[T]={}^tT_{ij}(i=0\sim31,\ j=0\sim31)$

```
        | 1 0 1 0 1 0 1 0   1 0 1 0 1 0 1 0                                      |
        | 1 0 1 0 1 0 1 0   −0 −0 −0 −0                                          |
        | 1 0 −0 0 −0 1     1 0 0 1 0 1 −0                                       |
        | 1 0 −0 0 −0 1     −0 0 −0 −1 0                                         |
        | 1 0 −0 0 1 0 −    0 1 1 0 −0 0 1                                       |
        | 1 0 −0 0 1 0 −    0 −−0 1 0 0 −                                        |
        | 1 0 1 0 −0 −0     0 1 0 1 0 −0 −                                       |
        | 1 0 1 0 −0 −0     0 −0 −0 1 0 1                          O             |
        | 0 1 0 1 0 1 0 1   1 0 0 −−0 0 −                                        |
        | 0 1 0 1 0 1 0 1   −0 0 1 1 0 0 1                                       |
        | 0 1 0 −1 0 −0     1 0 −0 0 −0 1                                        |
        | 0 1 0 −1 0 −0     −0 1 0 0 1 0 −                                       |
        | 0 1 0 −−0 1 0     0 1 0 −1 0 −0                                        |
        | 0 1 0 −−0 1 0     0 −0 1 −0 1 0                                        |
        | 0 1 0 1 0 −0 −    0 1 −0 0 1 1 0                                       |
 t(T) = | 0 1 0 1 0 −0 −    0 −1 0 0 −−0                                         |
        |                                   0 −1 0 −−−−       1 −1 −0 −1 0       |
        |                                   0 1 1 0 0 1 −0    0 −0 1 0 1 1 0     |
        |                                   0 −1 0 0 0 0 0    0 0 0 0 0 1 −0     |
        |                                   0 1 1 0 −−1 1     −1 1 −0 −−0        |
        |                                   0 −1 0 0 0 0 0    0 0 0 0 0 1 −0     |
        |                                   0 1 1 0 1 0 0 −   1 0 −0 0 −−0       |
        |                                   0 −1 0 1 1 1 1    −1 −1 0 −1 0       |
        |                                   0 1 1 0 0 0 1 0   0 −0 0 0 1 1 0     |
```

-continued

```
                 1 0 0 1 0 0 0 0   0 0 1 0 1 0 0 1 |
                 1 0 0 −1 −0 1     1 0 0 1 1 0 0 − |
                 1 0 0 1 0 1 0 1   1 0 0 − −0 0 −  |
        O        1 0 0 −0 0 −0     0 1 1 0 −0 0 1  |
                 1 0 0 1 1 −0 −    −0 0 1 −0 0 −   |
                 1 0 0 −0 0 1 0    0 − −0 −0 0 1   |
                 1 0 0 1 −0 −0     0 1 −0 1 0 0 1  |
                 1 0 0 − −1 0 −    −0 0 −1 0 0 −   |
```

$$= \begin{vmatrix} {}^tT1 & O \\ O & {}^tT1 \end{vmatrix}$$

$^t$[R] denotes fourth 32×32 constant transposition matrix data, defined as follows:

$^t[R]={}^tR_{ij}(i=0\sim31, j0\sim31)$

```
        |10000000 00000000 00000000 00000000|
        |00000000 00000000 00000001 00000000|
        |00000000 10000000 00000000 00000000|
        |00000000 00000000 00000000 00000001|
        |00000000 00000001 00000000 00000000|
        |00000000 00000000 00000000 10000000|
        |00000001 00000000 00000000 00000000|
        |00000000 00000000 10000000 00000000|

        |00100000 00000000 00000000 00000000|
        |00000000 00000000 00000100 00000000|
        |00000000 00100000 00000000 00000000|
        |00000000 00000000 00000000 00000100|
        |00000000 00000100 00000000 00000000|
        |00000000 00000000 00000000 00100000|
t(R) =  |00000100 00000000 00000000 00000000|
        |00000000 00000000 00100000 00000000|
```

-continued

```
|00001000 00000000 00000000 00000000|
|00000000 00000000 00010000 00000000|
|00000000 00001000 00000000 00000000|
|00000000 00000000 00000000 00010000|
|00000000 00010000 00000000 00000000|
|00000000 00000000 00000000 00001000|
|00010000 00000000 00000000 00000000|
|00000000 00000000 00001000 00000000|

|00000010 00000000 00000000 00000000|
|00000000 00000000 01000000 00000000|
|00000000 00000010 00000000 00000000|
|00000000 00000000 00000000 01000000|
|00000000 01000000 00000000 00000000|
|00000000 00000000 00000000 00000010|
|01000000 00000000 00000000 00000000|
|00000000 00000000 00000010 00000000|
```

[L] denotes fifth 32×32 constant matrix data, defined as follows:

$[L]=L_{ij}(i=0\sim31, j=0\sim31)$

```
      ┌ ++                                                      ┐
      │ +−                                                      │
      │    ++                                                   │
      │    +−                                                   │
      │       ++                                                │
      │       +−                                                │
      │          ++                                             │
      │          +−                                             │
      │             ++                                          │
      │             +−                   O                      │
      │                ++                                       │
      │                +−                                       │
      │                   ++                                    │
      │                   +−                                    │
      │                      ++                                 │
(L) = │                      +−                                 │
      │                         ++                              │
      │                         +−                              │
      │                            ++                           │
      │                            +−                           │
      │                               ++                        │
      │                               +−                        │
      │          O                       ++                     │
      │                                  +−                     │
      │                                     ++                  │
      │                                     +−                  │
      │                                        ++               │
      │                                        +−               │
      │                                           ++            │
      │                                           +−            │
      │                                              ++         │
      └                                              +−         ┘
```

$^t$[Q] denotes sixth 32×32 constant transposition matrix data, defined as follows:

$^t[Q]={}^tQ_{ij}(i=0\sim31, j=0\sim31)$ $^t[Q] =$

-continued $$\left|\begin{array}{cccc}
10000000 & & & \\
00100000 & & & \\
00001000 & & & \\
00000010 & & & \\
00000001 & & & \\
00000100 & & O & \\
00010000 & & & \\
01000000 & & & \\
 & 10000000 & & \\
 & 00100000 & & \\
 & 00001000 & & \\
 & 00000010 & & \\
 & 00000001 & & \\
 & 00000100 & & \\
 & 00010000 & & \\
 & 01000000 & & \\
 & & 10000000 & \\
 & & 00100000 & \\
 & & 00001000 & \\
 & & 00000010 & \\
 & & 00000001 & \\
 & & 00000100 & \\
 & & 00010000 & \\
 & & 01000000 & \\
 & & & 10000000 \\
O & & & 00100000 \\
 & & & 00001000 \\
 & & & 00000010 \\
 & & & 00000001 \\
 & & & 00000100 \\
 & & & 00010000 \\
 & & & 01000000
\end{array}\right|$$

wherein said transforming means comprises:

a first rearrangement means (3) for rearranging said matrix data $\vec{C}$ in accordance with positions of factors "1" in said first 32×32 constant transposition matrix data $^t[W]$, as an inner product computation: $^t[W]\cdot\vec{C}$, to provide seventh matrix data: $[MD7]={}^t[W]\cdot\vec{C}$;

a serial to parallel conversion means (15) for continuously receiving two consecutive serial data from said first rearrangement means (3) and outputting two parallel data, to thereby provide matrix data as eighth matrix data [MD8];

a first fourth-order inner product computation means (5A), connected to a first output terminal of said serial to parallel conversion means (15), for computing a fourth-order inner product computation between said eighth matrix data [MD8] and a first 16×16 sub-matrix, data $^t[V_0]$ of said second transposition matrix data $^t[V]$, to provide ninth 16×16 matrix data $[MD9]={}^t[V_0]\cdot[MD8]$;

a first eighth-order inner product computation means (7A), connected to said first fourth-order inner product computation means, for computing an eighth-order inner product computation between a first 16×16 sub-matrix data $^t[T_0]$ of said third transposition matrix data $^t[T]$ and a first 16×16 sub-matrix data [MD9] of said ninth matrix data [MD9] output from said first fourth-order inner product computation means, to provide 10th 16×16 matrix data $[MD10]={}^t[T_0]\cdot[MD9]$;

a second fourth-order inner product computation means (5B), connected to a second output terminal of said serial to parallel conversion means (15), for computing a fourth order inner product computation between said eighth matrix data [MD11] and a second 16×16 sub-matrix data $^t[V_1]$ of said second transposition matrix data $^t[V]$, to provide 11th 16×16 matrix data $[\mathbf{MD11}]={}^t[V_1]\cdot[\mathbf{MD8}]$;

a second eighth-order inner product computation means (7B), connected to said second fourth-order inner product computation means, for computing an eighth-order inner product computation between a second 16×16 sub-matrix data $^t[T_1]$ of said third transposition matrix data $^t[T]$ and a second 16×16 sub-matrix data [MD11] of said 11th matrix data [MD11] output from said second fourth-order inner product computation means, to provide 12th 16×16 matrix data $[\mathbf{MD12}]={}^t[T_1]\cdot[\mathbf{MD11}]$;

an addition and subtraction means (11') computing a second-order inner product computation between said fifth constant matrix data [L], including an addition means (11A), a subtraction means (11B) and a parallel to serial conversion means (21) having a first input terminal connected to an output terminal of said addition means, and a second input terminal connected to an output terminal of said subtraction means, said addition means adding a data output from said first eighth-order inner product computation means and a data output from said second eighth-order inner product computation means, said subtraction means subtracting said data output from said second eighth-order inner product computation means from said data output from said first eighth-order inner product computation means, and said conversion means receiving the results of said addition means and subtraction means and outputting them as two consecutive serial data, as 13th matrix data [MD13];

a second rearrangement means (13) for rearranging said 13th matrix data [MD13] output from said parallel to serial conversion means in accordance with positions of factors "1" in said sixth 32×32 constant transposition matrix data $^t[Q]$, as an inner product computation: $^t[Q]\cdot[\mathbf{MD13}]$, to provide 14th matrix data $[\mathbf{MD14}]={}^t[Q]\cdot[\mathbf{MD13d}]$; and a shift means for shifting said 14th matrix data [MD14] by two bits, to thereby provide said matrix data $\vec{X}=[\mathbf{MD14}]/4$.

33. A discrete cosine inverse transformation system according to claim 32, wherein said first rearrangement means (3) comprises a writable and readable memory means having a 32 word storage capacity, said memory means including:

(a) means for receiving and storing 32 element data of said matrix data $\vec{C}$ therein, (b) means for reading said stored data therefrom, in accordance with an order defined by element data of said first transposition matrix data $^t[W]$ corresponding to said element data of said matrix data $\vec{C}$, and (c) means for continuously repeating said operations (a) and (b) four times.

34. A discrete cosine inverse transformation system according to claim 32, wherein said first fourth-order product computation means comprises first to fourth multiplication means (102 to 105), an addition means (106) and a coefficient control means (107) holding coefficients in said first sub-matrix $^t[V_0]$ of said second transposition matrix data $^t[V]$ as element data, said coefficient control means applying four element data in each line of said second transposition matrix data to said first to fourth multiplication means at each data input time, said first to fourth multiplication means multiplying the respective input data of said eighth matrix data [MD8] and said applied element data, and said addition means adding data multiplied at said first to fourth multiplication means.

35. A discrete cosine inverse transformation system according to claim 32, wherein said first fourth-order product computation means comprises first to fourth multiplication and accumulation means, each including a multiplication means (102, 103, 104, 105), an addition means having a first input terminal connected to an output terminal of said multiplication, and a second input terminal, and a data holding means having an input terminal connected to an output terminal of said addition means and an output terminal connected to said second input terminal of said addition means, said product computation means further comprises a coefficient control means holding coefficients in said first sub-matrix $^t[V_0]$ of said second transposition matrix data $^t[V]$ as element data, said coefficient control means applying four element data in each line of said second transposition matrix data to each multiplication means at each data input time, said each multiplication means multiplying the respective input data of said eighth matrix data [MD8] and said applied element data, and said each addition means adding data multiplied at said each multiplication means and data held in said each data holding means.

36. A discrete cosine inverse transformation system according to claim 32, wherein said first eighth-order inner product computation means (7A) comprises eight computing means (81 to 83) provided in parallel, each including a data input terminal receiving a data of a first 16×16 sub-matrix data of said ninth matrix data [MD9], a switching means having a first input terminal connected to said input terminal, a second input terminal, a third input terminal applied a data "0" and an output terminal, a complement means, provided between said data input terminal and said second input terminal of said switching means, and computing a complement of a binary data "2" of said input data at said data input terminal, and an accumulation means for accumulating data from said switching means, said inner product computation means further comprises a coefficient control means (88) for controlling the switching operations of said switching means in said respective computing means in accordance with element data in said first sub-matrix $^t[T_0]$ of said third transposition matrix data $^t[T]$, said coefficient control means simultaneously controlling said respective switching means as follows:

when the element data positioned at a portion corresponding to the input data in each computing means is +1, said control means energizes the switching means to output said input data applied to said first input terminal thereof from said output terminal thereof, when the element data is −1, said control means energizes the switching means to output said complement data applied to said second input terminal thereof from said output terminal thereof, and when the element data is zero, said control means energizes the switching means to output the data zero applied to said third input terminal thereof from said output terminal thereof.

37. A discrete cosine inverse transformation system according to claim 32, wherein said first eighth-order inner product computation means (7A) comprises eight computing means (91 to 92), each including a data input terminal receiving a data in a first 16×16 sub-matrix of said ninth matrix data [MD9], a first switching means (91*b*) having a first input terminal connected to said data input terminal, a second input terminal, a third input terminal applying a data "0", and an output terminal, a complement computing means (91*a*) provided between said data input terminal and said second input terminal of said first switching means and computing a complement of a binary data "2" of said input data at said data input terminal, an addition means (91*c*) having a first input terminal connected to said output terminal of said first switching means, and a second input terminal, a second switching means (91*d*) having an input terminal connected to an output of said addition means, and first and second output terminals, a first data holding means (91*e*) having an input terminal connected to said first output terminal of said second switching means, holding the data from said addition means through said second switching means by a predetermined time, a second data holding means (91*f*) having an input terminal connected to said second output terminal of said second switching means, holding the data from said addition means through said second switching means by the predetermined time, and a third switching means (91*g*) having a first input terminal connected to an output of said first data holding means, a second input terminal connected to an output of said second data holding means, and an output terminal connected to said second input terminal of said addition means, said inner product computation means further comprises a coefficient control means (94) for controlling switching operations of said first to third switching means in said respective computing means in accordance with element data in said first sub-matrix data $^t[T_0]$ of said third transposition matrix data $^t[T]$, said coefficient control means simultaneously controlling said first to third switching means in said respective computing means, as follows:

when the element data positioned at a portion corresponding to the input data in each computing means is +1, said coefficient control means energizes said first switching means to output said input data applied to said first input terminal thereof from said output terminal thereof, when the element data is −1, said coefficient control means energizes said first switching means to output said complement data applied to said second input terminal thereof from said output terminal thereof, and when the element data is 0, said coefficient control means energizes said first switching means to output said data "0" applied to said third input terminal thereof from said output terminal thereof, and said coefficient control means controlling said second and third switching means so that said first data holding means is connected between the output and said second input terminal of said addition means when first eight data in each line of said ninth matrix data are input, and said second data holding means is connected between the output and said second input terminal of said addition means when second eight data in said each line of said ninth matrix data are input.

38. A discrete cosine inverse transformation system according to claim 32, wherein said second fourth-order product computation means comprises first to fourth multiplication means (102 to 105), an addition means (106) and a coefficient control means (107) holding coefficients in a second sub-matrix $^t[V_1]$ of said third transposition matrix data $^t[V]$ as element data, said coefficient control means applying four element data in each line of said third transposition matrix data to said first to fourth multiplication means at each data input time, said first to fourth multiplication means multiplying the respective input data of a second 16×16 matrix data in said eighth matrix data [MD8] and said applied element data, and said addition means adding data multiplied at said first to fourth multiplication means.

39. A discrete cosine inverse transformation system according to claim 32, wherein said second fourth-order product computation means comprises first to fourth multiplication and accumulation means, each including a multiplication means (102, 103, 104, 105), an addition means having a first input terminal connected to an output terminal of said multiplication, and a second input terminal, and a data holding means having an input terminal connected to an output terminal of said addition means and an output terminal connected to said second input terminal of said addition means, said product computation means further comprises a coefficient control means holding coefficients in a second sub-matrix $^t[V_1]$ of said third transposition matrix data $^t[V]$ as element data, said coefficient control means applying four element data in each line of said third transposition matrix data to each multiplication means at each data input time, said each multiplication means multiplying the respective input data of a second 16×16 sub-matrix data in said eighth matrix data and said applied element data, and said each addition means adding data multiplied at said each multiplication means and data held in said each data holding means.

40. A discrete cosine inverse transformation system according to claim 32, wherein said second eighth-order inner product computation means (7B) comprises eight computing means (81 to 83) provided in parallel, each including a data input terminal receiving a data of a second 16×16 sub-matrix data of said eleventh matrix data [MD11], a switching means having a first input terminal connected to said input terminal, a second input terminal, a third input terminal applied a data "0" and an output terminal, a complement means, provided between said data input terminal and said second input terminal of said switching means, and computing a complement of a binary data "2" of said input data at said data input terminal, and an accumulation means for accumulating data from said switching means, said inner product computation means further comprises a coefficient control means (88) for controlling the switching operations of said switching means in said respective computing means in accordance with element data in a second sub-matrix $^t[T_1]$ of said third transposition matrix data $^t[T]$, said coefficient control means simultaneously controlling said respective switching means as follows:

when the element data positioned at a portion corresponding to the input data in each computing means is +1, said control means energizes the switching means to output said input data applied to said first input terminal thereof from said output terminal thereof, when the element data is −1, said control means energizes the switching means to output said complement data applied to said second input terminal thereof from said output terminal thereof, and when the element data is zero, said control means energizes the switching means to output the data of zero applied to said third input terminal thereof from said output terminal thereof.

41. A discrete cosine inverse transformation system according to claim 32, wherein said second eighth-order inner product computation means (7B) comprises eight computing means (91 to 92) each including a data input terminal receiving a data in a second 16×16 sub-matrix of said ninth matrix data [MD9], a first switching means (**91*b*) having a first input terminal connected to said data input terminal, a second input terminal, a third input terminal applied a data "0", and an output terminal, a complement computing means (91*a*) provided between said data input terminal and said second input terminal of said first switching means and computing a complement of a binary data "2" of said input data at said data input terminal, an addition means (91*c*) having a first input terminal connected to said output terminal of said first switching means, and a second input terminal, a second switching means (91*d*) having an input terminal connected to an output of said addition means, and first and second output terminals, a first data holding means (91*e*) having an input terminal connected to said first output terminal of said second switching means, holding the data from said addition means through said second switching means by a predetermined time, a second data holding means (91*f*) having an input terminal connected to said second output terminal of said second switching means, holding the data from said addition means through said second switching means by the predetermined time, and a third switching means (91*g***) having a first input terminal connected to an output of said first data holding means, a second input terminal connected to an output of said second data holding means, and an output terminal connected to said second input terminal of said addition means, said inner product computation means further comprises a coefficient control means (94) for controlling switching operations of said first to third switching means in said respective computing means in accordance with element data in a second sub-matrix data ${}^t[T_1]$ of said third transposition matrix data ${}^t[T]$, said coefficient control means simultaneously controlling said first to third switching means in said respective computing means, as follows:

when the element data positioned at a portion corresponding to the input data in each computing means is +1, said coefficient control means energizes said first switching means to output said input data applied to said first input terminal thereof from said output terminal thereof, when the element data is −1, said coefficient control means energizes said first switching means to output said complement data applied to said second input terminal thereof from said output terminal thereof, and when the element data is 0, said coefficient control means energizes said first switching means to output said data "0" applied to said third input terminal thereof from said output terminal thereof, and said coefficient control means controlling said second and third switching means so that said first data holding means is connected between the output and said second input terminal of said addition means when first eight data in each line of said eleventh matrix data are input, and said second data holding means is connected between the output and said second input terminal of said addition means when second eight data in said each line of said eleventh matrix data are input.

42. A discrete cosine inverse transformation system according to claim 32, wherein said second rearrangement means (13) comprises a writable and readable memory means having an eight word storage capacity, said memory means including:

(a) means for receiving and storing eight element data of said 13th matrix data [MD13] therein, (b) means for reading said stored data therefrom, in accordance with an order defined by element data of said sixth transposition matrix data ${}^t[Q]$ corresponding to said element data of said 13th matrix data, and (c) means for continuously repeating said operations (a) and (b) 32 times.

43. A discrete cosine transformation system comprising transforming means for performing a two-dimensional 4-row×8 column discrete cosine transformation of binary data in a matrix form, in accordance with the following formula:

$$DCT;\vec{C}=(\tfrac{1}{4})\,[U][T][S][R][L][Q]\vec{X}$$

where, $\vec{X}$ denotes matrix data to be subjected to the discrete cosine transformation and is defined as follows:

$\vec{X}=X_k(k=0\sim7,\ 10\sim17,\ 20\sim27,\ 30\sim37)$, or $X_{ij}$ $(i=0\sim3, j=0\sim7)$ $$\vec{X}=\begin{bmatrix} x00 \\ x01 \\ x02 \\ \vdots \\ x07 \\ x10 \\ x11 \\ x12 \\ \vdots \\ x30 \\ \vdots \\ x36 \\ x37 \end{bmatrix}$$

$\vec{C}$ denotes matrix data obtained by the discrete cosine transformation and is defined as follows:

$\vec{C}=C_k(k=0\sim7,\ 10\sim17,\ 20\sim27,\ 30\sim37)$, or $C_{ij}$ $(i=0\sim3, j=0\sim7)$ $$\vec{C}=\begin{bmatrix} c00 \\ c01 \\ c02 \\ \vdots \\ c07 \\ c10 \\ c11 \\ c12 \\ \vdots \\ c30 \\ \vdots \\ c36 \\ c37 \end{bmatrix} \quad (8)$$

[Q] denotes first 32×32 constant matrix data, defined as follows:

$[Q]=Q_{ij}(i=0\sim31, j=0\sim31)$ $$[Q]=\begin{vmatrix}
10000000 & 00000000 & 00000000 & 00000000 \\
00000001 & 00000000 & 00000000 & 00000000 \\
00000000 & 00000000 & 00000000 & 10000000 \\
00000000 & 00000000 & 00000000 & 00000001 \\
01000000 & 00000000 & 00000000 & 00000000 \\
00000010 & 00000000 & 00000000 & 00000000 \\
00000000 & 00000000 & 00000000 & 01000000 \\
00000000 & 00000000 & 00000000 & 00000010 \\
\\
00100000 & 00000000 & 00000000 & 00000000 \\
00000100 & 00000000 & 00000000 & 00000000 \\
00000000 & 00000000 & 00000000 & 00100000 \\
00000000 & 00000000 & 00000000 & 00000100 \\
00010000 & 00000000 & 00000000 & 00000000 \\
00001000 & 00000000 & 00000000 & 00000000 \\
00000000 & 00000000 & 00000000 & 00010000 \\
00000000 & 00000000 & 00000000 & 00001000
\end{vmatrix}$$

-continued

```
00000000 10000000 00000000 00000000
00000000 00000001 00000000 00000000
00000000 00000000 10000000 00000000
00000000 00000000 00000001 00000000
00000000 01000000 00000000 00000000
00000000 00000010 00000000 00000000
00000000 00000000 01000000 00000000
00000000 00000000 00000010 00000000

00000000 00100000 00000000 00000000
00000000 00000100 00000000 00000000
00000000 00000000 00100000 00000000
00000000 00000000 00000100 00000000
00000000 00010000 00000000 00000000
00000000 00001000 00000000 00000000
00000000 00000000 00010000 00000000
00000000 00000000 00001000 00000000
```

[L] denotes second 32×32 matrix data, defined as follows:

[L]=$L_{ij}$(i=0~31, j=0~31)

```
      |++++                                      |
      |+-+-                                      |
      |++--                                      |
      |+--+                                      |
      |    ++++                                  |
      |    +-+-                                  |
      |    ++--                                  |
      |    +--+                                  |
      |        ++++                 O            |
      |        +-+-                              |
      |        ++--                              |
      |        +--+                              |
      |            ++++                          |
      |            +-+-                          |
      |            ++--                          |
[L] = |            +--+                          |
      |                ++++                      |
      |                +-+-                      |
      |                ++--                      |
      |                +--+                      |
      |                    ++++                  |
      |                    +-+-                  |
      |                    ++--                  |
      |                    +--+                  |
      |                        ++++              |
      |       O                +-+-              |
      |                        ++--              |
      |                        +--+              |
      |                            ++++          |
      |                            +-+-          |
      |                            ++--          |
      |                            +--+          |
```

[R] denotes third 32×32 constant matrix data, defined as follows:

[R]=$R_{ij}$(i=0~31, j=0~31)

[R] =

```
10000000 00000000 00000000 00000000
00001000 00000000 00000000 00000000
00000000 10000000 00000000 00000000
00000000 00001000 00000000 00000000
00000000 00000000 10000000 00000000
00000000 00000000 00001000 00000000
00000000 00000000 00000000 10000000
00000000 00000000 00000000 00001000
```

-continued

```
00000000 00000000 00100000 00000000
00000000 00000000 00000010 00000000
00000000 00000000 00000000 00100000
00000000 00000000 00000000 00000100
00100000 00000000 00000000 00000000
00000010 00000000 00000000 00000000
00000000 00100000 00000000 00000000
00000000 00000010 00000000 00000000

00000000 00000100 00000000 00000000
00000000 01000000 00000000 00000000
00000100 00000000 00000000 00000000
01000000 00000000 00000000 00000000
00000000 00000000 00000000 00000100
00000000 00000000 00000000 01000000
00000000 00000000 00000100 00000000
00000000 00000000 01000000 00000000
```

```
00000000 00000000 00000000 00000001
00000000 00000000 00000000 00010000
00000000 00000000 00000001 00000000
00000000 00000000 00010000 00000000
00000000 00000001 00000000 00000000
00000000 00010000 00000000 00000000
00000001 00000000 00000000 00000000
00010000 00000000 00000000 00000000
```

[S] denotes fourth 32×32 constant matrix data, defined as follows:

[S]=$S_{ij}$(i=0~31, j=0~31)

```
       | 1 1 1 1 0 0 0 0                                                  |
       | 0 0 0 0 1 1 1 1                                                  |
       | 1 — —1 0 0 0 0                                                   |
       | 0 0 0 0 1 — —1                                                   |
       | 1 1 — —0 0 0 0                                                   |
       | 0 0 0 0 1 1 — —                                                  |
       | 1 —1 —0 0 0 0                                                    |
       | 0 0 0 0 1 —1 —                                   O               |
       |                 1 0 0 1 0 1 1 0                                  |
       |                 0 1 1 0 1 0 0 1                                  |
       |                 1 0 0 1 0 — —0                                   |
       |                 0 1 1 0 —0 0 —                                   |
       |                 1 0 0 —0 1 —0                                    |
       |                 0 1 —0 —0 0 1                                    |
       |                 1 0 0 —0 —1 0                                    |
[S] =  |                 0 1 —0 1 0 0 —                                   |
       |                                 1 0 0 1 1 0 0 1                  |
       |                                 0 1 1 0 0 1 1 0                  |
       |                                 1 0 0 —1 0 0 —                   |
       |                                 0 1 —0 0 1 —0                    |
       |                                 1 0 0 1 —0 0 —                   |
       |                                 0 1 1 0 0 — —0                   |
       |                                 1 0 0 — —0 0 1                   |
       |          O                      0 1 —0 0 —1 0                    |
       |                                                 1 1 0 0 0 0 1 1  |
       |                                                 0 0 1 —1 —0 0    |
       |                                                 1 0 —0 0 —0 —    |
       |                                                 0 1 0 — —0 —0    |
       |                                                 1 0 1 0 0 1 0 —  |
       |                                                 0 1 0 1 1 0 —0   |
       |                                                 1 —0 0 0 0 —1    |
       |                                                 0 0 1 1 — —0 0   |

       | S1         O  |
       |    S2         |
    =  |                |
       |       S3       |
       | O        S4   |
```

[T] denotes fifth 32×32 constant matrix data including irrational numbers, defined as follows:

$[T]=T_{ij}(i=0\sim31, j=0\sim31)$

```
       | + + 0 0                                                                   |
       | + — 0 0                                                                   |
       | 0 0 + +                                                                   |
       | 0 0 + —                                                                   |
       |         k k l l                                                           |
       |         k m l n                                                           |
       |         n n k k                                                           |
       |         n l k m                                          O                |
       |                 k k n n                                                   |
       |                 n n m m                                                   |
       |                 n l k m                                                   |
       |                 m k n l                                                   |
       |                         i j 0 +                                           |
       |                         j j —0                                            |
       |                         j j +0                                            |
[T] =  |                         j i 0 +                                           |
       |                                 b a g h                                   |
       |                                 d f e g                                   |
       |                                 a g d b                                   |
       |                                 g d f a                                   |
       |                                         b a g h                           |
       |                                         d f e g                           |
       |                                         a g d b                           |
       |          O                              g d f a                           |
       |                                                 a h f g                   |
       |                                                 b c d a                   |
       |                                                 h e g b                   |
       |                                                 g b e d                   |
       |                                                         e h c b           |
       |                                                         g f d e           |
       |                                                         h a b g           |
       |                                                         b g a d           |
```

-continued $$= \begin{vmatrix} T1 & & & \\ & T2 & & O \\ & & T3 & \\ O & & & T4 \end{vmatrix}$$

wherein, $a=-e=\cos(\pi/16)$
$b=-f=\cos(3\pi/16)$
$c=-g=\cos(5\pi/16)$
$d=-h=\cos(7\pi/16)$
$i=-j=\cos(4\pi/16)$
$k=-m=\cos(2\pi/16)$
$l=-n=\cos(6\pi/16)$

[U] denotes sixth 32×32 constant matrix data, defined as follows:

$[U]=U_{ij}(i=0\sim 31, j=0\sim 31)$ $$[U] = \begin{vmatrix}
10000000 & 00000000 & 00000000 & 00000000 \\
00000000 & 00000000 & 10000000 & 00000000 \\
00001000 & 00000000 & 00000000 & 00000000 \\
00000000 & 00000000 & 01000000 & 00000000 \\
00100000 & 00000000 & 00000000 & 00000000 \\
00000000 & 00000000 & 00100000 & 00000000 \\
00000010 & 00000000 & 00000000 & 00000000 \\
00000000 & 00000000 & 00010000 & 00000000 \\
 & & & \\
00000000 & 10000000 & 00000000 & 00000000 \\
00000000 & 00000000 & 00000000 & 10000000 \\
00000000 & 00001000 & 00000000 & 00000000 \\
00000000 & 00000000 & 00000000 & 00001000 \\
00000000 & 00100000 & 00000000 & 00000000 \\
00000000 & 00000000 & 00000000 & 00000010 \\
00000000 & 00000010 & 00000000 & 00000000 \\
00000000 & 00000000 & 00000000 & 00100000 \\
 & & & \\
01000000 & 00000000 & 00000000 & 00000000 \\
00000000 & 00000000 & 00001000 & 00000000 \\
00000100 & 00000000 & 00000000 & 00000000 \\
00000000 & 00000000 & 00000100 & 00000000 \\
00010000 & 00000000 & 00000000 & 00000000 \\
00000000 & 00000000 & 00000010 & 00000000 \\
00000001 & 00000000 & 00000000 & 00000000 \\
00000000 & 00000000 & 00000001 & 00000000 \\
 & & & \\
00000000 & 01000000 & 00000000 & 00000000 \\
00000000 & 00000000 & 00000000 & 00000100 \\
00000000 & 00000100 & 00000000 & 00000000 \\
00000000 & 00000000 & 00000000 & 01000000 \\
00000000 & 00010000 & 00000000 & 00000000 \\
00000000 & 00000000 & 00000000 & 00010000 \\
00000000 & 00000001 & 00000000 & 00000000 \\
00000000 & 00000000 & 00000000 & 00000001
\end{vmatrix}$$

wherein said transforming means comprises:

a first rearrangement means (122) for rearranging said matrix data $\vec{X}$ in accordance with positions of factors "1" in said first 32×32 constant matrix data [Q], as an inner product computation; $[Q]\cdot\vec{X}$, to provide seventh matrix data: $[MD7]=[Q]\cdot\vec{X}$ a first fourth-order inner product computation means (124) for computing a second order inner product computation between said second 32×32 constant matrix data [L] and said seventh matrix data [MD7], to provide eighth matrix data: $[MD8]=[L]\cdot[MD7]$;

a second rearrangement means (126) for rearranging eighth matrix data [MD8] in accordance with position of factors "1" in said third 32×32 constant matrix data [R], as an inner product computation: $[R]\cdot[MD8]$ to provide ninth matrix data: $[MD9]=[R]\cdot[MD8]$;

a second fourth-order inner product computation means (128) for computing a fourth order product computation between said fourth 32×32 constant matrix data [S] and said ninth matrix data [MD9], to provide 10th matrix data: $[MD10]=[S]\cdot[MD9]$;

a third fourth-order inner product computation means (130) for computing a fourth order product computation between said fifth 32×32 constant matrix data [T] and said 10th matrix data [MD10], to provide 11th matrix data: $[MD11]=[T]\cdot[MD10]$;

a third rearrangement means (132) for rearranging said 11th matrix data [MD11] in accordance with positions of factors "1" in said sixth 32×32 constant matrix data [U], as an inner product computation: $[U]\cdot[MD11]$, to provide 12th matrix data $[MD12]=[U]\cdot[MD11]$; and a shift means for shifting said 12th matrix data [MD12] by three bits, to thereby provide said matrix data $\vec{C}=[MD12]/8$.

44. A discrete cosine transformation system according to claim 43, wherein said third fourth-order inner product computation means (130) comprises:

a first multiplication, addition and subtraction means (130A) for multiplying, adding and subtracting said first sub-matrix data of said 10th matrix data with a first 8×8 sub-matrix data [T1] in a diagonal line of said fifth matrix data [T], to provide a first 8×8 sub-matrix data of said 11th matrix data;

a second multiplication, addition and substraction means (130B) for multiplying, adding and subtracting said second sub-matrix data of said 10th matrix data with a third 8×8 sub-matrix data [T3] in the diagonal line of said fifth matrix data [T], to provide a second 8×8 sub-matrix data of said 11th matrix data;

a third multiplication, addition and substraction means (130C) for multiplying, adding and substracting said third sub-matrix data of said 10th matrix data with a second 8×8 sub-matrix data [T2] in the diagonal line of said fifth matrix data [T], to provide a third 8×8 sub-matrix data of said 11th matrix data; and a fourth multiplication, addition and substraction means (130D) for multiplying, adding and substracting said fourth sub-matrix data of said 10th matrix data with a fourth 8×8 sub-matrix data [T4] in the diagonal line of said fifth matrix data [T], to provide a fourth 8×8 sub-matrix data of said 11th matrix data.

45. A discrete cosine transformation system according to claim 43, wherein said second fourth-order inner product computation means (128) comprises a first addition and subtraction means (128A) for adding and subtracting said first sub-matrix of said ninth matrix data in accordance with a first submatrix [S1] in said fourth matrix data [S], to provide a first sub-matrix data of said 10th matrix data, a second addition and subtraction means (128B) for adding and subtracting said second sub-matrix of said ninth matrix data in accordance with a third sub-matrix [S3] in said fourth matrix data [S], to provide a second sub-matrix data of said 10th matrix data, a third addition and subtraction means (128C) for adding and subtracting said third sub-matrix of said ninth matrix data in accordance with a second sub-matrix [S2] in said fourth matrix data [S], to provide a third sub-matrix data of said 10th matrix data, and a fourth addition and subtraction means (128D) for adding and subtracting said fourth sub-matrix of said ninth matrix data in accordance with a fourth sub-matrix [S4] in said fourth matrix data [S], to provide a fourth sub-matrix data of said 10th matrix data.

46. A discrete cosine transformation system according to claim 45, wherein said third fourth-order inner product computation means (130) comprises a first multiplication, addition and subtraction means (130A) for multiplying, adding and subtracting said first sub-matrix data of said 10th matrix data with a first 8×8 sub-matrix data [T1] in a diagonal line of said fifth matrix data [T], to provide a first 8×8 sub-matrix data of said 11th matrix data, a second multiplication, addition and subtraction means (130B) for multiplying, adding and subtracting said second sub-matrix data of said 10th matrix data with a third 8×8 sub-matrix data [T3] in the diagonal line of said fifth matrix data [T], to provide a second 8×8 sub-matrix data of said 11th matrix data, a third multiplication, addition and subtraction means (130C) for multiplying, adding and subtracting said third sub-matrix data of said 10th matrix data with a second 8×8 sub-matrix data [T2] in the diagonal line of said fifth matrix data [T], to provide a third 8×8 sub-matrix data of said 11th matrix data, and a fourth multiplication, addition and subtraction means (130D) for multiplying, adding and subtracting said fourth sub-matrix data of said 10th matrix data with a fourth 8×8 sub-matrix data [T4] in the diagonal line of said fifth matrix data [T], to provide a fourth 8×8 sub-matrix data of said 11th matrix data.

47. A discrete cosine inverse transformation system comprising transforming means for performing a two-dimensional 4-row×8 column discrete cosine inverse transformation of binary data in a matrix form, in accordance with the following formula:

$$\text{IDCT}: \vec{X} = (\tfrac{1}{4})\,{}^t[Q][L]\,{}^t[R]\,{}^t[S]\,{}^t[T]\,{}^t[U]\vec{C}$$

where, $\vec{C}$ denotes matrix data to be subjected to the discrete cosine inverse transformation and is defined as follows:

$\vec{C} = C_k$(k=0~7, 10~17, 20~27, 30~37), or $C_{ij}$ (i=0~3, j=0~7)

$$\vec{C} = \begin{bmatrix} c00 \\ c01 \\ c02 \\ \cdot \\ \cdot \\ \cdot \\ c07 \\ c10 \\ c11 \\ c12 \\ \cdot \\ \cdot \\ c30 \\ \cdot \\ \cdot \\ \cdot \\ c36 \\ c37 \end{bmatrix} \tag{8}$$

$\vec{X}$ denotes matrix data obtained by the discrete cosine inverse transformation and is defined as follows:

$\vec{X} = X_k$(k=0~7, 10~17, 20~27, 30~37), or $X_{ij}$ (i=0~3, j=0~7)

$$\vec{X} = \begin{bmatrix} x00 \\ x01 \\ x02 \\ \cdot \\ \cdot \\ \cdot \\ x07 \\ x10 \\ x11 \\ x12 \\ \cdot \\ \cdot \\ x30 \\ \cdot \\ \cdot \\ \cdot \\ x36 \\ x37 \end{bmatrix}$$

${}^t[U]$ denotes first 32×32 constant transposition matrix data, defined as follows:

${}^t[U] = {}^tU_{ij}$(i=0~31, j=0~31)

${}^t[U]$ =

| | | | |
|---|---|---|---|
| 10000000 | 00000000 | 00000000 | 00000000 |
| 00000000 | 00000000 | 10000000 | 00000000 |
| 00001000 | 00000000 | 00000000 | 00000000 |
| 00000000 | 00000000 | 00001000 | 00000000 |
| 00100000 | 00000000 | 00000000 | 00000000 |
| 00000000 | 00000000 | 00100000 | 00000000 |
| 00000010 | 00000000 | 00000000 | 00000000 |
| 00000000 | 00000000 | 00000010 | 00000000 |

| | | | |
|---|---|---|---|
| 00000000 | 10000000 | 00000000 | 00000000 |
| 00000000 | 00000000 | 00000000 | 10000000 |
| 00000000 | 00001000 | 00000000 | 00000000 |
| 00000000 | 00000000 | 00000000 | 00001000 |
| 00000000 | 00100000 | 00000000 | 00000000 |
| 00000000 | 00000000 | 00000000 | 00100000 |
| 00000000 | 00000010 | 00000000 | 00000000 |
| 00000000 | 00000000 | 00000000 | 00000010 |

-continued $$\left|\begin{array}{cccc}
01000000 & 00000000 & 00000000 & 00000000 \\
00010000 & 00000000 & 00000000 & 00000000 \\
00000100 & 00000000 & 00000000 & 00000000 \\
00000001 & 00000000 & 00000000 & 00000000 \\
00000000 & 00000000 & 01000000 & 00000000 \\
00000000 & 00000000 & 00010000 & 00000000 \\
00000000 & 00000000 & 00000100 & 00000000 \\
00000000 & 00000000 & 00000001 & 00000000
\end{array}\right|$$

$$\left|\begin{array}{cccc}
00000000 & 01000000 & 00000000 & 00000000 \\
00000000 & 00000000 & 00000000 & 00010000 \\
00000000 & 00000001 & 00000000 & 00000000 \\
00000000 & 00000000 & 00000000 & 00000100 \\
00000000 & 00010000 & 00000000 & 00000000 \\
00000000 & 00000000 & 00000000 & 01000000 \\
00000000 & 00000100 & 00000000 & 00000000 \\
00000000 & 00000000 & 00000000 & 00000001
\end{array}\right|$$

${}^t[T]$ denotes second 32×32 transposition matrix data, defined as follows:

${}^t[T] = {}^tT_{ij}(i=0\sim31,\ j=0\sim31)$ $$[T] = \left|\begin{array}{cccccccc}
\begin{smallmatrix} + & + & 0 & 0 \\ + & - & 0 & 0 \\ 0 & 0 & + & + \\ 0 & 0 & + & - \end{smallmatrix} & & & & & & & \\
& \begin{smallmatrix} k & k & n & n \\ k & m & n & l \\ l & l & k & k \\ l & n & k & m \end{smallmatrix} & & & & O & & \\
& & \begin{smallmatrix} k & n & n & m \\ k & n & l & k \\ n & m & k & n \\ n & m & m & l \end{smallmatrix} & & & & & \\
& & & \begin{smallmatrix} i & j & j & j \\ j & j & j & i \\ 0 & - & + & 0 \\ + & 0 & 0 & + \end{smallmatrix} & & & & \\
& & & & \begin{smallmatrix} b & d & a & g \\ a & f & g & d \\ g & e & d & f \\ h & g & b & a \end{smallmatrix} & & & \\
& & & & & \begin{smallmatrix} b & d & a & g \\ a & f & g & d \\ g & e & d & f \\ h & g & b & a \end{smallmatrix} & & \\
& O & & & & & \begin{smallmatrix} a & b & h & g \\ h & c & e & b \\ f & d & g & e \\ g & a & b & d \end{smallmatrix} & \\
& & & & & & & \begin{smallmatrix} e & g & h & b \\ h & f & a & g \\ c & d & b & a \\ b & e & g & d \end{smallmatrix}
\end{array}\right|$$

$$= \left|\begin{array}{cccc}
{}^tT1 & & O & \\
& {}^tT2 & & \\
& & {}^tT3 & \\
O & & & {}^tT4
\end{array}\right|$$

wherein, $a=-e=\cos(\pi/16)$ $b=-f=\cos(3\pi/16)$ $c=-g=\cos(5\pi/16)$ $d=-h=\cos(7\pi/16)$ $i=-j=\cos(4\pi/16)$ $k=-m=\cos(2\pi/16)$ $l=-n=\cos(6\pi/16)$ ${}^t[S]$ denotes third 32×32 constant transposition matrix data, defined as follows:

${}^t[S] = {}^tS_{ij}(i=0\sim31,\ j=0\sim31)$ $^t[S] =$

```
1 0 1 0 1 0 1 0
1 0 —0 1 0 —0
1 0 —0 —0 1 0
1 0 1 0 —0 —0
0 1 0 1 0 1 0 1
0 1 0 —0 1 0 —
0 1 0 —0 —0 1
0 1 0 1 0 —0 —
                1 0 1 0 1 0 1 0                          O
                0 1 0 1 0 1 0 1
                0 1 0 1 0 —0 —
                1 0 1 0 —0 —0
                0 1 0 —0 —0 1
                1 0 —0 1 0 —0
                1 0 —0 —0 1 0
                0 1 0 —0 1 0 —
                                1 0 1 0 1 0 1 0
                                0 1 0 1 0 1 0 1
                                0 1 0 —0 1 0 —
                                1 0 —0 1 0 —0
                                1 0 1 0 —0 —0
                                0 1 0 1 0 —0 —
                                0 1 0 —0 —0 1
          O                     1 0 —0 —0 1 0
                                                1 0 1 0 1 0 1 0
                                                1 0 0 1 0 1 —0
                                                0 1 —0 1 0 0 1
                                                0 —0 —0 1 0 1
                                                0 1 0 —0 1 0 —
                                                0 ——0 1 0 0 —
                                                1 0 0 —0 ——0
                                                1 0 —0 —0 1 0
```

```
= | tS 1            O      |
  |     tS 2               |
  |          tS 3          |
  | O              tS 4    |
```

$^t[R]$ denotes fourth 32×32 constant transposition matrix data, defined as follows:

$^t[R] = {}^tR_{ij}$ (i=0~31, j=0~31)

$^t[R] =$

| | | | |
|---|---|---|---|
| 10000000 | 00000000 | 00000000 | 00000000 |
| 00000000 | 00000000 | 00010000 | 00000000 |
| 00000000 | 00001000 | 00000000 | 00000000 |
| 00000000 | 00000000 | 00000000 | 00000001 |
| 01000000 | 00000000 | 00000000 | 00000000 |
| 00000000 | 00000000 | 00100000 | 00000000 |
| 00000000 | 00000100 | 00000000 | 00000000 |
| 00000000 | 00000000 | 00000000 | 00000010 |

| | | | |
|---|---|---|---|
| 00100000 | 00000000 | 00000000 | 00000000 |
| 00000000 | 00000000 | 01000000 | 00000000 |
| 00000000 | 00000010 | 00000000 | 00000000 |
| 00000000 | 00000000 | 00000000 | 00000100 |
| 00010000 | 00000000 | 00000000 | 00000000 |
| 00000000 | 00000000 | 10000000 | 00000000 |
| 00000000 | 00000001 | 00000000 | 00000000 |
| 00000000 | 00000000 | 00000000 | 00001000 |

-continued

| | | | |
|---|---|---|---|
| 00001000 | 00000000 | 00000000 | 00000000 |
| 00000000 | 00000000 | 00000001 | 00000000 |
| 00000000 | 10000000 | 00000000 | 00000000 |
| 00000000 | 00000000 | 00000000 | 00010000 |
| 00000100 | 00000000 | 00000000 | 00000000 |
| 00000000 | 00000000 | 00000010 | 00000000 |
| 00000000 | 01000000 | 00000000 | 00000000 |
| 00000000 | 00000000 | 00000000 | 00100000 |

| | | | |
|---|---|---|---|
| 00000010 | 00000000 | 00000000 | 00000000 |
| 00000000 | 00000000 | 00000100 | 00000000 |
| 00000000 | 00100000 | 00000000 | 00000000 |
| 00000000 | 00000000 | 00000000 | 01000000 |
| 00000001 | 00000000 | 00000000 | 00000000 |
| 00000000 | 00000000 | 00001000 | 00000000 |
| 00000000 | 00000000 | 00000000 | 00000000 |
| 00000000 | 00000000 | 00000000 | 10000000 |

[L] denotes fifth 32×32 constant matrix data, defined as follows:

$[L] = L_{ij}$ (i=0~31, j=0~31)

```
      | ++++                                                      |
      | +-+-                                                      |
      | ++--                                                      |
      | +--+                                                      |
      |      ++++                                                 |
      |      +-+-                                                 |
      |      ++--                                                 |
      |      +--+                                   O             |
      |           ++++                                            |
      |           +-+-                                            |
      |           ++--                                            |
      |           +--+                                            |
      |                ++++                                       |
      |                +-+-                                       |
      |                ++--                                       |
[L] = |                +--+                                       |
      |                     ++++                                  |
      |                     +-+-                                  |
      |                     ++--                                  |
      |                     +--+                                  |
      |                          ++++                             |
      |                          +-+-                             |
      |                          ++--                             |
      |                          +--+                             |
      |         O                     ++++                        |
      |                               +-+-                        |
      |                               ++--                        |
      |                               +--+                        |
      |                                    ++++                   |
      |                                    +-+-                   |
      |                                    ++--                   |
      |                                    +--+                   |
```

$^t$[Q] denotes sixth 32 × 32 constant transposition matrix data, defined as follows:

$^t[Q] = {}^tQ_{ij}(i=\sim 31,\ j=0\sim 31)$ $^t[Q] =$

```
10000000 00000000 00000000 00000000
00001000 00000000 00000000 00000000
00000000 10000000 00000000 00000000
00000000 00001000 00000000 00000000
01000000 00000100 00000000 00000000
00000000 01000000 00000000 00000000
00000100 00000000 00000000 00000000
01000000 00000000 00000000 00000000

00000000 00000000 10000000 00000000
00000000 00000000 00001000 00000000
00000000 00000000 00000000 10000000
00000000 00000000 00000000 00001000
00000000 00000000 00000000 00000100
00000000 00000000 00000000 01000000
00000000 00000000 00000100 00000000
00000000 00000000 01000000 00000000

00000000 00000000 00100000 00000000
00000000 00000000 00000010 00000000
00000000 00000000 00000000 00100000
00000000 00000000 00000000 00000010
00000000 00000000 00000000 00000001
00000000 00000000 00000000 00010000
00000000 00000000 00000001 00000000
00000000 00000000 00010000 00000000

00100000 00000000 00000000 00000000
00000010 00000000 00000000 00000000
00000000 00100000 00000000 00000000
00000000 00000010 00000000 00000000
00000000 00000001 00000000 00000000
00000000 00010000 00000000 00000000
00000001 00000000 00000000 00000000
00010000 00000000 00000000 00000000
```

wherein said transforming means comprises:

a first rearrangement means (123) for rearranging matrix data $\vec{C}$ in accordance with positions of factors "1" in said first 32×32 constant transposition matrix data $^t$[U], as an inner product computation: $^t$ [U]·$\vec{C}$, to provide seventh matrix data: [MD7]=$^t$[U]·$\vec{C}$ a first fourth-order inner product computation means (125) for computing a fourth order inner product computation between said second 32×32 transposition matrix data $^t$[T] and said seventh matrix data [MD7], to provide eighth matrix data: [MD8]=$^t$[T]·[MD7];

a second fourth-order inner product computation means (127) for computing a fourth order product computation between said third 32×32 constant transposition matrix data $^t$[S] and said eighth matrix data [MD8], to provide ninth matrix data: [MD9]=$^t$[S]·[MD8];

a second rearrangement means (129) for rearranging ninth matrix data [MD9] in accordance with position of factors "1" in said fourth 32×32 constant transposition matrix data $^t$[R], as an inner product computation: $^t$[R]·[MD9]to provide 10th matrix data: [MD10]=$^t$[R]·[MD9];

a third fourth-order inner product computation means (131) for computing a fourth order product computation between said fifth 32×32 constant matrix data [L] and said 10th matrix data [MD10], to provide 11th matrix data: [MD11]=[L]·[MD10];

a third rearrangement means (133) for rearranging said 11th matrix data [MD11] in accordance with positions of factors "1" in said sixth 32×32 constant transposition matrix data $^t$[Q], as an inner product computation: $^t$[Q]·[MD11], to provide 12th matrix data [MD12]=$^t$[Q]·[MD11]; and a shift means for shifting said 12th matrix data [MD12] by two bits, to thereby provide said matrix data $\vec{X}$=[MD12]/4.

48. A discrete cosine transformation system according to claim 47, wherein said second fourth-order inner product computation means (127) comprises:

a first addition and substraction means (127A) for adding and substracting said first sub-matrix of said eighth matrix data in accordance with first 8×8 sub-matrix $^{t}$[S1]0 in said third transportation matrix data $^{t}$[S1], to provide first sub-matrix data of said ninth matrix data;

a second addition and substraction means (127B) for adding and substracting said second sub-matrix of said eighth matrix data in accordance with third 8×8 sub-matrix $^{t}$[S3] in said third transportation matrix data $^{t}$[S], to provide second sub-matrix data of said ninth matrix data;

a third addition and substraction means (127C) for adding and substracting said third sub-matrix of said eighth matrix data in accordance with second 8×8 sub-matrix $^{t}$[S2] in said third transportation matrix data $^{t}$[S], to provide third sub-matrix data of said ninth matrix data; and a fourth addition and substraction means (127D) for adding and substracting said fourth sub-matrix of said ninth matrix data in accordance with fourth 8×8 sub-matrix $^{t}$[S4] in said third transportation matrix data $^{t}$[S], to provide fourth sub-matrix data of said ninth matrix data.

49. A discrete cosine inverse transformation system according to claim 47, wherein said first fourth-order inner product computation means (125) comprises a first multiplication, addition and subtraction means (125A) for multiplying, adding and subtracting first 8×8 sub-matrix data in a diagonal line of said seventh matrix data [MD7] with first 8×8 sub-matrix data $^{t}$[T1] in a diagonal line of said second transposition matrix data $^{t}$[T], to provide first 8×8 sub-matrix data of said eighth matrix data, a second multiplication, addition and subtraction means (125B) for multiplying, adding and subtracting second 8×8 sub-matrix data in the diagonal line of said seventh matrix data with third 8×8 sub-matrix data $^{t}$[T3] in the diagonal line of said second transposition matrix data $^{t}$[T], to provide second 8×8 sub-matrix data of said eighth matrix data, a third multiplication, addition and subtraction means (125C) for multiplying, adding and subtracting said third 8×8 sub-matrix data in the diagonal line of said seventh matrix data with second 8×8 sub-matrix data $^{t}$[T2] in the diagonal line of said second transposition matrix data [T], to provide third 8×8 sub-matrix data of said eighth matrix data, and a fourth multiplication, addition and subtraction means (125D) for multiplying, adding and subtracting fourth 8×8 sub-matrix data in the diagonal line of said seventh matrix data with fourth 8×8 sub-matrix data $^{t}$[T4] in the diagonal line of said second transposition matrix data [T], to provide fourth 8×8 sub-matrix data of said eighth matrix data.

50. A discrete cosine transformation system according to claim 49, wherein said second fourth-order inner product computation means (127) comprises a first addition and subtraction means (127A) for adding and subtracting said first sub-matrix of said eighth matrix data in accordance with first 8×8 sub-matrix $^{t}$[S1] in said third transposition matrix data $^{t}$[S], to provide first sub-matrix data of said ninth matrix data, a second addition and subtraction means (127B) for adding and subtracting said second sub-matrix of said eighth matrix data in accordance with third 8×8 sub-matrix $^{t}$[S3] in said third transposition matrix data $^{t}$[S], to provide second sub-matrix data of said ninth matrix data, a third addition and subtraction means (127C) for adding and subtracting said third sub-matrix of said eighth matrix data in accordance with second 8×8 sub-matrix $^{t}$[S2] in said third transposition matrix data $^{t}$[S], to provide third sub-matrix data of said ninth matrix data, and a fourth addition and subtraction means (127D) for adding and subtracting said fourth sub-matrix of said ninth matrix data in accordance with fourth 8×8 sub-matrix $^{t}$[S4] in said third transposition matrix data $^{t}$[S], to provide fourth sub-matrix data of said ninth matrix data.

51. A discrete cosine transformation system comprising transforming means for performing a two-dimensional 4-row×8 column discrete cosine transformation of binary data in a matrix form, in accordance with the following formula:

$$\text{DCT: } \vec{C}=(\tfrac{1}{4})\,[U^t][T^t][S^t][R^t][L][Q]\vec{X}$$

where, $\vec{X}$ denotes matrix data to be subjected to the discrete cosine transformation and is defined as follows:

$\vec{X}=X_k(k=0\sim7,\ 10\sim17,\ 20\sim27,\ 30\sim37)$, or $X_{ij}$. $(i=0\sim3,\ j=0\sim7)$ $$\vec{X}=\begin{bmatrix} x00 \\ x01 \\ x02 \\ \cdot \\ \cdot \\ \cdot \\ x07 \\ x10 \\ x11 \\ x12 \\ \cdot \\ \cdot \\ \cdot \\ x30 \\ \cdot \\ \cdot \\ \cdot \\ x36 \\ x37 \end{bmatrix}$$

$\vec{C}$ denotes matrix data obtained by the discrete cosine transformation and is defined as follows:

$\vec{C}=C_k(k=0\sim7,\ 10\sim17,\ 20\sim27,\ 30\sim37)$, or $C_{ij}$. $(i=0\sim3,\ j=0\sim7)$ $$\vec{C} = \begin{bmatrix} c00 \\ c01 \\ c02 \\ \cdot \\ \cdot \\ \cdot \\ c07 \\ c10 \\ c11 \\ c12 \\ \cdot \\ \cdot \\ \cdot \\ c30 \\ \cdot \\ \cdot \\ \cdot \\ c36 \\ c37 \end{bmatrix}$$

[Q] denotes first 32×32 constant matrix data, defined as follows:

$[Q]=Q_{ij}(i=0\sim31, j=0\sim31)$ $$[Q] = \left| \begin{array}{cccc}
10000000 & 00000000 & 00000000 & 00000000 \\
00000001 & 00000000 & 00000000 & 00000000 \\
00000000 & 00000000 & 00000000 & 10000000 \\
00000000 & 00000000 & 00000000 & 00000001 \\
01000000 & 00000000 & 00000000 & 00000000 \\
00000010 & 00000000 & 00000000 & 00000000 \\
00000000 & 00000000 & 00000000 & 01000000 \\
00000010 & 00000000 & 00000000 & 00000010
\end{array} \right|$$

-continued $$\left| \begin{array}{cccc}
00100000 & 00000000 & 00000000 & 00000000 \\
00000100 & 00000000 & 00000000 & 00000000 \\
00000000 & 00000000 & 00000000 & 00100000 \\
00000000 & 00000000 & 00000000 & 00000100 \\
00010000 & 00000000 & 00000000 & 00000000 \\
00001000 & 00000000 & 00000000 & 00000000 \\
00000000 & 00000000 & 00000000 & 00010000 \\
00000000 & 00000000 & 00000000 & 00001000
\end{array} \right|$$

$$\left| \begin{array}{cccc}
00000000 & 10000000 & 00000000 & 00000000 \\
00000000 & 00000001 & 00000000 & 00000000 \\
00000000 & 00000000 & 10000000 & 00000000 \\
00000000 & 00000000 & 00000001 & 00000000 \\
00000000 & 01000000 & 00000000 & 00000000 \\
00000000 & 00000010 & 00000000 & 00000000 \\
00000000 & 00000000 & 01000000 & 00000000 \\
00000000 & 00000000 & 00000010 & 00000000
\end{array} \right|$$

$$\left| \begin{array}{cccc}
00000000 & 00100000 & 00000000 & 00000000 \\
00000000 & 00000100 & 00000000 & 00000000 \\
00000000 & 00000000 & 00100000 & 00000000 \\
00000000 & 00000000 & 00001000 & 00000000 \\
00000000 & 00010000 & 00000000 & 00000000 \\
00000000 & 00001000 & 00000000 & 00000000 \\
00000000 & 00000000 & 00010000 & 00000000 \\
00000000 & 00000000 & 00001000 & 00000000
\end{array} \right|$$

[L] denotes second 32×32 matrix data, defined as follows:

$[L]=L_{ij}(i=0\sim31, j=0\sim31)$ $$[L] = \begin{bmatrix}
\begin{array}{c} ++++ \\ +-+- \\ ++-- \\ +--+ \end{array} & & & & & & & \\
& \begin{array}{c} ++++ \\ +-+- \\ ++-- \\ +--+ \end{array} & & & & O & & \\
& & \begin{array}{c} ++++ \\ +-+- \\ ++-- \\ +--+ \end{array} & & & & & \\
& & & \begin{array}{c} ++++ \\ +-+- \\ ++-- \\ +--+ \end{array} & & & & \\
& & & & \begin{array}{c} ++++ \\ +-+- \\ ++-- \\ +--+ \end{array} & & & \\
& & & & & \begin{array}{c} ++++ \\ +-+- \\ ++-- \\ +--+ \end{array} & & \\
& O & & & & & \begin{array}{c} ++++ \\ +-+- \\ ++-- \\ +--+ \end{array} & \\
& & & & & & & \begin{array}{c} ++++ \\ +-+- \\ ++-- \\ +--+ \end{array}
\end{bmatrix}$$

[R′] denotes third 32×32 constant matrix data, defined as follows:

$[R']=R'_{ij}(i=0\sim31, j=0\sim31)$ $[R'] =$

-continued $$\begin{vmatrix}
10000000 & 00000000 & 00000000 & 00000000 \\
00001000 & 00000000 & 00000000 & 00000000 \\
00000000 & 10000000 & 00000000 & 00000000 \\
00000000 & 00001000 & 00000000 & 00000000 \\
00000000 & 00000000 & 10000000 & 00000000 \\
00000000 & 00000000 & 00001000 & 00000000 \\
00000000 & 00000000 & 00000000 & 10000000 \\
00000000 & 00000000 & 00000000 & 00001000
\end{vmatrix}$$

$$\begin{vmatrix}
00000000 & 00000000 & 00100000 & 00000000 \\
00000000 & 00000000 & 00000000 & 00000010 \\
00100000 & 00000000 & 00000000 & 00000000 \\
00000000 & 00000010 & 00000000 & 00000000 \\
00000000 & 00000000 & 00000010 & 00000000 \\
00000000 & 00000000 & 00000000 & 00100000 \\
00000010 & 00000000 & 00000000 & 00000000 \\
00000000 & 00100000 & 00000000 & 00000000
\end{vmatrix}$$

$$\begin{vmatrix}
00000000 & 00000100 & 00000000 & 00000000 \\
00000000 & 00000000 & 00000000 & 00000000 \\
00000100 & 00000000 & 00000000 & 00000000 \\
01000000 & 00000000 & 00000000 & 00000000 \\
00000000 & 00000000 & 00000000 & 00000100 \\
00000000 & 01000000 & 00000000 & 01000000 \\
00000000 & 00000100 & 00001000 & 00000000 \\
00000000 & 01000000 & 01000000 & 00000000
\end{vmatrix}$$

-continued $$\begin{vmatrix}
00000000 & 00000000 & 00000000 & 00000001 \\
00000000 & 00000000 & 00010000 & 00000000 \\
00000000 & 00010000 & 00000000 & 00000000 \\
00000001 & 00000000 & 00000000 & 00000000 \\
00000000 & 00000000 & 00000000 & 00010000 \\
00000000 & 00000000 & 00000001 & 00000000 \\
00000000 & 00000001 & 00000000 & 00000000 \\
00010000 & 00000000 & 00000000 & 00000000
\end{vmatrix}$$

[S'] denotes fourth 32×32 matrix data, defined as follows:

$[S'] = S'_{ij}(i=0\sim31,\ j=0\sim31)$ $$[S'] = \begin{bmatrix}
\begin{array}{cccccccc}
+&0&0&+&0&0&0&0 \\
0&0&0&0&+&0&0&+ \\
0&+&+&0&0&0&0&0 \\
0&0&0&0&0&+&+&0 \\
k&n&l&m&0&0&0&0 \\
0&0&0&0&k&n&l&m \\
l&k&m&n&0&0&0&0 \\
0&0&0&0&l&k&m&n
\end{array} & & & O \\
& \begin{array}{cccccccc}
n&n&k&k&0&0&0&0 \\
0&0&0&0&n&n&k&k \\
k&k&l&l&0&0&0&0 \\
0&0&0&0&k&k&l&l \\
+&-&0&0&0&0&-&+ \\
0&0&+&-&+&-&0&0 \\
j&i&0&0&0&0&j&i \\
0&0&i&j&j&i&0&0
\end{array} & & \\
& & \begin{array}{cccccccc}
g&a&d&b&0&0&0&0 \\
0&0&0&0&g&a&d&b \\
b&h&a&c&0&0&0&0 \\
d&g&f&a&0&0&0&0 \\
0&0&0&0&d&g&f&a \\
a&b&g&h&0&0&0&0 \\
0&0&0&0&a&b&g&h
\end{array} & \\
& O & & \begin{array}{cccccccc}
a&d&b&c&0&0&0&0 \\
0&0&0&0&a&h&c&b \\
f&c&d&a&0&0&0&0 \\
0&0&0&0&g&b&h&a \\
g&f&a&h&0&0&0&0 \\
0&0&0&0&d&a&b&g \\
h&a&c&f&0&0&0&0 \\
0&0&0&0&f&g&a&d
\end{array}
\end{bmatrix}$$

$$= \begin{bmatrix} S1' & & & O \\ & S2' & & \\ & & S3' & \\ O & & & S4' \end{bmatrix}$$

wherein, $a = -e = \cos(\pi/16)$ $b = -f = \cos(3\pi/16)$ $c = -g = \cos(5\pi/16)$ $d = -h = \cos(7\pi/16)$ $i = -j = \cos(4\pi/16)$ $k = -m = \cos(2\pi/16)$ $l = -n = \cos(6\pi/16)$

[T'] denotes fifth 32×32 constant matrix data, defined as follows:

$[T'] = T'_{ij}(i=0\sim31,\ j=0\sim31)$ $$\begin{bmatrix}
\begin{array}{cccccccc}
+&+&+&+&0&0&0&0 \\
0&0&0&0&+&+&+&+ \\
+&-&+&-&0&0&0&0 \\
0&0&0&0&+&-&+&- \\
+&+&-&-&0&0&0&0 \\
0&0&0&0&+&+&-&- \\
+&-&-&+&0&0&0&0 \\
0&0&0&0&+&-&-&+
\end{array} & O
\end{bmatrix}$$

-continued

```
        | ++++0 0 0 0                                          |
        | 0 0 0 0 0 +−+                                        |
        | +−+−0 0 0 0                                          |
        | 0 0 0 0 −0 ++                                        |
        | ++−−0 0 −+                                           |
        | 0 0 0 0 +0 ++                                        |
        | +−−+0 0 0 0                                          |
[T] =   | 0 0 0 0 0 ++−                                        |

        |                 ++++0 0 0 0                          |
        |                 0 0 0 0 ++++                         |
        |                 +−+−0 0 0 0                          |
        |                 0 0 0 0 +−+−                         |
        |                 ++−−0 0 0 0                          |
        |                 0 0 0 0 ++−−                         |
        |                 +−−+0 0 0 0                          |

        |   O                              ++++0 0 0 0         |
        |                                  0 0 0 0 +−+−        |
        |                                  +−−+0 0 0 0         |
        |                                  0 0 0 0 +−−+        |
        |                                  0 +−0 0 0 ++        |
        |                                  −0 +−−0 0 0         |
        |                                  0 +−0 0 0 −−        |
        |                                  −0 0 +++0 0         |

      [ T1'        O  ]
      [    T2'        ]
      [       T3'     ]
    = [ O         T4' ]
```

[U'] denotes sixth 32×32 constant matrix data, defined as follows:

$[U'] = U'_{ij}$ (i=0~31, j=0~31)

```
         [ 10000000            00000000            ]
         [ 00000000            10000000            ]
         [ 01000000            00000000            ]
         [ 00000000            00000100            ]
         [ 00001000            00000000            ]
         [ 00000000            01000000            ]
         [ 00000100            00000000            ]
         [ 00000000            00001000            ]

         |          10000000            00000000   |
         |          00000000            10000000   |
         |          01000000            00000000   |
         |          00000000            00000100   |
         |          00100000            00000000   |
         |          00000000            00001000   |
         |          00000100            00000000   |
[U'] =   |          00000000            01000000   |

         | 00100000            00000000            |
         | 00000000            00100000            |
         | 00010000            00000000            |
         | 00000000            00000001            |
         | 00000010            00000000            |
         | 00000000            00010000            |
         | 00000001            00000000            |
         | 00000000            00000010            |

         |          00001000            00000000   |
         |          00000000            00010000   |
         |          00010000            00000000   |
         |          00000000            00000010   |
         |          00000010            00000000   |
         |          00000000            00000001   |
         |          00000001            00000000   |
         [          00000000            00100000   ]
```

wherein said transforming means comprises:

a first rearrangement means (142) for rearranging said matrix data $\vec{X}$ in accordance with positions of factors "1" in said first 32×32 constant matrix data [Q], as an inner product computation: $[Q]\cdot\vec{X}$, to provide seventh matrix data: $[MD7]=[Q]\cdot\vec{X}$;

a first fourth-order inner product computation means (144) for computing a fourth order inner product computation between said second 32×32 constant matrix data [L] and said seventh matrix data [MD7], to provide eighth matrix data: [MD8]=[L]·[MD7];

a second rearrangement means (146) for rearranging eighth matrix data [MD8] in accordance with position of factors "1" in said third 32×32 constant matrix data [R'], as an inner product computation :[R']·[MD8] to provide ninth matrix data: [MD9]=[R']·[MD8];

a second fourth-order inner product computation means (148) for computing a fourth order product computation between said fourth 32×32 constant matrix data [S'] and said ninth matrix data [MD9], to provide 10th matrix data: [MD10]=[S']·[MD9];

a third fourth-order inner product computation means (150) for computing a fourth order product computation between said fourth 32×32 constant matrix data [T'] and said 10th matrix data [MD10], to provide 11th matrix data: [MD11]=[T']·[MD10];

a third rearrangement means (152 ) for rearranging said 11th matrix data [MD11] in accordance with positions of factors "1" in said sixth 32×32 constant matrix data [U'], as an inner product computation: [U']·[MD11], to provide 12th matrix data [MD12]=[U']·[MD11]; and a shift means for shifting said 12th matrix data [MD12] by three bits, to thereby provide said matrix data $\vec{C}$=[MD12]/8.

52. A discrete cosine transformation system accordin to claim 51, wherein asid third fourth-order inner product computation means (150) comprises:

a first addition and substraction means (150A) for adding and substracting said first sub-matrix data of said 10th matrix data in accordance with first sub-matrix data [T1'] in said fifth matrix data [T'], to provide first sub-matrix data of said 11th matrix data;

a second addition and substraction means (150B) for adding and substracting said second sub-matrix data of said 10th matrix data in accordance with third sub-matrix data [T3'] in said fifth matrix data [T'], to provide second sub-matrix data of said 11th matrix data;

a third addition and substraction means (150C) for adding and substracting said third sub-matrix of said 10th matrix data in accordance with second sub-matrix data [T2'] in said fifth matrix data [T'], to provide third sub-matrix data of said 11th matrix data; and a fourth addition and substraction means (150D) for adding and substracting said fourth sub-matrix of said 10th matrix data in accordance with fourth sub-matrix data [T2'] in said fifth matrix data [T'], to provide fourth sub-matrix data of said 11th matrix data.

53. A discrete cosine transformation system according to claim 51, wherein said second fourth-order inner product computation means (148) comprises a first multiplication, addition and subtraction means (148A) for multiplying, adding and subtracting said first sub-matrix data of said ninth matrix data [MD9] with first 8×8 sub-matrix data [S1'] in a diagonal line of said fourth matrix data [S'], to provide first 8×8 sub-matrix data of said 10th matrix data, a second multiplication, addition and subtraction means (148B) for multiplying, adding and subtracting said second sub-matrix data of said ninth matrix data with third 8×8 sub-matrix data [S3'] in the diagonal line of said fourth matrix data [S'], to provide a second 8×8 sub-matrix data of said 10th matrix data, a third multiplication, addition and subtraction means (148C) for multiplying, adding and subtracting said third sub-matrix data of said ninth matrix data with second 8×8 sub-matrix data [S2'] in the diagonal line of said fourth matrix data [S'], to provide a third 8×8 sub-matrix data of said 10th matrix data, and a fourth multiplication, addition and subtraction means (148D) for multiplying, adding and subtracting said fourth sub-matrix data of said 10th matrix data with fourth 8×8 sub-matrix data [S4'] in the diagonal line of said fourth matrix data [S'], to provide fourth 8×8 sub-matrix data of said 10th matrix data.

54. A discrete cosine transformation system according to claim 53, wherein said third fourth-order inner product computation means (150) comprises a first addition and subtraction means (150A) for adding and subtracting said first sub-matrix data of said 10th matrix data in accordance with first sub-matrix data [T1'] in said fifth matrix data [T'], to provide first sub-matrix data of said 11th matrix data, a second addition and subtraction means (150B) for adding and subtracting said second sub-matrix data of said 10th matrix data in accordance with third sub-matrix data [T3'] in said fifth matrix data [T'], to provide second sub-matrix data of said 11th matrix data, a third addition and subtraction means (150C) for adding and subtracting said third sub-matrix data of said 10th matrix data in accordance with second sub-matrix data [T2'] in said fifth matrix data [T'], to provide third sub-matrix data of said 11th matrix data, and a fourth addition and subtraction means (150D) for adding and subtracting said fourth sub-matrix data of said 10th matrix data in accordance with fourth sub-matrix data [T2'] in said fifth matrix data [T'], to provide fourth sub-matrix data of said 11th matrix data.

55. A discrete cosine inverse transformation system comprising transforming means for performing a two-dimensional 4-row×8 column discrete cosine inverse transformation of binary data in a matrix form, in accordance with the following formula:

$$\text{IDCT: } =\vec{X}=(\tfrac{1}{4})^t[Q][L]^t[R']^t[S']^t[T']^t[U']\vec{C}$$

where, $\vec{C}$ denotes matrix data to be subjected to the discrete cosine inverse transformation and is defined as follows:

$\vec{C}=C_k$(k=0~7, 10~17, 20~27, 30~37), or $C_{ij}$(i=0~3, j=0~7)

$$\vec{C}=\begin{bmatrix} c00\\ c01\\ c02\\ \cdot\\ \cdot\\ \cdot\\ c07\\ c10\\ c11\\ c12\\ \cdot\\ \cdot\\ \cdot\\ c30\\ \cdot\\ \cdot\\ \cdot\\ c36\\ c37 \end{bmatrix}$$

$\bar{X}$ denotes matrix data obtained by the discrete cosine inverse transformation and is defined as follows:

$\bar{X}=X_k(k=0\sim7,\ 10\sim17,\ 20\sim27,\ 30\sim37)$, or $X_{ij}$.

$$\vec{X}=\begin{bmatrix} x00\\ x01\\ x02\\ \cdot\\ \cdot\\ \cdot\\ x07\\ x10\\ x11\\ x12\\ \cdot\\ \cdot\\ \cdot\\ x30\\ \cdot\\ \cdot\\ \cdot\\ x36\\ x37 \end{bmatrix}$$

${}^t[U']$ denotes first $32\times32$ constant transposition matrix data, defined as follows:

${}^t[U']={}^tU'_{ij}(i=0\sim31,\ j=0\sim31)$ $$[U]=\left[\begin{array}{cccc}
10000000 & & 00000000 & \\
00100000 & & 00000000 & \\
00000000 & & 10000000 & \\
00000000 & & 00100000 & \\
00001000 & & 00000000 & \\
00000010 & & 00000000 & \\
00000000 & & 00001000 & \\
00000000 & & 00000010 & \\
 & 10000000 & & 00000000 \\
 & 00100000 & & 00000000 \\
 & 00001000 & & 00000000 \\
 & 00000000 & & 00100000 \\
 & 00000000 & & 10000000 \\
 & 00000010 & & 00000000 \\
 & 00000000 & & 00001000 \\
 & 00000000 & & 00000010 \\
01000000 & & 00000000 & \\
00000100 & & 00000000 & \\
00000000 & & 01000000 & \\
00000000 & & 00000100 & \\
00000001 & & 00000000 & \\
00010000 & & 00000000 & \\
00000000 & & 00000001 & \\
00000000 & & 00010000 & \\
 & 01000000 & & 00000000 \\
 & 00000001 & & 00000000 \\
 & 00000000 & & 00000001 \\
 & 00000000 & & 01000000 \\
 & 00000100 & & 00000000 \\
 & 00010000 & & 00000000 \\
 & 00000000 & & 00010000 \\
 & 00000000 & & 00000100
\end{array}\right]$$

$(i=0\sim3,\ j=0\sim7)$ ${}^t[T']$ denotes second $32\times32$ transposition matrix data, defined as follows:

${}^t[T']={}^tT'_{ij}(i=0\sim31,\ j=0\sim31)$ $$\left[\begin{array}{ll}
+0\ +0\ +0\ +0 & \\
+0\ -0\ +0\ -0 & \\
+0\ +0\ -0\ -0 & \\
+0\ -0\ -0\ +0 & \\
0\ +0\ +0\ +0\ + & \\
0\ +0\ -0\ +0\ - & \\
0\ +0\ +0\ -0\ - & O \\
0\ +0\ -0\ -0\ + &
\end{array}\right.$$

-continued

[T] =

+0 +0 +0 +0
+0 −0 +0 −0
+0 +0 −0 −0
+0 −0 −0 +0
0 0 0 −0 +0 0
0 +0 0 0 0 0 +
0 −0 +0 +0 +
0 +0 +0 +0 −

+0 +0 +0 +0
+0 −0 +0 −0
+0 +0 −0 −0
+0 −0 −0 +0
0 +0 +0 +0 +
0 +0 −0 +0 −
0 +0 +0 −0 −
0 +0 −0 −0 +

O

+0 +0 0 −0 −
+0 −0 +0 +0
+0 −0 − + −0
+0 +0 0 −0 +
0 +0 +0 −0 +
0 −0 −0 0 0 +
0 + − + +0 −0
0 −0 + +0 −0

$^t$[S′] denotes third 32×32 transposition matrix data, defined as follows:

$^t[S'] = {}^tS'_{ij}$ (i=0∼31, j=0∼31)

i=−j=cos (4π/16)
k=−m=cos (2π/16)
l=−n=cos (6π/16)

$^t$[S′] =

+0 0 +k 0 l 0
0 0 +0 n 0 k 0
0 0 +0 l 0 m0
+0 0 0 m0 n 0
0 +0 0 0 k 0 l
0 0 0 +0 n 0 k
0 0 0 +0 l 0 m
0 +0 0 0 m0 n

O n 0 k 0 +0 j 0
n 0 k 0 −0 i 0
k 0 l 0 0 +0 i
k 0 l 0 0 −0 j
0 n 0 k 0 +0 j
0 n 0 k 0 −0 i
0 k 0 l −0 j 0
0 k 0 l +0 i 0 g 0 b 0 d 0 a 0
a 0 h 0 g 0 b 0
d 0 a 0 f 0 g 0
b 0 c 0 a 0 h 0
0 g 0 b 0 d 0 a
0 a 0 h 0 g 0 b
0 d 0 a 0 f 0 g
0 b 0 c 0 a 0 h

O a 0 f 0 g 0 h 0
d 0 c 0 f 0 a 0
b 0 d 0 a 0 c 0
c 0 a 0 h 0 h 0
0 a 0 g 0 d 0 f
0 h 0 b 0 a 0 g
0 c 0 h 0 b 0 a
0 b 0 a 0 g 0 d $$= \begin{bmatrix} S1' & & & O \\ & S2' & & \\ & & S3' & \\ O & & & S4' \end{bmatrix}$$

wherein,
a=−e=cos (π/16)
b=−f=cos (3π/16)
c=−g=cos (5π/16)
d=−h=cos (7π/16)

$^t$[R′] denotes fourth 32×32 constant transposition matrix data, defined as follows:

$^t[R'] = {}^tR'_{ij}$ (i=0∼31, j=0∼31)

$^t$[R] =

-continued

| | | | |
|---|---|---|---|
| 10000000 | 00000000 | 00000000 | 00000000 |
| 00000000 | 00000000 | 00010000 | 00000000 |
| 00000000 | 00100000 | 00000000 | 00000000 |
| 00000000 | 00000000 | 00000000 | 00000001 |
| 01000000 | 00000000 | 00000000 | 00000000 |
| 00000000 | 00000000 | 00100000 | 00000000 |
| 00000000 | 00000010 | 00000000 | 00000000 |
| 00000000 | 00000000 | 00000000 | 00010000 |

| | | | |
|---|---|---|---|
| 00100000 | 00000000 | 00000000 | 00000000 |
| 00000000 | 00000000 | 01000000 | 00000000 |
| 00000000 | 00000001 | 00000000 | 00000000 |
| 00000000 | 00000000 | 00000000 | 00100000 |
| 00010000 | 00000000 | 00000000 | 00000000 |
| 00000000 | 00000000 | 10000000 | 00000000 |
| 00000000 | 00010000 | 00000000 | 00000000 |
| 00000000 | 00000000 | 00000000 | 00000010 |

| | | | |
|---|---|---|---|
| 00001000 | 00000000 | 00000000 | 00000000 |
| 00000000 | 00000000 | 00000001 | 00000000 |
| 00000000 | 10000000 | 00000000 | 00000000 |
| 00000000 | 00000000 | 00000000 | 01000000 |
| 00000100 | 00000000 | 00000000 | 00000000 |
| 00000000 | 00000000 | 00000010 | 00000000 |
| 00000000 | 00001000 | 00000000 | 00000000 |
| 00000000 | 00000000 | 00000000 | 00000100 |

| | | | |
|---|---|---|---|
| 00000010 | 00000000 | 00000000 | 00000000 |
| 00000000 | 00000000 | 00000100 | 00000000 |
| 00000000 | 00000100 | 00000000 | 00000000 |
| 00000000 | 00000000 | 00000000 | 00001000 |
| 00000001 | 00000000 | 00000000 | 00000000 |
| 00000000 | 00000000 | 00001000 | 00000000 |
| 00000000 | 01000000 | 00000000 | 00000000 |
| 00000000 | 00000000 | 00000000 | 10000000 |

[L] denotes fifth 32×32 constant matrix data, defined as follows:

$[L]=L_{ij}(i=0\sim31, j=0\sim31)$

[L] =

++++
+−+−
++−−
+−−+
++++
+−+−
++−−
+−−+
++++ O
+−+−
++−−
+−−+
++++
+−+−
++−−
+−−+
++++
+−+−
++−−
+−−+
++++
+−+−
++−−
+−−+
O ++++
+−+−
++−−
+−−+
++++
+−+−
++−−
+−−+

$^t[Q]$ denotes sixth 32×32 constant transposition matrix data, defined as follows:

$^t[Q]={}^tQ_{ij}(i=0\sim31, j=0\sim31)$ $^t[Q]$ =

| | | | |
|---|---|---|---|
| 10000000 | 00000000 | 00000000 | 00000000 |
| 00000000 | 00000000 | 00000000 | 00000000 |
| 00001000 | 10000000 | 00000000 | 00000000 |
| 00000000 | 00001000 | 00000000 | 00000000 |
| 01000000 | 00000100 | 00000000 | 00000000 |
| 00000000 | 01000000 | 00000000 | 00000000 |
| 00000100 | 00000000 | 00000000 | 00000000 |
| 01000000 | 00000000 | 00000000 | 00000000 |

| | | | |
|---|---|---|---|
| 00000000 | 00000000 | 10000000 | 00000000 |
| 00000000 | 00000000 | 00001000 | 00000000 |
| 00000000 | 00000000 | 00000000 | 10000000 |
| 00000000 | 00000000 | 00000000 | 00001000 |
| 00000000 | 00000000 | 00000000 | 00000100 |
| 00000000 | 00000000 | 00000000 | 01000000 |
| 00000000 | 00000000 | 00000100 | 00000000 |
| 00000000 | 00000000 | 01000000 | 00000000 |

| | | | |
|---|---|---|---|
| 00000000 | 00000000 | 00100000 | 00000000 |
| 00000000 | 00000000 | 00000010 | 00000000 |
| 00000000 | 00000000 | 00000000 | 00010000 |
| 00000000 | 00000000 | 00000000 | 00000010 |
| 00000000 | 00000000 | 00000000 | 00000001 |
| 00000000 | 00000010 | 00000000 | 00010000 |
| 00000000 | 00000000 | 00000001 | 00000000 |
| 00000000 | 00000000 | 00010000 | 00000000 |

-continued

| | | | |
|---|---|---|---|
| 00100000 | 00000000 | 00000000 | 00000000 |
| 00000010 | 00000000 | 00000000 | 00000000 |
| 00000000 | 00100000 | 00000000 | 00000000 |
| 00000000 | 00000010 | 00000000 | 00000000 |
| 00000000 | 00000001 | 00000000 | 00000000 |
| 00000000 | 00010000 | 00000000 | 00000000 |
| 00000001 | 00000000 | 00000000 | 00000000 |
| 00010000 | 00000000 | 00000000 | 00000000 |

wherein said transforming means comprises:

a first rearrangement means (143) for rearranging matrix data $\vec{C}$ in accordance with positions of factors "1" in said first 32×32 constant transposition matrix data ${}^t$[U'], as an inner product computation: ${}^t$[U']·$\vec{C}$, to provide seventh matrix data: [MD7]=${}^t$[U']·$\vec{C}$ a first fourth-order inner product computation means (145) for computing a fourth order inner product computation between said second 32×32 transposition matrix data ${}^t$[T'] and said seventh matrix data [MD7], to provide eighth matrix data: [MP8]=${}^t$[T']·[MD7];

a second fourth-order inner product computation means (147) for computing a fourth order product computation between said third 32×32 constant transposition matrix data ${}^t$[S'] and said eighth matrix data [MD8], to provide ninth matrix data: [MD9]=${}^t$[S']·[MD8];

a second rearrangement means (149) for rearranging ninth matrix data [MD9] in accordance with position of factors "1" in said fourth 32×32 constant transposition matrix data ${}^t$[R'], as an inner product computation : ${}^t$[R']·[MD9] to provide 10th matrix data: [MD10]=${}^t$[R']·[MD9];

a third fourth-order inner product computation means (151) for computing a fourth order product computation between said fourth 32×32 constant matrix data [L] and said 10th matrix data [MD10], to provide 11th matrix data: [MD11]=[L]·[MD10];

a third rearrangement means (153) for rearranging said 11th matrix data [MD11] in accordance with positions of factors "1" in said sixth 32×32 constant transposition matrix data ${}^t$[Q], as an inner product computation: ${}^t$[Q]·[MD11], to provide 12th matrix data [MD12]=${}^t$[Q]·[MD11]; and a shift means for shifting said 12th matrix data [MD12] by two bits, to thereby provide said matrix data $\vec{X}$=[MD12]/4.

56. A discrete cosine inverse transformation system according to claim 55, wherein said first fourth-order inner product computation means (145) comprises a first addition and subtraction means (145A) for adding and subtracting first sub-matrix data of said seventh matrix data in accordance with first 8×8 sub-matrix data ${}^t$[T1'] in said second transposition matrix data ${}^t$[T'], to provide a first sub-matrix data of said eighth matrix data, a second addition and subtraction means (145B) for adding and subtracting second sub-matrix data of said seventh matrix data in accordance with third 8×8 sub-matrix data ${}^t$[T3'] in said second matrix data ${}^t$[T'], to provide second sub-matrix data of said eighth matrix data, a third addition and subtraction means (145C) for adding and subtracting third sub-matrix data of said seventh matrix data in accordance with second 8×8 sub-matrix data ${}^t$[T2'] in second transposition matrix data ${}^t$[T'], to provide a third sub-matrix data of said eighth matrix data, and a fourth addition and subtraction means (145D) for adding and subtracting fourth sub-matrix data of said seventh matrix data in accordance with fourth 8×8 sub-matrix data ${}^t$[T4'] in said second transposition matrix data ${}^t$[T'], to provide a fourth sub-matrix data of said eighth matrix data.

57. A discrete cosine inverse transformation system according to claim 56, wherein said second fourth-order inner product computation means (147) comprises a first multiplication, addition and subtraction means (147A) for multiplying, adding and subtracting first 8×8 sub-matrix data in a diagonal line of said eighth matrix data [MD8] with first 8×8 sub-matrix data ${}^t$[S1'] in a diagonal line of said third transposition matrix data ${}^t$[S'], to provide first 8×8 sub-matrix data of said ninth matrix data, a second multiplication, addition and subtraction means (147B) for multiplying, adding and subtracting second 8×8 sub-matrix data in the diagonal line of said eighth matrix data with third 8×8 sub-matrix data ${}^t$[S3'] in the diagonal line of said third transposition matrix data ${}^t$[S'], to provide second 8×8 sub-matrix data of said ninth matrix data, a third multiplication, addition and subtraction means (147C) for multiplying, adding and subtracting said third sub-matrix data in the diagonal line of said eighth matrix data with second 8×8 sub-matrix data ${}^t$[S2'] in the diagonal line of said third transposition matrix data ${}^t$[S'], to provide third 8×8 sub-matrix data of said ninth matrix data, and a fourth multiplication, addition and subtraction means (147D) for multiplying, adding and subtracting fourth 8×8 sub-matrix data in the diagonal line of said eighth matrix data with a fourth 8×8 sub-matrix data ${}^t$[S4'] in the diagonal line of said third transposition matrix data ${}^t$[S'], to provide fourth 8×8 sub-matrix data of said ninth matrix data.

58. A discrete cosine inverse transformation system according to claim 55, wherein said second fourth-order inner product computation means (147) comprises:

a first multiplication, addition and subtraction means (147A) for multiplying, adding subtracting first 8×8 sub-matrix data in a diagonal line of said eighth matrix data [MD8] with first 8×8 sub-matrix data ${}^t$[S1'] in a diagonal line of said third transposition matrix data ${}^t$[S'], to provide first 8×8 sub-matrix data of said ninth matrix data, a second multiplication, addition and subtraction means (147B) for multiplying, adding and subtracting second 8×8 sub-matrix data in the diagonal line of said eighth matrix data with third 8×8 sub-matrix data ${}^t$[S3'] in the diagonal line of said third transposition matrix data ${}^t$[S'], to provide second 8×8 sub-matrix data of said ninth matrix data, a third multiplication, addition and subtraction means (147C) for multiplying, adding and subtracting said third sub-matrix data in the diagonal line of said eighth matrix data with second 8×8 sub-matrix data ${}^t$[S2'] in the diagonal line of said third transposition matrix data ${}^t[S']$, to provide third $8\times8$ sub-matrix data of said ninth matrix data, and a fourth multiplication, addition and subtraction means (147D) for multiplying, adding and subtracting fourth $8\times8$ sub-matrix data in the diagonal line of said eighth matrix data with a fourth $8\times8$ sub-matrix data ${}^t$[S4'] in the diagonal line of said third transposition matrix data ${}^t[S']$, to provide fourth $8\times8$ sub-matrix data of said ninth matrix data.

59. A discrete cosine transformation system for comprising transforming means for performing a two-dimensional 4-row×4 column discrete cosine transformation of binary data in a matrix form, in accordance with the following formula:

$$\mathrm{DCT}:\vec{C}=(\tfrac{1}{4})\,[U][T][S][R][L][Q]\vec{X}$$

where, $\vec{X}$ denotes matrix data to be subjected to the discrete cosine transformation and is defined as follows:

$\vec{X}=X_k$(k=0~3, 10~13, 20~23 30~33), or $X_{ij}$ (i=0~3, j=0~37)

$$\vec{X}=\begin{bmatrix} x00\\ x01\\ x02\\ x03\\ x10\\ x11\\ x12\\ x13\\ x20\\ \cdot\\ \cdot\\ \cdot\\ x32\\ x33 \end{bmatrix}$$

$\vec{C}$ denotes matrix data obtained by the discrete cosine transformation and is defined as follows:

$\vec{C}=C_k$(k=0~3, 10~13, 20~23, 30~33), or $C_{ij}$ (i=0~3, j=0~3)

$$\vec{C}=\begin{bmatrix} c00\\ c01\\ c02\\ c03\\ c10\\ c11\\ c12\\ c13\\ c20\\ \cdot\\ \cdot\\ \cdot\\ c32\\ c33 \end{bmatrix}$$

[Q] denotes first 16×16 constant matrix data, defined as follows:

$[Q]=Q_{ij}$(i=0~15, j=0~15)

$$[Q]=\begin{bmatrix}
1000 & & & 0000\\
0001 & & & 0000\\
0000 & & & 1000\\
0000 & & & 0001\\
0100 & & & 0000\\
0010 & & & 0000\\
0000 & & & 0100\\
0000 & & & 0010\\
 & 1000 & 0000 & \\
 & 0001 & 0000 & \\
 & 0000 & 1000 & \\
 & 0000 & 0001 & \\
 & 0100 & 0000 & \\
 & 0010 & 0100 & \\
 & 0000 & 0100 & \\
 & 0000 & 0010 &
\end{bmatrix}$$

[L] denotes second 16×16 matrix data, defined as follows:

$[L]=L_{ij}$(i=0~15, j=1~15)

$$[L]=\begin{bmatrix}
++++ & & & \\
+-+- & & & \\
++-- & & & \\
+--+ & & & \\
 & ++++ & & \\
 & +-+- & & \\
 & ++-- & & \\
 & +--+ & & \\
 & & ++++ & \\
 & & +-+- & \\
 & & ++-- & \\
 & & +--+ & \\
 & & & ++++\\
 & & & +-+-\\
 & & & ++--\\
 & & & +--+
\end{bmatrix}$$

[R] denotes third 16×16 constant matrix data, defined as follows:

$[R]=R_{ij}$(i=0~15, j=0~15)

$$[R]=\begin{bmatrix}
1000 & 0000 & 0000 & 0000\\
0000 & 1000 & 0000 & 0000\\
0000 & 0000 & 1000 & 0000\\
0000 & 0000 & 0000 & 1000\\
0000 & 0100 & 0000 & 0000\\
0000 & 0000 & 0000 & 0100\\
0100 & 0000 & 0000 & 0000\\
0000 & 0000 & 0100 & 0000\\
0000 & 0000 & 0010 & 0000\\
0000 & 0000 & 0000 & 0010\\
0010 & 0000 & 0000 & 0000\\
0000 & 0010 & 0000 & 0000\\
0000 & 0000 & 0000 & 0001\\
0000 & 0000 & 0001 & 0000\\
0000 & 0001 & 0000 & 0000\\
0001 & 0000 & 0000 & 0000
\end{bmatrix}$$

[S] denotes fourth 16×16 constant matrix data, defined as follows:

$[S]=S_{ij}$(i=0~15, j=0~15)

$$[S] = \left(\begin{array}{cccc}
+0+0 & & & \\
0+0+ & & & \\
+0-0 & & & \\
0+0- & & & \\
 & ++++ & & \\
 & ++-- & & \\
 & +-+- & & \\
 & +--+ & & \\
 & & ++++ & \\
 & & ++-- & \\
 & & +-+- & \\
 & & +--+ & \\
 & & & +00+ \\
 & & & +--- \\
 & & & 0+-0 \\
 & & & +++-
\end{array}\right) = \left(\begin{array}{cccc}
S1 & & & O \\
 & S2 & & \\
 & & S3 & \\
O & & & S4
\end{array}\right)$$

[T] denotes fifth 16×16 constant matrix data including irrational numbers, defined as follows:

$[T]=T_{ij}(i=0\sim15, j=0\sim15)$ $$[T] = \left(\begin{array}{cccccccc}
++ & & & & & & & \\
+- & & & & & & & \\
 & ++ & & & & & & \\
 & +- & & & & & & \\
 & & kn & & & & & \\
 & & nm & & & & & \\
 & & & kn & & & & \\
 & & & nm & & & & \\
 & & & & kn & & & \\
 & & & & nm & & & \\
 & & & & & kn & & \\
 & & & & & nm & & \\
 & & & & & & +j & \\
 & & & & & & +i & \\
 & & & & & & & +j \\
 & & & & & & & -j
\end{array}\right) = \left(\begin{array}{cccc}
T1 & & & O \\
 & T2 & & \\
 & & T3 & \\
O & & & T4
\end{array}\right)$$

wherein, $i=-j=\cos(2\pi/8)$ $k=-m=\cos(1\pi/8)$ $l=-n=\cos(3\pi/8)$

[U] denotes sixth 16×16 constant matrix data, defined as follows:

$[U]=U_{ij}(i=0\sim31, j=0\sim31)$ $$[U] = \left[\begin{array}{cccc}
1000 & 0000 & 0000 & 0000 \\
0000 & 1000 & 0000 & 0000 \\
0100 & 0000 & 0000 & 0000 \\
0000 & 0100 & 0000 & 0000 \\
0000 & 0000 & 1000 & 0000 \\
0000 & 0000 & 0000 & 1000 \\
0000 & 0000 & 0010 & 0000 \\
0000 & 0000 & 0000 & 0010 \\
0010 & 0000 & 0000 & 0000 \\
0000 & 0010 & 0000 & 0000 \\
0001 & 0000 & 0000 & 0000 \\
0000 & 0001 & 0000 & 0000 \\
0000 & 0000 & 0100 & 0000 \\
0000 & 0000 & 0000 & 0001 \\
0000 & 0000 & 0001 & 0000 \\
0000 & 0000 & 0000 & 0100
\end{array}\right]$$

wherein said transforming means for:

a first rearrangement means (162) for rearranging matrix data $\vec{X}$ in accordance with positions of factors "1" in said first constant matrix data [Q], as an inner product computation: $[Q]\cdot\vec{X}$, to provide seventh matrix data: $[MD7]=[Q]\cdot\vec{X}$;

a first fourth-order inner product computation means (164) for computing a fourth order inner product computation between said second constant matrix data [L] and said seventh matrix data [MD7], to provide eighth matrix data: [MD8]=[L]·[MD7];

a second rearrangement means (166) for rearranging eighth matrix data [MD8] in accordance with position of factors "1" in said third constant matrix data [R], as an inner product computation :[R]·[MD8]to provide ninth matrix data: [MD9]=[R]·[MD8];

a second fourth-order inner product computation means (168) for computing a fourth order product computation between said fourth constant matrix data [S] and said ninth matrix data [MD9], to provide 10th matrix data: [MD10]=[S]·[MD9];

a second order inner product computation means (170) for computing a second order product computation between said fifth matrix data [T] and said 10th matrix data [MD10], to provide 11th matrix data: [MD11]=[T]·[MD10];

a third rearrangement means (172) for rearranging said 11th matrix data [MD11] in accordance with positions of factors "1" in said sixth constant matrix data [U], as an inner product computation: [U]·[MD11], to provide 12th matrix data [MD12]=[U]·[MD11]; and a shift means for shifting said 12th matrix data [MD12] by two bits, to thereby provide said matrix data $\vec{C}$=[MD12]/4.

60. A discrete cosine transformation system according to claim 59, wherein said second-order inner product computation means (170) comprises:

a first multiplication, addition and subtraction means (170A) for multiplying, adding and subtracting said first sub-matrix data of said 10th matrix data with first 4×4 sub-matrix data [T1] in a diagonal line of said fifth matrix data [T], to provide first 4×4 sub-matrix data of said 11th matrix data;

a second multiplication, addition and subtraction means (170B) for multiplying, adding and subtracting said second sub-matrix data of said 10th matrix data with a third 4×4 sub-matrix data [T3] in the diagonal line of said fifth matrix data [T], to provide second 4×4 sub-matrix data of said 11th matrix data, a third multiplication, addition and subtraction means (170C) for multiplying, adding and subtracting said third sub-matrix data of said 10th matrix data with second 4×4 sub-matrix data [T2] in the diagonal line of said fifth matrix data [T], to provide third 4×4 sub-matrix data of said 11th matrix data, and a fourth multiplication, addition and subtraction means (170D) for multiplying, adding and subtracting said fourth sub-matrix data of said 10th matrix data with a fourth 4×4 sub-matrix data [T4] in the diagonal line of said fifth matrix data [T], to provide fourth 4×4 sub-matrix data of said 11th matrix data.

61. A discrete cosine transformation system according to claim 59, wherein said second fourth-order inner product computation means (168) comprises a first addition and subtraction means (168A) for adding and subtracting said first sub-matrix data of said ninth matrix data in accordance with first submatrix data [S1] in said fourth matrix data [S], to provide first sub-matrix data of said 10th matrix data, a second addition and subtraction means (168B) for adding and subtracting said second sub-matrix data of said ninth matrix data in accordance with third sub-matrix data [S3] in said fourth matrix data [S], to provide second sub-matrix data of said 10th matrix data, a third addition and subtraction means (168C) for adding and subtracting said third sub-matrix data of said ninth matrix data in accordance with second sub-matrix data [S2] in said fourth matrix data [S], to provide third sub-matrix data of said 10th matrix data, and a fourth addition and subtraction means (168D) for adding and subtracting said fourth sub-matrix data of said ninth matrix data in accordance with fourth sub-matrix data [S4] in said fourth matrix data [S], to provide fourth sub-matrix data of said 10th matrix data.

62. A discrete cosine transformation system according to claim 61, wherein said second-order inner product computation means (170) comprises a first multiplication, addition and subtraction means (170A) for multiplying, adding and subtracting said first sub-matrix data of said 10th matrix data with first 4×4 sub-matrix data [T1] in a diagonal line of said fifth matrix data [T], to provide first 4×4 sub-matrix data of said 11th matrix data, a second multiplication, addition and subtraction means (170B) for multiplying, adding and subtracting said second sub-matrix data of said 10th matrix data with a third 4×4 sub-matrix data [T3] in the diagonal line of said fifth matrix data [T], to provide second 4×4 sub-matrix data of said 11th matrix data, a third multiplication, addition and subtraction means (170C) for multiplying, adding and subtracting said third sub-matrix data of said 10th matrix data with second 4×4 sub-matrix data [T2] in the diagonal line of said fifth matrix data [T], to provide third 4×4 sub-matrix data of said 11th matrix data, and a fourth multiplication, addition and subtraction means (170D) for multiplying, adding and subtracting said fourth sub-matrix data of said 10th matrix data with fourth 4×4 sub-matrix data [T4] in the diagonal line of said fifth matrix data [T], to provide

63. A discrete cosine inverse transformation system for performing a two-dimensional 4-row×4 column discrete cosine inverse transformation of binary data in a matrix form, in accordance with the following formula:

$$\text{IDCT}:\vec{X} = (\tfrac{1}{4})\,{}^t[Q][L]\,{}^t[R]\,{}^t[S]\,{}^t[T]\,{}^t[U]\vec{C}$$

where, $\vec{C}$ denotes matrix data to be subjected to the discrete cosine inverse transformation and is defined as follows:

$\vec{C} = C_k$(k=0~3, 10~13 20~23, 30~33), or $C_{ij}$-(i=0~3, j=0~3)

$$\vec{C} = \begin{bmatrix} c00 \\ c01 \\ c02 \\ c03 \\ c10 \\ c11 \\ c12 \\ c13 \\ c20 \\ \cdot \\ \cdot \\ \cdot \\ c32 \\ c33 \end{bmatrix}$$

$\vec{X}$ denotes matrix data obtained by the discrete cosine inverse transformation and is defined as follows:

$\vec{X} = X_k$(k=0~3, 10~13 20~23, 30~33), or $X_{ij}$-(i=0~3, j=0~3)

$$\vec{X} = \begin{bmatrix} x00 \\ x01 \\ x02 \\ x03 \\ x10 \\ x11 \\ x12 \\ x13 \\ x20 \\ \cdot \\ \cdot \\ \cdot \\ x32 \\ x33 \end{bmatrix}$$

${}^t[U]$ denotes first 16×16 constant transportation matrix data, defined as follows:

${}^t[U] = {}^t[U_{ij}$(i=0~15, j=0~15)

$${}^t[U] = \begin{pmatrix} 1000 & 0000 & 0000 & \\ 0010 & 0000 & 0000 & \\ 0000 & 0000 & 1000 & \\ 0000 & 0000 & 0010 & \\ & & & \\ 0100 & & 0000 & \\ 0001 & & 0000 & \\ 0000 & & 0100 & \\ 0000 & & 0001 & \\ & & & \\ & 1000 & & 0000 \\ & 0000 & & 1000 \\ & 0010 & & 0000 \\ & 0000 & & 0010 \\ & & & \\ & 0100 & & 0000 \\ & 0000 & & 0001 \\ & 0001 & & 0000 \\ & 0000 & & 0100 \end{pmatrix}$$

${}^t[T]$ denotes second 16×16 transportation matrix data, defined as follows:

${}^t[T] = {}^t[T_{ij}$(i=0~15, j=0~15)

$$
{}^t[T] = \left(\begin{array}{cccccccccccccccc}
+ & + \\
+ & - \\
 & & + & + \\
 & & + & - \\
 & & & & k & n \\
 & & & & n & m \\
 & & & & & & k & n \\
 & & & & & & n & m \\
 & & & & & & & & k & n \\
 & & & & & & & & n & m \\
 & & & & & & & & & & k & n \\
 & & & & & & & & & & n & m \\
 & & & & & & & & & & & & + & + \\
 & & & & & & & & & & & & j & i \\
 & & & & & & & & & & & & & & + & - \\
 & & & & & & & & & & & & & & j & j
\end{array}\right) = \begin{pmatrix} {}^tT1 & & & \\ & {}^tT2 & & O \\ & & {}^tT3 & \\ O & & & {}^tT4 \end{pmatrix}
$$

wherein, $i=-j=\cos(2\pi/8)$ $k=-m=\cos(1\pi/8)$ $l=-n=\cos(3\pi/8)$ ${}^t[S]$ denotes third 16×16 constant transportation matrix data, defined as follows:

${}^t[S]={}^t[S_{ij}](i=0\sim15,\ j=0\sim15)$ $$
{}^t[S] = \left(\begin{array}{cccccccccccccccc}
+ & 0 & + & 0 \\
0 & + & 0 & + \\
+ & 0 & - & 0 \\
0 & + & 0 & - \\
 & & & & + & + & + & + \\
 & & & & + & + & - & - \\
 & & & & + & - & + & - \\
 & & & & + & - & - & + \\
 & & & & & & & & + & + & + & + \\
 & & & & & & & & + & + & - & - \\
 & & & & & & & & + & - & + & - \\
 & & & & & & & & + & - & - & + \\
 & & & & & & & & & & & & + & + & 0 & + \\
 & & & & & & & & & & & & 0 & - & + & + \\
 & & & & & & & & & & & & 0 & - & - & + \\
 & & & & & & & & & & & & + & - & 0 & -
\end{array}\right) = \begin{pmatrix} {}^tS1 & & & \\ & {}^tS2 & & O \\ & & {}^tS3 & \\ O & & & {}^tS4 \end{pmatrix}
$$

${}^t[R]$ denotes fourth 16×16 constant transportation matrix data, defined as follows:

${}^t[R]={}^t[R_{ij}](i=0\sim15,\ j=0\sim15)$ $$
{}^t[R] = \left(\begin{array}{cccccccccccccccc}
1&0&0&0&0&0&0&0&0&0&0&0&0&0&0&0 \\
0&0&0&0&0&0&1&0&0&0&0&0&0&0&0&0 \\
0&0&0&0&0&0&0&0&0&0&1&0&0&0&0&0 \\
0&0&0&0&0&0&0&0&0&0&0&0&0&0&0&1 \\
0&1&0&0&0&0&0&0&0&0&0&0&0&0&0&0 \\
0&0&0&0&1&0&0&0&0&0&0&0&0&0&0&0 \\
0&0&0&0&0&0&0&0&0&0&0&1&0&0&0&0 \\
0&0&0&0&0&0&0&0&0&0&0&0&0&0&1&0 \\
0&0&1&0&0&0&0&0&0&0&0&0&0&0&0&0 \\
0&0&0&0&0&0&0&1&0&0&0&0&0&0&0&0 \\
0&0&0&0&0&0&0&0&1&0&0&0&0&0&0&0 \\
0&0&0&0&0&0&0&0&0&0&0&0&0&1&0&0 \\
0&0&0&1&0&0&0&0&0&0&0&0&0&0&0&0 \\
0&0&0&0&0&1&0&0&0&0&0&0&0&0&0&0 \\
0&0&0&0&0&0&0&0&0&1&0&0&0&0&0&0 \\
0&0&0&0&0&0&0&0&0&0&0&0&1&0&0&0
\end{array}\right)
$$

[L] denotes fifth 16×16 constant matrix data, defined as follows:

$[L]=L_{ij}(i=0\sim15,\ j=0\sim15)$ $$
[L] = \left(\begin{array}{cccccccccccccccc}
+ & + & + & + \\
+ & - & + & - \\
+ & + & - & - \\
+ & - & - & + \\
 & & & & + & + & + & + \\
 & & & & + & - & + & - \\
 & & & & + & + & - & - \\
 & & & & + & - & - & + \\
 & & & & & & & & + & + & + & + \\
 & & & & & & & & + & - & + & - \\
 & & & & & & & & + & + & - & - \\
 & & & & & & & & + & - & - & + \\
 & & & & & & & & & & & & + & + & + & + \\
 & & & & & & & & & & & & + & - & + & - \\
 & & & & & & & & & & & & + & + & - & - \\
 & & & & & & & & & & & & + & - & - & +
\end{array}\right)
$$

${}^t[Q]$ denotes sixth 16×16 constant transportation matrix data, defined as follows:

${}^t[Q]={}^t[Q_{ij}](i=0\sim15,\ j=0\sim15)$ $$
{}^t[Q] = \left(\begin{array}{cccccccccccccccc}
1&0&0&0&0&0&0&0 \\
0&0&0&0&1&0&0&0 \\
0&0&0&0&0&1&0&0 \\
0&1&0&0&0&0&0&0 \\
 & & & & & & & &1&0&0&0&0&0&0&0 \\
 & & & & & & & &0&0&0&0&1&0&0&0 \\
 & & & & & & & &0&0&0&0&0&1&0&1 \\
 & & & & & & & &0&1&0&0&0&0&0&0 \\
 & & & & & & & &0&0&1&0&0&0&0&0 \\
 & & & & & & & &0&0&0&0&0&0&1&0 \\
 & & & & & & & &0&0&0&0&0&0&0&1 \\
 & & & & & & & &0&0&0&1&0&0&0&0 \\
0&0&1&0&0&0&0&0 \\
0&0&0&0&0&0&1&0 \\
0&0&0&0&0&0&0&1 \\
0&0&0&1&0&0&0&0
\end{array}\right)
$$

wherein said transforming means comprises:

a first rearrangement means (163) for rearranging said matrix data $\vec{C}$ in accordance with positions of factors "1" in said first constant transportation matrix data $_t[U]$, as an inner product computation: $_t[U]\cdot\vec{C}$, to provide seventh matrix data: $[MD7]=\cdot\vec{C}$;

a second order inner product computation means (165) for computing a second order inner product computation between said second transportation matrix data ${}^t[T]$ and said seventh matrix data [MD7], to provide eighth matrix data: $[MD8]={}_t[T]\cdot[MD7]$;

a first fourth-order inner product computation means (167) for computing a fourth order inner product computation between said third constant transportation matrix data ${}^t[S]$ and said eighth matrix data [MD8], to provide ninth matrix data: $[MD9]={}_t[S]\cdot[MD8]$;

a second rearrangement means (169) for rearranging said ninth matrix data [MD9] in accordance with position of factors "1" in said fourth constant transportation matrix data $_t[R]$, as an inner product computation: $_t[R]\cdot[MD9]$, to provide 10th matrix data: $[MD10]={}_t[R]\cdot[MD9]$;

a second fourth-order inner product computation means (171) for computing a fourth order inner product computation between said fifth matrix data [L] and said 10th matrix data [MD10], to provide 11th matrix data: $[MD11]=[L]\cdot[MD10]$;

a third rearrangement means (173) for rearranging said 11th matrix data [MD11] in accordance with positions of factors "1" in said sixth constant transportion matrix data $_t[Q]$, as an inner product computation: $_t[Q]\cdot[MD11]$, to provide 12th matrix data $[MD12]={_t[Q]}\cdot[MD11]$; and a shift means for shifting said 12th matrix data [MD12] by two bits, to thereby provide said matrix data $\vec{X}=[MD12]/4$.

64. A discrete cosine inverse transformation system according to claim 63, wherein said first fourth-order inner product computation means (167) comprises:

a first addition and subtraction means (167A) for adding and subtracting said first sub-matrix of said eighth matrix data in accordance with first 4×4 sub-matrix data $^t[S1]$ in a said third transposition matrix data $^t[S]$, to provide first sub-matrix data of said ninth matrix data, a second addition and subtraction means (167B) for adding and subtracting said second sub-matrix of said eighth matrix data in accordance with third 4×4 sub-matrix data $^t[S3]$ in said third transposition matrix data $^t[S]$, to provide second sub-matrix data of said ninth matrix data, a third addition and subtraction means (167C) for adding and subtracting said third sub-matrix of said eighth matrix data in accordance with second 4×4 sub-matrix data $^t[S2]$ in said third transposition matrix data $^t[S]$, to provide third sub-matrix data of said ninth matrix data, and a fourth addition and subtraction means (167D) for adding and subtracting said fourth sub-matrix of said ninth matrix data in accordance with fourth 4×4 sub-matrix $^t[S4]$ in said third transposition matrix data $^t[S]$, to provide fourth sub-matrix data of said ninth matrix data.

65. A discrete cosine inverse transformation system according to claim 63, wherein said second-order inner product computation means (165) comprises a first multiplication, addition and subtraction means (165A) for multiplying, adding and subtracting first 4×4 sub-matrix data in the diagonal line of said seventh matrix data with first 4×4 sub-matrix data $^t[T1]$ in a diagonal line of said second transposition matrix data $^t[T]$, to provide first 4×4 sub-matrix data of said eighth matrix data, a second multiplication, addition and subtraction means (165B) for multiplying, adding and subtracting second 4×4 sub-matrix data in the diagonal line of said seventh matrix data with third 4×4 sub-matrix data $^t[T3]$ in the diagonal line of said second transposition matrix data $^t[T]$, to provide second 4×4 sub-matrix data of said eighth matrix data, a third multiplication, addition and subtraction means (165C) for multiplying, adding and subtracting said third 4×4 sub-matrix data in the diagonal line of said seventh matrix data with second 4×4 sub-matrix data $^t[T2]$ in the diagonal line of said second transposition matrix data $^t[T]$, to provide third 4×4 sub-matrix data of said eighth matrix data, and a fourth multiplication, addition and subtraction means (165D) for multiplying, adding and subtracting said fourth 4×4 sub-matrix data in the diagonal line of said seventh matrix data with fourth 4×4 sub-matrix data $^t[T4]$ in the diagonal line of said second transposition matrix data $^t[T]$, to provide fourth 4×4 sub-matrix data of said eighth matrix data.

66. A discrete cosine inverse transformation system according to claim 65, wherein said first fourth-order inner product computation means (167) comprises a first addition and subtraction means (167A) for adding and subtracting said first sub-matrix of said eighth matrix data in accordance with first 4×4 sub-matrix data $^t[S1]$ in said third transposition matrix data $^t[S]$, to provide first sub-matrix data of said ninth matrix data, a second addition and subtraction means (167B) for adding and subtracting said second sub-matrix of said eighth matrix data in accordance with third 4×4 sub-matrix data $^t[S3]$ in said third transposition matrix data $^t[S]$, to provide second sub-matrix data of said ninth matrix data, a third addition and subtraction means (167C) for adding and subtracting said third sub-matrix of said eighth matrix data in accordance with second 4×4 sub-matrix data $^t[S2]$ in said third transposition matrix data $^t[S]$, to provide third sub-matrix data of said ninth matrix data, and a fourth addition and subtraction means (167D) for adding and subtracting said fourth sub-matrix of said ninth matrix data in accordance with fourth 4×4 sub-matrix $^t[S4]$ in said third transposition matrix data $^t[S]$, to provide fourth sub-matrix data of said ninth matrix data.

67. A discrete cosine transformation system comprising transforming means for performing a two-dimensional 4-row×4 column discrete cosine transformation of binary data in a matrix form, in accordance with the following formula:

$$DCT: \vec{C} = (\tfrac{1}{4})\,[U'][T'][S'][R'][L][Q]\vec{X}$$

where, $\vec{X}$ denotes matrix data to be subjected to the discrete cosine transformation and is defined as follows:

$\vec{X}=X_k$(k=0~3, 10~13, 20~23 30~33), or $X_{ij}$. (i=0~3, j=0~3)

$$\vec{X} = \begin{bmatrix} x00 \\ x01 \\ x02 \\ x03 \\ x10 \\ x11 \\ x12 \\ x13 \\ x20 \\ \cdot \\ \cdot \\ \cdot \\ x32 \\ x33 \end{bmatrix}$$

$\vec{C}$ denotes matrix data obtained by the discrete cosine transformation and is defined as follows:

$\vec{C}=C_k$(k=0~3, 10~13, 20~23, 30~33), or $C_{ij}$. (i=0~3, j=0~3)

$$\vec{C} = \begin{bmatrix} c00 \\ c01 \\ c02 \\ c03 \\ c10 \\ c11 \\ c12 \\ c13 \\ c20 \\ \cdot \\ \cdot \\ \cdot \\ c32 \\ c33 \end{bmatrix}$$

[Q] denotes first 16×16 constant matrix data, defined as follows:

$[Q]=Q_{ij}(i=0\sim15,\ j=0\sim15)$ $$[Q] = \begin{pmatrix}
1000 & & & 0000 \\
0001 & & & 0000 \\
0000 & & & 1000 \\
0000 & & & 0001 \\
0100 & & & 0000 \\
0010 & & & 0000 \\
0000 & & & 0100 \\
0000 & & & 0010 \\
 & 1000 & 0000 & \\
 & 0001 & 0000 & \\
 & 0000 & 1000 & \\
 & 0000 & 0001 & \\
 & 0100 & 0000 & \\
 & 0010 & 0000 & \\
 & 0000 & 0100 & \\
 & 0000 & 0010 &
\end{pmatrix}$$

[L] denotes second 16×16 matrix data, defined as follows:

$[L]=L_{ij}(i=0\sim15,\ j=0\sim15)$ $$[L] = \begin{pmatrix}
++++ & & & \\
+-+- & & & \\
++-- & & & \\
+--+ & & & \\
 & ++++ & & \\
 & +-+- & & \\
 & ++-- & & \\
 & +--+ & & \\
 & & ++++ & \\
 & & +-+- & \\
 & & ++-- & \\
 & & +--+ & \\
 & & & ++++ \\
 & & & +-+- \\
 & & & ++-- \\
 & & & +--+
\end{pmatrix}$$

[R'] denotes third 16×16 constant matrix data, defined as follows:

$[R']=R'_{ij}(i=0\sim15,\ j=0\sim15)$

-continued $$[R'] = \begin{pmatrix}
1000 & 0000 & 0000 & 0000 \\
0000 & 1000 & 0000 & 0000 \\
0000 & 0000 & 1000 & 0000 \\
0000 & 0000 & 0000 & 1000 \\
0000 & 0100 & 0000 & 0000 \\
0100 & 0000 & 0000 & 0000 \\
0000 & 0000 & 0000 & 0100 \\
0000 & 0000 & 0100 & 0000 \\
0000 & 0000 & 0010 & 0000 \\
0010 & 0000 & 0000 & 0000 \\
0000 & 0000 & 0000 & 0010 \\
0000 & 0010 & 0000 & 0000 \\
0000 & 0000 & 0000 & 0001 \\
0001 & 0000 & 0000 & 0000 \\
0000 & 0000 & 0001 & 0000 \\
0000 & 0001 & 0000 & 0000
\end{pmatrix}$$

[S'] denotes fourth 16×16 matrix data, defined as follows:

$[S']=S'_{ij}(i=0\sim15,\ j=0\sim15)$ $$[S'] = \begin{pmatrix}
++ & & & & & & & \\
-+ & & & & & & & \\
 & ++ & & & & & & \\
 & -+ & & & & & & \\
 & & nk & & & & & \\
 & & kl & & & O & & \\
 & & & nk & & & & \\
 & & & kl & & & & \\
 & & & & nk & & & \\
 & & & & kl & & & \\
 & & & & & nk & & \\
 & & & & & kl & & \\
 & & O & & & & ++ & \\
 & & & & & & ji & \\
 & & & & & & & -+ \\
 & & & & & & & ij
\end{pmatrix}$$

wherein, $i=-j=\cos(2\pi/8)$ $k=-m=\cos(1\pi/8)$ $l=-n=\cos(3\pi/8)$

[T'] denotes fifth 16×16 matrix data, defined as follows:

$[T']=T'_{ij}(i=0\sim15,\ j=0\sim15)$ $$[T'] = \begin{pmatrix}
+0+0 & & & \\
0-0- & & & \\
+0-0 & & & \\
0-0+ & & & \\
 & ++++ & & \\
 & +-+- & & \\
 & ++-- & & \\
 & +--+ & & \\
 & & ++++ & \\
 & & +-+- & \\
 & & ++-- & \\
 & & +--+ & \\
 & & & ++0+ \\
 & & & 0+-- \\
 & & & 0++- \\
 & & & +-0-
\end{pmatrix}$$

[U'] denotes sixth 16×16 constant matrix data, defined as follows:

$[U']=U'_{ij}(i=0\sim31,\ j=0\sim31)$ $$[U'] = \begin{pmatrix} 1000\ 0000 & \\ 0000\ 1000 & \\ 0100\ 0000 & \\ 0000\ 0100 & \\ & 1000\ 0000 \\ & 0000\ 1000 \\ & 0010\ 0000 \\ & 0000\ 0100 \\ 0010\ 0000 & \\ 0000\ 0010 & \\ 0001\ 0000 & \\ 0000\ 0001 & \\ & 0100\ 0000 \\ & 0000\ 0010 \\ & 0001\ 0000 \\ & 0000\ 0001 \end{pmatrix}$$

wherein said transforming means comprises:

a first rearrangement means (182) for rearranging matrix data $\vec{X}$ in accordance with positions of factors "1" in said first constant matrix data [Q], as an inner product computation: $[Q]\cdot\vec{X}$, to provide seventh matrix data: $[MD7]=[Q]\cdot\vec{X}$;

a first fourth-order inner product computation means (184) for computing a fourth order inner product computation between said second constant matrix data [L] and said seventh matrix data [MD7], to provide eighth matrix data: $[MD8]=[L]\cdot[MD7]$;

a second rearrangement means (186) for rearranging said eighth matrix data [MD8] in accordance with position of factors "1" in said third constant matrix data [R'], as an inner product computation: $[R']\cdot[MD8]$, to provide ninth matrix data: $[MD9]=[R']\cdot[MD8]$;

a second-order inner product computation means (188) for computing a second order inner product computation between said fourth constant matrix data [S']and said ninth matrix data [MD9], to provide 10th matrix data: $[MD10]=[S']\cdot[MD9]$;

a second fourth-order inner product computation means (190) for computing a second order product computation between said fifth matrix data [T']and said 10th matrix data [MD10], to provide 11th matrix data: $[MD11]=[T']\cdot[MD10]$;

a third rearrangement means (192) for rearranging said 11th matrix data [MD11] in accordance with positions of factors "1" in said sixth constant matrix data [U'], as an inner product computation: $[U']\cdot[MD11]$, to provide 12th matrix data $[MD12]=[U']\cdot[MD11]$; and a shift means for shifting said 12th matrix data [MD12] by two bits, to thereby provide said matrix data data $\vec{C}=[MD12]/4$.

68. A discrete cosine transformation system according to claim 67, wherein said second fourth-order inner product computation means (190) comprises:

a first addition and subtraction means for adding and subtracting said first sub-matrix of said 10th matrix data in accordance with first sub-matrix data [T1'] in said fifth matrix data [T'], to provide first sub-matrix data of said 11th matrix data;

a second addition and subtraction means for adding and subtracting said second sub-matrix data of said 10th matrix data in accordance with third sub-matrix data [T3',] in said fifth matrix data [T'], to provide second sub-matrix data of said 11th matrix data;

a third addition and subtraction means for adding and subtracting said third sub-matrix data of said 10th matrix data in accordance with second sub-matrix data [T2'] in said fifth matrix data [T'], to provide third sub-matrix data of said 11th matrix data; and a fourth addition and subtraction means for adding and subtracting said fourth sub-matrix data of said ninth matrix data in accordance with fourth sub-matrix data [T4'] in said fifth matrix data [T'], to provide fourth sub-matrix data of said 11th matrix data.

69. A discrete cosine transformation system according to claim 67, wherein said second-order inner product computation means (188) comprises a first multiplication, addition and subtraction means for multiplying, adding and subtracting said first sub-matrix data of said 10th matrix data with first 4×4 sub-matrix data [S1'] in a diagonal line of said fourth matrix data [S'], to provide a first 4×4 sub-matrix data of said 10th matrix data, a second multiplication, addition and subtraction means for multiplying, adding and subtracting said second sub-matrix data of said 10th matrix data with third 4×4 sub-matrix data [S3'] in the diagonal line of said fourth matrix data [S'], to provide second 4×4 sub-matrix data of said 10th matrix data, a third multiplication, addition and subtraction means for multiplying, adding and subtracting said third sub-matrix data of said 10th matrix data with second 4×4 sub-matrix data [S2'] in the diagonal line of said fourth matrix data [S'], to provide third 4×4 sub-matrix data of said 10th matrix data, and a fourth multiplication, addition and subtraction means for multiplying, adding and subtracting said fourth sub-matrix data of said 10th matrix data with a fourth 4×4 sub-matrix data [S4'] in the diagonal line of said fourth matrix data [S'], to provide fourth 4×4 sub-matrix data of said 10th matrix data.

70. A discrete cosine transformation system according to claim 69, wherein said second fourth-order inner product computation means (190) comprises a first addition and subtraction means for adding and subtracting said first sub-matrix of said 10th matrix data in accordance with first sub-matrix data [T1'] in said fifth matrix data [T'], to provide first sub-matrix data of said 11th matrix data, a second addition and subtraction means for adding and subtracting said second sub-matrix data of said 10th matrix data in accordance with third sub-matrix data [T3'] in said fifth matrix data [T'], to provide second sub-matrix data of said 11th matrix data, a third addition and subtraction means for adding and subtracting said third sub-matrix data of said 10th matrix data in accordance with second sub-matrix data [T2'] in said fifth matrix data [T'], to provide third sub-matrix data of said 11th matrix data, and a fourth addition and subtraction means for adding and subtracting said fourth sub-matrix data of said ninth matrix data in accordance with fourth sub-matrix data [T4'] in said fifth matrix data [T'], to provide fourth sub-matrix data of said 11th matrix data.

71. A discrete cosine inverse transformation system comprising transforming means for performing a two-dimensional 4-row×4 column discrete cosine inverse transformation of binary data in a matrix form, in accordance with the following formula:

$$DCT: \vec{X} = (\tfrac{1}{4})\ {}^t[Q][L]\,{}^t[R]\,{}^t[S]\,{}^t[T]\,{}^t[U]\vec{C}$$

where, $\vec{C}$ denotes matrix data to be subjected to the discrete cosine inverse transformation and is defined as follows:

$\vec{C} = C_k(k=0\sim3,\ 10\sim13\ 20\sim23,\ 30\sim33)$, or $C_{ij}$ $(i=0\sim3, j=0\sim3)$ $$\vec{C} = \begin{bmatrix} c00 \\ c01 \\ c02 \\ c03 \\ c10 \\ c11 \\ c12 \\ c13 \\ c20 \\ \cdot \\ \cdot \\ \cdot \\ c32 \\ c33 \end{bmatrix}$$

$\vec{X}$ denotes matrix data obtained by the discrete cosine inverse transformation and is defined as follows:

$\vec{X} = X_k(k=0\sim3,\ 10\sim13\ 20\sim23,\ 30\sim33)$, or $X_{ij}$ $(i=0\sim3, j=0\sim3)$ $$\vec{X} = \begin{bmatrix} x00 \\ x01 \\ x02 \\ x03 \\ x10 \\ x11 \\ x12 \\ x13 \\ x20 \\ \cdot \\ \cdot \\ \cdot \\ x32 \\ x33 \end{bmatrix}$$

${}^t[U']$ denotes first 16×16 constant transposition matrix data, defined as follows:

${}^t[U'] = {}^tU'_{ij}(i=0\sim15, j=0\sim15)$ $${}^t[U] = \begin{pmatrix} 1000 & 0000 & & \\ 0010 & 1000 & & \\ 0000 & 0000 & & \\ 0000 & 0010 & & \\ 0100 & 0000 & & \\ 0001 & 0000 & & \\ 0000 & 0100 & & \\ 0000 & 0001 & & \\ & & 1000 & 0000 \\ & & 0000 & 1000 \\ & & 0010 & 0000 \\ & & 0000 & 0010 \\ & & 0100 & 0000 \\ & & 0001 & 0000 \\ & & 0000 & 0100 \\ & & 0000 & 0001 \end{pmatrix}$$

${}^t[T']$ denotes second 16×16 transposition matrix data, defined as follows:

${}^t[T'] = {}^tT'_{ij}(i=0\sim15, j=0\sim15)$ $${}^t[T] = \begin{pmatrix} +0+0 & & & \\ 0-0- & & & \\ +0-0 & & & \\ 0-0+ & & & \\ & ++++ & & \\ & +-+- & & \\ & ++-- & & \\ & +--+ & & \\ & & ++++ & \\ & & +-+- & \\ & & ++-- & \\ & & +--+ & \\ & & & +00+ \\ & & & +++- \\ & & & 0-+0 \\ & & & +--- \end{pmatrix}$$

${}^t[S']$ denotes third 16×16 constant transposition matrix data, defined as follows:

${}^t[S'] = {}^tS'_{ij}(i=0\sim15, j=0\sim15)$ $${}^t[S] = \begin{pmatrix} + & - & & & & & & & & & & & & & & \\ + & + & & & & & & & & & & & & & & \\ & & + & - & & & & & & & & & & & & \\ & & + & + & & & & & & & & & & & & \\ & & & & n & k & & & & & & & & & & \\ & & & & k & l & & & & & & & O & & & \\ & & & & & & n & k & & & & & & & & \\ & & & & & & k & l & & & & & & & & \\ & & & & & & & & n & k & & & & & & \\ & & & & & & & & k & l & & & & & & \\ & & & & & & & & & & n & k & & & & \\ & & & & & & & & & & k & l & & & & \\ & & & O & & & & & & & & & +j & & & \\ & & & & & & & & & & & & & +i & & \\ & & & & & & & & & & & & & & -i & \\ & & & & & & & & & & & & & & & +i \end{pmatrix}$$

wherein, $i = -j = \cos(2\pi/8)$ $k = -m = \cos(1\pi/8)$ $l = -n = \cos(3\pi/8)$ ${}^t[R']$ denotes fourth 16×16 constant transposition matrix data, defined as follows:

${}^t[R'] = {}^tR'_{ij}(i=0\sim15, j=0\sim15)$ $$
{}^{t}[R'] = \begin{bmatrix}
1000 & 0000 & 0000 & 0000 \\
0000 & 0100 & 0000 & 0000 \\
0000 & 0000 & 0100 & 0000 \\
0000 & 0000 & 0000 & 0100 \\
0100 & 0000 & 0000 & 0000 \\
0000 & 1000 & 0000 & 0000 \\
0000 & 0000 & 0001 & 0000 \\
0000 & 0000 & 0000 & 0001 \\
0010 & 0000 & 0000 & 0000 \\
0000 & 0001 & 0000 & 0000 \\
0000 & 0000 & 1000 & 0000 \\
0000 & 0000 & 0000 & 0010 \\
0001 & 0000 & 0000 & 0000 \\
0000 & 0010 & 0000 & 0000 \\
0000 & 0000 & 0010 & 0000 \\
0000 & 0000 & 0000 & 1000
\end{bmatrix}
$$

[L] denotes fifth 16×16 constant matrix data, defined as follows:

$[L]=L_{ij}(i=0\sim15, j=0\sim15)$ $$
[L] = \begin{pmatrix}
{+}{+}{+}{+} & & & \\
{+}{-}{+}{-} & & & \\
{+}{+}{-}{-} & & & \\
{+}{-}{-}{+} & & & \\
 & {+}{+}{+}{+} & & \\
 & {+}{-}{+}{-} & & \\
 & {+}{+}{-}{-} & & \\
 & {+}{-}{-}{+} & & \\
 & & {+}{+}{+}{+} & \\
 & & {+}{-}{+}{-} & \\
 & & {+}{+}{-}{-} & \\
 & & {+}{-}{-}{+} & \\
 & & & {+}{+}{+}{+} \\
 & & & {+}{-}{+}{-} \\
 & & & {+}{+}{-}{-} \\
 & & & {+}{-}{-}{+}
\end{pmatrix}
$$

${}^{t}[Q]$ denotes sixth 16×16 constant transposition matrix data, defined as follows:

${}^{t}[Q]={}^{t}Q_{ij}(i=0\sim15, j=0\sim15)$ $$
{}^{t}[Q] = \begin{pmatrix}
1000 & 0000 & & \\
0000 & 1000 & & \\
0000 & 0100 & & \\
0100 & 0000 & & \\
 & & 1000 & 0000 \\
 & & 0000 & 1000 \\
 & & 0000 & 0101 \\
 & & 0100 & 0000 \\
 & & 0010 & 0000 \\
 & & 0000 & 0010 \\
 & & 0000 & 0001 \\
 & & 0001 & 0000 \\
0010 & 0000 & & \\
0000 & 0010 & & \\
0000 & 0001 & & \\
0001 & 0000 & &
\end{pmatrix}
$$

wherein said transforming means comprises:

a first rearrangement means (183) for rearranging said matrix data $\bar{C}$ in accordance with positions of factors "1" in said first constant transposition matrix data ${}^{t}[U']$, as an inner product computation: ${}^{t}[U']\cdot\bar{C}$, to provide seventh matrix data: $[MD7]={}^{t}[U']\cdot\bar{C}$;

a first fourth-order inner product computation means (185) for computing a fourth order inner product computation between said second transposition matrix data ${}^{t}[T']$ and said seventh matrix data [MD7], to provide eighth matrix data: $[MD8]={}^{t}[T']\cdot[MD7]$;

a first second-order inner product computation means (187) for computing a second order inner product computation between said third constant transposition matrix data ${}^{t}[S']$ and said eighth matrix data [MD8], to provide ninth matrix data: $[MD9]={}^{t}[S']\cdot[MD8]$;

a second rearrangement means (189) for rearranging ninth matrix data [MD9] in accordance with position of factors "1" in said fourth constant transposition matrix data ${}^{t}[R']$, as an inner product computation: ${}^{t}[R']\cdot[MD9]$, to provide 10th matrix data: $[MD10]={}^{t}[R']\cdot[MD9]$;

a second fourth-order inner product computation means (191) for computing a fourth order product computation between said fourth matrix data [L] and said 10th matrix data [MD10], to provide 11th matrix data: $[MD11]=[L]\cdot[MD10]$;

a third rearrangement means (173) for rearranging said 11th matrix data [MD11] in accordance with positions of factors "1" in said sixth constant transposition matrix data ${}^{t}[Q]$, as an inner product computation: ${}^{t}[Q]\cdot[MD11]$, to provide 12th matrix data $[MD12]={}^{t}[Q]\cdot[MD11]$; and a shift means for shifting said 12th matrix data [MD12] by two bits, to thereby provide said matrix data $\bar{X}=[MD12]/4$.

72. A discrete cosine inverse transformation system according to claim 71, wherein said second-order inner product computation means (187) comprises:

a first multiplication, addition and subtraction means for multiplying, adding and subtracting first 4×4 sub-matrix data in a diagonal line of said eighth matrix data [MD8] with first 4×4 sub-matrix data ${}^{t}[S1']$ in a diagonal line of said third transposition matrix data ${}^{t}[S']$, to provide first 4×4 sub-matrix data of said ninth matrix data;

a second multiplication, addition and subtraction means for multiplying, adding and subtracting said second 4×4 sub-matrix data in the diagonal line of said eighth matrix data with third 4×4 sub-matrix data ${}^{t}[S2']$ in the diagonal line of said third transposition matrix data ${}^{t}[S']$, to provide second 4×4 sub-matrix data of said ninth matrix data;

a third multiplication, addition and subtraction means for multiplying, adding and subtracting said third 4×4 sub-matrix data in the diagonal line of said eighth matrix data with second 4×4 sub-matrix data ${}^{t}[S2']$ in the diagonal line of said third transposition matrix data ${}^{t}[S']$, to provide third 4×4 sub-matrix data of said ninth matrix data; and a fourth multiplication, addition and subtraction means for multiplying, adding and subtracting fourth 4×4 sub-matrix data in the diagonal line of said eighth matrix data with fourth 4×4 sub-matrix data ${}^{t}[S4']$ in the diagonal line of said third transposition matrix data ${}^{t}[S']$, to provide fourth 4×4 sub-matrix data of said ninth matrix data.

73. A discrete cosine inverse transformation system according to claim 71 wherein said first fourth-order inner product computation means (185) comprises a first addition and subtraction means for adding and subtracting said first sub-matrix data of seventh matrix data in accordance with first 4×4 submatrix data ${}^t[T1']$ in said second transposition matrix data ${}^t[T']$, to provide first sub-matrix data of said eighth matrix data, a second addition and subtraction means for adding and subtracting said second sub-matrix data of seventh matrix data in accordance with second 4×4 sub-matrix data ${}^t[T2']$ in said second transposition matrix data ${}^t[T']$, to provide second sub-matrix data of said eighth matrix data, a third addition and subtraction means for adding and subtracting said third sub-matrix data of seventh matrix data in accordance with third 4×4 sub-matrix data ${}^t[T3']$ in said second transposition matrix data ${}^t[T']$, to provide third sub-matrix data of said eighth matrix data, and a fourth addition and subtraction means for adding and subtracting said fourth sub-matrix data of seventh matrix data in accordance with fourth 4×4 sub-matrix ${}^t[T4']$ in said second transposition matrix data ${}^t[T']$, to provide fourth sub-matrix data of said eighth matrix data.

74. A discrete cosine inverse transformation system according to claim 73 wherein said second-order inner product computation means (187) comprises a first multiplication, addition and subtraction means for multiplying, adding and subtracting first 4×4 sub-matrix data in a diagonal line of said eighth matrix data [MD8] with first 4×4 sub-matrix data ${}^t[S1']$ in a diagonal line of said third transposition matrix data ${}^t[S']$, to provide first 4×4 sub-matrix data of said ninth matrix data, a second multiplication, addition and subtraction means for multiplying, adding and subtracting said second 4×4 sub-matrix data in the diagonal line of said eighth matrix data with third 4×4 sub-matrix data ${}^t[S2']$ in the diagonal line of said third transposition matrix data ${}^t[S']$, to provide second 4×4 sub-matrix data of said ninth matrix data, a third multiplication, addition and subtraction means for multiplying, adding and subtracting said third 4×4 sub-matrix data in the diagonal line of said eighth matrix data with second 4×4 sub-matrix data ${}^t[S2']$ in the diagonal line of said third transposition matrix data ${}^t[S']$, to provide third 4×4 sub-matrix data of said ninth matrix data, and a fourth multiplication, addition and subtraction means for multiplying, adding and subtracting fourth 4×4 sub-matrix data in the diagonal line of said eighth matrix data with fourth 4×4 sub-matrix data ${}^t[S4']$ in the diagonal line of said third transposition matrix data ${}^t[S']$, to provide fourth 4×4 sub-matrix data of said ninth matrix data.

75. A discrete cosine transformation system comprising transforming means for performing a two-dimensional 4-row×8 column discrete cosine transformation of binary data in a matrix form, in accordance with the following formula:

$$DCT: \vec{C} = (\tfrac{1}{4})\,[U][T][S][R][L][Q]\vec{X}$$

where, $\vec{X}$ denotes matrix data to be subjected to the discrete cosine transformation and is defined as follows:

$\vec{X} = X_k$(k=0~7, 10~17, 20~27, 30~37), or $X_{ij}$ (i=0~3, j=0~7)

$$\vec{X} = \begin{bmatrix} x00 \\ x01 \\ x02 \\ \cdot \\ \cdot \\ \cdot \\ x07 \\ x10 \\ x11 \\ x12 \\ \cdot \\ \cdot \\ \cdot \\ x30 \\ \cdot \\ \cdot \\ \cdot \\ x36 \\ x37 \end{bmatrix}$$

$\vec{C}$ denotes matrix data obtained by the discrete cosine transformation and is defined as follows:

$\vec{C} = C_k$(k=0~7, 10~17, 20~27, 30~37), or $C_{ij}$ (i=0~3, j=0~7)

$$\vec{C} = \begin{bmatrix} c00 \\ c01 \\ c02 \\ \cdot \\ \cdot \\ \cdot \\ c07 \\ c10 \\ c11 \\ c12 \\ \cdot \\ \cdot \\ \cdot \\ c30 \\ \cdot \\ \cdot \\ \cdot \\ c36 \\ c37 \end{bmatrix}$$

[Q] denotes first 32×32 constant matrix data, defined as follows:

$[Q] = Q_{ij}$(i=0~31, j=0~31)

[Q] =

| | | | |
|---|---|---|---|
| 10000000 | 00000000 | 00000000 | 00000000 |
| 00000001 | 00000000 | 00000000 | 00000000 |
| 00000000 | 00000000 | 00000000 | 10000000 |
| 00000000 | 00000000 | 00000000 | 00000001 |
| 01000000 | 00000000 | 00000000 | 00000000 |
| 00000010 | 00000000 | 00000000 | 00000000 |
| 00000000 | 00000000 | 00000000 | 01000000 |
| 00000000 | 00000000 | 00000000 | 00000010 |

| | | | |
|---|---|---|---|
| 00100000 | 00000000 | 00000000 | 00000000 |
| 00000100 | 00000000 | 00000000 | 00000000 |
| 00000000 | 00000000 | 00000000 | 00100000 |
| 00000000 | 00000000 | 00000000 | 00000100 |
| 00010000 | 00000000 | 00000000 | 00000000 |
| 00001000 | 00000000 | 00000000 | 00000000 |
| 00000000 | 00000000 | 00000000 | 00010000 |
| 00000000 | 00000000 | 00000000 | 00001000 |

-continued

| | | | |
|---|---|---|---|
| 00000000 | 10000000 | 00000000 | 00000000 |
| 00000000 | 00000001 | 00000000 | 00000000 |
| 00000000 | 00000000 | 10000000 | 00000000 |
| 00000000 | 00000000 | 00000001 | 00000000 |
| 00000000 | 01000000 | 00000000 | 00000000 |
| 00000000 | 00000010 | 00000000 | 00000000 |
| 00000000 | 00000000 | 01000000 | 00000000 |
| 00000000 | 00000000 | 00000010 | 00000000 |

| | | | |
|---|---|---|---|
| 00000000 | 00100000 | 00000000 | 00000000 |
| 00000000 | 00000100 | 00000000 | 00000000 |
| 00000000 | 00000000 | 00100000 | 00000000 |
| 00000000 | 00000000 | 00000100 | 00000000 |
| 00000000 | 00010000 | 00000000 | 00000000 |
| 00000000 | 00001000 | 00000000 | 00000000 |
| 00000000 | 00000000 | 00010000 | 00000000 |
| 00000000 | 00000000 | 00001000 | 00000000 |

-continued

| | | | |
|---|---|---|---|
| 00000000 | 00000000 | 00100000 | 00000000 |
| 00000000 | 00000000 | 00000010 | 00000000 |
| 00000000 | 00000000 | 00000000 | 00100000 |
| 00000000 | 00000000 | 00000000 | 00000010 |
| 00100000 | 00000000 | 00000000 | 00000000 |
| 00000010 | 00000000 | 00000000 | 00000000 |
| 00000000 | 00100000 | 00000000 | 00000000 |
| 00000000 | 00000010 | 00000000 | 00000000 |

| | | | |
|---|---|---|---|
| 00000000 | 00000100 | 00000000 | 00000000 |
| 00000000 | 01000000 | 00000000 | 00000000 |
| 00000100 | 00000000 | 00000000 | 00000000 |
| 01000000 | 00000000 | 00000000 | 00000000 |
| 00000000 | 00000000 | 00000000 | 00000100 |
| 00000000 | 00000000 | 00000000 | 01000000 |
| 00000000 | 00000000 | 00000100 | 00000000 |
| 00000000 | 00000000 | 01000000 | 00000000 |

[L] denotes second 32×32 matrix data, defined as follows:

$[L]=L_{ij}(i=0\sim31, j=0\sim31)$

[L] = (block diagonal; each of the 8 diagonal blocks is:)

++++
+−+−
++−−
+−−+

O (above the diagonal blocks)

O (below the diagonal blocks)

[R] denotes third 32×32 constant matrix data, defined as follows:

$[R]=R_{ij}(i=0\sim31, j=0\sim31)$

[R] =

| | | | |
|---|---|---|---|
| 10000000 | 00000000 | 00000000 | 00000000 |
| 00001000 | 00000000 | 00000000 | 00000000 |
| 00000000 | 10000000 | 00000000 | 00000000 |
| 00000000 | 00001000 | 00000000 | 00000000 |
| 00000000 | 00000000 | 10000000 | 00000000 |
| 00000000 | 00000000 | 00001000 | 00000000 |
| 00000000 | 00000000 | 00000000 | 10000000 |
| 00000000 | 00000000 | 00000000 | 00001000 |

| | | | |
|---|---|---|---|
| 00000000 | 00000000 | 00000000 | 00000001 |
| 00000000 | 00000000 | 00000000 | 00010000 |
| 00000000 | 00000000 | 00000001 | 00000000 |
| 00000000 | 00000000 | 00010000 | 00000000 |
| 00000000 | 00000001 | 00000000 | 00000000 |
| 00000000 | 00010000 | 00000000 | 00000000 |
| 00000001 | 00000000 | 00000000 | 00000000 |
| 00010000 | 00000000 | 00000000 | 00000000 |

[S] denotes fourth 32×32 constant matrix data, defined as follows:

$[S]=S_{ij}(i=0\sim31, j=0\sim31)$ $$[S] = \left|\begin{matrix}
\begin{matrix}
1&1&1&1&0&0&0&0\\
0&0&0&0&1&1&1&1\\
1&-&-&1&0&0&0&0\\
0&0&0&0&1&-&-&1\\
1&1&-&-&0&0&0&0\\
0&0&0&0&1&1&-&-\\
1&-&1&-&0&0&0&0\\
0&0&0&0&1&-&1&-
\end{matrix} & & & O \\
& \begin{matrix}
1&0&0&1&0&1&1&0\\
0&1&1&0&1&0&0&1\\
1&0&0&1&0&-&-&0\\
0&1&1&0&-&0&0&-\\
1&0&0&-&0&1&-&0\\
0&1&-&0&-&0&0&1\\
1&0&0&-&0&-&1&0\\
0&1&-&0&1&0&0&-
\end{matrix} & & \\
& & \begin{matrix}
1&0&0&1&1&0&0&1\\
0&1&1&0&0&1&1&0\\
1&0&0&-&1&0&0&-\\
0&1&-&0&0&1&-&0\\
1&0&0&1&-&0&0&-\\
0&1&1&0&0&-&-&0\\
1&0&0&-&-&0&0&1\\
0&1&-&0&0&-&1&0
\end{matrix} & \\
O & & & \begin{matrix}
1&1&0&0&0&0&1&1\\
0&0&1&-&1&-&0&0\\
1&0&-&0&0&-&0&-\\
0&1&0&-&-&0&-&0\\
1&0&1&0&0&1&0&-\\
0&1&0&1&1&0&-&0\\
1&-&0&0&0&0&-&1\\
0&0&1&1&-&-&0&0
\end{matrix}
\end{matrix}\right|$$

$$= \left|\begin{matrix} S1 & & & O \\ & S2 & & \\ & & S3 & \\ O & & & S4 \end{matrix}\right|$$

[T] denotes fifth $32 \times 32$ constant matrix data including irrational numbers, defined as follows:
$[T] = T_{ij}(i=0 \sim 31,\ j=0 \sim 31)$ $$[T] = \left|\begin{matrix}
\begin{matrix} +&+&0&0\\ +&-&0&0\\ 0&0&+&+\\ 0&0&+&- \end{matrix} & & & & & & & O \\
& \begin{matrix} k&k&l&l\\ k&m&l&n\\ n&n&k&k\\ n&l&k&m \end{matrix} & & & & & & \\
& & \begin{matrix} k&k&n&n\\ n&n&m&m\\ n&l&k&m\\ m&k&n&l \end{matrix} & & & & & \\
& & & \begin{matrix} i&j&0&+\\ j&j&-&0\\ j&j&+&0\\ j&i&0&+ \end{matrix} & & & & \\
& & & & \begin{matrix} b&a&g&h\\ d&f&e&g\\ a&g&d&b\\ g&d&f&a \end{matrix} & & & \\
& & & & & \begin{matrix} b&a&g&h\\ d&f&e&g\\ a&g&d&b\\ g&d&f&a \end{matrix} & & \\
& & & & & & \begin{matrix} a&h&f&g\\ b&c&d&a\\ h&e&g&b\\ g&b&e&d \end{matrix} & \\
O & & & & & & & \begin{matrix} e&h&c&b\\ g&f&d&e\\ h&a&b&g\\ b&g&a&d \end{matrix}
\end{matrix}\right|$$

-continued $$= \begin{vmatrix} T1 & & & O \\ & T2 & & \\ & & T3 & \\ O & & & T4 \end{vmatrix}$$

wherein, $a = -e = \cos(\pi/16)$
$b = -f = \cos(3\pi/16)$
$c = -g = \cos(5\pi/16)$
$d = -h = \cos(7\pi/16)$
$i = -j = \cos(4\pi/16)$
$k = -m = \cos(2\pi/16)$
$l = -n = \cos(6\pi/16)$

[U] denotes sixth 32×32 constant matrix data, defined as follows:

$[U] = U_{ij} (i = 0 \sim 31, j = 0 \sim 31)$ $[U] =$

| | | | |
|---|---|---|---|
| 10000000 | 00000000 | 00000000 | 00000000 |
| 00000000 | 00000000 | 10000000 | 00000000 |
| 00001000 | 00000000 | 00000000 | 00000000 |
| 00000000 | 00000000 | 01000000 | 00000000 |
| 00100000 | 00000000 | 00000000 | 00000000 |
| 00000000 | 00000000 | 00100000 | 00000000 |
| 00000010 | 00000000 | 00000000 | 00000000 |
| 00000000 | 00000000 | 00010000 | 00000000 |
| 00000000 | 10000000 | 00000000 | 00000000 |
| 00000000 | 00000000 | 00000000 | 10000000 |
| 00000000 | 00001000 | 00000000 | 00000000 |
| 00000000 | 00000000 | 00000000 | 00001000 |
| 00000000 | 00100000 | 00000000 | 00000000 |
| 00000000 | 00000000 | 00000000 | 00000010 |
| 00000000 | 00000010 | 00000000 | 00000000 |
| 00000000 | 00000000 | 00000000 | 00100000 |
| 01000000 | 00000000 | 00000000 | 00000000 |
| 00000000 | 00000000 | 00001000 | 00000000 |
| 00000100 | 00000000 | 00000000 | 00000000 |
| 00000000 | 00000000 | 00000100 | 00000000 |
| 00010000 | 00000000 | 00000000 | 00000000 |
| 00000000 | 00000000 | 00000010 | 00000000 |
| 00000001 | 00000000 | 00000000 | 00000000 |
| 00000000 | 00000000 | 00000001 | 00000000 |
| 00000000 | 01000000 | 00000000 | 00000000 |
| 00000000 | 00000000 | 00000000 | 00000100 |
| 00000000 | 00000100 | 00000000 | 00000000 |
| 00000000 | 00000000 | 00000000 | 01000000 |
| 00000000 | 00010000 | 00000000 | 00000000 |
| 00000000 | 00000000 | 00000000 | 00010000 |
| 00000000 | 00000001 | 00000000 | 00000000 |
| 00000000 | 00000000 | 00000000 | 00000001 |

wherein said transforming means comprises:

a first rearrangement means (122) for rearranging said matrix data $\vec{X}$ in accordance with positions of factors "1" in said first 32×32 constant matrix data [Q], as an inner product computation; $[Q]\cdot\vec{X}$, to provide seventh matrix data: $[MD7]=[Q]\cdot\vec{X}$;

a first addition and subtraction means (124A) for performing addition of four data in a first row of each 4×4 sub-matrix positioned in a diagonal line of said seventh matrix data [MD7] in accordance with four element data in a first line of each 4×4 sub-matrix positioned in a diagonal line of said second constant matrix [L], to provide a first sub-matrix of ninth matrix data $[MD9]=\cdot[R]\cdot[L]\cdot[MD7]$;

a second addition and subtraction means (124B) for performing addition and subtraction of four data in a second row of each 4×4 sub-matrix positioned in the diagonal line of said seventh matrix data [MD7] in accordance with four element data in a second line of each 4×4 sub-matrix positioned in the diagonal line of said second constant matrix [L], to provide a second sub-matrix of said ninth matrix data;

a third addition and subtraction means (124C) for performing addition and subtraction of four data in a third row of each 4×4 sub-matrix positioned in the diagonal line of said seventh matrix data [MD7] in accordance with four element data in a third line of each 4×4 sub-matrix positioned in the diagonal line of said second constant matrix [L], to provide a third sub-matrix of said ninth matrix data; and a fourth addition and subtraction means (124D) for performing addition and subtraction of fourth data in a fourth row of each 4×4 sub-matrix positioned in the diagonal line of said seventh matrix data [MD7] in accordance with four element data in a fourth line of each 4×4 sub-matrix positioned in the diagonal line of said second constant matrix [L], to provide a fourth sub-matrix of said ninth matrix data;

a second fourth-order inner product computation means (128) for computing a fourth order product computation between said fourth 32×32 constant matrix data [S] and said ninth matrix data [MD9], to provide 10th matrix data: $[MD10]=[S]\cdot[MD9]$;

a third fourth-order inner product computation means (130) for computing a fourth order product computation between said fifth 32×32 constant matrix data [T] and said 10th matrix data [MD10], to provide 11th matrix data: $[MD11]=[T]\cdot[MD10]$;

a third rearrangement means (132) for rearranging said 11th matrix data [MD11] in accordance with positions of factors "1" in said sixth 32×32 constant matrix data [U], as an inner product computation: $[U]\cdot[MD11]$, to provide 12th matrix data $[MD12]=[U]\cdot[MD11]$; and a shift means for shifting said 12th matrix data [MD12] by three bits, to thereby provide said matrix data $\vec{C}=[MD12]/8$.

76. A discrete cosine inverse transformation system comprising transforming means for performing a two-dimensional 4-row×8 column discrete cosine inverse transformation of binary data in a matrix form, in accordance with the following formula:

$$IDCT: \vec{X} = (\tfrac{1}{4})^t[Q][L]^t[R]^t[S]^t[T]\vec{C}$$

where, $\vec{C}$ denotes matrix data to be subjected to the discrete cosine inverse transformation and is defined as follows:

$\vec{C}=C_k(k=0\sim7,\ 10\sim17,\ 20\sim27,\ 30\sim37)$, or $C_{ij}$. $(i=0\sim3,\ j=0\sim7)$ $$\vec{C}=\begin{bmatrix} c00 \\ c01 \\ c02 \\ \cdot \\ \cdot \\ \cdot \\ c07 \\ c10 \\ c11 \\ c12 \\ \cdot \\ \cdot \\ \cdot \\ c30 \\ \cdot \\ \cdot \\ \cdot \\ c36 \\ c37 \end{bmatrix}$$

$\vec{X}$ denotes matrix data obtained by the discrete cosine inverse transformation and is defined as follows:

$\vec{X}=X_k(k=0\sim7,\ 10\sim17,\ 20\sim27,\ 30\sim37)$, or $X_{ij}$. $(i=0\sim3,\ j=0\sim7)$ $$\vec{X}=\begin{bmatrix} x00 \\ x01 \\ x02 \\ \cdot \\ \cdot \\ \cdot \\ x07 \\ x10 \\ x11 \\ x12 \\ \cdot \\ \cdot \\ \cdot \\ x30 \\ \cdot \\ \cdot \\ \cdot \\ x36 \\ x37 \end{bmatrix}$$

${}^t[U]$ denotes first 32×32 constant transportation matrix data, defined as follows:

${}^t[U]={}^tU_{ij}(i=0\sim31,\ j=0\sim31)$ $$
{}^t[U]=
\left|\begin{array}{cccc}
10000000 & 00000000 & 00000000 & 00000000 \\
00000000 & 00000000 & 10000000 & 00000000 \\
00001000 & 00000000 & 00000000 & 00000000 \\
00000000 & 00000000 & 00001000 & 00000000 \\
00100000 & 00000000 & 00000000 & 00000000 \\
00000000 & 00000000 & 00100000 & 00000000 \\
00000010 & 00000000 & 00000000 & 00000000 \\
00000000 & 00000000 & 00000010 & 00000000 \\
\\
00000000 & 10000000 & 00000000 & 00000000 \\
00000000 & 00000000 & 00000000 & 10000000 \\
00000000 & 00001000 & 00000000 & 00000000 \\
00000000 & 00000000 & 00000000 & 00001000 \\
00000000 & 00100000 & 00000000 & 00000000 \\
00000000 & 00000000 & 00000000 & 00100000 \\
00000000 & 00000010 & 00000000 & 00000000 \\
00000000 & 00000000 & 00000000 & 00000010 \\
\\
01000000 & 00000000 & 00000000 & 00000000 \\
00010000 & 00000000 & 00000000 & 00000000 \\
00000100 & 00000000 & 00000000 & 00000000 \\
00000001 & 00000000 & 00000000 & 00000000 \\
00000000 & 00000000 & 01000000 & 00000000 \\
00000000 & 00000000 & 00010000 & 00000000 \\
00000000 & 00000000 & 00000100 & 00000000 \\
00000000 & 00000000 & 00000001 & 00000000 \\
\\
00000000 & 01000000 & 00000000 & 00000000 \\
00000000 & 00000000 & 00000000 & 00010000 \\
00000000 & 00000001 & 00000000 & 00000000 \\
00000000 & 00000000 & 00000000 & 00000100 \\
00000000 & 00010000 & 00000000 & 00000000 \\
00000000 & 00000000 & 00000000 & 01000000 \\
00000000 & 00000100 & 00000000 & 00000000 \\
00000000 & 00000000 & 00000000 & 00000001
\end{array}\right|
$$

${}^t[T]$ denotes second 32×32 transportation matrix data, defined as follows:

${}^t[T]={}^tT_{ij}(i=0\sim31,\ j=0\sim31)$ $$
{}^t[T]=
\left|\begin{array}{cccccc}
+\,+\,0\,0 & & & & & \\
+\,-\,0\,0 & & & & & \\
0\,0\,+\,+ & & & & & \\
0\,0\,+\,- & & & & & \\
 & k\,k\,n\,n & & & & \\
 & k\,m\,n\,l & & & & \\
 & l\,l\,k\,k & & & & \\
 & l\,n\,k\,m & & & & \mathrm{O} \\
 & & k\,n\,n\,m & & & \\
 & & k\,n\,l\,k & & & \\
 & & n\,m\,k\,n & & & \\
 & & n\,m\,m\,l & & & \\
 & & & i\,j\,j\,j & & \\
 & & & j\,j\,j\,i & & \\
 & & & 0\,-\,+\,0 & & \\
 & & & +\,0\,0\,+ & &
\end{array}\right.
$$

-continued $$
\begin{vmatrix}
 & & & & \begin{array}{cccc} b & d & a & g \\ a & f & g & d \\ g & e & d & f \\ h & g & b & a \end{array} & & & \\
 & & & & & \begin{array}{cccc} b & d & a & g \\ a & f & g & d \\ g & e & d & f \\ h & g & b & a \end{array} & & \\
 & O & & & & & \begin{array}{cccc} a & b & h & g \\ h & c & e & b \\ f & d & g & e \\ g & a & b & d \end{array} & \\
 & & & & & & & \begin{array}{cccc} e & g & h & b \\ h & f & a & g \\ c & d & b & a \\ b & e & g & d \end{array}
\end{vmatrix}
$$

$$
= \begin{vmatrix} {}^tT1 & & & O \\ & {}^tT2 & & \\ & & {}^tT3 & \\ O & & & {}^tT4 \end{vmatrix}
$$

wherein, a=−e=cos (π/16)

b=−f=cos (3π/16)

c=−g=cos (5π/16)

d=−h=cos (7π/16)

i=−j=cos (4π/16)

k=−m=cos (2π/16)

l=−n=cos (6π/16)

${}^t$[S] denotes third 32×32 constant transportation matrix data, defined as follows:

${}^t[S] = {}^tS_{ij} (i=0\sim31,\ j=0\sim31)$ $$
{}^t[S] = \begin{vmatrix}
\begin{array}{l} 1\ 0\ 1\ 0\ 1\ 0\ 1\ 0 \\ 1\ 0\ -0\ 1\ 0\ -0 \\ 1\ 0\ -0\ -0\ 1\ 0 \\ 1\ 0\ 1\ 0\ -0\ -0 \\ 0\ 1\ 0\ 1\ 0\ 1\ 0\ 1 \\ 0\ 1\ 0\ -0\ 1\ 0\ - \\ 0\ 1\ 0\ -0\ -0\ 1 \\ 0\ 1\ 0\ 1\ 0\ -0\ - \end{array} & & & \\
 & \begin{array}{l} 1\ 0\ 1\ 0\ 1\ 0\ 1\ 0 \\ 0\ 1\ 0\ 1\ 0\ 1\ 0\ 1 \\ 0\ 1\ 0\ 1\ 0\ -0\ - \\ 1\ 0\ 1\ 0\ -0\ -0 \\ 0\ 1\ 0\ -0\ -0\ 1 \\ 1\ 0\ -0\ 1\ 0\ -0 \\ 1\ 0\ -0\ -0\ 1\ 0 \\ 0\ 1\ 0\ -0\ 1\ 0\ - \end{array} & & O \\
 & & \begin{array}{l} 1\ 0\ 1\ 0\ 1\ 0\ 1\ 0 \\ 0\ 1\ 0\ 1\ 0\ 1\ 0\ 1 \\ 0\ 1\ 0\ -0\ 1\ 0\ - \\ 1\ 0\ -0\ 1\ 0\ -0 \\ 1\ 0\ 1\ 0\ -0\ -0 \\ 0\ 1\ 0\ 1\ 0\ -0\ - \\ 0\ 1\ 0\ -0\ -0\ 1 \\ 1\ 0\ -0\ -0\ 1\ 0 \end{array} & \\
 & O & & \begin{array}{l} 1\ 0\ 1\ 0\ 1\ 0\ 1\ 0 \\ 1\ 0\ 0\ 1\ 0\ 1\ -0 \\ 0\ 1\ -0\ 1\ 0\ 0\ 1 \\ 0\ -0\ -0\ 1\ 0\ 1 \\ 0\ 1\ 0\ -0\ 1\ 0\ - \\ 0\ -\ -0\ 1\ 0\ 0\ - \\ 1\ 0\ 0\ -0\ -\ -0 \\ 1\ 0\ -0\ -0\ 1\ 0 \end{array}
\end{vmatrix}
$$

$$
= \begin{vmatrix} {}^tS1 & & & O \\ & {}^tS2 & & \\ & & {}^tS3 & \\ O & & & {}^tS4 \end{vmatrix}
$$

$^t$[R] denotes fourth 32×32 constant transportation matrix data, defined as follows:

$^t[R] = {}^tR_{ij}(i=0\sim31,\ j=0\sim31)$ $^t[R] =$

| | | | |
|---|---|---|---|
| 10000000 | 00000000 | 00000000 | 00000000 |
| 00000000 | 00000000 | 00010000 | 00000000 |
| 00000000 | 00001000 | 00000000 | 00000000 |
| 00000000 | 00000000 | 00000000 | 00000001 |
| 01000000 | 00000000 | 00000000 | 00000000 |
| 00000000 | 00000000 | 00100000 | 00000000 |
| 00000000 | 00000100 | 00000000 | 00000000 |
| 00000000 | 00000000 | 00000000 | 00000010 |
| 00100000 | 00000000 | 00000000 | 00000000 |
| 00000000 | 00000000 | 01000000 | 00000000 |
| 00000000 | 00000010 | 00000000 | 00000000 |
| 00000000 | 00000000 | 00000000 | 00000100 |
| 00010000 | 00000000 | 00000000 | 00000000 |
| 00000000 | 00000000 | 10000000 | 00000000 |
| 00000000 | 00000001 | 00000000 | 00000000 |
| 00000000 | 00000000 | 00000000 | 00001000 |
| 00001000 | 00000000 | 00000000 | 00000000 |
| 00000000 | 00000000 | 00000001 | 00000000 |
| 00000000 | 10000000 | 00000000 | 00000000 |
| 00000000 | 00000000 | 00000000 | 00010000 |
| 00000100 | 00000000 | 00000000 | 00000000 |
| 00000000 | 00000000 | 00000010 | 00000000 |
| 00000000 | 01000000 | 00000000 | 00000000 |
| 00000000 | 00000000 | 00000000 | 00100000 |
| 00000010 | 00000000 | 00000000 | 00000000 |
| 00000000 | 00000000 | 00000100 | 00000000 |
| 00000000 | 00100000 | 00000000 | 00000000 |
| 00000000 | 00000000 | 00000000 | 01000000 |
| 00000001 | 00000000 | 00000000 | 00000000 |
| 00000000 | 00010000 | 00001000 | 00000000 |
| 00000000 | 00000000 | 00000000 | 00000000 |
| 00000000 | 00000000 | 00000000 | 10000000 |

[L] denotes fifth 32×32 constant matrix data, defined as follows:

$[L] = L_{ij}(i=0\sim31,\ j=0\sim31)$

[L] = (block-diagonal; each of the eight diagonal 4×4 blocks is as below; all other entries O)

| | | | |
|---|---|---|---|
| + | + | + | + |
| + | − | + | − |
| + | + | − | − |
| + | − | − | + |

$^t$[Q] denotes sixth 32×32 constant transportation matrix data, defined as follows:

$^t[Q] = {}^tQ_{ij}(i=0\sim31,\ j=0\sim31)$ $^t[Q] =$

| | | | |
|---|---|---|---|
| 10000000 | 00000000 | 00000000 | 00000000 |
| 00001000 | 00000000 | 00000000 | 00000000 |
| 00000000 | 10000000 | 00000000 | 00000000 |
| 00000000 | 00001000 | 00000000 | 00000000 |
| 00000000 | 00000100 | 00000000 | 00000000 |
| 00000000 | 01000000 | 00000000 | 00000000 |
| 00000100 | 00000000 | 00000000 | 00000000 |
| 01000000 | 00000000 | 00000000 | 00000000 |
| 00000000 | 00000000 | 10000000 | 00000000 |
| 00000000 | 00000000 | 00001000 | 00000000 |
| 00000000 | 00000000 | 00000000 | 10000000 |
| 00000000 | 00000000 | 00000000 | 00001000 |
| 00000000 | 00000000 | 00000000 | 00000100 |
| 00000000 | 00000000 | 00000000 | 01000000 |
| 00000000 | 00000000 | 00000100 | 00000000 |
| 00000000 | 00000000 | 01000000 | 00000000 |

-continued $$\begin{vmatrix} 00000000 & 00000000 & 00100000 & 00000000 \\ 00000000 & 00000000 & 00000010 & 00000000 \\ 00000000 & 00000000 & 00000000 & 00100000 \\ 00000000 & 00000000 & 00000000 & 00000010 \\ 00000000 & 00000000 & 00000000 & 00000001 \\ 00000000 & 00000000 & 00000000 & 00010000 \\ 00000000 & 00000000 & 00000001 & 00000000 \\ 00000000 & 00000000 & 00010000 & 00000000 \end{vmatrix}$$

$$\begin{vmatrix} 00100000 & 00000000 & 00000000 & 00000000 \\ 00000010 & 00000000 & 00000000 & 00000000 \\ 00000000 & 00100000 & 00000000 & 00000000 \\ 00000000 & 00000010 & 00000000 & 00000000 \\ 00000000 & 00000001 & 00000000 & 00000000 \\ 00000000 & 00010000 & 00000000 & 00000000 \\ 00000001 & 00000000 & 00000000 & 00000000 \\ 00010000 & 00000000 & 00000000 & 00000000 \end{vmatrix}$$

wherein said transforming means comprises:

- a first rearrangement means (123) for rearranging matrix data $\bar{C}$ in accordance with positions of factors "1" in said first 32×32 constant transposition matrix data $^t[U]$, as an inner product computation: $^t[U]\cdot\bar{C}$, to provide seventh matrix data: $[MD7]={}^t[U]\cdot\bar{C}$
- a first fourth-order inner product computation means (125) for computing a fourth order inner product computation between said second 32×32 transposition matrix data $^t[T]$ and said seventh matrix data [MD7], to provide eighth matrix data: $[MD8]={}^t[T]\cdot[MD7]$;
- a second fourth-order inner product computation means (127) for computing a fourth order product computation between said third 32×32 constant transposition matrix data $^t[S]$and said eighth matrix data [MD8], to provide ninth matrix data: $[MD9]={}^t[S]\cdot[MD8]$;
- a first addition and subtraction means (131A) for performing addition of four data in a first row of each 4×4 sub-matrix positioned in a diagonal line of said ninth matrix data [MD9] in accordance with four element data in a first line of each 4×4 sub-matrix positioned in a diagonal line of said fifth constant matrix [L], to provide first sub-matrix of 11th matrix data $[MD11]=[L]\cdot[R]\cdot[MD9]$;
- a second addition and subtraction means (131B) for performing addition and subtraction of four data in a second row of each 4×4 sub-matrix positioned in the diagonal line of said ninth matrix data [MD9] in accordance with four element data in a second line of each 4×4 sub-matrix positioned in the diagonal line of said fifth constant matrix [L], to provide second sub-matrix of said 11th matrix data;
- a third addition and subtraction means (131C) for performing addition and subtraction of four data in a third row of each 4×4 sub-matrix positioned in the diagonal line of said ninth matrix data [MD9] in accordance with four element data in a third line of each 4×4 sub-matrix positioned in the diagonal line of said fifth constant matrix [L], to provide third sub-matrix of said 11th matrix data;
- a fourth addition and subtraction means (131D) for performing addition and subtraction of four data in a fourth row of each 4×4 sub-matrix positioned in the diagonal line of said ninth matrix data [MD9] in accordance with four element data in a fourth line of each 4×4 sub-matrix positioned in the diagonal line of said fifth constant matrix [L], to provide fourth sub-matrix of said 11th matrix data;

- a third rearrangement means (133) for rearranging said 11th matrix data [MD11] in accordance with positions of factors "1" in said sixth 32×32 constant transposition matrix data $^t[Q]$, as an inner product computation: $^t[Q]\cdot[MD11]$, to provide 12th matrix data $[MD12]={}^t[Q]\cdot[MD11]$; and
- a shift means for shifting said 12th matrix data [MD12] by two bits, to thereby provide said matrix data $\bar{X}=[MD12]/4$.

77. A discrete cosine transformation system comprising transforming means for performing a two-dimensional 4-row×8 column discrete cosine transformation of binary data in a matrix form, in accordance with the following formula:

$$DCT{:}\vec{C}=(\tfrac{1}{8})\,[U'][T'][S'][R'][L][Q]\vec{X}$$

where, $\bar{X}$ denotes matrix data to be subjected to the discrete cosine transformation and is defined as follows:

$\bar{X}=X_k(k=0\sim7,\ 10\sim17,\ 20\sim27,\ 30\sim37)$, or $X_{ij}$, $(i=0\sim3,\ j=0\sim7)$ $$\vec{X}=\begin{bmatrix} x00 \\ x01 \\ x02 \\ \cdot \\ \cdot \\ x07 \\ x10 \\ x11 \\ x12 \\ \cdot \\ \cdot \\ x30 \\ \cdot \\ \cdot \\ x36 \\ x37 \end{bmatrix}$$

$\bar{C}$ denotes matrix data obtained by the discrete cosine transformation and is defined as follows:

$\bar{C}=C_k(k=0\sim7,\ 10\sim17,\ 20\sim27,\ 30\sim37)$, or $C_{ij}$, $(i=0\sim3,\ j=0\sim7)$ $$\vec{C}=\begin{bmatrix} c00 \\ c01 \\ c02 \\ \cdot \\ \cdot \\ c07 \\ c10 \\ c11 \\ c12 \\ \cdot \\ \cdot \\ c30 \\ \cdot \\ \cdot \\ c36 \\ c37 \end{bmatrix}$$

[Q] denotes first 32×32 constant matrix data, defined as follows:

$[Q]=Q_{ij}(i=0\sim31,\ j=0\sim31)$

[Q] =

```
10000000 00000000 00000000 00000000
00000001 00000000 00000000 00000000
00000000 00000000 00000000 10000000
00000000 00000000 00000000 00000001
01000000 00000000 00000000 00000000
00000010 00000000 00000000 00000000
00000000 00000000 00000000 01000000
00000000 00000000 00000000 00000010

00100000 00000000 00000000 00000000
00000100 00000000 00000000 00000000
00000000 00000000 00000000 00100000
00000000 00000000 00000000 00000100
00010000 00000000 00000000 00000000
00001000 00000000 00000000 00000000
00000000 00000000 00000000 00010000
00000000 00000000 00000000 00001000

00000000 10000000 00000000 00000000
00000000 00000001 00000000 00000000
00000000 00000000 10000000 00000000
00000000 00000000 00000001 00000000
00000000 01000000 00000000 00000000
00000000 00000010 00000000 00000000
00000000 00000000 01000000 00000000
00000000 00000000 00000010 00000000

00000000 00100000 00000000 00000000
00000000 00000100 00000000 00000000
00000000 00000000 00100000 00000000
00000000 00000000 00001000 00000000
00000000 00010000 00000000 00000000
00000000 00001000 00000000 00000000
00000000 00000000 00010000 00000000
00000000 00000000 00001000 00000000
```

[L] denotes second 32×32 matrix data, defined as follows:

$[L]=L_{ij}(i=0\sim31, j=0\sim31)$

[L] =

```
++++
+-+-
++--
+--+
    ++++
    +-+-
    ++--
    +--+
        ++++
        +-+-                O
        ++--
        +--+
            ++++
            +-+-
            ++--
            +--+
                ++++
                +-+-
                ++--
                +--+
                    ++++
                    +-+-
                    ++--
                    +--+
      O                 ++++
                        +-+-
                        ++--
                        +--+
                            ++++
                            +-+-
                            ++--
                            +--+
```

[R'] denotes third 32×32 constant matrix data, defined as follows:

$[R']=R'_{ij}(i=0\sim31, j=0\sim31)$

[R] =

```
10000000 00000000 00000000 00000000
00001000 00000000 00000000 00000000
00000000 10000000 00000000 00000000
00000000 00001000 00000000 00000000
00000000 00000000 10000000 00000000
00000000 00000000 00001000 00000000
00000000 00000000 00000000 10000000
00000000 00000000 00000000 00001000

00000000 00000000 00100000 00000000
00000000 00000000 00000000 00000010
00100000 00000000 00000000 00000000
00000000 00000010 00000000 00000000
00000000 00000000 00000010 00000000
00000000 00000000 00000000 00100000
00000010 00000000 00000000 00000000
00000000 00100000 00000000 00000000

00000000 00000100 00000000 00000000
00000000 01000000 00000000 00000000
00000100 00000000 00000000 00000000
01000000 00000000 00000000 00000000
00000000 00000000 00000000 00000100
00000000 00000000 00000000 01000000
00000000 00000000 00000100 00000000
00000000 00000000 01000000 00000000

00000000 00000000 00000000 00000001
00000000 00000000 00010000 00000000
00000000 00010000 00000000 00000000
00000001 00000000 00000000 00000000
00000000 00000000 00000000 00010000
00000000 00000000 00000001 00000000
00000000 00000001 00000000 00000000
00010000 00000000 00000000 00000000
```

[S'] denotes fourth 32×32 matrix data, defined as follows:

$[S']=S'_{ij}(i=0\sim31, j=0\sim31)$ $$[S'] = \left[\begin{array}{cccc}
\begin{array}{cccccccc}
+ & 0 & 0 & + & 0 & 0 & 0 & 0 \\
0 & 0 & 0 & 0 & + & 0 & 0 & + \\
0 & + & + & 0 & 0 & 0 & 0 & 0 \\
0 & 0 & 0 & 0 & 0 & + & + & 0 \\
k & n & l & m & 0 & 0 & 0 & 0 \\
0 & 0 & 0 & 0 & k & n & l & m \\
l & k & m & n & 0 & 0 & 0 & 0 \\
0 & 0 & 0 & 0 & l & k & m & n
\end{array} & & & O \\
 & \begin{array}{cccccccc}
n & n & k & k & 0 & 0 & 0 & 0 \\
0 & 0 & 0 & 0 & n & n & k & k \\
k & k & l & l & 0 & 0 & 0 & 0 \\
0 & 0 & 0 & 0 & k & k & l & l \\
+ & - & 0 & 0 & 0 & 0 & - & + \\
0 & 0 & + & - & + & - & 0 & 0 \\
j & i & 0 & 0 & 0 & 0 & j & i \\
0 & 0 & i & j & j & i & 0 & 0
\end{array} & & \\
 & & \begin{array}{cccccccc}
g & a & d & b & 0 & 0 & 0 & 0 \\
0 & 0 & 0 & 0 & g & a & d & b \\
b & h & a & c & 0 & 0 & 0 & 0 \\
d & g & f & a & 0 & 0 & 0 & 0 \\
0 & 0 & 0 & 0 & d & g & f & a \\
a & b & g & h & 0 & 0 & 0 & 0 \\
0 & 0 & 0 & 0 & a & b & g & h
\end{array} & \\
O & & & \begin{array}{cccccccc}
a & d & b & c & 0 & 0 & 0 & 0 \\
0 & 0 & 0 & 0 & a & h & c & b \\
f & c & d & a & 0 & 0 & 0 & 0 \\
0 & 0 & 0 & 0 & g & b & h & a \\
g & f & a & h & 0 & 0 & 0 & 0 \\
0 & 0 & 0 & 0 & d & a & b & g \\
h & a & c & f & 0 & 0 & 0 & 0 \\
0 & 0 & 0 & 0 & f & g & a & d
\end{array}
\end{array}\right]
= \begin{bmatrix} S1' & & & O \\ & S2' & & \\ & & S3' & \\ O & & & S4' \end{bmatrix}$$

wherein, $a = -e = \cos(\pi/16)$ $b = -f = \cos(3\pi/16)$ $c = -g = \cos(5\pi/16)$ $d = -h = \cos(7\pi/16)$ $i = -j = \cos(4\pi/16)$ $k = -m = \cos(2\pi/16)$ $l = -n = \cos(6\pi/16)$

[T'] denotes fifth 32×32 constant matrix data, defined as follows:

$[T'] = T'_{ij}(i = 0 \sim 31,\ j = 0 \sim 31)$ $$[T'] = \left[\begin{array}{cccc}
\begin{array}{cccccccc}
+ & + & + & + & 0 & 0 & 0 & 0 \\
0 & 0 & 0 & 0 & + & + & + & + \\
+ & - & + & - & 0 & 0 & 0 & 0 \\
0 & 0 & 0 & 0 & + & - & + & - \\
+ & + & - & - & 0 & 0 & 0 & 0 \\
0 & 0 & 0 & 0 & + & + & - & - \\
+ & - & - & + & 0 & 0 & 0 & 0 \\
0 & 0 & 0 & 0 & + & - & - & +
\end{array} & & & O \\
 & \begin{array}{cccccccc}
+ & + & + & + & 0 & 0 & 0 & 0 \\
0 & 0 & 0 & 0 & 0 & + & - & + \\
+ & - & + & - & 0 & 0 & 0 & 0 \\
0 & 0 & 0 & 0 & - & 0 & + & + \\
+ & + & - & - & 0 & 0 & - & + \\
0 & 0 & 0 & 0 & + & 0 & + & + \\
+ & - & - & + & 0 & 0 & 0 & 0 \\
0 & 0 & 0 & 0 & 0 & + & + & - \\
0 & 0 & 0 & 0 & + & - & - & +
\end{array} & & \\
 & & \begin{array}{cccccccc}
+ & + & + & + & 0 & 0 & 0 & 0 \\
0 & 0 & 0 & 0 & + & + & + & + \\
+ & - & + & - & 0 & 0 & 0 & 0 \\
0 & 0 & 0 & 0 & + & - & + & - \\
+ & + & - & - & 0 & 0 & 0 & 0 \\
0 & 0 & 0 & 0 & + & + & - & - \\
+ & - & - & + & 0 & 0 & 0 & 0
\end{array} &
\end{array}\right.$$

-continued $$
\begin{bmatrix}
O & & & & & & & & \\
 & + & + & + & + & 0 & 0 & 0 & 0 \\
 & 0 & 0 & 0 & 0 & + & - & + & - \\
 & + & - & - & + & 0 & 0 & 0 & 0 \\
 & 0 & 0 & 0 & 0 & + & - & - & + \\
 & 0 & + & - & 0 & 0 & 0 & + & + \\
 & - & 0 & + & - & - & 0 & 0 & 0 \\
 & 0 & + & - & 0 & 0 & 0 & - & - \\
 & - & 0 & 0 & + & + & + & 0 & 0
\end{bmatrix}
$$

$$
= \begin{bmatrix} T1' & & & O \\ & T2' & & \\ & & T3' & \\ O & & & T4' \end{bmatrix}
$$

[U'] denotes sixth 32×32 constant matrix data, defined as follows:

$[U'] = U'_{ij}(i=0\sim31,\ j=0\sim31)$ $$
[U'] = \begin{bmatrix}
10000000 & & 00000000 & \\
00000000 & & 10000000 & \\
01000000 & & 00000000 & \\
00000000 & & 00000100 & \\
00001000 & & 00000000 & \\
00000000 & & 01000000 & \\
00000100 & & 00000000 & \\
00000000 & & 00001000 & \\
 & 10000000 & & 00000000 \\
 & 00000000 & & 10000000 \\
 & 01000000 & & 00000000 \\
 & 00000000 & & 00000100 \\
 & 00100000 & & 00000000 \\
 & 00000000 & & 00001000 \\
 & 00000100 & & 00000000 \\
 & 00000000 & & 01000000 \\
00100000 & & 00000000 & \\
00000000 & & 00100000 & \\
00010000 & & 00000000 & \\
00000000 & & 00000001 & \\
00000010 & & 00000000 & \\
00000000 & & 00010000 & \\
00000001 & & 00000000 & \\
00000000 & & 00000010 & \\
 & 00001000 & & 00000000 \\
 & 00000000 & & 00010000 \\
 & 00010000 & & 00000000 \\
 & 00000000 & & 00000010 \\
 & 00000010 & & 00000000 \\
 & 00000000 & & 00000001 \\
 & 00000001 & & 00000000 \\
 & 00000000 & & 00100000
\end{bmatrix}
$$

wherein said transforming means comprises:

a first rearrangement means (142) for rearranging said matrix data $\bar{X}$ in accordance with positions of factors "1" in said first 32×32 constant matrix data [Q], as an inner product computation: $[Q]\cdot\bar{X}$, to provide seventh matrix data: $[MD7]=[Q]\cdot\bar{X}$;

a first addition and subtraction means (144A) for performing addition of four data in a first row of each 4×4 sub-matrix data positioned in a diagonal line of said seventh matrix data [MD7] in accordance with four element data in a first line of each 4×4 sub-matrix data positioned in a diagonal line of said second constant matrix [L], to provide first sub-matrix of ninth matrix data $[MD9]=[R']\cdot[L]\cdot[MD7]$;

a second addition and subtraction means (144B) for performing addition and subtraction of four data in a second row of each 4×4 sub-matrix data positioned in the diagonal line of said seventh matrix data [MD7] in accordance with four element data in a second line of each 4×4 sub-matrix data positioned in the diagonal line of said second constant matrix [L], to provide second sub-matrix of said ninth matrix data;

a third addition and subtraction means (144C) for performing addition and subtraction of four data in a third row of each 4×4 sub-matrix data positioned in the diagonal line of said seventh matrix data [MD7] in accordance with four element data in a third line of each 4×4 sub-matrix data positioned in the diagonal line of said second constant matrix [L], to provide third sub-matrix of said ninth matrix data; and a fourth addition and subtraction means (144D) for performing addition and subtraction of four data in a fourth row of each 4×4 sub-matrix data positioned in the diagonal line of said seventh matrix data [MD7] in accordance with four element data in a fourth line of each 4×4 sub-matrix positioned in the diagonal line of said second constant matrix [L], to provide fourth sub-matrix of said ninth matrix data;

a second fourth-order inner product computation means (148) for computing a fourth order product computation between said fourth 32×32 constant matrix data [S'] and said ninth matrix data [MD9], to provide 10th matrix data: $[MD10]=[S']\cdot[MD9]$;

a third fourth-order inner product computation means (150) for computing a fourth order product computation between said fifth 32×32 constant matrix data [T'] and said 10th matrix data [MD10], to provide 11th matrix data: $[MD11]=[T']\cdot[MD10]$;

a third rearrangement means (152) for rearranging said 11th matrix data [MD11] in accordance with positions of factors "1" in said sixth 32×32 constant matrix data [U'], as an inner product computation: $[U']\cdot[MD11]$, to provide 12th matrix data $[MD12]=[U']\cdot[MD11]$; and a shift means for shifting said 12th matrix data [MD12] by three bits, to thereby provide said matrix data $\vec{C}=[MD12]/8$.

78. A discrete cosine inverse transformation system comprising transforming means for performing a two-dimensional 4-row×8 column discrete cosine inverse transformation of binary data in a matrix form, in accordance with the following formula:

$$
\text{IDCT: } \vec{X}=(\tfrac{1}{4})\,{}^t[Q][L]\,{}^t[R']\,{}^t[S']\,{}^t[T']\,{}^t[U']\vec{C}
$$

where, $\vec{C}$ denotes matrix data to be subjected to the discrete cosine inverse transformation and is defined as follows:

$\vec{C}=C_k(k=0\sim7,\ 10\sim17,\ 20\sim27,\ 30\sim37)$, or $C_{ij}$ $(i=0\sim3, j=0\sim7)$ $$\vec{C}=\begin{bmatrix} c\ 0\ 0 \\ c\ 0\ 1 \\ c\ 0\ 2 \\ \cdot \\ \cdot \\ \cdot \\ c\ 0\ 7 \\ c\ 1\ 0 \\ c\ 1\ 1 \\ c\ 1\ 2 \\ \cdot \\ \cdot \\ \cdot \\ c\ 3\ 0 \\ \cdot \\ \cdot \\ \cdot \\ c\ 3\ 6 \\ c\ 3\ 7 \end{bmatrix}$$

$\vec{X}$ denotes matrix data obtained by the discrete cosine inverse transformation and is defined as follows:

$\vec{X}=X_k(k=0\sim7,\ 10\sim17,\ 20\sim27,\ 30\sim37)$, or $X_{ij}$ $(i=0\sim3, j=0\sim7)$ $$\vec{X}=\begin{bmatrix} x\ 0\ 0 \\ x\ 0\ 1 \\ x\ 0\ 2 \\ \cdot \\ \cdot \\ \cdot \\ x\ 0\ 7 \\ x\ 1\ 0 \\ x\ 1\ 1 \\ x\ 1\ 2 \\ \cdot \\ \cdot \\ \cdot \\ x\ 3\ 0 \\ \cdot \\ \cdot \\ \cdot \\ x\ 3\ 6 \\ x\ 3\ 7 \end{bmatrix}$$

${}^t[U']$ denotes first 32×32 constant transposition matrix data, defined as follows:

${}^t[U']={}^tU'_{ij}(i=0\sim31, j=0\sim31)$ $${}^t[U']=\left[\begin{array}{cccc}
10000000 & & 00000000 & \\
00100000 & & 00000000 & \\
00000000 & & 10000000 & \\
00000000 & & 00100000 & \\
00001000 & & 00000000 & \\
00000010 & & 00000000 & \\
00000000 & & 00001000 & \\
00000000 & & 00000010 & \\
 & 10000000 & & 00000000 \\
 & 00100000 & & 00000000 \\
 & 00001000 & & 00000000 \\
 & 00000000 & & 00100000 \\
 & 00000000 & & 10000000 \\
 & 00000010 & & 00000000 \\
 & 00000000 & & 00001000 \\
 & 00000000 & & 00000010 \\
01000000 & & 00000000 & \\
00000100 & & 00000000 & \\
00000000 & & 01000000 & \\
00000000 & & 00000100 & \\
00000001 & & 00000000 & \\
00010000 & & 00000000 & \\
00000000 & & 00000001 & \\
00000000 & & 00010000 & \\
 & 01000000 & & 00000000 \\
 & 00000001 & & 00000000 \\
 & 00000000 & & 00000001 \\
 & 00000000 & & 01000000 \\
 & 00000100 & & 00000000 \\
 & 00010000 & & 00000000 \\
 & 00000000 & & 00010000 \\
 & 00000000 & & 00000100
\end{array}\right]$$

${}^t[T']$ denotes second 32×32 transposition matrix data, defined as follows:

${}^t[T']={}^tT'_{ij}(i=0\sim31, j=0\sim31)$ $${}^t[T]=\left[\begin{array}{ll}
+0\ +0\ +0\ +0 & \\
+0\ -0\ +0\ -0 & \\
+0\ +0\ -0\ -0 & \\
+0\ -0\ -0\ +0 & \\
0\ +0\ +0\ +0\ + & \\
0\ +0\ -0\ +0\ - & \\
0\ +0\ +0\ -0\ - & \\
0\ +0\ -0\ -0\ + & \\
 & +0\ +0\ +0\ +0 \\
 & +0\ -0\ +0\ -0 \\
 & +0\ +0\ -0\ -0 \\
 & +0\ -0\ -0\ +0 \\
 & 0\ 0\ 0\ -0\ +0\ 0 \\
 & 0\ +0\ 0\ 0\ 0\ 0\ + \\
 & 0\ -0\ +0\ +0\ + \\
 & 0\ +0\ +0\ +0\ -
\end{array}\right.$$

-continued $$\begin{array}{l}
+0\ +0\ +0\ +0 \\
+0\ -0\ +0\ -0 \\
+0\ +0\ -0\ -0 \\
+0\ -0\ -0\ +0 \\
0\ +0\ +0\ +0\ + \\
0\ +0\ -0\ +0\ - \\
0\ +0\ +0\ -0\ - \\
0\ +0\ -0\ -0\ +
\end{array}$$

$$\begin{array}{l}
+0\ +0\ 0\ -0\ - \\
+0\ -0\ +0\ +0 \\
+0\ -0\ -+-0 \\
+0\ +0\ 0\ -0\ + \\
0\ +0\ +0\ -0\ + \\
0\ -0\ -0\ 0\ 0\ + \\
0\ +0\ -+0\ -0 \\
0\ -0\ ++0\ -0
\end{array}$$

$$= \begin{bmatrix} {}^tT1' & & & O \\ & {}^tT2' & & \\ & & {}^tT3' & \\ O & & & {}^tT4' \end{bmatrix}$$

${}^t[S']$ denotes third 32×32 transposition matrix data, defined as follows:

${}^t[S'] = {}^tS'_{ij}$ (i=0~31, j=0~31)

$$\begin{array}{l}
+0\ 0\ 0\ k\ 0\ l\ 0 \\
0\ 0\ +0\ n\ 0\ k\ 0 \\
0\ 0\ +0\ l\ 0\ m 0 \\
+0\ 0\ 0\ m 0\ n\ 0 \\
0\ +0\ 0\ 0\ k\ 0\ l \\
0\ 0\ 0\ +0\ n\ 0\ k \\
0\ 0\ 0\ +0\ l\ 0\ m \\
0\ +0\ 0\ 0\ m 0\ n
\end{array} \qquad O$$

$${}^t[S'] = \begin{array}{l}
n\ 0\ k\ 0\ +0\ j\ 0 \\
n\ 0\ k\ 0\ -0\ i\ 0 \\
k\ 0\ l\ 0\ 0\ +0\ i \\
k\ 0\ l\ 0\ 0\ -0\ j \\
0\ n\ 0\ k\ 0\ +0\ j \\
0\ n\ 0\ k\ 0\ -0\ i \\
0\ k\ 0\ l\ -0\ j\ 0 \\
0\ k\ 0\ l\ +0\ i\ 0
\end{array}$$

$$\begin{array}{l}
g\ 0\ b\ 0\ d\ 0\ a\ 0 \\
a\ 0\ h\ 0\ g\ 0\ b\ 0 \\
d\ 0\ a\ 0\ f\ 0\ g\ 0 \\
b\ 0\ c\ 0\ a\ 0\ h\ 0 \\
0\ g\ 0\ b\ 0\ d\ 0\ a \\
0\ a\ 0\ h\ 0\ g\ 0\ b \\
0\ d\ 0\ a\ 0\ f\ 0\ g \\
0\ b\ 0\ c\ 0\ a\ 0\ h
\end{array}$$

$$O \qquad \begin{array}{l}
a\ 0\ f\ 0\ g\ 0\ h\ 0 \\
d\ 0\ c\ 0\ f\ 0\ a\ 0 \\
b\ 0\ d\ 0\ a\ 0\ c\ 0 \\
c\ 0\ a\ 0\ h\ 0\ f\ 0 \\
0\ a\ 0\ g\ 0\ d\ 0\ f \\
0\ h\ 0\ b\ 0\ a\ 0\ g \\
0\ c\ 0\ h\ 0\ b\ 0\ a \\
0\ b\ 0\ a\ 0\ g\ 0\ d
\end{array}$$

$$= \begin{bmatrix} {}^tS1' & & & O \\ & {}^tS2' & & \\ & & {}^tS3' & \\ O & & & {}^tS4' \end{bmatrix}$$

wherein, $a = -e = \cos(\pi/16)$ $b = -f = \cos(3\pi/16)$ $c = -g = \cos(5\pi/16)$ $d = -h = \cos(7\pi/16)$ $i = -j = \cos(4\pi/16)$ $k = -m = \cos(2\pi/16)$ $l = -n = \cos(6\pi/16)$ ${}^t[R']$ denotes fourth 32×32 constant transposition matrix data, defined as follows:

${}^t[R'] = {}^tR'_{ij}$ (i=0~31, j=0~31)

$^t[R'] =$

```
10000000 00000000 00000000 00000000
00000000 00000000 00010000 00000000
00000000 00100000 00000000 00000000
00000000 00000000 00000000 00000001
01000000 00000000 00000000 00000000
00000000 00000000 00100000 00000000
00000000 00000010 00000000 00000000
00000000 00000000 00000000 00010000

00100000 00000000 00000000 00000000
00000000 00000000 01000000 00000000
00000000 00000001 00000000 00000000
00000000 00000000 00000000 00100000
00010000 00000000 00000000 00000000
00000000 00000000 10000000 00000000
00000000 00010000 00000000 00000000
00000000 00000000 00000000 00000010

00001000 00000000 00000000 00000000
00000000 00000000 00000001 00000000
00000000 10000000 00000000 00000000
00000000 00000000 00000000 01000000
00000100 00000000 00000000 00000000
00000000 00000000 00000010 00000000
00000000 00001000 00000000 00000000
00000000 00000000 00000000 00000100

00000010 00000000 00000000 00000000
00000000 00000000 00000100 00000000
00000000 00000100 00000000 00000000
00000000 00000000 00000000 00001000
00000001 00000000 00000000 00000000
00000000 00000000 00001000 00000000
00000000 01000000 00000000 00000000
00000000 00000000 00000000 10000000
```

[L] denotes fifth 32×32 constant matrix data, defined as follows:

$[L]=L_{ij}(i=0-31, j=0-31)$ $[L] =$

```
++++
+-+-
++--
+--+
    ++++
    +-+-
    ++--
    +--+
        ++++                            O
        +-+-
        ++--
        +--+
            ++++
            +-+-
            ++--
            +--+
                ++++
                +-+-
                ++--
                +--+
                    ++++
                    +-+-
                    ++--
                    +--+
        O               ++++
                        +-+-
                        ++--
                        +--+
                            ++++
                            +-+-
                            ++--
                            +--+
```

$^t[Q]$ denotes sixth 32×32 constant transposition matrix data, defined as follows:

$^t[Q]={}^tQ_{ij}(i=0\sim31, j=0-31)$ $^t[Q] =$

```
10000000 00000000 00000000 00000000
00000000 00000000 00000000 00000000
00001000 10000000 00000000 00000000
00000000 00001000 00000000 00000000
00000000 00000100 00000000 00000000
00000000 01000000 00000000 00000000
00000100 00000000 00000000 00000000
01000000 00000000 00000000 00000000

00000000 00000000 10000000 00000000
00000000 00000000 00001000 00000000
00000000 00000000 00000000 10000000
00000000 00000000 00000000 00001000
00000000 00000000 00000000 00000100
00000000 00000010 00000000 01000000
00000000 00000000 00000100 00000000
00000000 00000000 01000000 00000000
```

-continued

```
|00000000 00000000 00100000 00000000|
|00000000 00000000 00000010 00000000|
|00000000 00000000 00000000 00100000|
|00000000 00000000 00000000 00000010|
|00000000 00000000 00000000 00000001|
|00000000 00000000 00000000 00010000|
|00000000 00000000 00000001 00000000|
|00000000 00000000 00010000 00000000|
```

```
|00100000 00000000 00010000 00000000|
|00000010 00000000 00000000 00000000|
|00000000 00100000 00000000 00000000|
|00000000 00000010 00000000 00000000|
|00000000 00000001 00000000 00000000|
|00000000 00010000 00000000 00000000|
|00000001 00000000 00000000 00000000|
|00010000 00000000 00000000 00000000|
```

wherein said transforming means comprises:

a first rearrangement means (143) for rearranging matrix data $\vec{C}$ in accordance with positions of factors "1" in said first 32×32 constant transposition matrix data $^t[U']$, as an inner product computation: $^t[U']\cdot\vec{C}$, to provide seventh matrix data: $[MD7]={}^t[U']\cdot\vec{C}$;

a first fourth-order inner product computation means (145) for computing a fourth order inner product computation between said second 32×32 transposition matrix data $^t[T']$ and said seventh matrix data [MD7], to provide eighth matrix data: $[MD8]={}^t[T']\cdot[MD7]$;

a second fourth-order inner product computation means (147) for computing a fourth order product computation between said third 32×32 constant transposition matrix data $^t[S']$ and said eighth matrix data [MD8], to provide ninth matrix data: $[MD9]={}^t[S']\cdot[MD8]$;

a first addition and subtraction means (151A) for performing addition of four data in a first row of each 4×4 sub-matrix data positioned in a diagonal line of said ninth matrix data [MD9] in accordance with four element data in a first line of each 4×4 sub-matrix positioned in a diagonal line of said fifth constant matrix [L], to provide first sub-matrix of 11th matrix data $[MD11]=[L]\cdot{}^t[R']\cdot[MD9]$;

a second addition and subtraction means (151B) for performing addition and subtraction of four data in a second row of each 4×4 sub-matrix data positioned in the diagonal line of said ninth matrix data [MD9] in accordance with four element data in a second line of each 4×4 sub-matrix positioned in the diagonal line of said fifth constant matrix [L], to provide second sub-matrix of said 11th matrix data;

a third addition and subtraction means (151C) for performing addition and subtraction of four data in a third row of each 4×4 sub-matrix data positioned in the diagonal line of said ninth matrix data [MD9] in accordance with four element data in a third line of each 4×4 sub-matrix positioned in the diagonal line of said fifth constant matrix [L], to provide third sub-matrix of said 11th matrix data; and a fourth addition and subtraction means (151D) for performing addition and subtraction of four data in a fourth row of each 4×4 sub-matrix data positioned in the diagonal line of said ninth matrix data [MD9] in accordance with four element data in a fourth line of each 4×4 sub-matrix positioned in the diagonal line of said fifth constant matrix [L], to provide fourth sub-matrix of said 11th matrix data;

a third rearrangement means (153) for rearranging said 11th matrix data [MD11] in accordance with positions of factors "1" in said sixth 32×32 constant transposition matrix data $^t[Q]$, as an inner product computation: $^t[Q]\cdot[MD11]$, to provide 12th matrix data $[MD12]={}^t[Q]\cdot[MD11]$; and a shift means for shifting said 12th matrix data [MD12] by two bits, to thereby provide said matrix data $\vec{X}=[MD12]/4$.

79. A discrete cosine transformation system comprising transforming means for performing a two-dimensional 4-row×4 column discrete cosine transformation of binary data in a matrix form, in accordance with the following formula:

$$DCT: \vec{C}=(\tfrac{1}{4})\,[U][T][S][R][L][Q]\vec{X}$$

where, $\vec{X}$ denotes matrix data to be subjected to the discrete cosine transformation and is defined as follows:

$\vec{X}=X_k$(k=0~3, 10~13, 20~23 30~33), or $X_{ij}$ (i=0~3, j=0~3)

$$\vec{X}=\begin{bmatrix} x00 \\ x01 \\ x02 \\ x03 \\ x10 \\ x11 \\ x12 \\ x13 \\ x20 \\ \cdot \\ \cdot \\ \cdot \\ x32 \\ x33 \end{bmatrix}$$

$\vec{C}$ denotes matrix data obtained by the discrete cosine transformation and is defined as follows:

$\vec{C}=C_k$(k=0~3, 10~13, 20~23 30~33), or $C_{ij}$(i=0~3, j=0~3)

$$\vec{C}=\begin{bmatrix} c00 \\ c01 \\ c02 \\ c03 \\ c10 \\ c11 \\ c12 \\ c13 \\ c20 \\ \cdot \\ \cdot \\ \cdot \\ c32 \\ c33 \end{bmatrix}$$

[Q] denotes first 16×16 constant matrix data, defined as follows:

$[Q]=Q_{ij}(i=0\sim15,\ j=0\sim15)$ $$[Q]=\begin{pmatrix}
1000 & & & 0000 \\
0001 & & & 0000 \\
0000 & & & 1000 \\
0000 & & & 0001 \\
0100 & & & 0000 \\
0010 & & & 0000 \\
0000 & & & 0100 \\
0000 & & & 0010 \\
 & 1000 & 0000 & \\
 & 0001 & 0000 & \\
 & 0000 & 1000 & \\
 & 0000 & 0001 & \\
 & 0100 & 0000 & \\
 & 0010 & 0000 & \\
 & 0000 & 0100 & \\
 & 0000 & 0010 &
\end{pmatrix}$$

[L] denotes second 16×16 matrix data, defined as follows:

$[L]=L_{ij}(i=0\sim15,\ j=0\sim15)$ $$[L]=\begin{pmatrix}
++++ & & & \\
+-+- & & & \\
++-- & & & \\
+--+ & & & \\
 & ++++ & & \\
 & +-+- & & \\
 & ++-- & & \\
 & +--+ & & \\
 & & ++++ & \\
 & & +-+- & \\
 & & ++-- & \\
 & & +--+ & \\
 & & & ++++ \\
 & & & +-+- \\
 & & & ++-- \\
 & & & +--+
\end{pmatrix}$$

[R] denotes third 16×16 constant matrix data, defined as follows:

$[R]=R_{ij}(i=0\sim15,\ j=0\sim15)$ $$[R]=\begin{pmatrix}
1000 & 0000 & 0000 & 0000 \\
0000 & 1000 & 0000 & 0000 \\
0000 & 0000 & 1000 & 0000 \\
0000 & 0000 & 0000 & 1000 \\
0000 & 0100 & 0000 & 0000 \\
0000 & 0000 & 0000 & 0100 \\
0100 & 0000 & 0000 & 0000 \\
0000 & 0000 & 0100 & 0000 \\
0000 & 0000 & 0010 & 0000 \\
0000 & 0000 & 0000 & 0010 \\
0010 & 0000 & 0000 & 0000 \\
0000 & 0010 & 0000 & 0000 \\
0000 & 0000 & 0000 & 0001 \\
0000 & 0000 & 0001 & 0000 \\
0000 & 0001 & 0000 & 0000 \\
0001 & 0000 & 0000 & 0000
\end{pmatrix}$$

[S] denotes fourth 16×16 constant matrix data, defined as follows:

$[S]=S_{ij}(i=0\sim15,\ j=0\sim15)$ $$[S]=\begin{pmatrix}
+0+0 & & & \\
0+0+ & & & \\
+0-0 & & & \\
0+0- & & & \\
 & ++++ & & \\
 & ++-- & & \\
 & +-+- & & \\
 & +--+ & & \\
 & & ++++ & \\
 & & ++-- & \\
 & & +-+- & \\
 & & +--+ & \\
 & & & +00+ \\
 & & & +--- \\
 & & & 0+-0 \\
 & & & +++-
\end{pmatrix}=\begin{pmatrix} S1 & & & O \\ & S2 & & \\ & & S3 & \\ O & & & S4 \end{pmatrix}$$

[T] denotes fifth 16×16 constant matrix data including irrational numbers, defined as follows:

$[T]=T_{ij}(i=0\sim 15,\ j=0\sim 15)$ $$[T]=\begin{pmatrix}
++ & & & & & & & \\
+- & & & & & & & \\
 & ++ & & & & & & \\
 & +- & & & & & & \\
 & & kn & & & & & \\
 & & nm & & & & & \\
 & & & kn & & & & \\
 & & & nm & & & & \\
 & & & & kn & & & \\
 & & & & nm & & & \\
 & & & & & kn & & \\
 & & & & & nm & & \\
 & & & & & & +j & \\
 & & & & & & +i & \\
 & & & & & & & +j \\
 & & & & & & & -j
\end{pmatrix}=\begin{pmatrix} T1 & & & O \\ & T2 & & \\ & & T3 & \\ O & & & T4 \end{pmatrix}$$

wherein, $i=-j=\cos(2\pi/8)$ $k=-m=\cos(1\pi/8)$ $l=-n=\cos(3\pi/8)$

[U] denotes sixth 16×16 cons=an=matrix data, defined as follows:

$[U]=U_{ij}(i=0\sim 31,\ j=0\sim 31)$ $$[U]=\begin{pmatrix}
1000 & 0000 & 0000 & 0000 \\
0000 & 1000 & 0000 & 0000 \\
0100 & 0000 & 0000 & 0000 \\
0000 & 0100 & 0000 & 0000 \\
0000 & 0000 & 1000 & 0000 \\
0000 & 0000 & 0000 & 1000 \\
0000 & 0000 & 0010 & 0000 \\
0000 & 0000 & 0000 & 0010 \\
0010 & 0000 & 0000 & 0000 \\
0000 & 0010 & 0000 & 0000 \\
0001 & 0000 & 0000 & 0000 \\
0000 & 0001 & 0000 & 0000 \\
0000 & 0000 & 0100 & 0000 \\
0000 & 0000 & 0000 & 0001 \\
0000 & 0000 & 0001 & 0000 \\
0000 & 0000 & 0000 & 0100
\end{pmatrix}$$

wherein said transforming means comprises:

a first rearrangement means (162) for rearranging matrix data $\bar{X}$ in accordance with positions of factors "1" in said first constant matrix data [Q], as an inner product computation: $[Q]\cdot\bar{X}$, to provide seventh matrix data $[MD7]=[Q]\cdot\bar{X}$;

a first addition and subtraction means (164A) for performing addition of four data in a first row of each 4×4 sub-matrix data positioned in a diagonal line of said seventh matrix data [MD7] in accordance with four element data in a first line of each 4×4 sub-matrix data positioned in a diagonal line of said second constant matrix [L], to provide first sub-matrix data of said ninth matrix data $[MD9]=[R]\cdot[L]\cdot[MD7]$;

a second addition and subtraction means (164B) for performing addition and subtraction of four data in a second row of each 4×4 sub-matrix data positioned in the diagonal line of said seventh matrix data [MD7] in accordance with four element data in a second line of each 4×4 sub-matrix data positioned in the diagonal line of said second constant matrix [L], to provide a second sub-matrix data of said ninth matrix data;

a third addition and subtraction means (164C) for performing addition and subtraction of four data in a third row of each 4×4 sub-matrix data positioned in the diagonal line of said seventh matrix data [MD7] in accordance with four element data in a third line of each 4×4 sub-matrix data positioned in the diagonal line of said second constant matrix [L], to provide a third sub-matrix data of said ninth matrix data; and a fourth addition and subtraction means (164D) for performing addition and subtraction of four data in a fourth row of each 4×4 sub-matrix data positioned in the diagonal line of said seventh matrix data [MD7] in accordance with four element data in a fourth line of each 4×4 sub-matrix data positioned in the diagonal line of said second constant matrix [L], to provide a fourth sub-matrix data of said ninth matrix data;

a second fourth-order inner product computation means (168) for computing a fourth order product computation between said fourth constant matrix data [S] and said ninth matrix data [MD9], to provide 10th matrix data: $[MD10]=[S]\cdot[MD9]$;

a second fourth-order inner product computation means (170) for computing a second order product computation between said fifth matrix data [T] and said 10th matrix data [MD10], to provide 11th matrix data: [MD11]=[T]·[MD10];

a third rearrangement means (172) for rearranging said 11th matrix data [MD11] in accordance with positions of factors "1" in said sixth constant matrix data [U], as an inner product computation: [U][MD11], to provide 12th matrix data [MD12]=[U]·[MD11]; and a shift means for shifting said 12th matrix data [MD12] by two bits, to thereby provide said matrix data $\vec{C}$=[MD12]/4.

80. A discrete cosine inverse transformation system comprising transforming means for performing a two-dimensional 4-row×4 column discrete cosine inverse transformation of binary data in a matrix form, in accordance with the following formula:

$$\text{IDCT}:\vec{X}=(\tfrac{1}{4})\,{}^t[Q][L]\,{}^t[R]\,{}^t[S]\,{}^t[T]\,{}^t[U]\vec{C}$$

where, $\vec{C}$ denotes matrix data to be subjected to the discrete cosine inverse transformation and is defined as follows:

$\vec{C}=C_k$(k=0~3, 10~13 20~23, 30~33), or $C_{ij}$. (i=0~3, j=0~3)

$$\vec{C}=\begin{bmatrix} c00 \\ c01 \\ c02 \\ c03 \\ c10 \\ c11 \\ c12 \\ c13 \\ c20 \\ \cdot \\ \cdot \\ \cdot \\ c32 \\ c33 \end{bmatrix}$$

$\vec{X}$ denotes matrix data obtained by the discrete cosine inverse transformation and is defined as follows:

$\vec{X}=X_k$(k=0~3, 10~13 20~23, 30~33), or $X_{ij}$. (i=0~3, j=0~3)

$$\vec{X}=\begin{bmatrix} x00 \\ x01 \\ x02 \\ x03 \\ x10 \\ x11 \\ x12 \\ x13 \\ x20 \\ \cdot \\ \cdot \\ \cdot \\ x32 \\ x33 \end{bmatrix}$$

${}^t$[U] denotes first 16×16 constant transposition matrix data, defined as follows:

${}^t[U]={}^tU_{ij}$(i=0~15, j=0~15)

$${}^t(U)=\begin{pmatrix}
1000 & 0000 & 0000 & \\
0010 & 0000 & 0000 & \\
0000 & 0000 & 1000 & \\
0000 & 0000 & 0010 & \\
0100 & & 0000 & \\
0001 & & 0000 & \\
0000 & & 0100 & \\
0000 & & 0001 & \\
 & 1000 & & 0000 \\
 & 0000 & & 1000 \\
 & 0010 & & 0000 \\
 & 0000 & & 0010 \\
 & 0100 & & 0000 \\
 & 0000 & & 0001 \\
 & 0001 & & 0000 \\
 & 0000 & & 0100
\end{pmatrix}$$

${}^t$[T] denotes second 16×16 transposition matrix data, defined as follows:

${}^t[T]={}^tT_{ij}$(i=0~15, j=0~15)

$${}^t[T]=\begin{pmatrix}
++ & & & & & & & \\
+- & & & & & & & \\
 & ++ & & & & & & \\
 & +- & & & & & & \\
 & & k\,n & & & & & \\
 & & n\,m & & & & & \\
 & & & k\,n & & & & \\
 & & & n\,m & & & & \\
 & & & & k\,n & & & \\
 & & & & n\,m & & & \\
 & & & & & k\,n & & \\
 & & & & & n\,m & & \\
 & & & & & & ++ & \\
 & & & & & & j\,i & \\
 & & & & & & & +- \\
 & & & & & & & j\,j
\end{pmatrix}=\begin{pmatrix}
{}^tT1 & & & O \\
 & {}^tT2 & & \\
 & & {}^tT3 & \\
O & & & {}^tT4
\end{pmatrix}$$

wherein, i=−j=cos(2π/8)

k=−m=cos(1π/8)

l=−n=cos(3π/8)

${}^t$[S] denotes third 16×16 constant transposition matrix data, defined as follows:

${}^t[S]={}^tS_{ij}$(i=0~15, j=0~15)

$$
{}^t[S] = \begin{pmatrix}
\begin{smallmatrix} +&0&+&0\\ 0&+&0&+\\ +&0&-&0\\ 0&+&0&- \end{smallmatrix} & & & \\
& \begin{smallmatrix} +&+&+&+\\ +&+&-&-\\ +&-&+&-\\ +&-&-&+ \end{smallmatrix} & & \\
& & \begin{smallmatrix} +&+&+&+\\ +&+&-&-\\ +&-&+&-\\ +&-&-&+ \end{smallmatrix} & \\
& & & \begin{smallmatrix} +&+&0&+\\ 0&-&+&+\\ 0&-&-&+\\ +&-&0&- \end{smallmatrix}
\end{pmatrix} = \begin{pmatrix}
{}^tS1 & & & O\\
& {}^tS2 & & \\
& & {}^tS3 & \\
O & & & {}^tS4
\end{pmatrix}
$$

${}^t[R]$ denotes fourth 16×16 constant transposition matrix data, defined as follows:

${}^t[R] = {}^tR_{ij}(i=0\sim15,\ j=0\sim15)$ $$
{}^t[R] = \begin{pmatrix}
1000 & 0000 & 0000 & 0000\\
0000 & 0010 & 0000 & 0000\\
0000 & 0000 & 0010 & 0000\\
0000 & 0000 & 0000 & 0001\\
0100 & 0000 & 0000 & 0000\\
0000 & 1000 & 0000 & 0000\\
0000 & 0000 & 0001 & 0000\\
0000 & 0000 & 0000 & 0010\\
0010 & 0000 & 0000 & 0000\\
0000 & 0001 & 0000 & 0000\\
0000 & 0000 & 1000 & 0000\\
0000 & 0000 & 0000 & 0100\\
0001 & 0000 & 0000 & 0000\\
0000 & 0100 & 0000 & 0000\\
0000 & 0000 & 0100 & 0000\\
0000 & 0000 & 0000 & 1000
\end{pmatrix}
$$

[L] denotes fifth 16×16 constant matrix data, defined as follows:

$[L] = L_{ij}(i=0\sim15,\ j=0\sim15)$ $$
[L] = \begin{pmatrix}
\begin{smallmatrix} +&+&+&+\\ +&-&+&-\\ +&+&-&-\\ +&-&-&+ \end{smallmatrix} & & & \\
& \begin{smallmatrix} +&+&+&+\\ +&-&+&-\\ +&+&-&-\\ +&-&-&+ \end{smallmatrix} & & \\
& & \begin{smallmatrix} +&+&+&+\\ +&-&+&-\\ +&+&-&-\\ +&-&-&+ \end{smallmatrix} & \\
& & & \begin{smallmatrix} +&+&+&+\\ +&-&+&-\\ +&+&-&-\\ +&-&-&+ \end{smallmatrix}
\end{pmatrix}
$$

${}^t[Q]$ denotes sixth 16×16 constant transposition matrix data, defined as follows:

${}^t[Q] = {}^tQ_{ij}(i=0\sim15,\ j=0\sim15)$ $$
{}^t[Q] = \begin{pmatrix}
1000 & 0000 & & \\
0000 & 1000 & & \\
0000 & 0100 & & \\
0100 & 0000 & & \\
& & 1000 & 0000\\
& & 0000 & 1000\\
& & 0000 & 0101\\
& & 0100 & 0000\\
& & 0010 & 0000\\
& & 0000 & 0010\\
& & 0000 & 0001\\
& & 0001 & 0000\\
0010 & 0000 & & \\
0000 & 0010 & & \\
0000 & 0001 & & \\
0001 & 0000 & &
\end{pmatrix}
$$

wherein said transforming means comprises:

a first rearrangement means (163) for rearranging said matrix data $\bar{C}$ in accordance with positions of factors "1" in said first constant transposition matrix data ${}^t[U]$, as an inner product computation: ${}^t[U]\cdot\bar{C}$, to provide seventh matrix data: $[MD7] = {}^t[U]\cdot\bar{C}$;

a second order inner product computation means (165) for computing a second order inner product computation between said second transposition matrix data ${}^t[T]$ and said seventh matrix data [MD7], to provide eighth matrix data: $[MD8] = {}^t[T]\cdot[MD7]$;

a first fourth-order inner product computation means (167) for computing a fourth order inner product computation between said third constant transposition matrix data ${}^t[S]$ and said eighth matrix data [MD8], to provide ninth matrix data: $[MD9] = {}^t[S]\cdot[MD8]$;

a first addition and subtraction means (171A) for performing addition of four data in a first row of each 4×4 sub-matrix data positioned in a diagonal line of said ninth matrix data [MD9] in accordance with four element data in a first line of each 4×4 sub-matrix data positioned in a diagonal line of said fifth constant matrix [L], to provide first sub-matrix of 11th matrix data $[MD11] = [L]\cdot{}^t[R]\cdot[MD9]$;

a second addition and subtraction means (171B) for performing addition and subtraction of four data in a second row of each 4×4 sub-matrix data positioned in the diagonal line of said ninth matrix data [MD9] in accordance with four element data in a second line of each 4×4 sub-matrix data positioned in the diagonal line of said fifth constant matrix [L], to provide second sub-matrix of said 11th matrix data;

a third addition and subtraction means (171C) for performing addition and subtraction of four data in a third row of each 4×4 sub-matrix data positioned in the diagonal line of said ninth matrix data [MD9] in accordance with four element data in a third line of each 4×4 sub-matrix data positioned in the diagonal line of said fifth constant matrix [L], to provide third sub-matrix data of said 11th matrix data; and a fourth addition and subtraction means (171D) for performing addition and subtraction of four data in a fourth row of each 4×4 sub-matrix data positioned in the diagonal line of said ninth matrix data [MD9] in accordance with four element data in a fourth line of each 4×4 sub-matrix data positioned in the diagonal line of said fifth constant matrix [L], to provide fourth sub-matrix of said 11th matrix data;

a third rearrangement means (173) for rearranging said 11th matrix data [MD11] in accordance with positions of factors "1" in said sixth constant transposition matrix data $^t$[Q], as an inner product computation: $^t$[Q]·[MD11], to provide 12th matrix data MD12]=$^t$[Q]·[MD11]; and a shift means for shifting said 12th matrix data [MD12] by two bits, to thereby provide said matrix data $\vec{X}$=MD12]/4.

81. A discrete cosine transformation system comprising transforming means for performing a two-dimensional 4-row×4 column discrete cosine transformation of binary data in a matrix form, in accordance with the following formula:

$$DCT{:}\vec{C}=(\tfrac{1}{4})\,[U'][T'][S'][R'][L][Q]\vec{X}$$

where, $\vec{X}$ denotes matrix data to be subjected to the discrete cosine transformation and is defined as follows:
$\vec{X}=X_k$(k=0∼3, 10∼13, 20∼23 30∼33), or $X_{ij}$-(i=0∼3, j=0∼3)

$$\vec{X}=\begin{bmatrix} x00\\ x01\\ x02\\ x03\\ x10\\ x11\\ x12\\ x13\\ x20\\ \cdot\\ \cdot\\ \cdot\\ x32\\ x33 \end{bmatrix}$$

$\vec{C}$ denotes matrix data obtained by the discrete cosine transformation and is defined as follows:
$\vec{C}=C_k$(k=0∼3, 10∼13, 20∼23, 30∼33), or $C_{ij}$-(i=0∼3, j=0∼3)

$$\vec{C}=\begin{bmatrix} c00\\ c01\\ c02\\ c03\\ c10\\ c11\\ c12\\ c13\\ c20\\ \cdot\\ \cdot\\ \cdot\\ c32\\ c33 \end{bmatrix}$$

[Q] denotes first 16×16 constant matrix data, defined as follows:
[Q]=$Q_{ij}$(i=0∼15, j=0∼15)

$$[Q]=\begin{pmatrix}
1000 & & & 0000\\
0001 & & & 0000\\
0000 & & & 1000\\
0000 & & & 0001\\
0100 & & & 0000\\
0010 & & & 0000\\
0000 & & & 0100\\
0000 & & & 0010\\
 & 1000 & 0000 & \\
 & 0001 & 0000 & \\
 & 0000 & 1000 & \\
 & 0000 & 0001 & \\
 & 0100 & 0000 & \\
 & 0010 & 0000 & \\
 & 0000 & 0100 & \\
 & 0000 & 0010 &
\end{pmatrix}$$

[L] denotes second 16×16 matrix data, defined as follows:
[L]=$L_{ij}$(i=0∼15, j=0∼15)

$$[L]=\begin{pmatrix}
{+}{+}{+}{+} & & & \\
{+}{-}{+}{-} & & & \\
{+}{+}{-}{-} & & & \\
{+}{-}{-}{+} & & & \\
 & {+}{+}{+}{+} & & \\
 & {+}{-}{+}{-} & & \\
 & {+}{+}{-}{-} & & \\
 & {+}{-}{-}{+} & & \\
 & & {+}{+}{+}{+} & \\
 & & {+}{-}{+}{-} & \\
 & & {+}{+}{-}{-} & \\
 & & {+}{-}{-}{+} & \\
 & & & {+}{+}{+}{+}\\
 & & & {+}{-}{+}{-}\\
 & & & {+}{+}{-}{-}\\
 & & & {+}{-}{-}{+}
\end{pmatrix}$$

[R'] denotes third 16×16 constant matrix data, defined as follows:
[R']=$R'_{ij}$(i=0∼15, j=0∼15)

$$[R'] = \begin{pmatrix} 1000 & 0000 & 0000 & 0000 \\ 0000 & 1000 & 0000 & 0000 \\ 0000 & 0000 & 1000 & 0000 \\ 0000 & 0000 & 0000 & 1000 \\ 0000 & 0100 & 0000 & 0000 \\ 0100 & 0000 & 0000 & 0000 \\ 0000 & 0000 & 0000 & 0100 \\ 0000 & 0000 & 0100 & 0000 \\ 0000 & 0000 & 0010 & 0000 \\ 0010 & 0000 & 0000 & 0000 \\ 0000 & 0000 & 0000 & 0010 \\ 0000 & 0010 & 0000 & 0000 \\ 0000 & 0000 & 0000 & 0001 \\ 0001 & 0000 & 0000 & 0000 \\ 0000 & 0000 & 0001 & 0000 \\ 0000 & 0001 & 0000 & 0000 \end{pmatrix}$$

[S'] denotes fourth 16×16 matrix data, defined as follows:

$[S'] = S'_{ij} (i = 0 \sim 15, j = 0 \sim 15)$ $$[S'] = \begin{pmatrix} \begin{smallmatrix} + & + \\ - & + \end{smallmatrix} & & & & & & & \\ & \begin{smallmatrix} + & + \\ - & + \end{smallmatrix} & & & & & & \\ & & \begin{smallmatrix} n & k \\ k & l \end{smallmatrix} & & & \text{O} & & \\ & & & \begin{smallmatrix} n & k \\ k & l \end{smallmatrix} & & & & \\ & & & & \begin{smallmatrix} n & k \\ k & l \end{smallmatrix} & & & \\ & & & & & \begin{smallmatrix} n & k \\ k & l \end{smallmatrix} & & \\ & \text{O} & & & & & \begin{smallmatrix} + & + \\ j & i \end{smallmatrix} & \\ & & & & & & & \begin{smallmatrix} - & + \\ i & i \end{smallmatrix} \end{pmatrix}$$

wherein, $i = -j = \cos(2\pi/8)$ $k = -m = \cos(1\pi/8)$ $l = -n = \cos(3\pi/8)$

[T'] denotes fifth 16×16 matrix data, defined as follows:

$[T'] = T'_{ij} (i = 0 \sim 15, j = 0 \sim 15)$ $$[T'] = \begin{pmatrix} \begin{smallmatrix} + & 0 & + & 0 \\ 0 & - & 0 & - \\ + & 0 & - & 0 \\ 0 & - & 0 & + \end{smallmatrix} & & & \\ & \begin{smallmatrix} + & + & + & + \\ + & - & + & - \\ + & + & - & - \\ + & - & - & + \end{smallmatrix} & & \\ & & \begin{smallmatrix} + & + & + & + \\ + & - & + & - \\ + & + & - & - \\ + & - & - & + \end{smallmatrix} & \\ & & & \begin{smallmatrix} + & + & 0 & + \\ 0 & + & - & - \\ 0 & + & + & - \\ + & - & 0 & - \end{smallmatrix} \end{pmatrix}$$

[U'] denotes sixth 16×16 constant matrix data, defined as follows:

$[U'] = U'_{ij} (i = 0 \sim 31, j = 0 \sim 31)$ $$[U'] = \begin{pmatrix} 1000 & 0000 & & \\ 0000 & 1000 & & \\ 0100 & 0000 & & \\ 0000 & 0100 & & \\ & & 1000 & 0000 \\ & & 0000 & 1000 \\ & & 0010 & 0000 \\ & & 0000 & 0100 \\ 0010 & 0000 & & \\ 0000 & 0010 & & \\ 0001 & 0000 & & \\ 0000 & 0001 & & \\ & & 0100 & 0000 \\ & & 0000 & 0010 \\ & & 0001 & 0000 \\ & & 0000 & 0001 \end{pmatrix}$$

wherein said transforming means comprises:

a first rearrangement means (182) for rearranging matrix data $\vec{X}$ in accordance with positions of factors "1" in said first constant matrix data [Q], as an inner product computation: $[Q]\cdot\vec{X}$, to provide seventh matrix data: $[Q]\cdot\vec{X}$;

a first addition and subtraction means (164A) for performing addition of four data in a first row of each 4×4 sub-matrix data positioned in a diagonal line of said seventh matrix data [MD7] in accordance with four element data in a first line of each 4×4 sub-matrix data positioned in a diagonal line of said second constant matrix [L], to provide first sub-matrix data of ninth matrix data [MD9]=[R']·[L]·[MD7];

a second addition and subtraction means (164B) for performing addition and subtraction of four data in a second row of each 4×4 sub-matrix data positioned in the diagonal line of said seventh matrix data [MD7] in accordance with four element data in a second line of each 4×4 sub-matrix data positioned in the diagonal line of said second constant matrix [L], to provide a second sub-matrix data of said ninth matrix data;

a third addition and subtraction means (164C) for performing addition and subtraction of four data in a third row of each 4×4 sub-matrix data positioned in the diagonal line of said seventh matrix data [MD7] in accordance with four element data in a third line of each 4×4 sub-matrix data positioned in the diagonal line of said second constant matrix [L], to provide a third sub-matrix data of said ninth matrix data; and a fourth addition and subtraction means (164D) for performing addition and subtraction of four data in a fourth row of each 4×4 sub-matrix data positioned in the diagonal line of said seventh matrix data [MD7] in accordance with four element data in a fourth line of each 4×4 sub-matrix data positioned in the diagonal line of said second constant matrix [L], to provide a fourth sub-matrix data of said ninth matrix data;

a second-order inner product computation means (188) for computing second order product computation between said fourth constant matrix data [S'] and said ninth matrix data [MD9], to provide 10th matrix data: [MD10]=[S']·[MD9];

a second fourth-order inner product computation means (190) for computing a second order product computation between said fifth matrix data [T'] and said 10th matrix data [MD10], to provide 11th matrix data: [MD11]=[T']·[MD10];

a third rearrangement means (192) for rearranging said 11th matrix data [MD11] in accordance with positions of factors "1" in said sixth constant matrix data [U'], as an inner product computation: [U']·[MD11], to provide 12th matrix data [MD12]=[U']·[MD11]; and a shift means for shifting said 12th matrix data [MD12] by two bits, to thereby provide said matrix data data $\vec{C}$=[MD12]/4.

82. A discrete cosine inverse transformation system comprising transforming means for performing a two-dimensional 4-row×4 column discrete cosine inverse transformation of binary data in a matrix form, in accordance with the following formula:

$$\mathrm{IDCT}:\vec{X}=(\tfrac{1}{4})\,{}^t[Q][L]\,{}^t[R]\,{}^t[S]\,{}^t[T]\,{}^t[U]\vec{C}$$

where, $\vec{C}$ denotes matrix data to be subjected to the discrete cosine inverse transformation and is defined as follows:

$\vec{C}=C_k$(k=0~3, 10~13 20~23, 30~33), or $C_{ij}$.(i=0~3, j=0~3)

$$\vec{C}=\begin{bmatrix} c00 \\ c01 \\ c02 \\ c03 \\ c10 \\ c11 \\ c12 \\ c13 \\ c20 \\ \cdot \\ \cdot \\ \cdot \\ c32 \\ c33 \end{bmatrix}$$

$\vec{X}$ denotes matrix data obtained by the discrete cosine inverse transformation and is defined as follows:

$\vec{X}=X_k$(k=0~3, 10~13 20~23, 30~33), or $X_{ij}$.(i=0~3, j=0~3)

$$\vec{X}=\begin{bmatrix} x00 \\ x01 \\ x02 \\ x03 \\ x10 \\ x11 \\ x12 \\ x13 \\ x20 \\ \cdot \\ \cdot \\ \cdot \\ x32 \\ x33 \end{bmatrix}$$

${}^t[U']$ denotes first 16×16 constant transposition matrix data, defined as follows:

${}^t[U']={}^tU'_{ij}$(i=0~15, j=0~15)

$${}^t[U']=\begin{pmatrix}
1000 & 0000 & & \\
0010 & 1000 & & \\
0000 & 0000 & & \\
0000 & 0010 & & \\
0100 & 0000 & & \\
0001 & 0000 & & \\
0000 & 0100 & & \\
0000 & 0001 & & \\
 & 1000 & 0000 & \\
 & 0000 & 1000 & \\
 & 0010 & 0000 & \\
 & 0000 & 0010 & \\
 & 0100 & 0000 & \\
 & 0001 & 0000 & \\
 & 0000 & 0100 & \\
 & 0000 & 0001 &
\end{pmatrix}$$

${}^t[T']$ denotes second 16×16 transposition matrix data, defined as follows:

${}^t[T']={}^tT'_{ij}$(i=0~15, j=0~15)

$${}^t[T']=\begin{pmatrix}
+0\ +0 & & & \\
0\ -0\ - & & & \\
+0\ -0 & & & \\
0\ -0\ + & & & \\
 & ++++ & & \\
 & +-+- & & \\
 & ++-- & & \\
 & +--+ & & \\
 & & ++++ & \\
 & & +-+- & \\
 & & ++-- & \\
 & & +--+ & \\
 & & & +0\ 0\ + \\
 & & & +++- \\
 & & & 0\ -+0 \\
 & & & +---
\end{pmatrix}$$

${}^t[S']$ denotes third 16×16 constant transposition matrix data, defined as follows:

${}^t[S']={}^tS'_{ij}$(i=0~15, j=0~15)

$${}^t[S']=\begin{pmatrix}
+- & & & & & & & \\
++ & & & & & & & \\
 & +- & & & & & & \\
 & ++ & & & & & & \\
 & & n\ k & & & & O & \\
 & & k\ l & & & & & \\
 & & & n\ k & & & & \\
 & & & k\ l & & & & \\
 & & & & n\ k & & & \\
 & & & & k\ l & & & \\
 & & & & & n\ k & & \\
 & & & & & k\ l & & \\
 & O & & & & & +j & \\
 & & & & & & +i & \\
 & & & & & & & -i \\
 & & & & & & & +i
\end{pmatrix}$$

wherein, $i=-j=\cos(2\pi/8)$ $k=-m=\cos(1\pi/8)$ $l=-n=\cos(3\pi/8)$ ${}^t[R']$ denotes fourth 16×16 constant transposition matrix data, defined as follows:

${}^t[R'] = {}^tR'_{ij}(i=0\sim 15, j=0\sim 15)$ $$
{}^t[R'] = \begin{pmatrix}
1000 & 0000 & 0000 & 0000 \\
0000 & 0100 & 0000 & 0000 \\
0000 & 0000 & 0100 & 0000 \\
0000 & 0000 & 0000 & 0100 \\
0100 & 0000 & 0000 & 0000 \\
0000 & 1000 & 0000 & 0000 \\
0000 & 0000 & 0001 & 0000 \\
0000 & 0000 & 0000 & 0001 \\
0010 & 0000 & 0000 & 0000 \\
0000 & 0001 & 0000 & 0000 \\
0000 & 0000 & 1000 & 0000 \\
0000 & 0000 & 0000 & 0010 \\
0001 & 0000 & 0000 & 0000 \\
0000 & 0010 & 0000 & 0000 \\
0000 & 0000 & 0010 & 0000 \\
0000 & 0000 & 0000 & 1000
\end{pmatrix}
$$

[L] denotes fifth 16×16 constant matrix data, defined as follows:

$[L] = L_{ij}(t=0\sim 15, j=0\sim 15)$ $$
[L] = \begin{pmatrix}
++++ & & & \\
+-+- & & & \\
++-- & & & \\
+--+ & & & \\
 & ++++ & & \\
 & +-+- & & \\
 & ++-- & & \\
 & +--+ & & \\
 & & ++++ & \\
 & & +-+- & \\
 & & ++-- & \\
 & & +--+ & \\
 & & & ++++ \\
 & & & +-+- \\
 & & & ++-- \\
 & & & +--+
\end{pmatrix}
$$

${}^t[Q]$ denotes sixth 16×16 constant transposition matrix data, defined as follows:

${}^t[Q] = {}^tQ_{ij}(i=0\sim 15, j=0\sim 15)$ $$
{}^t[Q] = \begin{pmatrix}
1000 & 0000 & & \\
0000 & 1000 & & \\
0000 & 0100 & & \\
0100 & 0000 & & \\
 & & 1000 & 0000 \\
 & & 0000 & 1000 \\
 & & 0000 & 0101 \\
 & & 0100 & 0000 \\
 & & 0010 & 0000 \\
 & & 0000 & 0010 \\
 & & 0000 & 0001 \\
 & & 0001 & 0000 \\
0010 & 0000 & & \\
0000 & 0010 & & \\
0000 & 0001 & & \\
0001 & 0000 & &
\end{pmatrix}
$$

wherein said transforming means comprises:

a first rearrangement means (183) for rearranging said matrix data $\vec{C}$ in accordance with positions of factors "1" in said first constant transposition matrix data ${}^t[U']$, as an inner product computation: ${}^t[U']\cdot\vec{C}$, to provide seventh matrix data: $[MD7] = {}^t[U']\cdot\vec{C}$;

a first fourth-order inner product computation means (185) for computing a fourth order inner product computation between said second transposition matrix data ${}^t[T']$ and said seventh matrix data [MD7], to provide eighth matrix data: $[MD8] = {}^t[T']\cdot[MD7]$;

a first second-order inner product computation means (187) for computing a second order inner product computation between said third constant transposition matrix data ${}^t[S']$ and said eighth matrix data [MD8], to provide ninth matrix data: $[MD9] = {}^t[S']\cdot[MD8]$;

a first addition and subtraction means for performing addition of four data in a first row of each 4×4 sub-matrix data positioned in a diagonal line of said ninth matrix data [MD9] in accordance with four element data in a first line of each 4×4 sub-matrix data positioned in a diagonal line of said fifth constant matrix [L], to provide first sub-matrix of said 11th matrix data $[MD11] = [L]\cdot{}^t[R']\cdot[MD9]$;

a second addition and subtraction means for performing addition and subtraction of four data in a second row of each 4×4 sub-matrix data positioned in the diagonal line of said ninth matrix data [MD9] in accordance with four element data in a second line of each 4×4 sub-matrix data positioned in the diagonal line of said fifth constant matrix [L], to provide second sub-matrix of said 11th matrix data;

a third addition and subtraction means for performing addition and subtraction of four data in a third row of each 4×4 sub-matrix data positioned in the diagonal line of said ninth matrix data [MD9] in accordance with four element data in a third line of each 4×4 sub-matrix data positioned in the diagonal line of said fifth constant matrix [L], to provide third sub-matrix data of said 11th matrix data; and a fourth addition and subtraction means for performing addition and subtraction of four data in a fourth row of each 4×4 sub-matrix data positioned in the diagonal line of said ninth matrix data [MD9] in accordance with four element data in a fourth line of each 4×4 sub-matrix data positioned in the diagonal line of said fifth constant matrix [L], to provide fourth sub-matrix of said 11th matrix data;

a third rearrangement means (173) for rearranging said 11th matrix data [MD11] in accordance with positions of factors "1" in said sixth constant transposition matrix data ${}^t[Q]$, as an inner product computation: ${}^t[Q]\cdot[MD11]$, to provide 12th matrix data $[MD12] = {}^t[Q]\cdot[MD11]$; and a shift means for shifting said 12th matrix data [MD12]by two bits, to thereby provide said matrix data $\vec{X} = [MD12]/4$.

83. A system for performing either a two-dimensional 8×8 discrete cosine transformation (8×8 DCT) or a two-dimensional 4×8 discrete cosine transformation (4×8 DCT) in an apparatus used for both two-dimensional 8×8 DCT and two-dimensional 4×8 DCT, comprising:

a control circuit for switching said system to perform either a two-dimensional 8×8 DCT or a two-dimensional 4×8 DCT of input matrix data;

a first rearrangement circuit for rearranging words of said input matrix data, and providing output data representative thereof; wherein said first rearrangement circuit rearranges the order of up to 64 words when said control circuit is switched to perform 8×8 DCT and rearranges the order of up to 32 words when said control circuit is switched to perform 4×8 DCT;

a first fourth-order inner product computation circuit performing an inner product computation between said output data from said first rearrangement circuit and a constant matrix having coefficients of "+1" and "−1", and providing output data representative thereof;

a second rearrangement circuit for rearranging words of said output data from said first fourth-order inner product computation circuit and providing output data representative thereof; wherein said second rearrangement circuit rearranges the order of up to 64 words when said control circuit is switched to perform 8×8 DCT and rearranges the order of up to 32 words when said control circuit is switched to perform 4×8 DCT;

an inner product computation circuit receiving said output data from said second rearrangement circuit;

wherein said inner product computation circuit performs an eighth-order inner product computation between said output data from said second rearrangement circuit and a constant matrix having coefficients of "0", "+1", and "−1" when said control circuit is switched to perform 8×8 DCT, and performs a fourth-order inner product computation between said output data from said second rearrangement circuit and a constant matrix having coefficients of "+1" and "−1" when said control circuit is switched to perform 4×8 DCT;

a second fourth-order inner product computation circuit performing an inner product computation between output data from said inner product computation circuit and a constant matrix having specific constants selected by the control circuit, and providing output data representative thereof;

a third rearrangement circuit for rearranging words of said output data from said second fourth-order inner product computation circuit and providing output data representative thereof; wherein said third rearrangement circuit rearranges the order of up to 64 words when said control circuit is switched to perform 8×8 DCT and rearranges the order of up to 32 words when said control circuit is switched to perform 4×8 DCT.

84. A system for performing either a two-dimensional 8×8 discrete cosine inverse transformation (8×8 IDCT) or a two-dimensional 4×8 discrete cosine inverse transformation (4×8 IDCT) in an apparatus used for both two-dimensional 8×8 IDCT and two-dimensional 4×8 IDCT, comprising:

a control circuit for switching said system to perform either a two-dimensional 8×8 IDCT or a two-dimensional 4×8 IDCT of input matrix data;

a first rearrangement circuit for rearranging words of said input matrix data and providing output data representative thereof; wherein said first rearrangement circuit rearranges the order of up to 64 words when said control circuit is switched to perform 8×8 IDCT and rearranges the order of up to 32 words when said control circuit is switched to perform 4×8 IDCT;

a first fourth-order inner product computation circuit performing an inner product computation between said output data from said first rearrangement circuit and a constant matrix having specific constants selected by the control circuit, and providing output data representative thereof;

an inner product computation circuit receiving said output data from said first fourth-order inner product computation circuit;

wherein said inner product computation circuit performs an eighth-order inner product computation between said output data from said first fourth-order inner product computation circuit and a constant matrix having coefficients of "0", "+1", and "−1" when said control circuit is switched to perform 8×8 IDCT, and performs a fourth-order inner product computation between said output data from said first fourth-order inner product computation circuit and a constant matrix having coefficients of "+1" and "−1" when said control circuit is switched to perform 4×8 IDCT;

a second rearrangement circuit for rearranging words of output data from said inner product computation circuit and providing output data representative thereof; wherein said second rearrangement circuit rearranges the order of up to 64 words when said control circuit is switched to perform 8×8 IDCT and rearranges the order of up to 32 words when said control circuit is switched to perform 4×8 IDCT;

a second fourth-order inner product computation circuit performing an inner product computation between said output data from said second rearrangement circuit and a constant matrix having coefficients of "+1" and "−1", and providing output data representative thereof;

a third rearrangement circuit for rearranging words of said output data from said second fourth-order inner product computation circuit and providing output data representative thereof; wherein said third rearrangement circuit rearranges the order of up to 64 words when said control circuit is switched to perform 8×8 IDCT and rearranges the order of up to 32 words when said control circuit is switched to perform 4×8 IDCT.

85. A system for performing either a two-dimensional 8×8 discrete cosine transformation (8×8 DCT) or a two-dimensional 4×8 discrete cosine transformation (4×8 DCT) in an apparatus used for both two-dimensional 8×8 DCT and two-dimensional 4×8 DCT, comprising:

a control circuit for switching said system to perform either a two-dimensional 8×8 DCT or a two-dimensional 4×8 DCT of input matrix data;

a first rearrangement circuit for rearranging words of said input matrix data and providing output data representative thereof; wherein said first rearrangement circuit rearranges the order of up to 64 words when said control circuit is switched to perform 8×8 DCT and rearranges the order of up to 8 words when said control circuit is switched to perform 4×8 DCT;

a first inner product computation circuit receiving said output data from said first rearrangement circuit;

wherein said first inner product computation circuit performs a fourth-order inner product computation between said output data from said first rearrangement circuit and a constant matrix having coefficients of "+1" and "−1" when said control circuit is switched to perform 8×8 DCT, and performs a second-order inner product computation between said output data from said first rearrangement circuit and a constant matrix having coefficients of "+1" and "−1" when said control circuit is switched to perform 4×8 DCT;

a second rearrangement circuit for rearranging words of output data from said first inner product computation circuit and providing output data representative thereof; wherein said second rearrangement circuit rearranges the order of up to 64 words when said control circuit is switched to perform 8×8 DCT and rearranges the order of up to 32 words when said control circuit is switched to perform 4×8 DCT;

a second inner product computation circuit receiving said output data from said second rearrangement circuit;

wherein said second inner product computation circuit performs an eighth-order inner product computation between said output data from said second rearrangement circuit and a constant matrix having coefficients of "0", "+1", and "−1" when said control circuit is switched to perform 8×8 DCT, and performs an eighth-order inner product computation between said output data from said second rearrangement circuit and a constant matrix having coefficients of "+1" and "−1" when said control circuit is switched to perform 4×8 DCT;

a fourth-order inner product computation circuit performing an inner product computation between output data from said second inner product computation circuit and a constant matrix having specific constants selected by the control circuit, and providing output data representative thereof;

a third rearrangement circuit for rearranging said output data from said fourth-order inner product computation circuit and providing output data representative thereof; wherein said third rearrangement circuit rearranges the order of up to 64 words when said control circuit is switched to perform 8×8 DCT and rearranges the order of up to 32 words when said control circuit is switched to perform 4×8 DCT.

86. A system for performing either a two-dimensional 8×8 discrete cosine inverse transformation (8×8 IDCT) or a two-dimensional 4×8 discrete cosine inverse transformation (4×8 IDCT) in an apparatus used for both two-dimensional 8×8 IDCT and two-dimensional 4×8 IDCT, comprising:

a control circuit for switching said system to perform either a two-dimensional 8×8 IDCT or a two-dimensional 4×8 IDCT of input matrix data;

a first rearrangement circuit for rearranging words of said input matrix data and providing output data representative thereof; wherein said first rearrangement circuit rearranges the order of up to 64 words when said control circuit is switched to perform 8×8 IDCT, and rearranges the order of up to 32 words when said control circuit is switched to perform 4×8 IDCT;

a fourth-order inner product computation circuit performing an inner product computation between said output data from said first rearrangement circuit and a constant matrix having specific constants selected by the control circuit, and providing output data representative thereof;

a first inner product computation circuit receiving said output data from said fourth-order inner product computation circuit;

wherein said first inner product computation circuit performs an eighth-order inner product computation between said output data from said fourth-order inner product computation circuit and a constant matrix having coefficients of "0", "+1", and "−1" when said control circuit is switched to perform 8×8 IDCT, and performs an eighth-order inner product computation between said output data from said fourth-order inner product computation circuit and a constant matrix having coefficients of "+1" and "−1" when said control circuit is switched to perform 4×8 IDCT;

a second rearrangement circuit for rearranging words of output data from said first inner product computation circuit and providing output data representative thereof; wherein said second rearrangement circuit rearranges the order of up to 64 words when said control circuit is switched to perform 8×8 IDCT and rearranges the order of up to 32 words when said control circuit is switched to perform 4×8 IDCT;

a second inner product computation circuit receiving said output data from said second rearrangement circuit;

wherein said second inner product computation circuit performs a fourth-order inner product computation between said output data from said second rearrangement circuit and a constant matrix having coefficients of "+1" and "−1" when said control circuit is switched to perform 8×8 IDCT, and performs a second-order inner product computation between said output data from said second rearrangement circuit and a constant matrix having coefficients of "+1" and "−1" when said control circuit is switched to perform 4×8 IDCT;

a third rearrangement circuit for rearranging output data from said second inner product computation circuit and providing output data representative thereof; wherein said third rearrangement circuit rearranges the order of up to 64 words when said control circuit is switched to perform 8×8 IDCT and rearranges the order of up to 8 words when said control circuit is switched to perform 4×8 IDCT.

87. A system for performing either a two-dimensional 8×8 discrete cosine transformation (8×8 DCT) or a two-dimensional 4×8 discrete cosine transformation (4×8 DCT) in an apparatus used for both two-dimensional 8×8 DCT and two-dimensional 4×8 DCT, comprising:

a control circuit for switching said system to perform either a two-dimensional 8×8 DCT or a two-dimensional 4×8 DCT of input matrix data;

a first rearrangement circuit for rearranging words of said input matrix data, and providing output data representative thereof; wherein said first rearrangement circuit rearranges the order of up to 64 words when said control circuit is switched to perform 8×8 DCT and rearranges the order of up to 32 words when said control circuit is switched to perform 4×8 DCT;

a serial to parallel converter for providing the input matrix data in parallel form to first through fourth addition and subtraction circuits for adding and subtracting according to respective 4×4 sub-matrix data;

wherein each of said first through fourth addition and subtraction circuits provides an output to respective first through fourth inner product computation circuits;

wherein each of said first through fourth inner product computation circuits performs an eighth-order inner product computation between respective output data from the corresponding addition and subtraction circuit and a constant matrix having coefficients of "0", "+1", and "−1" when said control circuit is switched to perform 8×8 DCT, and performs a fourth-order inner product computation between respective output data from the corresponding addition and subtraction circuit and a constant matrix having coefficients of "+1" and "−1" when said control circuit is switched to perform 4×8 DCT, each of said first through fourth inner product computations circuits further providing an output to respective first through fourth fourth-order inner product computation circuits;

each of said first through fourth fourth-order inner product computation circuits performing an inner product computation between said output data from said inner product computation circuit and a constant matrix having specific constants selected by the control circuit, and providing output data representative thereof in parallel to a parallel to serial converter;

said parallel to serial converter provides an serial output data to a second rearrangement circuit;

said second rearranging circuit rearranges words of said output data from said parallel to serial converter and provides output data representative thereof; wherein said third rearrangement circuit rearranges the order of up to 64 words when said control circuit is switched to perform 8×8 DCT and rearranges the order of up to 32 words when said control circuit is switched to perform 4×8 DCT.

88. A system for performing either a two-dimensional 8×8 discrete cosine transformation (8×8 IDCT) or a two-dimensional 4×8 discrete cosine transformation (4×8 IDCT) in an apparatus used for both two-dimensional 8×8 IDCT and two-dimensional 4×8 IDCT, comprising:

a control circuit for switching said system to perform either a two-dimensional 8×8 IDCT or a two-dimensional 4×8 IDCT of input matrix data;

a first rearrangement circuit for rearranging words of said input matrix data, and providing output data representative thereof; wherein said first rearrangement circuit rearranges the order of up to 64 words when said control circuit is switched to perform 8×8 IDCT and rearranges the order of up to 32 words when said control circuit is switched to perform 4×8 IDCT;

a serial to parallel converter for providing the input matrix data in parallel form to first through fourth fourth-order inner product computation circuits;

each of said first through fourth fourth-order inner product computation circuits performing an inner product computation between said output data from said serial to parallel converter and a constant matrix having specific constants selected by the control circuit, and providing output data representative thereof to respective first through fourth inner product computation circuits;

wherein each of said first through fourth inner product computation circuits performs an eighth-order inner product computation between respective output data from the corresponding fourth-order inner product computation circuit and a constant matrix having coefficients of "0", "+1", and "−1" when said control circuit is switched to perform 8×8 IDCT, and performs a fourth-order inner product computation between respective output data from the corresponding fourth-order inner product computation circuit and a constant matrix having coefficients of "+1" and "−1" when said control circuit is switched to perform 4×8 IDCT, each of said first through fourth inner product computations circuits further providing an output to respective first through fourth addition and subtraction circuits for adding and subtracting according to respective 4×4 sub-matrix data, and each of said first through fourth addition and subtraction circuits provides an output representative thereof in parallel to a parallel to serial converter;

said parallel to serial converter provides serial output data to a second rearrangement circuit which rearranges words of said output data from said parallel to serial converter and provides output data representative thereof; and wherein said third rearrangement circuit rearranges the order of up to 64 words when said control circuit is switched to perform 8×8 IDCT and rearranges the order of up to 32 words when said control circuit is switched to perform 4×8 IDCT.

* * * * *